US012709680B2

(12) United States Patent
Hartwig et al.

(10) Patent No.: US 12,709,680 B2
(45) Date of Patent: Aug. 18, 2026

(54) OXIDIZED POLYETHYLENE COMPOUNDS AND METHODS OF MAKING THE SAME

(71) Applicant: The Regents Of The University Of California, Oakland, CA (US)

(72) Inventors: John F. Hartwig, Berkeley, CA (US); Liye Chen, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 811 days.

(21) Appl. No.: 17/921,520

(22) PCT Filed: Apr. 29, 2021

(86) PCT No.: PCT/US2021/029982
§ 371 (c)(1),
(2) Date: Oct. 26, 2022

(87) PCT Pub. No.: WO2021/222634
PCT Pub. Date: Nov. 4, 2021

(65) Prior Publication Data

US 2023/0272202 A1 Aug. 31, 2023

Related U.S. Application Data

(60) Provisional application No. 63/017,526, filed on Apr. 29, 2020.

(51) Int. Cl.

| | |
|---|---|
| ***C08F 2/06*** | (2006.01) |
| ***C08F 4/80*** | (2006.01) |
| ***C08F 8/06*** | (2006.01) |
| ***C08F 110/02*** | (2006.01) |
| ***C08K 5/3432*** | (2006.01) |
| ***C08L 23/06*** | (2006.01) |
| ***C08L 23/30*** | (2006.01) |

(52) U.S. Cl.
CPC ................ *C08L 23/30* (2013.01); *C08F 2/06* (2013.01); *C08F 4/80* (2013.01); *C08F 8/06* (2013.01); *C08F 110/02* (2013.01); *C08K 5/3432* (2013.01); *C08L 23/06* (2013.01); *C08L 2207/066* (2013.01)

(58) Field of Classification Search
CPC .... C08L 23/30; C08L 23/06; C08L 2207/066; C08L 23/04; C08F 2/06; C08F 4/80; C08F 8/06; C08F 110/02; C08K 5/3432; C08G 2261/142; C08G 2261/334; C08G 2261/418; C08G 2261/419; C08G 2261/724; C08G 61/08; C08G 61/02; C08G 61/04; B01J 31/1815; B01J 31/183; B01J 31/182; B01J 2231/70; B01J 2531/025; B01J 2531/0258; B01J 2531/821; B01J 2540/22
See application file for complete search history.

(56) References Cited

PUBLICATIONS

Bunescu et al., Catalytic Hydroxylation of Polyethylenes, ACS Central Science, vol. 3, Aug. 9, 2017, pp. 895-303.*
Bunescu (A. Bunescu et al., Catalytic hydroxylation of polyethylenes, ACS Central Science, vol. 3, Aug. 9, 2017, pp. 895-903).*
Wang (C. Wang et al., Fast catalytic hydroxylation of hydrocarbons with ruthenium porphyrins, Inorganic Chemistry, vol. 45 (12), May 18, 2006, pp. 4769-4782).*
Bae, C. et al. (Jan. 19, 2005). "Catalytic hydroxylation of polypropylenes," *J Am Chem Soc* 127(2):767-776.
Bae, C. et al. (Oct. 7, 2005). "Regiospecific side-chain functionalization of linear low-density polyethylene with polar groups," *Angew Chem Int Ed Engl* 44(39):6410-6413.
Boaen, N. K. et al. (2003). "Selective and Mild Oxyfunctionalization of Model Polyolefins," *Macromolecules* 36(19):7027-7034.
Boffa, L. S. et al. (Apr. 12, 2000). "Copolymerization of polar monomers with olefins using transition-metal complexes," Chem Rev 100(4):1479-1494.
Bunescu, A. et al. (Aug. 9, 2017). "Catalytic Hydroxylation of Polyethylenes," *ACS Central Science* 3:895-903.
Carrow, B. P. et al. (May 30, 2012). "Synthesis of functional polyolefins using cationic bisphosphine monoxide-palladium complexes," *J Am Chem Soc* 134(21):8802-8805.
Desai, S. M. et al. (2004). "Surface Modification of Polyethylene," *Adv Polym Sci* 169:231-294.
Groves, J. T. et al. (1996). "Rapid Catalytic Oxygenation of Hydrocarbons by Ruthenium Pentafluorophenylporphyrin Complexes: Evidence for the Involvement of a Ru(III) Intermediate," *J Am Chem Soc* 118(37):8961-8962.
Hillmyer, M. A. et al. (1995). "Ring-Opening Metathesis Polymerization of Functionalized Cyclooctenes by a Ruthenium-Based Metathesis Catalyst," *Macromolecules* 28(18):6311-6316.
Holmes-Farley, S. R. et al. (1985). "Acid-Base Behavior of Carboxylic Acid Groups Covalently Attached at the Surface of Polyethylene: The Usefulness of Contact Angle in Following the Ionization of Surface Functionality," *Langmuir* 1(6):725-740.
International Search Report mailed on Sep. 21, 2021, for PCT Application No. PCT/US2021/029982, filed Apr. 29, 2021, 6 pages.
Jagur-Grodzinski, J. (1992). "Modification of Polymers Under Heterogeneous Conditions," *Prog Polym Sci* 17(3):361-415.
Johnson, L. K. et al. (1996). "Copolymerization of Ethylene and Propylene with Functionalized Vinyl Monomers by Palladium(II) Catalysts," *J Am Chem Soc* 118(1):267-268.
Kochi, T. et al. (Jul. 25, 2007). "Formation of linear copolymers of ethylene and acrylonitrile catalyzed by phosphine sulfonate palladium complexes," *J Am Chem Soc* 129(29):8948-8949.
Kondo, Y. et al. (Feb. 20, 2002). "Rhodium-catalyzed, regiospecific functionalization of polyolefins in the melt," *J Am Chem Soc* 124(7):1164-1165.
Ortmann, P. et al. (Jul. 21, 2015). "Long-Spaced Polyketones from ADMET Copolymerizations as Ideal Models for Ethylene/CO Copolymers," *ACS Macro Letters* 4(7), 704-707.

(Continued)

*Primary Examiner* — Kumar R Bhushan
(74) *Attorney, Agent, or Firm* — Mintz, Levin, Cohn, Ferris, Glovsky and Popeo, P.C.

(57) ABSTRACT

Disclosed herein, inter alia, are oxidized polyethylene compounds and compositions and methods of making the same.

5 Claims, 16 Drawing Sheets

(56) References Cited

PUBLICATIONS

Wang, C. et al. (May 18, 2006). "Fast Catalytic Hydroxylation of Hydrocarbons with Ruthenium Porphyrins," *Inorganic Chemistry* 45(12): 4769-4782.

Watson, M. D. et al. (2000). "Tandem Homogeneous Metathesis/Heterogeneous Hydrogenation: Preparing Model Ethylene/CO2 and Ethylene/CO Copolymers," *Macromolecules* 33(9):3196-3201.

Watson, M. D. et al. (2000). "Functionalized Polyethylene via Acyclic Diene Metathesis Polymerization: Effect of Precise Placement of Functional Groups," *Macromolecules* 33(24):8963-8970.

Williamson, J. B. et al. (May 22, 2018). "Regioselective C-H Xanthylation as a Platform for Polyolefin Functionalization," *Angew Chem Int Ed* 57(21) 6261-6265.

Williamson, J. B. et al. (Aug. 14, 2019). "Chemo- and Regioselective Functionalization of Isotactic Polypropylene: A Mechanistic and Structure-Property Study," *J Am Chem Soc* 141(32):12815-12823.

Written Opinion mailed on Sep. 21, 2021, for PCT Application No. PCT/US2021/029982, filed Apr. 29, 2021, 9 pages.

* cited by examiner from LDPE 3
$M_n$ = 25.7 kg/mol, $Đ$ = 6.87
l/n = 1.7, m/n = 2.1
$T_m$ = 100.9 °C
$T_d$ = 414.9 °C starting LDPE 3:
$M_n$ = 25.9 kg/mol, $Đ$ = 6.76
$T_m$ = 110.8 °C,
$T_d$ = 441.8 °C from HDPE 4
$M_n$ = 7.1 kg/mol, $Đ$ = 6.56
l/n = 1.6, m/n = 2.3
$T_m$ = 117.9 °C
$T_d$ = 421.0 °C starting HDPE 4:
$M_n$ = 7.0 kg/mol, $Đ$ = 11.4
$T_m$ = 126.4 °C,
$T_d$ = 451.3 °C from LLDPE 5
$M_n$ = 22.6 kg, $Đ$ = 5.85
l/n = 1.5, m/n = 2.5
$T_m$ = 110.2 °C
$T_d$ = 422.8 °C starting LLDPE 5:
$M_n$ = 22.7 kg/mol, $Đ$ = 5.44
$T_m$ = 120.8 °C,
$T_d$ = 453.0 °C FIG. 5A
FIG. 5B
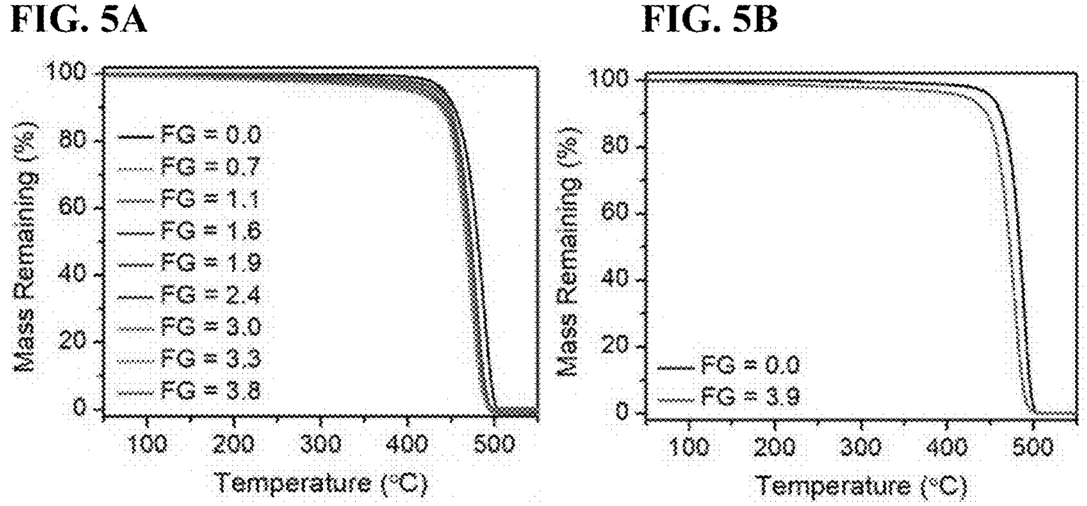
FIG. 5C
FIG. 6A
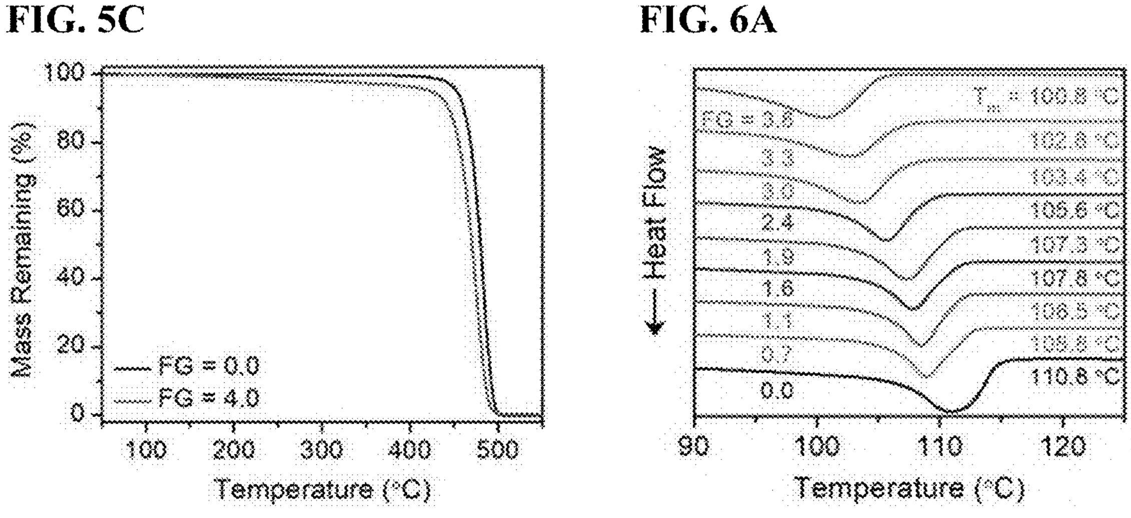

$C_6F_5$ (TPFPP)
2,4,6-$C_6H_2(CH_3)_3$ (TMP)
$C_6H_5$ (TPP)

2,4,6-$C_6H_2(CH_3)_3$ (TMP)
w/ AgOTs

Fe(TPP)Cl $(SbF_6)_2$

Fe-(R,R-PDP)

$(OTf)_2$ $[Fe(BpyPy_2Me)(CH_3CN)_2](OTf)_2$

OXIDIZED POLYETHYLENE COMPOUNDS AND METHODS OF MAKING THE SAME

CROSS-REFERENCES TO RELATED APPLICATIONS

This application is the national stage filing under 35 U.S.C. § 371 of International Application No. PCT/US2021/029982 filed Apr. 29, 2021, which claims the benefit of U.S. Provisional Application No. 63/017,526, filed Apr. 29, 2020, which are incorporated herein by reference in their entirety and for all purposes.

STATEMENT AS TO RIGHTS TO INVENTIONS MADE UNDER FEDERALLY SPONSORED RESEARCH AND DEVELOPMENT

This invention was made with government support under Grant Number DE-AC02-05CH11231 awarded by the U.S. Department of Energy. The government has certain rights in the invention.

BACKGROUND

Polyolefins currently constitute approximately half of all synthetic plastics produced worldwide. Despite their low cost and excellent thermal and mechanical properties, polyolefins generally do not mix well with other materials, and this lack of compatibility limits their use in high-performance composites and as components of more sustainable plastics. Incorporating low levels of polar functional groups into polyolefins is a promising strategy to overcome this shortcoming. Disclosed herein, inter alia, are solutions to these and other problems in the art.

BRIEF SUMMARY

In an aspect is provided an oxidized polyethylene, including a first oxidized subunit, a second oxidized subunit, and a non-oxidized subunit.

The first oxidized subunit has the formula:

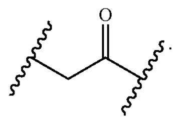 [SMILES: *CC(*)=O]

The second oxidized subunit has the formula:

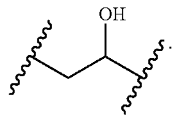 [SMILES: *CC(*)O]

The non-oxidized subunit has the formula:

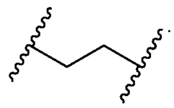 [SMILES: *CC*]

In embodiments, the ratio of the first and second oxidized subunits to the non-oxidized subunit is from 1:10,000 to 1:5.

In embodiments, the oxidized polyethylene has a number average molecular weight from 150 Da to 20,000,000 Da.

In embodiments, a sum of a chloride subunit of formula

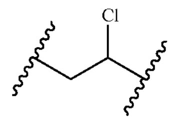

and an ester subunit of formula

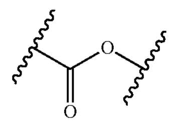

of the oxidized polyethylene is less than about 6% of a sum of the first oxidized subunit and the second oxidized subunit of the oxidized polyethylene.

In an aspect is provided a hydroxylated polyethylene, including a second oxidized subunit and a non-oxidized subunit. The second oxidized subunit and the non-oxidized subunit are as described herein. The hydroxylated polyethylene has a number average molecular weight from 150 Da to 20,000,000 Da.

In an aspect is provided a cross-linked polymer, wherein a first oxidized polyethylene (e.g., as described herein) is covalently bonded to a second oxidized polyethylene (e.g., as described herein) via a covalent linker having the formula:

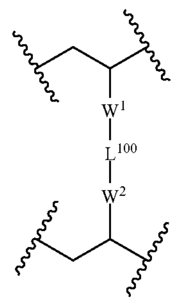

$W^1$ is —O— or —$NR^1$—. $W^2$ is —O— or —$NR^2$—.

$R^1$ and $R^2$ are independently hydrogen, halogen, —$CX^3_3$, —$CHX^3_2$, —$CH_2X^3$, —$OCX^3_3$, —$OCH_2X^3$, —$OCHX^3_2$, —CN, —$SO_{n3}R^3$, —$SO_{v3}NR^3R^3$, —$NR^3NR^3R^3$, —$ONR^3R^3$, —$NHC(O)NR^3NR^3R^3$, —$NHC(O)NR^3R^3$, —$N(O)_{m3}$, —$NR^3R^3$, —$C(O)R^3$, —$C(O)OR^3$, —$C(O)NR^3R^3$, —$OR^3$, —$SR^3$, —$NR^3SO_2R^3$, —$NR^3C(O)R^3$, —$NR^3C(O)OR^3$, —$NR^3OR^3$, —$SF_5$, —$N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

$R^3$ is independently hydrogen, oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —S H, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—OCCl_3$, $—OCF_3$, $—OCBr_3$, $—OCI_3$, $—OCHCl_2$, $—OCHBr_2$, $—OCHI_2$, $—OCHF_2$, $—OCH_2Cl$, $—OCH_2Br$, $—OCH_2I$, $—OCH_2F$, $—N_3$, $—SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^3$ substituents bonded to the same nitrogen atom may optionally be joined to form a substituted or unsubstituted heterocycloalkyl, or substituted or unsubstituted heteroaryl.

$L^{100}$ is $-L^{101}-L^{102}-L^{103}-$.

$L^{101}$ is a bond, $—N(R^{101})—$, —S—, —O—, —C(O)—, —C(O)O—, —OC(O)—, $—N(R^{101})C(O)—$, $—C(O)N(R^{101})—$, $—NR^{101}C(O)NR^{101}—$, $—NR^{101}C(NH)NH—$, —C(S)—, $—Si(R^{101})_2—$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

$L^{102}$ is a bond, $—N(R^{102})—$, —S—, —O—, —C(O)—, —C(O)O—, —OC(O)—, $—N(R^{102})C(O)—$, $—C(O)N(R^{102})—$, $—NR^{102}C(O)NR^{102}—$, $—NR^{102}C(NH)NH—$, —C(S)—, $—Si(R^{102})_2—$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene.

$L^{103}$ is a bond, $—N(R^{103})—$, —S—, —O—, —C(O)—, —C(O)O—, —OC(O)—, $—N(R^{103})C(O)—$, $—C(O)N(R^{103})—$, $—NR^{103}C(O)NR^{103}—$, $—NR^{103}C(NH)NH—$, —C(S)—, $—Si(R^{103})_2—$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene $R^{101}$, $R^{102}$, and $R^{103}$ are independently hydrogen, halogen, $—CX^{104}_3$, $—CHX^{104}_2$, $—CH_2X^{104}$, $—OCX^{104}_3$, $—OCH_2X^{104}$, $—OCHX^{104}_2$, —CN, $—SO_{n104}R^{104}$, $—SO_{v104}NR^{104}R^{104}$, $—NR^{104}NR^{104}R^{104}$, $—ONR^{104}R^{104}$, $—NHC(O)NR^{104}NR^{104}R^{104}$, $—NHC(O)NR^{104}R^{104}$, $—N(O)_{m104}$, $—NR^{104}R^{104}$, $—C(O)R^{104}$, $—C(O)OR^{104}$, $—C(O)NR^{104}R^{104}$, $—OR^{104}$, $—SR^{104}$, $—NR^{104}SO_2R^{104}$, $—NR^{104}C(O)R^{104}$, $—NR^{104}C(O)OR^{104}$, $—NR^{104}R^{104}$, $—SF_5$, $—N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

$R^{104}$ is independently hydrogen, oxo, halogen, $—CCl_3$, $—CBr_3$, $—CF_3$, $—CI_3$, $—CHCl_2$, $—CHBr_2$, $—CHF_2$, $—CHI_2$, $—CH_2Cl$, $—CH_2Br$, $—CH_2F$, $—CH_2I$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—OCCl_3$, $—OCF_3$, $—OCBr_3$, $—OCI_3$, $—OCHCl_2$, $—OCHBr_2$, $—OCHI_2$, $—OCHF_2$, $—OCH_2Cl$, $—OCH_2Br$, $—OCH_2I$, $—OCH_2F$, $—N_3$, $—SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^{104}$ substituents bonded to the same nitrogen atom may optionally be joined to form a substituted or unsubstituted heterocycloalkyl, or substituted or unsubstituted heteroaryl.

$X^3$ and $X^{104}$ are independently —F, —Cl, —Br, or —I.

The variables n3 and n104 are independently an integer from 0 to 4.

The variables m3, m104, v3, and v104 are independently 1 or 2.

In an aspect is provided an oxidized polyethylene in a vessel including an oxidized polyethylene and one or more additional compounds selected from the groups consisting of: (i) a metal catalyst; (ii) an oxidizing agent; (iii) a reducing agent; and (iv) a polyethylene; wherein the metal catalyst is not a manganese porphyrin catalyst or an iron porphyrin catalyst.

The oxidized polyethylene and the hydroxylated polyethylene are as described herein, including in embodiments.

The polyethylene includes a non-oxidized subunit, wherein the non-oxidized subunit is as described herein.

In an aspect is provided a mixture of polymers including an oxidized polyethylene and a second polymer. The oxidized polyethylene is as described herein, including in embodiments.

In an aspect is provided a cross-linked polymer and a second polymer. The cross-linked polymer is as described herein, including in embodiments.

In an aspect is provided a method of making an oxidized polyethylene, including mixing a polyethylene, a metal catalyst, and an oxidizing agent. The oxidized polyethylene, polyethylene, metal catalyst, and oxidizing agent are as described herein, including in embodiments. The metal catalyst is not a manganese porphyrin catalyst or an iron porphyrin catalyst.

In embodiments, a sum of a chloride subunit of formula

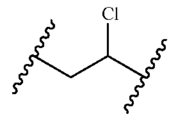

and an ester subunit of formula

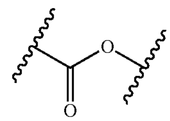

of the oxidized polyethylene is less than about 6% of a sum of the first oxidized subunit and the second oxidized subunit of the oxidized polyethylene.

Other aspects are disclosed infra.

BRIEF DESCRIPTION OF THE DRAWINGS

FIG. 1A: Copolymerization. FIG. 1B: Post-polymerization modification.

FIGS. 5A-5C. Plots of thermogravimetric analysis for oxidized LDPE (FIG. 5A), HDPE (FIG. 5B), and LLDPE (FIG. 5C).

FIGS. 6A-6C. Graphs of differential scanning calorimetry for oxidized LDPE (FIG. 6A), HDPE (FIG. 6B), and LLDPE (FIG. 6C).

DETAILED DESCRIPTION

I. Definitions

Figure 1A:
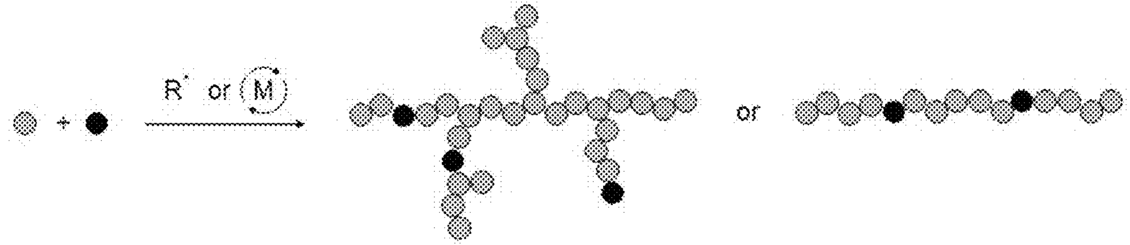
FIGS. 1A-1B. Two conceptually different approaches for the synthesis of polar-functionalized polyethylenes. LLDPE: linear low-density polyethylene; LDPE: low-density polyethylene; HDPE: high-density polyethylene; FG: functional group.

The abbreviations used herein have their conventional meaning within the chemical and biological arts. The chemical structures and formulae set forth herein are constructed according to the standard rules of chemical valency known in the chemical arts.

Where substituent groups are specified by their conventional chemical formulae, written from left to right, they equally encompass the chemically identical substituents that would result from writing the structure from right to left, e.g., $—CH_2O—$ is equivalent to $—OCH_2—$.

The term "alkyl," by itself or as part of another substituent, means, unless otherwise stated, a straight (i.e., unbranched) or branched carbon chain (or carbon), or combination thereof, which may be fully saturated, mono- or polyunsaturated and can include mono-, di-, and multivalent radicals. The alkyl may include a designated number of carbons (e.g., $C_1$-$C_{10}$ means one to ten carbons). Alkyl is an uncyclized chain. Examples of saturated hydrocarbon radicals include, but are not limited to, groups such as methyl, ethyl, n-propyl, isopropyl, n-butyl, t-butyl, isobutyl, sec-butyl, methyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. An alkoxy is an alkyl attached to the remainder of the molecule via an oxygen linker (—O—). An alkyl moiety may be an alkenyl moiety. An alkyl moiety may be an alkynyl moiety. An alkyl moiety may be fully saturated. An alkenyl may include more than one double bond and/or one or more triple bonds in addition to the one or more double bonds. An alkynyl may include more than one triple bond and/or one or more double bonds in addition to the one or more triple bonds. In embodiments, the alkyl is fully saturated. In embodiments, the alkyl is monounsaturated. In embodiments, the alkyl is polyunsaturated.

The term "alkylene," by itself or as part of another substituent, means, unless otherwise stated, a divalent radical derived from an alkyl, as exemplified, but not limited by, $—CH_2CH_2CH_2CH_2—$. Typically, an alkyl (or alkylene) group will have from 1 to 24 carbon atoms, with those groups having 10 or fewer carbon atoms being preferred herein. A "lower alkyl" or "lower alkylene" is a shorter chain alkyl or alkylene group, generally having eight or fewer carbon atoms. The term "alkenylene," by itself or as part of another substituent, means, unless otherwise stated, a divalent radical derived from an alkene. The term "alkynylene" by itself or as part of another substituent, means, unless otherwise stated, a divalent radical derived from an alkyne. In embodiments, the alkylene is fully saturated. In embodiments, the alkylene is monounsaturated. In embodiments, the alkylene is polyunsaturated. In embodiments, an alkenylene includes one or more double bonds. In embodiments, an alkynylene includes one or more triple bonds.

The term "heteroalkyl," by itself or in combination with another term, means, unless otherwise stated, a stable straight or branched chain, or combinations thereof, including at least one carbon atom and at least one heteroatom (e.g., O, N, P, Si, and S), and wherein the nitrogen and sulfur atoms may optionally be oxidized, and the nitrogen heteroatom may optionally be quaternized. The heteroatom(s) (e.g., O, N, S, Si, or P) may be placed at any interior position of the heteroalkyl group or at the position at which the alkyl group is attached to the remainder of the molecule. Heteroalkyl is an uncyclized chain. Examples include, but are not limited to: $—CH_2—CH_2—O—CH_3$, $—CH_2—CH_2—NH—CH_3$, $—CH_2—CH_2—N(CH_3)—CH_3$, $—CH_2—S—CH_2—CH_3$, $—CH_2—S—CH_2$, $—S(O)—CH_3$, $—CH_2—CH_2—S(O)_2—CH_3$, $—CH{=}CHO—CH_3$, $—Si(CH_3)_3$, $—CH_2—CH{=}N—OCH_3$, $—CH{=}CH—N(CH_3)—CH_3$, $—O—CH_3$, $—O—CH_2—CH_3$, and —CN. Up to two or three heteroatoms may be consecutive, such as, for example, $—CH_2—NH—OCH_3$ and $—CH_2—O—Si(CH_3)_3$. A heteroalkyl moiety may include one heteroatom (e.g., O, N, S, Si, or P). A heteroalkyl moiety may include two optionally different heteroatoms (e.g., O, N, S, Si, or P). A heteroalkyl moiety may include three optionally different heteroatoms (e.g., O, N, S, Si, or P). A heteroalkyl moiety may include four optionally different heteroatoms (e.g., O, N, S, Si, or P). A heteroalkyl moiety may include five optionally different heteroatoms (e.g., O, N, S, Si, or P). A heteroalkyl moiety may include up to 8 optionally different heteroatoms (e.g., O, N, S, Si, or P). The term "heteroalkenyl," by itself or in combination with another term, means, unless otherwise stated, a heteroalkyl including at least one double bond. A heteroalkenyl may optionally include more than one double bond and/or one or more triple bonds in additional to the one or more double bonds. The term "heteroalkynyl," by itself or in combination with another term, means, unless otherwise stated, a heteroalkyl including at least one triple bond. A heteroalkynyl may optionally include more than one triple bond and/or one or more double bonds in additional to the one or more triple bonds. In embodiments, the heteroalkyl is fully saturated. In embodiments, the heteroalkyl is monounsaturated. In embodiments, the heteroalkyl is polyunsaturated.

Similarly, the term "heteroalkylene," by itself or as part of another substituent, means, unless otherwise stated, a divalent radical derived from heteroalkyl, as exemplified, but not limited by, $—CH_2—CH_2—S—CH_2—CH_2—$ and $—CH_2—S—CH_2—CH_2—NH—CH_2—$. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula $—C(O)_2R'—$ represents both $—C(O)_2R'—$ and $—R'C(O)_2—$. As described above, heteroalkyl groups, as used herein, include those groups that are attached to the remainder of the molecule through a heteroatom, such as —C(O)R', —C(O)NR', —NR'R", —OR', —SR', and/or $—SO_2R'$. Where "heteroalkyl" is recited, followed by recitations of specific heteroalkyl groups, such as —NR'R" or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like. The term "heteroalkenylene," by itself or as part of another substituent, means, unless otherwise stated, a divalent radical derived from a heteroalkene. The term "heteroalkynylene" by itself or as part of another substituent, means, unless otherwise stated, a divalent radical derived from a heteroalkyne. In embodiments, the heteroalkylene is fully saturated. In embodiments, the heteroalkylene is monounsaturated. In embodiments, the heteroalkylene is polyunsaturated. In embodiments, a heteroalkenylene includes one or more double bonds. In embodiments, a heteroalkynylene includes one or more triple bonds.

The terms "cycloalkyl" and "heterocycloalkyl," by themselves or in combination with other terms, mean, unless otherwise stated, cyclic versions of "alkyl" and "heteroalkyl," respectively. Cycloalkyl and heterocycloalkyl are not aromatic. Additionally, for heterocycloalkyl, a heteroatom can occupy the position at which the heterocycle is attached to the remainder of the molecule. Examples of cycloalkyl include, but are not limited to, cyclopropyl, cyclobutyl, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. A "cycloalkylene" and a "heterocycloalkylene," alone or as part of another substituent, means a divalent radical derived from a cycloalkyl and heterocycloalkyl, respectively. In embodiments, the cycloalkyl is fully saturated. In embodiments, the cycloalkyl is monounsaturated. In embodiments, the cycloalkyl is polyunsaturated. In embodiments, the heterocycloalkyl is fully saturated. In embodiments, the heterocycloalkyl is monounsaturated. In embodiments, the heterocycloalkyl is polyunsaturated.

In embodiments, the term "cycloalkyl" means a monocyclic, bicyclic, or a multicyclic cycloalkyl ring system. In embodiments, monocyclic ring systems are cyclic hydrocarbon groups containing from 3 to 8 carbon atoms, where such groups can be saturated or unsaturated, but not aromatic. In embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. A bicyclic or multicyclic cycloalkyl ring system refers to multiple rings fused together wherein at least one of the fused rings is a cycloalkyl ring and wherein the multiple rings are attached to the parent molecular moiety through any carbon atom contained within a cycloalkyl ring of the multiple rings. In embodiments, bridged monocyclic rings contain a monocyclic cycloalkyl ring where two non adjacent carbon atoms of the monocyclic ring are linked by an alkylene bridge of between one and three additional carbon atoms (i.e., a bridging group of the form $(CH_2)_w$, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. In embodiments, fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. In embodiments, the bridged or fused bicyclic cycloalkyl is attached to the parent molecular moiety through any carbon atom contained within the monocyclic cycloalkyl ring. In embodiments, cycloalkyl groups are optionally substituted with one or two groups which are independently oxo or thia. In embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thia. In embodiments, multicyclic cycloalkyl ring systems are a monocyclic cycloalkyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other ring systems independently selected from the group consisting of a phenyl, a bicyclic aryl, a monocyclic or bicyclic heteroaryl, a monocyclic or bicyclic cycloalkyl, a monocyclic or bicyclic cycloalkenyl, and a monocyclic or bicyclic heterocyclyl. In embodiments, the multicyclic cycloalkyl is attached to the parent molecular moiety through any carbon atom contained within the base ring. In embodiments, multicyclic cycloalkyl ring systems are a monocyclic cycloalkyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other ring systems independently selected from the group consisting of a phenyl, a monocyclic heteroaryl, a monocyclic cycloalkyl, a monocyclic cycloalkenyl, and a monocyclic heterocyclyl. Examples of multicyclic cycloalkyl groups include, but are not limited to tetradecahydrophenanthrenyl, perhydrophenothiazin-1-yl, and perhydrophenoxazin-1-yl.

In embodiments, a cycloalkyl is a cycloalkenyl. The term "cycloalkenyl" is used in accordance with its plain ordinary meaning. In embodiments, a cycloalkenyl is a monocyclic, bicyclic, or a multicyclic cycloalkenyl ring system. In embodiments, monocyclic cycloalkenyl ring systems are cyclic hydrocarbon groups containing from 3 to 8 carbon atoms, where such groups are unsaturated (i.e., containing at least one annular carbon carbon double bond), but not aromatic. Examples of monocyclic cycloalkenyl ring systems include cyclopentenyl and cyclohexenyl. In embodiments, bicyclic cycloalkenyl rings are bridged monocyclic rings or a fused bicyclic rings. In embodiments, bridged monocyclic rings contain a monocyclic cycloalkenyl ring where two non adjacent carbon atoms of the monocyclic ring are linked by an alkylene bridge of between one and three additional carbon atoms (i.e., a bridging group of the form $(CH_2)_w$, where w is 1, 2, or 3). Representative examples of bicyclic cycloalkenyls include, but are not limited to, norbornenyl and bicyclo[2.2.2]oct 2 enyl. In embodiments, fused bicyclic cycloalkenyl ring systems contain a monocyclic cycloalkenyl ring fused to either a phenyl, a monocyclic cycloalkyl, a monocyclic cycloalkenyl, a monocyclic heterocyclyl, or a monocyclic heteroaryl. In embodiments, the bridged or fused bicyclic cycloalkenyl is attached to the parent molecular moiety through any carbon atom contained within the monocyclic cycloalkenyl ring. In embodiments, cycloalkenyl groups are optionally substituted with one or two groups which are independently oxo or thia. In embodiments, multicyclic cycloalkenyl rings contain a monocyclic cycloalkenyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two ring systems independently selected from the group consisting of a phenyl, a bicyclic aryl, a monocyclic or bicyclic heteroaryl, a monocyclic or bicyclic cycloalkyl, a monocyclic or bicyclic cycloalkenyl, and a monocyclic or bicyclic heterocyclyl. In embodiments, the multicyclic cycloalkenyl is attached to the parent molecular moiety through any carbon atom contained within the base ring. In embodiments, multicyclic cycloalkenyl rings contain a monocyclic cycloalkenyl ring (base ring) fused to either (i) one ring system selected from the group consisting of a bicyclic cycloalkyl, a bicyclic cycloalkenyl, and a bicyclic heterocyclyl; or (ii) two ring systems independently selected from the group consisting of a monocyclic cycloalkyl, a monocyclic cycloalkenyl, and a monocyclic heterocyclyl.

In embodiments, the term "heterocycloalkyl" means a monocyclic, bicyclic, or a multicyclic heterocycloalkyl ring system. In embodiments, heterocycloalkyl groups are fully saturated. A bicyclic or multicyclic heterocycloalkyl ring system refers to multiple rings fused together wherein at least one of the fused rings is a heterocycloalkyl ring and wherein the multiple rings are attached to the parent molecular moiety through any atom contained within a heterocycloalkyl ring of the multiple rings. In embodiments, a heterocycloalkyl is a heterocyclyl. The term "heterocyclyl" as used herein, means a monocyclic, bicyclic, or multicyclic heterocycle. The heterocyclyl monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N, and S. The 5 membered ring can contain zero or one double bond and one, two or three heteroatoms selected from the group consisting of O, N, and S. The 6 or 7 membered ring contains zero, one or two double bonds and one, two or three heteroatoms selected from the group consisting of O, N, and S. The heterocyclyl monocyclic heterocycle is connected to the parent molecular moiety through any carbon atom or any nitrogen atom contained within the heterocyclyl monocyclic heterocycle. Representative examples of heterocyclyl monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The heterocyclyl bicyclic heterocycle is a monocyclic heterocycle fused to either a phenyl, a monocyclic cycloalkyl, a monocyclic cycloalkenyl, a monocyclic heterocycle, or a monocyclic heteroaryl. The heterocyclyl bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. In embodiments, heterocyclyl groups are optionally substituted with one or two groups which are independently oxo or thia. In certain embodiments, the bicyclic heterocyclyl is a 5 or 6 membered monocyclic heterocyclyl ring fused to a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thia. Multicyclic heterocyclyl ring systems are a monocyclic heterocyclyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other ring systems independently selected from the group consisting of a phenyl, a bicyclic aryl, a monocyclic or bicyclic heteroaryl, a monocyclic or bicyclic cycloalkyl, a monocyclic or bicyclic cycloalkenyl, and a monocyclic or bicyclic heterocyclyl. The multicyclic heterocyclyl is attached to the parent molecular moiety through any carbon atom or nitrogen atom contained within the base ring. In embodiments, multicyclic heterocyclyl ring systems are a monocyclic heterocyclyl ring (base ring) fused to either (i) one ring system selected from the group consisting of a bicyclic aryl, a bicyclic heteroaryl, a bicyclic cycloalkyl, a bicyclic cycloalkenyl, and a bicyclic heterocyclyl; or (ii) two other ring systems independently selected from the group consisting of a phenyl, a monocyclic heteroaryl, a monocyclic cycloalkyl, a monocyclic cycloalkenyl, and a monocyclic heterocyclyl. Examples of multicyclic heterocyclyl groups include, but are not limited to 10H-phenothiazin-10-yl, 9,10-dihydroacridin-9-yl, 9,10-dihydroacridin-10-yl, 10H-phenoxazin-10-yl, 10,11-dihydro-5H-dibenzo[b,f]azepin-5-yl, 1,2,3,4-tetrahydropyrido[4,3-g]isoquinolin-2-yl, 12H-benzo[b]phenoxazin-12-yl, and dodecahydro-1H-carbazol-9-yl.

The terms "halo" or "halogen," by themselves or as part of another substituent, mean, unless otherwise stated, a fluorine, chlorine, bromine, or iodine atom. Additionally, terms such as "haloalkyl" are meant to include monohaloalkyl and polyhaloalkyl. For example, the term "halo($C_1$-$C_4$) alkyl" includes, but is not limited to, fluoromethyl, difluoromethyl, trifluoromethyl, 2,2,2-trifluoroethyl, 4-chlorobutyl, 3-bromopropyl, and the like.

The term "acyl" means, unless otherwise stated, —C(O)R where R is a substituted or unsubstituted alkyl, substituted or unsubstituted cycloalkyl, substituted or unsubstituted heteroalkyl, substituted or unsubstituted heterocycloalkyl, substituted or unsubstituted aryl, or substituted or unsubstituted heteroaryl.

The term “aryl” means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring. In embodiments, a fused ring aryl refers to multiple rings fused together wherein at least one of the fused rings is an aryl ring and wherein the multiple rings are attached to the parent molecular moiety through any carbon atom contained within an aryl ring of the multiple rings. The term “heteroaryl” refers to aryl groups (or rings) that contain at least one heteroatom such as N, O, or S, wherein the nitrogen and sulfur atoms are optionally oxidized, and the nitrogen atom(s) are optionally quaternized. Thus, the term “heteroaryl” includes fused ring heteroaryl groups (i.e., multiple rings fused together wherein at least one of the fused rings is a heteroaromatic ring). In embodiments, the term “heteroaryl” includes fused ring heteroaryl groups (i.e., multiple rings fused together wherein at least one of the fused rings is a heteroaromatic ring and wherein the multiple rings are attached to the parent molecular moiety through any atom contained within a heteroaromatic ring of the multiple rings). A 5,6-fused ring heteroarylene refers to two rings fused together, wherein one ring has 5 members and the other ring has 6 members, and wherein at least one ring is a heteroaryl ring. Likewise, a 6,6-fused ring heteroarylene refers to two rings fused together, wherein one ring has 6 members and the other ring has 6 members, and wherein at least one ring is a heteroaryl ring. And a 6,5-fused ring heteroarylene refers to two rings fused together, wherein one ring has 6 members and the other ring has 5 members, and wherein at least one ring is a heteroaryl ring. A heteroaryl group can be attached to the remainder of the molecule through a carbon or heteroatom. Non-limiting examples of aryl and heteroaryl groups include phenyl, naphthyl, pyrrolyl, pyrazolyl, pyridazinyl, triazinyl, pyrimidinyl, imidazolyl, pyrazinyl, purinyl, oxazolyl, isoxazolyl, thiazolyl, furyl, thienyl, pyridyl, pyrimidyl, benzothiazolyl, benzoxazoyl benzimidazolyl, benzofuran, isobenzofuranyl, indolyl, isoindolyl, benzothiophenyl, isoquinolyl, quinoxalinyl, quinolyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below. An “arylene” and a “heteroarylene,” alone or as part of another substituent, mean a divalent radical derived from an aryl and heteroaryl, respectively. A heteroaryl group substituent may be —O— bonded to a ring heteroatom nitrogen.

A fused ring heterocyloalkyl-aryl is an aryl fused to a heterocycloalkyl. A fused ring heterocycloalkyl-heteroaryl is a heteroaryl fused to a heterocycloalkyl. A fused ring heterocycloalkyl-cycloalkyl is a heterocycloalkyl fused to a cycloalkyl. A fused ring heterocycloalkyl-heterocycloalkyl is a heterocycloalkyl fused to another heterocycloalkyl. Fused ring heterocycloalkyl-aryl, fused ring heterocycloalkyl-heteroaryl, fused ring heterocycloalkyl-cycloalkyl, or fused ring heterocycloalkyl-heterocycloalkyl may each independently be unsubstituted or substituted with one or more of the substitutents described herein.

Spirocyclic rings are two or more rings wherein adjacent rings are attached through a single atom. The individual rings within spirocyclic rings may be identical or different. Individual rings in spirocyclic rings may be substituted or unsubstituted and may have different substituents from other individual rings within a set of spirocyclic rings. Possible substituents for individual rings within spirocyclic rings are the possible substituents for the same ring when not part of spirocyclic rings (e.g., substituents for cycloalkyl or heterocycloalkyl rings). Spirocylic rings may be substituted or unsubstituted cycloalkyl, substituted or unsubstituted cycloalkylene, substituted or unsubstituted heterocycloalkyl or substituted or unsubstituted heterocycloalkylene and individual rings within a spirocyclic ring group may be any of the immediately previous list, including having all rings of one type (e.g., all rings being substituted heterocycloalkylene wherein each ring may be the same or different substituted heterocycloalkylene). When referring to a spirocyclic ring system, heterocyclic spirocyclic rings means a spirocyclic rings wherein at least one ring is a heterocyclic ring and wherein each ring may be a different ring. When referring to a spirocyclic ring system, substituted spirocyclic rings means that at least one ring is substituted and each substituent may optionally be different.

The symbol “〰” denotes the point of attachment of a chemical moiety to the remainder of a molecule or chemical formula.

The term “oxo,” as used herein, means an oxygen that is double bonded to a carbon atom.

The term “alkylarylene” as an arylene moiety covalently bonded to an alkylene moiety (also referred to herein as an alkylene linker). In embodiments, the alkylarylene group has the formula:

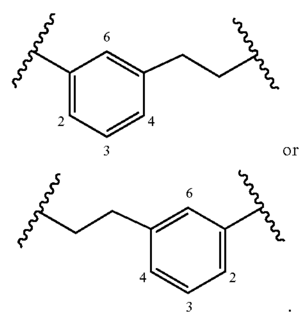

or

An alkylarylene moiety may be substituted (e.g., with a substituent group) on the alkylene moiety or the arylene linker (e.g., at carbons 2, 3, 4, or 6) with halogen, oxo, $—N_3$, $—CF_3$, $—CCl_3$, $—CBr_3$, $—CI_3$, —CN, —C(O)H, —OH, $—NH_2$, —COOH, $—CONH_2$, $—NO_2$, —SH, $—SO_2CH_3$, $—SO_3H$, $—OSO_3H$, $—SO_2NH_2$, $—NHNH_2$, $—ONH_2$, $—NHC(O)NHNH_2$, substituted or unsubstituted $C_1$-$C_5$ alkyl or substituted or unsubstituted 2 to 5 membered heteroalkyl). In embodiments, the alkylarylene is unsubstituted.

The term “alkylsulfonyl,” as used herein, means a moiety having the formula $—S(O_2)—R'$, where R' is a substituted or unsubstituted alkyl group as defined above. R' may have a specified number of carbons (e.g., “$C_1$-$C_4$ alkylsulfonyl”).

Each of the above terms (e.g., "alkyl," "heteroalkyl," "cycloalkyl," "heterocycloalkyl," "aryl," and "heteroaryl") includes both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C$(O)_2$R', —NR—C(NR'R"R'")=NR"", —NR—C(NR'R")=NR'", —S(O)R', —S$(O)_2$R', —S$(O)_2$NR'R", —NR$SO_2$R', —NR'NR"R'", —ONR'R", —NR'C(O)NR"NR'"R"", —CN, —$NO_2$, —NR'$SO_2$R", —NR'C(O)R", —NR'C(O)OR", —NR'OR", in a number ranging from zero to (2 m'+1), where m' is the total number of carbon atoms in such radical. R, R', R", R'", and R"" each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound described herein includes more than one R group, for example, each of the R groups is independently selected as are each R', R", R'", and R"" group when more than one of these groups is present. When R' and R" are attached to the same nitrogen atom, they can be combined with the nitrogen atom to form a 4-, 5-, 6-, or 7-membered ring. For example, —NR'R" includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Similar to the substituents described for the alkyl radical, substituents for the aryl and heteroaryl groups are varied and are selected from, for example: —OR', —NR'R", —SR', -halogen, —SiR'R"R'", —OC(O)R', —C(O)R', —$CO_2$R', —CONR'R", —OC(O)NR'R", —NR"C(O)R', —NR'—C(O)NR"R'", —NR"C$(O)_2$R', —NR—C(NR'R"R'")=NR"", —NR—C(NR'R")=NR'", —S(O)R', —S$(O)_2$R', —S$(O)_2$NR'R", —NR$SO_2$R', —NR'NR"R'", —ONR'R", —NR'C(O)NR"NR'"R"", —CN, —$NO_2$, —R', —$N_3$, —CH$(Ph)_2$, fluoro($C_1$-$C_4$)alkoxy, and fluoro($C_1$-$C_4$)alkyl, —NR'$SO_2$R", —NR'C(O)R", —NR'C(O)—OR", —NR'OR", in a number ranging from zero to the total number of open valences on the aromatic ring system; and where R', R", R'", and R"" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl. When a compound described herein includes more than one R group, for example, each of the R groups is independently selected as are each R', R", R'", and R"" groups when more than one of these groups is present.

Substituents for rings (e.g., cycloalkyl, heterocycloalkyl, aryl, heteroaryl, cycloalkylene, heterocycloalkylene, arylene, or heteroarylene) may be depicted as substituents on the ring rather than on a specific atom of a ring (commonly referred to as a floating substituent). In such a case, the substituent may be attached to any of the ring atoms (obeying the rules of chemical valency) and in the case of fused rings or spirocyclic rings, a substituent depicted as associated with one member of the fused rings or spirocyclic rings (a floating substituent on a single ring), may be a substituent on any of the fused rings or spirocyclic rings (a floating substituent on multiple rings). When a substituent is attached to a ring, but not a specific atom (a floating substituent), and a subscript for the substituent is an integer greater than one, the multiple substituents may be on the same atom, same ring, different atoms, different fused rings, different spirocyclic rings, and each substituent may optionally be different. Where a point of attachment of a ring to the remainder of a molecule is not limited to a single atom (a floating substituent), the attachment point may be any atom of the ring and in the case of a fused ring or spirocyclic ring, any atom of any of the fused rings or spirocyclic rings while obeying the rules of chemical valency. Where a ring, fused rings, or spirocyclic rings contain one or more ring heteroatoms and the ring, fused rings, or spirocyclic rings are shown with one more floating substituents (including, but not limited to, points of attachment to the remainder of the molecule), the floating substituents may be bonded to the heteroatoms. Where the ring heteroatoms are shown bound to one or more hydrogens (e.g., a ring nitrogen with two bonds to ring atoms and a third bond to a hydrogen) in the structure or formula with the floating substituent, when the heteroatom is bonded to the floating substituent, the substituent will be understood to replace the hydrogen, while obeying the rules of chemical valency.

Two or more substituents may optionally be joined to form aryl, heteroaryl, cycloalkyl, or heterocycloalkyl groups. Such so-called ring-forming substituents are typically, though not necessarily, found attached to a cyclic base structure. In one embodiment, the ring-forming substituents are attached to adjacent members of the base structure. For example, two ring-forming substituents attached to adjacent members of a cyclic base structure create a fused ring structure. In another embodiment, the ring-forming substituents are attached to a single member of the base structure. For example, two ring-forming substituents attached to a single member of a cyclic base structure create a spirocyclic structure. In yet another embodiment, the ring-forming substituents are attached to non-adjacent members of the base structure.

Two of the substituents on adjacent atoms of the aryl or heteroaryl ring may optionally form a ring of the formula -T-C(O)—$(CRR')_q$—U—, wherein T and U are independently —NR—, —O—, —CRR'—, or a single bond, and q is an integer of from 0 to 3. Alternatively, two of the substituents on adjacent atoms of the aryl or heteroaryl ring may optionally be replaced with a substituent of the formula -A-$(CH_2)_r$—B—, wherein A and B are independently —CRR'—, —O—, —NR—, —S—, —S(O)—, —S$(O)_2$—, —S$(O)_2$NR', or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —$(CRR')_s$—X'—$(C"R"R'")_d$—, where s and d are independently integers of from 0 to 3, and X' is —O—, —NR'—, —S—, —S(O)—, —S$(O)_2$—, or —S$(O)_2$NR'—. The substituents R, R', R", and R'" are preferably independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, and substituted or unsubstituted heteroaryl.

As used herein, the terms "heteroatom" or "ring heteroatom" are meant to include oxygen (O), nitrogen (N), sulfur (S), phosphorus (P), and silicon (Si).

A "substituent group," as used herein, means a group selected from the following moieties:

(A) oxo, halogen, $CCl_3$, —$CBr_3$, —$CF_3$, —$CI_3$, $CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and (B) alkyl (e.g., $C_1$-$C_{20}$, $C_1$-$C_{12}$, $C_1$-$C_8$, $C_1$-$C_6$, $C_1$-$C_4$, or $C_1$-$C_2$), heteroalkyl (e.g., 2 to 20 membered, 2 to 12 membered, 2 to 8 membered, 2 to 6 membered, 4 to 6 membered, 2 to 3 membered, or 4 to 5 membered), cycloalkyl (e.g., $C_3$-$C_{10}$, $C_3$-$C_8$, $C_3$-$C_6$, $C_4$-$C_6$, or $C_5$-$C_6$), heterocycloalkyl (e.g., 3 to 10 membered, 3 to 8 membered, 3 to 6 membered, 4 to 6 membered, 4 to 5 membered, or 5 to 6 membered), aryl (e.g., $C_6$-$C_{12}$, $C_6$-$C_{10}$, or phenyl), or heteroaryl (e.g., 5 to 12 membered, 5 to 10 membered, 5 to 9 membered, or 5 to 6 membered), substituted with at least one substituent selected from:

(i) oxo, halogen, —$CCl_3$, —$CBr_3$, —$CF_3$, —$CI_3$, $CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and (ii) alkyl (e.g., $C_1$-$C_{20}$, $C_1$-$C_{12}$, $C_1$-$C_8$, $C_1$-$C_6$, $C_1$-$C_4$, or $C_1$-$C_2$), heteroalkyl (e.g., 2 to 20 membered, 2 to 12 membered, 2 to 8 membered, 2 to 6 membered, 4 to 6 membered, 2 to 3 membered, or 4 to 5 membered), cycloalkyl (e.g., $C_3$-$C_{10}$, $C_3$-$C_8$, $C_3$-$C_6$, $C_4$-$C_6$, or $C_5$-$C_6$), heterocycloalkyl (e.g., 3 to 10 membered, 3 to 8 membered, 3 to 6 membered, 4 to 6 membered, 4 to 5 membered, or 5 to 6 membered), aryl (e.g., $C_6$-$C_{12}$, $C_6$-$C_{10}$, or phenyl), or heteroaryl (e.g., 5 to 12 membered, 5 to 10 membered, 5 to 9 membered, or 5 to 6 membered), substituted with at least one substituent selected from:

(a) oxo, halogen, —$CCl_3$, —$CBr_3$, —$CF_3$, —$CI_3$, $CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl), and (b) alkyl (e.g., $C_1$-$C_{20}$, $C_1$-$C_{12}$, $C_1$-$C_8$, $C_1$-$C_6$, $C_1$-$C_4$, or $C_1$-$C_2$), heteroalkyl (e.g., 2 to 20 membered, 2 to 12 membered, 2 to 8 membered, 2 to 6 membered, 4 to 6 membered, 2 to 3 membered, or 4 to 5 membered), cycloalkyl (e.g., $C_3$-$C_{10}$, $C_3$-$C_8$, $C_3$-$C_6$, $C_4$-$C_6$, or $C_5$-$C_6$), heterocycloalkyl (e.g., 3 to 10 membered, 3 to 8 membered, 3 to 6 membered, 4 to 6 membered, 4 to 5 membered, or 5 to 6 membered), aryl (e.g., $C_6$-$C_{12}$, $C_6$-$C_{10}$, or phenyl), or heteroaryl (e.g., 5 to 12 membered, 5 to 10 membered, 5 to 9 membered, or 5 to 6 membered), substituted with at least one substituent selected from: oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl).

A "size-limited substituent" or "size-limited substituent group," as used herein, means a group selected from all of the substituents described above for a "substituent group," wherein each substituted or unsubstituted alkyl is a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and each substituted or unsubstituted heteroaryl is a substituted or unsubstituted 5 to 10 membered heteroaryl.

A "lower substituent" or "lower substituent group," as used herein, means a group selected from all of the substituents described above for a "substituent group," wherein each substituted or unsubstituted alkyl is a substituted or unsubstituted $C_1$-$C_8$ alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted phenyl, and each substituted or unsubstituted heteroaryl is a substituted or unsubstituted 5 to 6 membered heteroaryl.

In some embodiments, each substituted group described in the compounds herein is substituted with at least one substituent group. More specifically, in some embodiments, each substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene described in the compounds herein are substituted with at least one substituent group. In other embodiments, at least one or all of these groups are substituted with at least one size-limited substituent group. In other embodiments, at least one or all of these groups are substituted with at least one lower substituent group.

In other embodiments of the compounds herein, each substituted or unsubstituted alkyl may be a substituted or unsubstituted $C_1$-$C_{20}$ alkyl, each substituted or unsubstituted heteroalkyl is a substituted or unsubstituted 2 to 20 membered heteroalkyl, each substituted or unsubstituted cycloalkyl is a substituted or unsubstituted $C_3$-$C_8$ cycloalkyl, each substituted or unsubstituted heterocycloalkyl is a substituted or unsubstituted 3 to 8 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 10 membered heteroaryl. In some embodiments of the compounds herein, each substituted or unsubstituted alkylene is a substituted or unsubstituted $C_1$-$C_{20}$ alkylene, each substituted or unsubstituted heteroalkylene is a substituted or unsubstituted 2 to 20 membered heteroalkylene, each substituted or unsubstituted cycloalkylene is a substituted or unsubstituted $C_3$-$C_8$ cycloalkylene, each substituted or unsubstituted heterocycloalkylene is a substituted or unsubstituted 3 to 8 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 10 membered heteroarylene.

In some embodiments, each substituted or unsubstituted alkyl is a substituted or unsubstituted $C_1$-$C_8$alkyl, each substituted or unsubstituted heteroalkyl is a substituted or unsubstituted 2 to 8 membered heteroalkyl, each substituted or unsubstituted cycloalkyl is a substituted or unsubstituted $C_3$-$C_7$ cycloalkyl, each substituted or unsubstituted heterocycloalkyl is a substituted or unsubstituted 3 to 7 membered heterocycloalkyl, each substituted or unsubstituted aryl is a substituted or unsubstituted $C_6$-$C_{10}$ aryl, and/or each substituted or unsubstituted heteroaryl is a substituted or unsubstituted 5 to 9 membered heteroaryl. In some embodiments, each substituted or unsubstituted alkylene is a substituted or unsubstituted $C_1$-$C_8$alkylene, each substituted or unsubstituted heteroalkylene is a substituted or unsubstituted 2 to 8 membered heteroalkylene, each substituted or unsubstituted cycloalkylene is a substituted or unsubstituted $C_3$-$C_7$ cycloalkylene, each substituted or unsubstituted heterocycloalkylene is a substituted or unsubstituted 3 to 7 membered heterocycloalkylene, each substituted or unsubstituted arylene is a substituted or unsubstituted $C_6$-$C_{10}$ arylene, and/or each substituted or unsubstituted heteroarylene is a substituted or unsubstituted 5 to 9 membered heteroarylene. In some embodiments, the compound is a chemical species set forth in the application (e.g., Examples section, claims, embodiments, figures, or tables below).

In embodiments, a substituted or unsubstituted moiety (e.g., substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted alkylene, substituted or unsubstituted heteroalkylene, substituted or unsubstituted cycloalkylene, substituted or unsubstituted heterocycloalkylene, substituted or unsubstituted arylene, and/or substituted or unsubstituted heteroarylene) is unsubstituted (e.g., is an unsubstituted alkyl, unsubstituted heteroalkyl, unsubstituted cycloalkyl, unsubstituted heterocycloalkyl, unsubstituted aryl, unsubstituted heteroaryl, unsubstituted alkylene, unsubstituted heteroalkylene, unsubstituted cycloalkylene, unsubstituted heterocycloalkylene, unsubstituted arylene, and/or unsubstituted heteroarylene, respectively). In embodiments, a substituted or unsubstituted moiety (e.g., substituted or unsubstituted alkyl, substituted or unsubstituted heteroalkyl, substituted or unsubstituted cycloalkyl, substituted or unsubstituted heterocycloalkyl, substituted or unsubstituted aryl, substituted or unsubstituted heteroaryl, substituted or unsubstituted alkylene, substituted or unsubstituted heteroalkylene, substituted or unsubstituted cycloalkylene, substituted or unsubstituted heterocycloalkylene, substituted or unsubstituted arylene, and/or substituted or unsubstituted heteroarylene) is substituted (e.g., is a substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene, respectively).

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one substituent group, wherein if the substituted moiety is substituted with a plurality of substituent groups, each substituent group may optionally be different. In embodiments, if the substituted moiety is substituted with a plurality of substituent groups, each substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one size-limited substituent group, wherein if the substituted moiety is substituted with a plurality of size-limited substituent groups, each size-limited substituent group may optionally be different. In embodiments, if the substituted moiety is substituted with a plurality of size-limited substituent groups, each size-limited substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one lower substituent group, wherein if the substituted moiety is substituted with a plurality of lower substituent groups, each lower substituent group may optionally be different. In embodiments, if the substituted moiety is substituted with a plurality of lower substituent groups, each lower substituent group is different.

In embodiments, a substituted moiety (e.g., substituted alkyl, substituted heteroalkyl, substituted cycloalkyl, substituted heterocycloalkyl, substituted aryl, substituted heteroaryl, substituted alkylene, substituted heteroalkylene, substituted cycloalkylene, substituted heterocycloalkylene, substituted arylene, and/or substituted heteroarylene) is substituted with at least one substituent group, size-limited substituent group, or lower substituent group; wherein if the substituted moiety is substituted with a plurality of groups selected from substituent groups, size-limited substituent groups, and lower substituent groups; each substituent group, size-limited substituent group, and/or lower substituent group may optionally be different. In embodiments, if the substituted moiety is substituted with a plurality of groups selected from substituent groups, size-limited substituent groups, and lower substituent groups; each substituent group, size-limited substituent group, and/or lower substituent group is different.

In a recited claim or chemical formula description herein, each R substituent or L linker that is described as being "substituted" without reference as to the identity of any chemical moiety that composes the "substituted" group (also referred to herein as an "open substitution" on an R substituent or L linker or an "openly substituted" R substituent or L linker), the recited R substituent or L linker may, in embodiments, be substituted with one or more first substituent groups as defined below.

The first substituent group is denoted with a corresponding first decimal point numbering system such that, for example, $R^1$ may be substituted with one or more first substituent groups denoted by $R^{1.1}$, $R^2$ may be substituted with one or more first substituent groups denoted by $R^{2.1}$, $R^3$ may be substituted with one or more first substituent groups denoted by $R^{3.1}$, $R^4$ may be substituted with one or more first substituent groups denoted by $R^{4.1}$, $R^5$ may be substituted with one or more first substituent groups denoted by $R^{5.1}$, and the like up to or exceeding an $R^{100}$ that may be substituted with one or more first substituent groups denoted by $R^{100.1}$. As a further example, RA may be substituted with one or more first substituent groups denoted by $R^{1A.1}$, $R^{2A}$ may be substituted with one or more first substituent groups denoted by $R^{2A.1}$, $R^{3A}$ may be substituted with one or more first substituent groups denoted by $R^{3A.1}$, $R^{4A}$ may be substituted with one or more first substituent groups denoted by $R^{4A.1}$, $R^{5A}$ may be substituted with one or more first substituent groups denoted by $R^{5A.1}$ and the like up to or exceeding an $R^{100A}$ may be substituted with one or more first substituent groups denoted by $R^{100A.1}$ As a further example, $L^1$ may be substituted with one or more first substituent groups denoted by $R^{L1.1}$, $L^2$ may be substituted with one or more first substituent groups denoted by $R^{L2.1}$, $L^3$ may be substituted with one or more first substituent groups denoted by $R^{L3.1}$, $L^4$ may be substituted with one or more first substituent groups denoted by $R^{L4.1}$, $L^5$ may be substituted with one or more first substituent groups denoted by $R^{L5.1}$ and the like up to or exceeding an $L^{100}$ which may be substituted with one or more first substituent groups denoted by $R^{L100.1}$. Thus, each numbered R group or L group (alternatively referred to herein as $R^{WW}$ or $L^{WW}$ wherein "WW" represents the stated superscript number of the subject R group or L group) described herein may be substituted with one or more first substituent groups referred to herein generally as $R^{WW.1}$ or $R^{LWW.1}$, respectively. In turn, each first substituent group (e.g., $R^{1.1}$, $R^{2.1}$, $R^{3.1}$, $R^{4.1}$, $R^{5.1}$ . . . $R^{100.1}$; $R^{1A.1}$, $R^{2A.1}$, $R^{3A.1}$, $R^{4A.1}$, $R^{5A.1}$ . . . $R^{100A.1}$; $R^{L1.1}$, $R^{L2.1}$, $R^{L3.1}$, $R^{L4.1}$, $R^{L5.1}$ . . . $R^{L100.1}$) may be further substituted with one or more second substituent groups (e.g., $R^{1.2}$, $R^{2.2}$, $R^{3.2}$, $R^{4.2}$, $R^{5.2}$ . . . $R^{100.2}$; $R^{1A.2}$, $R^{2A.2}$, $R^{3A.2}$, $R^{4A.2}$, $R^{5A.2}$ . . . $R^{100A.2}$; $R^{L1.2}$, $R^{L2.2}$, $R^{L3.2}$, $R^{L4.2}$, $R^{L5.2}$ . . . $R^{L100.2}$, respectively). Thus, each first substituent group, which may alternatively be represented herein as $R^{WW.1}$ as described above, may be further substituted with one or more second substituent groups, which may alternatively be represented herein as $R^{WW2}$.

Finally, each second substituent group (e.g., $R^{1.2}$, $R^{2.2}$, $R^{3.2}$, $R^{4.2}$, $R^{5.2}$ . . . $R^{100.2}$; $R^{1A.2}$, $R^{2A.2}$, $R^{3A.2}$, $R^{4A.2}$, $R^{5A.2}$ . . . $R^{100A.2}$; $R^{L1.2}$, $R^{L2.2}$, $R^{L3.2}$, $R^{L4.2}$, $R^{L5.2}$ . . . $R^{L100.2}$) may be further substituted with one or more third substituent groups (e.g., $R^{1.3}$, $R^{2.3}$, $R^{3.3}$, $R^{4.3}$, $R^{5.3}$ . . . $R^{100.3}$; $R^{1A.3}$, $R^{2A.3}$, $R^{3A.3}$, $R^{4A.3}$, $R^{5A.3}$ . . . $R^{100A.3}$; $R^{L1.3}$, $R^{L2.3}$, $R^{L3.3}$, $R^{L4.3}$, $R^{L5.3}$ . . . $R^{L100.3}$; respectively). Thus, each second substituent group, which may alternatively be represented herein as $R^{WW.2}$ as described above, may be further substituted with one or more third substituent groups, which may alternatively be represented herein as $R^{WW.3}$. Each of the first substituent groups may be optionally different. Each of the second substituent groups may be optionally different. Each of the third substituent groups may be optionally different.

Thus, as used herein, $R^{WW}$ represents a substituent recited in a claim or chemical formula description herein which is openly substituted. "WW" represents the stated superscript number of the subject R group (1, 2, 3, 1A, 2A, 3A, 1B, 2B, 3B, etc.). Likewise, $L^{WW}$ is a linker recited in a claim or chemical formula description herein which is openly substituted. Again, "WW" represents the stated superscript number of the subject L group (1, 2, 3, 1A, 2A, 3A, 1B, 2B, 3B, etc.). As stated above, in embodiments, each $R^{WW}$ may be unsubstituted or independently substituted with one or more first substituent groups, referred to herein as $R^{WW.1}$; each first substituent group, $R^{WW.1}$, may be unsubstituted or independently substituted with one or more second substituent groups, referred to herein as $R^{WW.2}$; and each second substituent group may be unsubstituted or independently substituted with one or more third substituent groups, referred to herein as $R^{WW.3}$. Similarly, each $L^{WW}$ linker may be unsubstituted or independently substituted with one or more first substituent groups, referred to herein as $R^{LWW.1}$; each first substituent group, $R^{LWW.1}$, may be unsubstituted or independently substituted with one or more second substituent groups, referred to herein as $R^{LWW.2}$; and each second substituent group may be unsubstituted or independently substituted with one or more third substituent groups, referred to herein as $R^{LWW.3}$. Each first substituent group is optionally different. Each second substituent group is optionally different. Each third substituent group is optionally different. For example, if $R^{WW}$ is phenyl, the said phenyl group is optionally substituted by one or more $R^{WW.1}$ groups as defined herein below, e.g., when $R^{WW.1}$ is $R^{WW.2}$-substituted or unsubstituted alkyl, examples of groups so formed include but are not limited to itself optionally substituted by 1 or more $R^{WW.2}$, which $R^{WW.2}$ is optionally substituted by one or more $R^{WW.3}$. By way of example when the $R^{WW}$ group is phenyl substituted by $R^{WW.1}$, which is methyl, the methyl group may be further substituted to form groups including but not limited to:

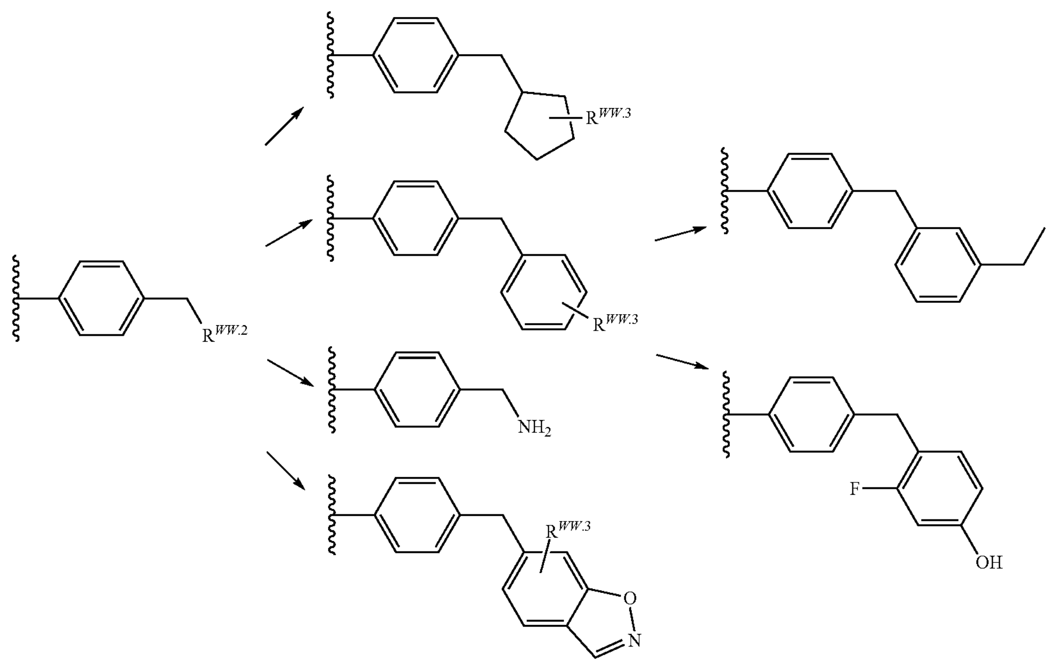

membered), $R^{WW.2}$-substituted or unsubstituted aryl (e.g., $C_6$-$C_{12}$, $C_6$-$C_{10}$, or phenyl), or $R^{WW.2}$-substituted or unsubstituted heteroaryl (e.g., 5 to 12 membered, 5 to 10 membered, 5 to 9 membered, or 5 to 6 membered). In embodiments, $R^{WW.1}$ is independently oxo, halogen, $-CX^{WW.1}_3$, $-CHX^{WW.1}_2$, $-CH_2X^{WW.1}$, $-OCX^{WW.1}_3$, $-OCH_2X^{WW.1}$, $-OCHX^{WW.1}_2$, —CN, —OH, $-NH_2$, —COOH, $-CONH_2$, $-NO_2$, —SH, $-SO_3H$, $-OSO_3H$, $-SO_2NH_2$, $-NHNH_2$, $-ONH_2$, $-NHC(O)NHNH_2$, $-NHC(O)NH_2$, $-NHSO_2H$, —NHC(O)H, —NHC(O)OH, —NHOH, $-N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{WW.1}$ is independently —F, —Cl, —Br, or —I.

$R^{WW.1}$ is independently oxo, halogen, $-CX^{WW.1}_3$, $-CHX^{WW.1}_2$, $-CH_2X^{WW.1}$, $-OCX^{WW.1}_3$, $-OCH_2X^{WW.1}$, $-OCHX^{WW.1}_3$, —CN, —OH, $-NH_2$, —COOH, $-CONH_2$, $-NO_2$, —SH, $-SO_3H$, $-OSO_3H$, $-SO_2NH_2$, $-NHNH_2$, $-ONH_2$, $-NHC(O)NHNH_2$, $-NHC(O)NH_2$, $-NHSO_2H$, —NHC(O)H, —NHC(O)OH, —NHOH, $-N_3$, $R^{WW.2}$-substituted or unsubstituted alkyl (e.g., $C_1$-$C_8$, $C_1$-$C_6$, $C_1$-$C_4$, or $C_1$-$C_2$), $R^{WW.2}$-substituted or unsubstituted heteroalkyl (e.g., 2 to 8 membered, 2 to 6 membered, 4 to 6 membered, 2 to 3 membered, or 4 to 5 membered), $R^{WW.2}$-substituted or unsubstituted cycloalkyl (e.g., $C_3$-$C_8$, $C_3$-$C_6$, $C_4$-$C_6$, or $C_5$-$C_6$), $R^{WW.2}$-substituted or unsubstituted heterocycloalkyl (e.g., 3 to 8 membered, 3 to 6 membered, 4 to 6 membered, 4 to 5 membered, or 5 to 6

$R^{WW.2}$ is independently oxo, halogen, $-CX^{WW.2}_3$, $-CHX^{WW.2}_2$, $-CH_2X^{WW.2}$, $-OCX^{WW.2}_3$, $-OCH_2X^{WW.2}$, $-OCHX^{WW.2}_3$, —CN, —OH, $-NH_2$, —COOH, $-CONH_2$, $-NO_2$, —SH, $-SO_3H$, $-OSO_3H$, $-SO_2NH_2$, $-NHNH_2$, $-ONH_2$, $-NHC(O)NHNH_2$, $-NHC(O)NH_2$, $-NHSO_2H$, —NHC(O)H, —NHC(O)OH, —NHOH, $-N_3$, $R^{WW.3}$-substituted or unsubstituted alkyl (e.g., $C_1$-$C_8$, $C_1$-$C_6$, $C_1$-$C_4$, or $C_1$-$C_2$), $R^{WW.3}$-substituted or unsubstituted heteroalkyl (e.g., 2 to 8 membered, 2 to 6 membered, 4 to 6 membered, 2 to 3 membered, or 4 to 5 membered), $R^{WW.3}$-substituted or unsubstituted cycloalkyl (e.g., $C_3$-$C_8$, $C_3$-$C_6$, $C_4$-$C_6$, or $C_5$-$C_6$), $R^{WW.3}$-substituted or unsubstituted heterocycloalkyl (e.g., 3 to 8 membered, 3 to 6 membered, 4 to 6 membered, 4 to 5 membered, or 5 to 6 membered), $R^{WW.3}$-substituted or unsubstituted aryl (e.g., $C_6$-$C_{12}$, $C_6$-$C_{10}$, or phenyl), or $R^{WW.3}$-substituted or unsubstituted heteroaryl (e.g., 5 to 12 membered, 5 to 10 membered, 5 to 9 membered, or 5 to 6 membered). In embodiments, $R^{WW.2}$ is independently oxo, halogen, $—CXW^{WW.2}_3$, $—CHX^{WW.2}_2$, $—CH_2X^{WW.2}$, $—OCX^{WW.2}_3$, $—OCH_2X^{WW.2}$, $—OCHX^{WW.2}_3$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{WW.2}$ is independently —F, —Cl, —Br, or —I.

$R^{WW.3}$ is independently oxo, halogen, $—CX^{WW.3}_3$, $—CHX^{WW.3}_2$, $—CH_2X^{WW.3}$, $—OCX^{WW.3}_3$, $—OCH_2X^{WW.3}$, $—OCHX^{WW.3}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{WW.3}$ is independently —F, —Cl, —Br, or —I.

Where two different $R^{WW}$ substituents are joined together to form an openly substituted ring (e.g., substituted cycloalkyl, substituted heterocycloalkyl, substituted aryl or substituted heteroaryl), in embodiments the openly substituted ring may be independently substituted with one or more first substituent groups, referred to herein as $R^{WW.1}$; each first substituent group, $R^{WW.1}$, may be unsubstituted or independently substituted with one or more second substituent groups, referred to herein as $R^{WW.2}$; and each second substituent group, $R^{WW.2}$, may be unsubstituted or independently substituted with one or more third substituent groups, referred to herein as $R^{WW.3}$; and each third substituent group, $R^{WW.3}$, is unsubstituted. Each first substituent group is optionally different. Each second substituent group is optionally different. Each third substituent group is optionally different. In the context of two different $R^{WW}$ substituents joined together to form an openly substituted ring, the "WW" symbol in the $R^{WW.1}$, $R^{WW.2}$ and $R^{WW.3}$ refers to the designated number of one of the two different $R^{WW}$ substituents. For example, in embodiments where $R^{100A}$ and $R^{100B}$ are optionally joined together to form an openly substituted ring, $R^{WW.1}$ is $R^{100A}$, $R^{WW.2}$ is $R^{100A.2}$, and $R^{WW.3}$ is $R^{100A.3}$. Alternatively, in embodiments where $R^{100A}$ and $R^{100B}$ are optionally joined together to form an openly substituted ring, $R^{WW.1}$ is $R^{100B.1}$, $R^{WW.2}$ is $R^{100B.2}$, and $R^{WW.3}$ is $R^{100B.3}$. $R^{WW.1}$, $R^{WW.2}$ and $R^{WW.3}$ in this paragraph are as defined in the preceding paragraphs.

$R^{LWW.1}$ is independently oxo, halogen, $—CX^{LWW.1}_3$, $—CHX^{LWW.1}_2$, $—CH_2X^{LWW.1}$, $—OCX^{LWW.1}_3$, $—OCH_2X^{LWW.1}$, $—OCHX^{LWW.1}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, $R^{LWW.2}$-substituted or unsubstituted alkyl (e.g., $C_1$-$C_8$, $C_1$-$C_6$, $C_1$-$C_4$, or $C_1$-$C_2$), $R^{LWW.2}$-substituted or unsubstituted heteroalkyl (e.g., 2 to 8 membered, 2 to 6 membered, 4 to 6 membered, 2 to 3 membered, or 4 to 5 membered), $R^{LWW.2}$-substituted or unsubstituted cycloalkyl (e.g., $C_3$-$C_8$, $C_3$-$C_6$, $C_4$-$C_6$, or $C_5$-$C_6$), $R^{LWW.2}$-substituted or unsubstituted heterocycloalkyl (e.g., 3 to 8 membered, 3 to 6 membered, 4 to 6 membered, 4 to 5 membered, or 5 to 6 membered), $R^{LWW.2}$-substituted or unsubstituted aryl (e.g., $C_6$-$C_{12}$, $C_6$-$C_{10}$, or phenyl), or $R^{LWW.2}$-substituted or unsubstituted heteroaryl (e.g., 5 to 12 membered, 5 to 10 membered, 5 to 9 membered, or 5 to 6 membered). In embodiments, $R^{LWW.1}$ is independently oxo, halogen, $—CXL^{LWW.1}_3$, $—CHX^{LWW.1}_2$, $—CH_2X^{LWW.1}$, $—OCX^{LWW.1}_3$, $—OCH_2X^{LWW.1}$, $—OCHX^{LWW.1}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{LWW.1}$ is independently —F, —Cl, —Br, or —I.

$R^{LWW.2}$ is independently oxo, halogen, $—CX^{LWW.2}_3$, $—CHX^{LWW.2}_2$, $—CH_2X^{LWW.2}$, $—OCX^{LWW.2}_3$, $—OCH_2X^{LWW.2}$, $—OCHX^{LWW.2}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, $R^{LWW.3}$-substituted or unsubstituted alkyl (e.g., $C_1$-$C_8$, $C_1$-$C_6$, $C_1$-$C_4$, or $C_1$-$C_2$), $R^L$w 0.3-substituted or unsubstituted heteroalkyl (e.g., 2 to 8 membered, 2 to 6 membered, 4 to 6 membered, 2 to 3 membered, or 4 to 5 membered), $R^{WW.3}$-substituted or unsubstituted cycloalkyl (e.g., $C_3$-$C_8$, $C_3$-$C_6$, $C_4$-$C_6$, or $C_5$-$C_6$), $R^{LWW.3}$-substituted or unsubstituted heterocycloalkyl (e.g., 3 to 8 membered, 3 to 6 membered, 4 to 6 membered, 4 to 5 membered, or 5 to 6 membered), $R^{LWW.3}$-substituted or unsubstituted aryl (e.g., $C_6$-$C_{12}$, $C_6$-$C_{10}$, or phenyl), or $R^{LWW.3}$-substituted or unsubstituted heteroaryl (e.g., 5 to 12 membered, 5 to 10 membered, 5 to 9 membered, or 5 to 6 membered). In embodiments, $R^{LWW.2}$ is independently oxo, halogen, $—CX^{LWW.2}_3$, $—CHX^{LWW.2}_2$, $—CH_2X^{LWW.2}$, $—OCX^{LWW.2}_3$, $—OCH_2X^{LWW.2}$, $—OCHX^{LWW.2}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)—OH, —NHOH, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{LWW.2}$ is independently —F, —Cl, —Br, or —I.

$R^{LWW.3}$ is independently oxo, halogen, $—CX^{LWW.3}_3$, $—CHX^{LWW.3}_2$, $—CH_2X^{LWW.3}$, $—OCX^{LWW.3}_3$, $—OCH_2X^{LWW.3}_3$, $—OCHX^{LWW.3}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, unsubstituted alkyl (e.g., $C_1$-$C_8$, $C_1$-$C_6$, $C_1$-$C_4$, or $C_1$-$C_2$), unsubstituted heteroalkyl (e.g., 2 to 8 membered, 2 to 6 membered, 4 to 6 membered, 2 to 3 membered, or 4 to 5 membered), unsubstituted cycloalkyl (e.g., $C_3$-$C_8$, $C_3$-$C_6$, $C_4$-$C_6$, or $C_5$-$C_6$), unsubstituted heterocycloalkyl (e.g., 3 to 8 membered, 3 to 6 membered, 4 to 6 membered, 4 to 5 membered, or 5 to 6 membered), unsubstituted aryl (e.g., $C_6$-$C_{12}$, $C_6$-$C_{10}$, or phenyl), or unsubstituted heteroaryl (e.g., 5 to 12 membered, 5 to 10 membered, 5 to 9 membered, or 5 to 6 membered). $X^{LWW.3}$ is independently —F, —Cl, —Br, or —I.

In the event that any R group recited in a claim or chemical formula description set forth herein ($R^{WW}$ substituent) is not specifically defined in this disclosure, then that R group ($R^{WW}$ group) is hereby defined as independently oxo, halogen, $—CX^{WW}_3$, $—CHX^{WW}_2$, $—CH_2X^{WW}$, $—OCX^{WW}_3$, $—OCH_2X^{WW}$, $—OCHX^{WW}_2$, —CN, —OH, $—NH_2$, —COOH, $—CONH_2$, $—NO_2$, —SH, $—SO_3H$, $—OSO_3H$, $—SO_2NH_2$, $—NHNH_2$, $—ONH_2$, $—NHC(O)NHNH_2$, $—NHC(O)NH_2$, $—NHSO_2H$, —NHC(O)H, —NHC(O)OH, —NHOH, $—N_3$, $R^{WW.1}$-substituted or unsubstituted alkyl (e.g., $C_1$-$C_8$, $C_1$-$C_6$, $C_1$-$C_4$, or $C_1$-$C_2$), $R^{WW.1}$-substituted or unsubstituted heteroalkyl (e.g., 2 to 8 membered, 2 to 6 membered, 4 to 6 membered, 2 to 3 membered, or 4 to 5 membered), $R^{WW.1}$-substituted or unsubstituted cycloalkyl (e.g., $C_3$-$C_8$, $C_3$-$C_6$, $C_4$-$C_6$, or $C_5$-$C_6$), $R^{WW.1}$-substituted or unsubstituted heterocycloalkyl (e.g., 3 to 8 membered, 3 to 6 membered, 4 to 6 membered, 4 to 5 membered, or 5 to 6 membered), $R^{WW.1}$-substituted or unsubstituted aryl (e.g., $C_6$-$C_{12}$, $C_6$-$C_{10}$, or phenyl), or $R^{WW.1}$-substituted or unsubstituted heteroaryl (e.g., 5 to 12 membered, 5 to 10 membered, 5 to 9 membered, or 5 to 6 membered). $X^{WW}$ is independently —F, —Cl, —Br, or —I. Again, "WW" represents the stated superscript number of the subject R group (e.g., 1, 2, 3, 1A, 2A, 3A, 1B, 2B, 3B, etc.). $R^{WW.1}$, $R^{WW.2}$, and $R^{WW.3}$ are as defined above.

In the event that any L linker group recited in a claim or chemical formula description set forth herein (i.e., an $L^{WW}$ substituent) is not explicitly defined, then that L group ($L^{WW}$ group) is herein defined as independently a bond, —O—, —NH—, —C(O)—, —C(O)NH—, —NHC(O)—, —NHC(O)NH—, —C(O)O—, —OC(O)—, —S—, $—SO_2—$, $—SO_2NH—$, $R^{LWW.1}$-substituted or unsubstituted alkylene (e.g., $C_1$-$C_8$, $C_1$-$C_6$, $C_1$-$C_4$, or $C_1$-$C_2$), $R^{LWW.1}$-substituted or unsubstituted heteroalkylene (e.g., 2 to 8 membered, 2 to 6 membered, 4 to 6 membered, 2 to 3 membered, or 4 to 5 membered), $R^{LWW.1}$-substituted or unsubstituted cycloalkylene (e.g., $C_3$-$C_8$, $C_3$-$C_6$, $C_4$-$C_6$, or $C_5$-$C_6$), $R^{LWW.1}$-substituted or unsubstituted heterocycloalkylene (e.g., 3 to 8 membered, 3 to 6 membered, 4 to 6 membered, 4 to 5 membered, or 5 to 6 membered), $R^{LWW.1}$-substituted or unsubstituted arylene (e.g., $C_6$-$C_{12}$, $C_6$-$C_{10}$, or phenyl), or $R^{WW.1}$-substituted or unsubstituted heteroarylene (e.g., 5 to 12 membered, 5 to 10 membered, 5 to 9 membered, or 5 to 6 membered). Again, "WW" represents the stated superscript number of the subject L group (1, 2, 3, 1A, 2A, 3A, 1B, 2B, 3B, etc.). $R^{LWW.1}$, as well as $R^{LWW.2}$ and $R^{LWW.3}$ are as defined above.

Certain compounds of the present disclosure possess asymmetric carbon atoms (optical or chiral centers) or double bonds; the enantiomers, racemates, diastereomers, tautomers, geometric isomers, stereoisometric forms that may be defined, in terms of absolute stereochemistry, as (R)- or (S)- or, as (D)- or (L)- for amino acids, and individual isomers are encompassed within the scope of the present disclosure. The compounds of the present disclosure do not include those that are known in art to be too unstable to synthesize and/or isolate. The present disclosure is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefinic bonds or other centers of geometric asymmetry, and unless specified otherwise, it is intended that the compounds include both E and Z geometric isomers.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another.

It will be apparent to one skilled in the art that certain compounds of this disclosure may exist in tautomeric forms, all such tautomeric forms of the compounds being within the scope of the disclosure.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the disclosure.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}C$- or $^{14}C$-enriched carbon are within the scope of this disclosure.

The compounds of the present disclosure may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$), or carbon-14 ($^{14}C$). All isotopic variations of the compounds of the present disclosure, whether radioactive or not, are encompassed within the scope of the present disclosure.

It should be noted that throughout the application that alternatives are written in Markush groups, for example, each amino acid position that contains more than one possible amino acid. It is specifically contemplated that each member of the Markush group should be considered separately, thereby comprising another embodiment, and the Markush group is not to be read as a single unit.

"Analog" or "analogue" is used in accordance with its plain ordinary meaning within Chemistry and Biology and refers to a chemical compound that is structurally similar to another compound (i.e., a so-called "reference" compound) but differs in composition, e.g., in the replacement of one atom by an atom of a different element, or in the presence of a particular functional group, or the replacement of one functional group by another functional group, or the absolute stereochemistry of one or more chiral centers of the reference compound. Accordingly, an analog is a compound that is similar or comparable in function and appearance but not in structure or origin to a reference compound.

The terms "a" or "an", as used in herein means one or more. In addition, the phrase "substituted with a[n]", as used herein, means the specified group may be substituted with one or more of any or all of the named substituents. For example, where a group, such as an alkyl or heteroaryl group, is "substituted with an unsubstituted $C_1$-$C_{20}$ alkyl, or unsubstituted 2 to 20 membered heteroalkyl", the group may contain one or more unsubstituted $C_1$-$C_{20}$ alkyls, and/or one or more unsubstituted 2 to 20 membered heteroalkyls.

Moreover, where a moiety is substituted with an R substituent, the group may be referred to as "R-substituted." Where a moiety is R-substituted, the moiety is substituted with at least one R substituent and each R substituent is optionally different. Where a particular R group is present in the description of a chemical genus (such as Formula (I)), a Roman alphabetic symbol may be used to distinguish each appearance of that particular R group. For example, where multiple $R^{13}$ substituents are present, each $R^{13}$ substituent may be distinguished as $R^{13A}$, $R^{13B}$, $R^{13C}$, $R^{13D}$, etc., wherein each of $R^{13A}$, $R^{13B}$, $R^{13C}$, $R^{13D}$, etc. is defined within the scope of the definition of $R^{13}$ and optionally differently.

Radioactive substances (e.g., radioisotopes) that may be used as imaging and/or labeling agents in accordance with the embodiments of the disclosure include, but are not limited to, $^{18}F$, $^{32}P$, $^{33}P$, $^{45}Ti$, $^{47}Sc$, $^{52}Fe$, $^{59}Fe$, $^{62}Cu$, $^{64}Cu$, $^{67}Cu$, $^{67}Ga$, $^{68}Ga$, $^{77}As$, $^{86}Y$, $^{90}Y$, $^{89}Sr$, $^{89}Zr$, $^{94}Tc$, $^{94}Tc$, $^{99m}Tc$, $^{99}Mo$, $^{105}Pd$, $^{105}Rh$, $^{111}Ag$, $^{111}In$, $^{123}I$, $^{124}I$, $^{125}I$, $^{131}I$, $^{142}Pr$, $^{143}Pr$, $^{149}Pm$, $^{153}Sm$, $^{154-1581}Gd$, $^{161}Tb$, $^{166}Dy$, $^{166}Ho$, $^{169}Er$, $^{175}Lu$, $^{177}Lu$, $^{186}Re$, $^{188}Re$, $^{189}Re$, $^{194}Ir$, $^{198}Au$, $^{199}Au$, $^{211}At$, $^{211}Pb$, $^{212}Pb$, $^{212}Bi$, $^{213}Bi$, $^{223}Ra$, and $^{225}Ac$. Paramagnetic ions that may be used as additional imaging agents in accordance with the embodiments of the disclosure include, but are not limited to, ions of transition and lanthanide metals (e.g., metals having atomic numbers of 21-29, 42, 43, 44, or 57-71). These metals include ions of Cr, V, Mn, Fe, Co, Ni, Cu, La, Ce, Pr, Nd, Pm, Sm, Eu, Gd, Tb, Dy, Ho, Er, Tm, Yb, and Lu.

Descriptions of compounds of the present disclosure are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

A person of ordinary skill in the art will understand when a variable (e.g., moiety or linker) of a compound or of a compound genus (e.g., a genus described herein) is described by a name or formula of a standalone compound with all valencies filled, the unfilled valence(s) of the variable will be dictated by the context in which the variable is used. For example, when a variable of a compound as described herein is connected (e.g., bonded) to the remainder of the compound through a single bond, that variable is understood to represent a monovalent form (i.e., capable of forming a single bond due to an unfilled valence) of a standalone compound (e.g., if the variable is named "methane" in an embodiment but the variable is known to be attached by a single bond to the remainder of the compound, a person of ordinary skill in the art would understand that the variable is actually a monovalent form of methane, i.e., methyl or —$CH_3$). Likewise, for a linker variable (e.g., $L^1$, $L^2$, or $L^3$ as described herein), a person of ordinary skill in the art will understand that the variable is the divalent form of a standalone compound (e.g., if the variable is assigned to "PEG" or "polyethylene glycol" in an embodiment but the variable is connected by two separate bonds to the remainder of the compound, a person of ordinary skill in the art would understand that the variable is a divalent (i.e., capable of forming two bonds through two unfilled valences) form of PEG instead of the standalone compound PEG).

As used herein, the term "salt" refers to acid or base salts of the compounds used in the methods of the present invention. Illustrative examples of acceptable salts are mineral acid (hydrochloric acid, hydrobromic acid, phosphoric acid, and the like) salts, organic acid (acetic acid, propionic acid, glutamic acid, citric acid and the like) salts, quaternary ammonium (methyl iodide, ethyl iodide, and the like) salts.

Thus, the compounds of the present disclosure may exist as salts. The present disclosure includes such salts. Non-limiting examples of such salts include hydrochlorides, hydrobromides, phosphates, sulfates, methanesulfonates, nitrates, maleates, acetates, citrates, fumarates, proprionates, tartrates (e.g., (+)-tartrates, (−)-tartrates, or mixtures thereof including racemic mixtures), succinates, benzoates, and salts with amino acids such as glutamic acid, and quaternary ammonium salts (e.g., methyl iodide, ethyl iodide, and the like). These salts may be prepared by methods known to those skilled in the art.

The neutral forms of the compounds are preferably regenerated by contacting the salt with a base or acid and isolating the parent compound in the conventional manner. The parent form of the compound may differ from the various salt forms in certain physical properties, such as solubility in polar solvents.

Certain compounds of the present disclosure can exist in unsolvated forms as well as solvated forms, including hydrated forms. In general, the solvated forms are equivalent to unsolvated forms and are encompassed within the scope of the present disclosure. Certain compounds of the present disclosure may exist in multiple crystalline or amorphous forms. In general, all physical forms are equivalent for the uses contemplated by the present disclosure and are intended to be within the scope of the present disclosure.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

"Contacting" is used in accordance with its plain ordinary meaning and refers to the process of allowing at least two distinct species (e.g., chemical compounds including biomolecules or cells) to become sufficiently proximal to react, interact or physically touch. It should be appreciated; however, the resulting reaction product can be produced directly from a reaction between the added reagents or from an intermediate from one or more of the added reagents that can be produced in the reaction mixture.

In this disclosure, "comprises," "comprising," "containing" and "having" and the like can have the meaning ascribed to them in U.S. Patent law and can mean "includes," "including," and the like. "Consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

The term "polymer" is used in accordance with its plain ordinary meaning in the art, and refers to a molecule including repeating subunits (e.g., polymerized monomers).

The term "cross-linked polymer" is used in accordance with its plain ordinary meaning in the art, and refers to polymer wherein a first polymer chain is connected to a second polymer chain via a linker.

The term "oxidation" is used in accordance with its plain ordinary meaning in the art, and refers to a loss of electrons or an increase in the oxidation state of a species (e.g., atom, ion, or certain atoms in a molecule). The term "oxidized" is used to describe a species (e.g., atom, ion, or certain atoms in a molecule) that has undergone an oxidation reaction.

The term "oxidizing agent" is used in accordance with its plain ordinary meaning in the art, and refers to a species that removes electrons from other reactants during a redox reaction. A "redox reaction" or "oxidation-reduction reaction" is a type of chemical reaction that involves a transfer of electrons between two species. Examples of oxidizing agents include, but are not limited to, oxygen, ozone, peroxides (e.g., hydrogen peroxide), or N-oxides (e.g., pyridine N-oxide), nitric acid, sulfuric acid, peroxydisulfuric acid, chlorite, chlorate, perchlorate, hypochlorite, permanaganate compounds (e.g., potassium permanganate), sodium perborate, nitrous oxide, or potassium nitrate.

The term "reducing agent" is used in accordance with its plain ordinary meaning in the art, and refers to a species that loses an electron to an electron recipient during a redox reaction. Examples of reducing agents include, but are not limited to, lithium aluminum hydride, atomic hydrogen, hydrogen without or with a suitable catalyst (e.g., Lindlar catalyst), sodium amalgam, sodium-lead alloy, zinc amalgam, diborane, sodium borohydride, iron(II) sulfate, tin(II) chloride, sulfur dioxide, dithionates, thiosulfates, iodides, hydrazine, or diisobutylaluminum hydride.

The term "catalyst" is used in accordance with its plain ordinary meaning in the art, and refers to a species that increases the rate of a chemical reaction. The catalyst is not consumed in the reaction and can continue to act repeatedly.

The term "metal catalyst" as used herein refers to a catalyst including a transition metal. A "transition metal" refers to an element whose atom has a partially filled d sub-shell, or which can give rise to cations with an incomplete d sub-shell. A person having skill in the art would understand a transition metal to be any element in the d-block of the periodic table, which includes groups 3 to 12 on the periodic table.

The term "polyethylene" is used in accordance with its plain ordinary meaning and refers to a class of organic polymers prepared by polymerization of ethylene.

The term "high-density polyethylene" or "HDPE" refers to a thermoplastic polymer produced from the monomer ethylene and is known for its high strength-to-density ratio. Typically, the density of HDPE ranges from about 0.93 $g/cm^3$ to about 0.97 $g/cm^3$. HDPE has minimal branching of its polymer chains and is therefore denser than low-density polyethylene.

The term "low-density polyethylene" or "LDPE" refers to a thermoplastic polymer produced from the monomer ethylene. Typically, the density of LDPE ranges from about 0.917 $g/cm^3$ to about 0.930 $g/cm^3$.

The term "linear low-density polyethylene" or "LLDPE" refers to a substantially linear polyethylene with significant numbers of short branches. LLDPE differs from LDPE because of the absence of long chain branching. Typically, the density of LLDPE ranges from about 0.91 $g/cm^3$ to about 0.94 $g/cm^3$.

II. Compounds

In an aspect is provided an oxidized polyethylene, including a first oxidized subunit, a second oxidized subunit, and a non-oxidized subunit.

The first oxidized subunit has the formula:

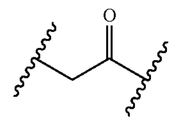

The second oxidized subunit has the formula:

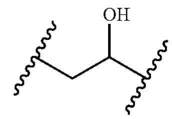

The non-oxidized subunit has the formula:

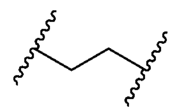

The ratio of the first and second oxidized subunits to the non-oxidized subunit is from 1:10,000 to 1:5.

The oxidized polyethylene has a number average molecular weight from 150 Da to 20,000,000 Da.

In embodiments, the oxidized polyethylene consists of only the first oxidized subunit, the second oxidized subunit, and the non-oxidized subunit.

In embodiments, the ratio of the first and second oxidized subunits to the non-oxidized subunit is from 1:8000 to 1:5. In embodiments, the ratio of the first and second oxidized subunits to the non-oxidized subunit is from 1:6000 to 1:5. In embodiments, the ratio of the first and second oxidized subunits to the non-oxidized subunit is from 1:4000 to 1:5. In embodiments, the ratio of the first and second oxidized subunits to the non-oxidized subunit is from 1:2000 to 1:5. In embodiments, the ratio of the first and second oxidized subunits to the non-oxidized subunit is from 1:1000 to 1:5. In embodiments, the ratio of the first and second oxidized subunits to the non-oxidized subunit is from 1:800 to 1:5. In embodiments, the ratio of the first and second oxidized subunits to the non-oxidized subunit is from 1:600 to 1:5. In embodiments, the ratio of the first and second oxidized subunits to the non-oxidized subunit is from 1:400 to 1:5. In embodiments, the ratio of the first and second oxidized subunits to the non-oxidized subunit is from 1:200 to 1:5. In embodiments, the ratio of the first and second oxidized subunits to the non-oxidized subunit is from 1:100 to 1:5. In embodiments, the ratio of the first and second oxidized subunits to the non-oxidized subunit is from 1:50 to 1:5. In embodiments, the ratio of the first and second oxidized subunits to the non-oxidized subunit is from 1:10,000 to 1:10. In embodiments, the ratio of the first and second oxidized subunits to the non-oxidized subunit is from 1:8000 to 1:10. In embodiments, the ratio of the first and second oxidized subunits to the non-oxidized subunit is from 1:6000 to 1:10. In embodiments, the ratio of the first and second oxidized subunits to the non-oxidized subunit is from 1:4000 to 1:10. In embodiments, the ratio of the first and second oxidized subunits to the non-oxidized subunit is from 1:2000 to 1:10. In embodiments, the ratio of the first and second oxidized subunits to the non-oxidized subunit is from 1:1000 to 1:10. In embodiments, the ratio of the first and second oxidized subunits to the non-oxidized subunit is from 1:800 to 1:10. In embodiments, the ratio of the first and second oxidized subunits to the non-oxidized subunit is from 1:600 to 1:10. In embodiments, the ratio of the first and second oxidized subunits to the non-oxidized subunit is from 1:400 to 1:10. In embodiments, the ratio of the first and second oxidized subunits to the non-oxidized subunit is from 1:200 to 1:10. In embodiments, the ratio of the first and second oxidized subunits to the non-oxidized subunit is from 1:100 to 1:10. In embodiments, the ratio of the first and second oxidized subunits to the non-oxidized subunit is from 1:50 to 1:10.

In embodiments, the ratio of the first and second oxidized subunits to the non-oxidized subunit is from about 1:10,000 to about 1:5. In embodiments, the ratio of the first and second oxidized subunits to the non-oxidized subunit is from about 1:8000 to about 1:5. In embodiments, the ratio of the first and second oxidized subunits to the non-oxidized subunit is from about 1:6000 to about 1:5. In embodiments, the ratio of the first and second oxidized subunits to the non-oxidized subunit is from about 1:4000 to about 1:5. In embodiments, the ratio of the first and second oxidized subunits to the non-oxidized subunit is from about 1:2000 to about 1:5. In embodiments, the ratio of the first and second oxidized subunits to the non-oxidized subunit is from about 1:1000 to about 1:5. In embodiments, the ratio of the first and second oxidized subunits to the non-oxidized subunit is from about 1:800 to about 1:5. In embodiments, the ratio of the first and second oxidized subunits to the non-oxidized subunit is from about 1:600 to about 1:5. In embodiments, the ratio of the first and second oxidized subunits to the non-oxidized subunit is from about 1:400 to about 1:5. In embodiments, the ratio of the first and second oxidized subunits to the non-oxidized subunit is from about 1:200 to about 1:5. In embodiments, the ratio of the first and second oxidized subunits to the non-oxidized subunit is from about 1:100 to about 1:5. In embodiments, the ratio of the first and second oxidized subunits to the non-oxidized subunit is from about 1:50 to about 1:5. In embodiments, the ratio of the first and second oxidized subunits to the non-oxidized subunit is from about 1:10,000 to about 1:10. In embodiments, the ratio of the first and second oxidized subunits to the non-oxidized subunit is from about 1:8000 to about 1:10. In embodiments, the ratio of the first and second oxidized subunits to the non-oxidized subunit is from about 1:6000 to about 1:10. In embodiments, the ratio of the first and second oxidized subunits to the non-oxidized subunit is from about 1:4000 to about 1:10. In embodiments, the ratio of the first and second oxidized subunits to the non-oxidized subunit is from about 1:2000 to about 1:10. In embodiments, the ratio of the first and second oxidized subunits to the non-oxidized subunit is from about 1:1000 to about 1:10. In embodiments, the ratio of the first and second oxidized subunits to the non-oxidized subunit is from about 1:800 to about 1:10. In embodiments, the ratio of the first and second oxidized subunits to the non-oxidized subunit is from about 1:600 to about 1:10. In embodiments, the ratio of the first and second oxidized subunits to the non-oxidized subunit is from about 1:400 to about 1:10. In embodiments, the ratio of the first and second oxidized subunits to the non-oxidized subunit is from about 1:200 to about 1:10. In embodiments, the ratio of the first and second oxidized subunits to the non-oxidized subunit is from about 1:100 to about 1:10. In embodiments, the ratio of the first and second oxidized subunits to the non-oxidized subunit is from about 1:50 to about 1:10.

In embodiments, the ratio of the first oxidized subunit to the second oxidized subunit is from 1:10 to 10:1. In embodiments, the ratio of the first oxidized subunit to the second oxidized subunit is from 1:9 to 9:1. In embodiments, the ratio of the first oxidized subunit to the second oxidized subunit is from 1:8 to 8:1. In embodiments, the ratio of the first oxidized subunit to the second oxidized subunit is from 1:7 to 7:1. In embodiments, the ratio of the first oxidized subunit to the second oxidized subunit is from 1:6 to 6:1. In embodiments, the ratio of the first oxidized subunit to the second oxidized subunit is from 1:5 to 5:1. In embodiments, the ratio of the first oxidized subunit to the second oxidized subunit is from 1:4 to 4:1. In embodiments, the ratio of the first oxidized subunit to the second oxidized subunit is from 1:3 to 3:1. In embodiments, the ratio of the first oxidized subunit to the second oxidized subunit is from 1:2 to 2:1. In embodiments, the ratio of the first oxidized subunit to the second oxidized subunit is 1:1.

In embodiments, the ratio of the first oxidized subunit to the second oxidized subunit is from about 1:10 to about 10:1. In embodiments, the ratio of the first oxidized subunit to the second oxidized subunit is from about 1:9 to about 9:1. In embodiments, the ratio of the first oxidized subunit to the second oxidized subunit is from about 1:8 to about 8:1. In embodiments, the ratio of the first oxidized subunit to the second oxidized subunit is from about 1:7 to about 7:1. In embodiments, the ratio of the first oxidized subunit to the second oxidized subunit is from about 1:6 to about 6:1. In embodiments, the ratio of the first oxidized subunit to the second oxidized subunit is from about 1:5 to about 5:1. In embodiments, the ratio of the first oxidized subunit to the second oxidized subunit is from about 1:4 to about 4:1. In embodiments, the ratio of the first oxidized subunit to the second oxidized subunit is from about 1:3 to about 3:1. In embodiments, the ratio of the first oxidized subunit to the second oxidized subunit is from about 1:2 to about 2:1. In embodiments, the ratio of the first oxidized subunit to the second oxidized subunit is about 1:1.

In embodiments, the oxidized polyethylene has a number average molecular weight from 150 Da to 15,000,000 Da. In embodiments, the oxidized polyethylene has a number average molecular weight from 150 Da to 10,000,000 Da. In embodiments, the oxidized polyethylene has a number average molecular weight from 150 Da to 5,000,000 Da. In embodiments, the oxidized polyethylene has a number average molecular weight from 150 Da to 2,000,000 Da. In embodiments, the oxidized polyethylene has a number average molecular weight from 150 Da to 1,000,000 Da. In embodiments, the oxidized polyethylene has a number average molecular weight from 150 Da to 500,000 Da. In embodiments, the oxidized polyethylene has a number average molecular weight from 150 Da to 200,000 Da. In embodiments, the oxidized polyethylene has a number average molecular weight from 150 Da to 100,000 Da. In embodiments, the oxidized polyethylene has a number average molecular weight from 150 Da to 50,000 Da. In embodiments, the oxidized polyethylene has a number average molecular weight from 150 Da to 20,000 Da. In embodiments, the oxidized polyethylene has a number average molecular weight from 150 Da to 10,000 Da. In embodiments, the oxidized polyethylene has a number average molecular weight from 150 Da to 5000 Da. In embodiments, the oxidized polyethylene has a number average molecular weight from 150 Da to 2000 Da. In embodiments, the oxidized polyethylene has a number average molecular weight from 150 Da to 1000 Da. In embodiments, the oxidized polyethylene has a number average molecular weight from 150 Da to 500 Da. In embodiments, the oxidized polyethylene has a number average molecular weight from 300 Da to 20,000,000 Da. In embodiments, the oxidized polyethylene has a number average molecular weight from 300 Da to 15,000,000 Da. In embodiments, the oxidized polyethylene has a number average molecular weight from 300 Da to 10,000,000 Da. In embodiments, the oxidized polyethylene has a number average molecular weight from 300 Da to 5,000,000 Da. In embodiments, the oxidized polyethylene has a number average molecular weight from 300 Da to 2,000,000 Da. In embodiments, the oxidized polyethylene has a number average molecular weight from 300 Da to 1,000,000 Da. In embodiments, the oxidized polyethylene has a number average molecular weight from 300 Da to 500,000 Da. In embodiments, the oxidized polyethylene has a number average molecular weight from 300 Da to 200,000 Da. In embodiments, the oxidized polyethylene has a number average molecular weight from 300 Da to 100,000 Da. In embodiments, the oxidized polyethylene has a number average molecular weight from 300 Da to 50,000 Da. In embodiments, the oxidized polyethylene has a number average molecular weight from 300 Da to 20,000 Da. In embodiments, the oxidized polyethylene has a number average molecular weight from 300 Da to 10,000 Da. In embodiments, the oxidized polyethylene has a number average molecular weight from 300 Da to 5000 Da. In embodiments, the oxidized polyethylene has a number average molecular weight from 300 Da to 2000 Da. In embodiments, the oxidized polyethylene has a number average molecular weight from 300 Da to 1000 Da. In embodiments, the oxidized polyethylene has a number average molecular weight from 300 Da to 500 Da. In embodiments, the oxidized polyethylene has a number average molecular weight from 450 Da to 20,000,000 Da. In embodiments, the oxidized polyethylene has a number average molecular weight from 450 Da to 15,000,000 Da. In embodiments, the oxidized polyethylene has a number average molecular weight from 450 Da to 10,000,000 Da. In embodiments, the oxidized polyethylene has a number average molecular weight from 450 Da to 5,000,000 Da. In embodiments, the oxidized polyethylene has a number average molecular weight from 450 Da to 2,000,000 Da. In embodiments, the oxidized polyethylene has a number average molecular weight from 450 Da to 1,000,000 Da. In embodiments, the oxidized polyethylene has a number average molecular weight from 450 Da to 500,000 Da. In embodiments, the oxidized polyethylene has a number average molecular weight from 450 Da to 200,000 Da. In embodiments, the oxidized polyethylene has a number average molecular weight from 450 Da to 100,000 Da. In embodiments, the oxidized polyethylene has a number average molecular weight from 450 Da to 50,000 Da. In embodiments, the oxidized polyethylene has a number average molecular weight from 450 Da to 20,000 Da. In embodiments, the oxidized polyethylene has a number average molecular weight from 450 Da to 10,000 Da. In embodiments, the oxidized polyethylene has a number average molecular weight from 450 Da to 5000 Da. In embodiments, the oxidized polyethylene has a number average molecular weight from 450 Da to 2000 Da. In embodiments, the oxidized polyethylene has a number average molecular weight from 450 Da to 1000 Da. In embodiments, the oxidized polyethylene has a number average molecular weight from 600 Da to 20,000,000 Da. In embodiments, the oxidized polyethylene has a number average molecular weight from 600 Da to 15,000,000 Da. In embodiments, the oxidized polyethylene has a number average molecular weight from 600 Da to 10,000,000 Da. In embodiments, the oxidized polyethylene has a number average molecular weight from 600 Da to 5,000,000 Da. In embodiments, the oxidized polyethylene has a number average molecular weight from 600 Da to 2,000,000 Da. In embodiments, the oxidized polyethylene has a number average molecular weight from 600 Da to 1,000,000 Da. In embodiments, the oxidized polyethylene has a number average molecular weight from 600 Da to 500,000 Da. In embodiments, the oxidized polyethylene has a number average molecular weight from 600 Da to 200,000 Da. In embodiments, the oxidized polyethylene has a number average molecular weight from 600 Da to 100,000 Da. In embodiments, the oxidized polyethylene has a number average molecular weight from 600 Da to 50,000 Da. In embodiments, the oxidized polyethylene has a number average molecular weight from 600 Da to 20,000 Da. In embodiments, the oxidized polyethylene has a number average molecular weight from 600 Da to 10,000 Da. In embodiments, the oxidized polyethylene has a number average molecular weight from 600 Da to 5000 Da. In embodiments, the oxidized polyethylene has a number average molecular weight from 600 Da to 2000 Da. In embodiments, the oxidized polyethylene has a number average molecular weight from 600 Da to 1000 Da.

In embodiments, the oxidized polyethylene has a number average molecular weight from about 150 Da to about 20,000,000 Da. In embodiments, the oxidized polyethylene has a number average molecular weight from about 150 Da to about 15,000,000 Da. In embodiments, the oxidized polyethylene has a number average molecular weight from about 150 Da to about 10,000,000 Da. In embodiments, the oxidized polyethylene has a number average molecular weight from about 150 Da to about 5,000,000 Da. In embodiments, the oxidized polyethylene has a number average molecular weight from about 150 Da to about 2,000,000 Da. In embodiments, the oxidized polyethylene has a number average molecular weight from about 150 Da to about 1,000,000 Da. In embodiments, the oxidized polyethylene has a number average molecular weight from about 150 Da to about 500,000 Da. In embodiments, the oxidized polyethylene has a number average molecular weight from about 150 Da to about 200,000 Da. In embodiments, the oxidized polyethylene has a number average molecular weight from about 150 Da to about 100,000 Da. In embodiments, the oxidized polyethylene has a number average molecular weight from about 150 Da to about 50,000 Da. In embodiments, the oxidized polyethylene has a number average molecular weight from about 150 Da to about 20,000 Da. In embodiments, the oxidized polyethylene has a number average molecular weight from about 150 Da to about 10,000 Da. In embodiments, the oxidized polyethylene has a number average molecular weight from about 150 Da to about 5000 Da. In embodiments, the oxidized polyethylene has a number average molecular weight from about 150 Da to about 2000 Da. In embodiments, the oxidized polyethylene has a number average molecular weight from about 150 Da to about 1000 Da. In embodiments, the oxidized polyethylene has a number average molecular weight from about 150 Da to about 500 Da. In embodiments, the oxidized polyethylene has a number average molecular weight from about 300 Da to about 20,000,000 Da. In embodiments, the oxidized polyethylene has a number average molecular weight from about 300 Da to about 15,000,000 Da. In embodiments, the oxidized polyethylene has a number average molecular weight from about 300 Da to about 10,000,000 Da. In embodiments, the oxidized polyethylene has a number average molecular weight from about 300 Da to about 5,000,000 Da. In embodiments, the oxidized polyethylene has a number average molecular weight from about 300 Da to about 2,000,000 Da. In embodiments, the oxidized polyethylene has a number average molecular weight from about 300 Da to about 1,000,000 Da. In embodiments, the oxidized polyethylene has a number average molecular weight from about 300 Da to about 500,000 Da. In embodiments, the oxidized polyethylene has a number average molecular weight from about 300 Da to about 200,000 Da. In embodiments, the oxidized polyethylene has a number average molecular weight from about 300 Da to about 100,000 Da. In embodiments, the oxidized polyethylene has a number average molecular weight from about 300 Da to about 50,000 Da. In embodiments, the oxidized polyethylene has a number average molecular weight from about 300 Da to about 20,000 Da. In embodiments, the oxidized polyethylene has a number average molecular weight from about 300 Da to about 10,000 Da. In embodiments, the oxidized polyethylene has a number average molecular weight from about 300 Da to about 5000 Da. In embodiments, the oxidized polyethylene has a number average molecular weight from about 300 Da to about 2000 Da. In embodiments, the oxidized polyethylene has a number average molecular weight from about 300 Da to about 1000 Da. In embodiments, the oxidized polyethylene has a number average molecular weight from about 300 Da to about 500 Da. In embodiments, the oxidized polyethylene has a number average molecular weight from about 450 Da to about 20,000,000 Da. In embodiments, the oxidized polyethylene has a number average molecular weight from about 450 Da to about 15,000,000 Da. In embodiments, the oxidized polyethylene has a number average molecular weight from about 450 Da to about 10,000,000 Da. In embodiments, the oxidized polyethylene has a number average molecular weight from about 450 Da to about 5,000,000 Da. In embodiments, the oxidized polyethylene has a number average molecular weight from about 450 Da to about 2,000,000 Da. In embodiments, the oxidized polyethylene has a number average molecular weight from about 450 Da to about 1,000,000 Da. In embodiments, the oxidized polyethylene has a number average molecular weight from about 450 Da to about 500,000 Da. In embodiments, the oxidized polyethylene has a number average molecular weight from about 450 Da to about 200,000 Da. In embodiments, the oxidized polyethylene has a number average molecular weight from about 450 Da to about 100,000 Da. In embodiments, the oxidized polyethylene has a number average molecular weight from about 450 Da to about 50,000 Da. In embodiments, the oxidized polyethylene has a number average molecular weight from about 450 Da to about 20,000 Da. In embodiments, the oxidized polyethylene has a number average molecular weight from about 450 Da to about 10,000 Da. In embodiments, the oxidized polyethylene has a number average molecular weight from about 450 Da to about 5000 Da. In embodiments, the oxidized polyethylene has a number average molecular weight from about 450 Da to about 2000 Da. In embodiments, the oxidized polyethylene has a number average molecular weight from about 450 Da to about 1000 Da. In embodiments, the oxidized polyethylene has a number average molecular weight from about 600 Da to about 20,000,000 Da. In embodiments, the oxidized polyethylene has a number average molecular weight from about 600 Da to about 15,000,000 Da. In embodiments, the oxidized polyethylene has a number average molecular weight from about 600 Da to about 10,000,000 Da. In embodiments, the oxidized polyethylene has a number average molecular weight from about 600 Da to about 5,000,000 Da. In embodiments, the oxidized polyethylene has a number average molecular weight from about 600 Da to about 2,000,000 Da. In embodiments, the oxidized polyethylene has a number average molecular weight from about 600 Da to about 1,000,000 Da. In embodiments, the oxidized polyethylene has a number average molecular weight from about 600 Da to about 500,000 Da. In embodiments, the oxidized polyethylene has a number average molecular weight from about 600 Da to about 200,000 Da. In embodiments, the oxidized polyethylene has a number average molecular weight from about 600 Da to about 100,000 Da. In embodiments, the oxidized polyethylene has a number average molecular weight from about 600 Da to about 50,000 Da. In embodiments, the oxidized polyethylene has a number average molecular weight from about 600 Da to about 20,000 Da. In embodiments, the oxidized polyethylene has a number average molecular weight from about 600 Da to about 10,000 Da. In embodiments, the oxidized polyethylene has a number average molecular weight from about 600 Da to about 5000 Da. In embodiments, the oxidized polyethylene has a number average molecular weight from about 600 Da to about 2000 Da. In embodiments, the oxidized polyethylene has a number average molecular weight from about 600 Da to about 1000 Da.

In embodiments, the oxidized polyethylene has from 5 to 600,000 number of total subunits. In embodiments, the oxidized polyethylene has from 5 to 400,000 number of total subunits. In embodiments, the oxidized polyethylene has from 5 to 200,000 number of total subunits. In embodiments, the oxidized polyethylene has from 5 to 100,000 number of total subunits. In embodiments, the oxidized polyethylene has from 5 to 50,000 number of total subunits. In embodiments, the oxidized polyethylene has from 5 to 20,000 number of total subunits. In embodiments, the oxidized polyethylene has from 5 to 10,000 number of total subunits. In embodiments, the oxidized polyethylene has from 5 to 5000 number of total subunits. In embodiments, the oxidized polyethylene has from 5 to 2000 number of total subunits. In embodiments, the oxidized polyethylene has from 5 to 1000 number of total subunits. In embodiments, the oxidized polyethylene has from 5 to 500 number of total subunits. In embodiments, the oxidized polyethylene has from 5 to 200 number of total subunits. In embodiments, the oxidized polyethylene has from 5 to 100 number of total subunits. In embodiments, the oxidized polyethylene has from 5 to 50 number of total subunits. In embodiments, the oxidized polyethylene has from 5 to 20 number of total subunits. In embodiments, the oxidized polyethylene has from 10 to 600,000 number of total subunits. In embodiments, the oxidized polyethylene has from 10 to 400,000 number of total subunits. In embodiments, the oxidized polyethylene has from 10 to 200,000 number of total subunits. In embodiments, the oxidized polyethylene has from 10 to 100,000 number of total subunits. In embodiments, the oxidized polyethylene has from 10 to 50,000 number of total subunits. In embodiments, the oxidized polyethylene has from 10 to 20,000 number of total subunits. In embodiments, the oxidized polyethylene has from 10 to 10,000 number of total subunits. In embodiments, the oxidized polyethylene has from 10 to 5000 number of total subunits. In embodiments, the oxidized polyethylene has from 10 to 2000 number of total subunits. In embodiments, the oxidized polyethylene has from 10 to 1000 number of total subunits. In embodiments, the oxidized polyethylene has from 10 to 500 number of total subunits. In embodiments, the oxidized polyethylene has from 10 to 200 number of total subunits. In embodiments, the oxidized polyethylene has from 10 to 100 number of total subunits. In embodiments, the oxidized polyethylene has from 10 to 50 number of total subunits. In embodiments, the oxidized polyethylene has from 10 to 20 number of total subunits. In embodiments, the oxidized polyethylene has from 15 to 600,000 number of total subunits. In embodiments, the oxidized polyethylene has from 15 to 400,000 number of total subunits. In embodiments, the oxidized polyethylene has from 15 to 200,000 number of total subunits. In embodiments, the oxidized polyethylene has from 15 to 100,000 number of total subunits. In embodiments, the oxidized polyethylene has from 15 to 50,000 number of total subunits. In embodiments, the oxidized polyethylene has from 15 to 20,000 number of total subunits. In embodiments, the oxidized polyethylene has from 15 to 10,000 number of total subunits. In embodiments, the oxidized polyethylene has from 15 to 5000 number of total subunits. In embodiments, the oxidized polyethylene has from 15 to 2000 number of total subunits. In embodiments, the oxidized polyethylene has from 15 to 1000 number of total subunits. In embodiments, the oxidized polyethylene has from 15 to 500 number of total subunits. In embodiments, the oxidized polyethylene has from 15 to 200 number of total subunits. In embodiments, the oxidized polyethylene has from 15 to 100 number of total subunits. In embodiments, the oxidized polyethylene has from 15 to 50 number of total subunits. In embodiments, the oxidized polyethylene has from 15 to 20 number of total subunits. In embodiments, the oxidized polyethylene has from 20 to 600,000 number of total subunits. In embodiments, the oxidized polyethylene has from 20 to 400,000 number of total subunits. In embodiments, the oxidized polyethylene has from 20 to 200,000 number of total subunits. In embodiments, the oxidized polyethylene has from 20 to 100,000 number of total subunits. In embodiments, the oxidized polyethylene has from 20 to 50,000 number of total subunits. In embodiments, the oxidized polyethylene has from 20 to 20,000 number of total subunits. In embodiments, the oxidized polyethylene has from 20 to 10,000 number of total subunits. In embodiments, the oxidized polyethylene has from 20 to 5000 number of total subunits. In embodiments, the oxidized polyethylene has from 20 to 2000 number of total subunits. In embodiments, the oxidized polyethylene has from 20 to 1000 number of total subunits. In embodiments, the oxidized polyethylene has from 20 to 500 number of total subunits. In embodiments, the oxidized polyethylene has from 20 to 200 number of total subunits. In embodiments, the oxidized polyethylene has from 20 to 100 number of total subunits. In embodiments, the oxidized polyethylene has from 20 to 50 number of total subunits.

In embodiments, the oxidized polyethylene has from about 5 to about 600,000 number of total subunits. In embodiments, the oxidized polyethylene has from about 5 to about 400,000 number of total subunits. In embodiments, the oxidized polyethylene has from about 5 to about 200,000 number of total subunits. In embodiments, the oxidized polyethylene has from about 5 to about 100,000 number of total subunits. In embodiments, the oxidized polyethylene has from about 5 to about 50,000 number of total subunits. In embodiments, the oxidized polyethylene has from about 5 to about 20,000 number of total subunits. In embodiments, the oxidized polyethylene has from about 5 to about 10,000 number of total subunits. In embodiments, the oxidized polyethylene has from about 5 to about 5000 number of total subunits. In embodiments, the oxidized polyethylene has from about 5 to about 2000 number of total subunits. In embodiments, the oxidized polyethylene has from about 5 to about 1000 number of total subunits. In embodiments, the oxidized polyethylene has from about 5 to about 500 number of total subunits. In embodiments, the oxidized polyethylene has from about 5 to about 200 number of total subunits. In embodiments, the oxidized polyethylene has from about 5 to about 100 number of total subunits. In embodiments, the oxidized polyethylene has from about 5 to about 50 number of total subunits. In embodiments, the oxidized polyethylene has from about 5 to about 20 number of total subunits. In embodiments, the oxidized polyethylene has from about 10 to about 600,000 number of total subunits. In embodiments, the oxidized polyethylene has from about 10 to about 400,000 number of total subunits. In embodiments, the oxidized polyethylene has from about 10 to about 200,000 number of total subunits. In embodiments, the oxidized polyethylene has from about 10 to about 100,000 number of total subunits. In embodiments, the oxidized polyethylene has from about 10 to about 50,000 number of total subunits. In embodiments, the oxidized polyethylene has from about 10 to about 20,000 number of total subunits. In embodiments, the oxidized polyethylene has from about 10 to about 10,000 number of total subunits. In embodiments, the oxidized polyethylene has from about 10 to about 5000 number of total subunits. In embodiments, the oxidized polyethylene has from about 10 to about 2000 number of total subunits. In embodiments, the oxidized polyethylene has from about 10 to about 1000 number of total subunits. In embodiments, the oxidized polyethylene has from about 10 to about 500 number of total subunits. In embodiments, the oxidized polyethylene has from about 10 to about 200 number of total subunits. In embodiments, the oxidized polyethylene has from about 10 to about 100 number of total subunits. In embodiments, the oxidized polyethylene has from about 10 to about 50 number of total subunits. In embodiments, the oxidized polyethylene has from about 10 to about 20 number of total subunits. In embodiments, the oxidized polyethylene has from about 15 to about 600,000 number of total subunits. In embodiments, the oxidized polyethylene has from about 15 to about 400,000 number of total subunits. In embodiments, the oxidized polyethylene has from about 15 to about 200,000 number of total subunits. In embodiments, the oxidized polyethylene has from about 15 to about 100,000 number of total subunits. In embodiments, the oxidized polyethylene has from about 15 to about 50,000 number of total subunits. In embodiments, the oxidized polyethylene has from about 15 to about 20,000 number of total subunits. In embodiments, the oxidized polyethylene has from about 15 to about 10,000 number of total subunits. In embodiments, the oxidized polyethylene has from about 15 to about 5000 number of total subunits. In embodiments, the oxidized polyethylene has from about 15 to about 2000 number of total subunits. In embodiments, the oxidized polyethylene has from about 15 to about 1000 number of total subunits. In embodiments, the oxidized polyethylene has from about 15 to about 500 number of total subunits. In embodiments, the oxidized polyethylene has from about 15 to about 200 number of total subunits. In embodiments, the oxidized polyethylene has from about 15 to about 100 number of total subunits. In embodiments, the oxidized polyethylene has from about 15 to about 50 number of total subunits. In embodiments, the oxidized polyethylene has from about 15 to about 20 number of total subunits. In embodiments, the oxidized polyethylene has from about 20 to about 600,000 number of total subunits. In embodiments, the oxidized polyethylene has from about 20 to about 400,000 number of total subunits. In embodiments, the oxidized polyethylene has from about 20 to about 200,000 number of total subunits. In embodiments, the oxidized polyethylene has from about 20 to about 100,000 number of total subunits. In embodiments, the oxidized polyethylene has from about 20 to about 50,000 number of total subunits. In embodiments, the oxidized polyethylene has from about 20 to about 20,000 number of total subunits. In embodiments, the oxidized polyethylene has from about 20 to about 10,000 number of total subunits. In embodiments, the oxidized polyethylene has from about 20 to about 5000 number of total subunits. In embodiments, the oxidized polyethylene has from about 20 to about 2000 number of total subunits. In embodiments, the oxidized polyethylene has from about 20 to about 1000 number of total subunits. In embodiments, the oxidized polyethylene has from about 20 to about 500 number of total subunits. In embodiments, the oxidized polyethylene has from about 20 to about 200 number of total subunits. In embodiments, the oxidized polyethylene has from about 20 to about 100 number of total subunits. In embodiments, the oxidized polyethylene has from about 20 to about 50 number of total subunits.

In an aspect is provided an oxidized polyethylene, including a first oxidized subunit and a non-oxidized subunit. The first oxidized subunit and the non-oxidized subunit are as described herein. The ratio of the first oxidized subunit to the non-oxidized subunit is from 1:10,000 to 1:5. The oxidized polyethylene has a number average molecular weight from 150 Da to 20,000,000 Da.

In embodiments, the oxidized polyethylene consists of only the first oxidized subunit and the non-oxidized subunit.

In embodiments, the ratio of the first oxidized subunit to the non-oxidized subunit is from 1:8000 to 1:5. In embodiments, the ratio of the first oxidized subunit to the non-oxidized subunit is from 1:6000 to 1:5. In embodiments, the ratio of the first oxidized subunit to the non-oxidized subunit is from 1:4000 to 1:5. In embodiments, the ratio of the first oxidized subunit to the non-oxidized subunit is from 1:2000 to 1:5. In embodiments, the ratio of the first oxidized subunit to the non-oxidized subunit is from 1:1000 to 1:5. In embodiments, the ratio of the first oxidized subunit to the non-oxidized subunit is from 1:800 to 1:5. In embodiments, the ratio of the first oxidized subunit to the non-oxidized subunit is from 1:600 to 1:5. In embodiments, the ratio of the first oxidized subunit to the non-oxidized subunit is from 1:400 to 1:5. In embodiments, the ratio of the first oxidized subunit to the non-oxidized subunit is from 1:200 to 1:5. In embodiments, the ratio of the first oxidized subunit to the non-oxidized subunit is from 1:100 to 1:5. In embodiments, the ratio of the first oxidized subunit to the non-oxidized subunit is from 1:50 to 1:5. In embodiments, the ratio of the first oxidized subunit to the non-oxidized subunit is from 1:10,000 to 1:10. In embodiments, the ratio of the first oxidized subunit to the non-oxidized subunit is from 1:8000 to 1:10. In embodiments, the ratio of the first oxidized subunit to the non-oxidized subunit is from 1:6000 to 1:10. In embodiments, the ratio of the first oxidized subunit to the non-oxidized subunit is from 1:4000 to 1:10. In embodiments, the ratio of the first oxidized subunit to the non-oxidized subunit is from 1:2000 to 1:10. In embodiments, the ratio of the first oxidized subunit to the non-oxidized subunit is from 1:1000 to 1:10. In embodiments, the ratio of the first oxidized subunit to the non-oxidized subunit is from 1:800 to 1:10. In embodiments, the ratio of the first oxidized subunit to the non-oxidized subunit is from 1:600 to 1:10. In embodiments, the ratio of the first oxidized subunit to the non-oxidized subunit is from 1:400 to 1:10. In embodiments, the ratio of the first oxidized subunit to the non-oxidized subunit is from 1:200 to 1:10. In embodiments, the ratio of the first oxidized subunit to the non-oxidized subunit is from 1:100 to 1:10. In embodiments, the ratio of the first oxidized subunit to the non-oxidized subunit is from 1:50 to 1:10.

In embodiments, the ratio of the first oxidized subunit to the non-oxidized subunit is from about 1:10,000 to about 1:5. In embodiments, the ratio of the first oxidized subunit to the non-oxidized subunit is from about 1:8000 to about 1:5. In embodiments, the ratio of the first oxidized subunit to the non-oxidized subunit is from about 1:6000 to about 1:5. In embodiments, the ratio of the first oxidized subunit to the non-oxidized subunit is from about 1:4000 to about 1:5. In embodiments, the ratio of the first oxidized subunit to the non-oxidized subunit is from about 1:2000 to about 1:5. In embodiments, the ratio of the first oxidized subunit to the non-oxidized subunit is from about 1:1000 to about 1:5. In embodiments, the ratio of the first oxidized subunit to the non-oxidized subunit is from about 1:800 to about 1:5. In embodiments, the ratio of the first oxidized subunit to the non-oxidized subunit is from about 1:600 to about 1:5. In embodiments, the ratio of the first oxidized subunit to the non-oxidized subunit is from about 1:400 to about 1:5. In embodiments, the ratio of the first oxidized subunit to the non-oxidized subunit is from about 1:200 to about 1:5. In embodiments, the ratio of the first oxidized subunit to the non-oxidized subunit is from about 1:100 to about 1:5. In embodiments, the ratio of the first oxidized subunit to the non-oxidized subunit is from about 1:50 to about 1:5. In embodiments, the ratio of the first oxidized subunit to the non-oxidized subunit is from about 1:10,000 to about 1:10. In embodiments, the ratio of the first oxidized subunit to the non-oxidized subunit is from about 1:8000 to about 1:10. In embodiments, the ratio of the first oxidized subunit to the non-oxidized subunit is from about 1:6000 to about 1:10. In embodiments, the ratio of the first oxidized subunit to the non-oxidized subunit is from about 1:4000 to about 1:10. In embodiments, the ratio of the first oxidized subunit to the non-oxidized subunit is from about 1:2000 to about 1:10. In embodiments, the ratio of the first oxidized subunit to the non-oxidized subunit is from about 1:1000 to about 1:10. In embodiments, the ratio of the first oxidized subunit to the non-oxidized subunit is from about 1:800 to about 1:10. In embodiments, the ratio of the first oxidized subunit to the non-oxidized subunit is from about 1:600 to about 1:10. In embodiments, the ratio of the first oxidized subunit to the non-oxidized subunit is from about 1:400 to about 1:10. In embodiments, the ratio of the first oxidized subunit to the non-oxidized subunit is from about 1:200 to about 1:10. In embodiments, the ratio of the first oxidized subunit to the non-oxidized subunit is from about 1:100 to about 1:10. In embodiments, the ratio of the first oxidized subunit to the non-oxidized subunit is from about 1:50 to about 1:10.

In an aspect is provided a hydroxylated polyethylene, including a second oxidized subunit and a non-oxidized subunit. The second oxidized subunit and the non-oxidized subunit are as described herein. The hydroxylated polyethylene has a number average molecular weight from 150 Da to 20,000,000 Da.

In embodiments, the hydroxylated polyethylene consists of only the second oxidized subunit and the non-oxidized subunit.

In embodiments, the ratio of the second oxidized subunit to the non-oxidized subunit in the hydroxylated polyethylene is from 1:10,000 to 1:5. In embodiments, the ratio of the second oxidized subunit to the non-oxidized subunit in the hydroxylated polyethylene is from 1:8000 to 1:5. In embodiments, the ratio of the second oxidized subunit to the non-oxidized subunit in the hydroxylated polyethylene is from 1:6000 to 1:5. In embodiments, the ratio of the second oxidized subunit to the non-oxidized subunit in the hydroxylated polyethylene is from 1:4000 to 1:5. In embodiments, the ratio of the second oxidized subunit to the non-oxidized subunit in the hydroxylated polyethylene is from 1:2000 to 1:5. In embodiments, the ratio of the second oxidized subunit to the non-oxidized subunit in the hydroxylated polyethylene is from 1:1000 to 1:5. In embodiments, the ratio of the second oxidized subunit to the non-oxidized subunit in the hydroxylated polyethylene is from 1:800 to 1:5. In embodiments, the ratio of the second oxidized subunit to the non-oxidized subunit in the hydroxylated polyethylene is from 1:600 to 1:5. In embodiments, the ratio of the second oxidized subunit to the non-oxidized subunit in the hydroxylated polyethylene is from 1:400 to 1:5. In embodiments, the ratio of the second oxidized subunit to the non-oxidized subunit in the hydroxylated polyethylene is from 1:200 to 1:5. In embodiments, the ratio of the second oxidized subunit to the non-oxidized subunit in the hydroxylated polyethylene is from 1:100 to 1:5. In embodiments, the ratio of the second oxidized subunit to the non-oxidized subunit in the hydroxylated polyethylene is from 1:50 to 1:5. In embodiments, the ratio of the second oxidized subunit to the non-oxidized subunit in the hydroxylated polyethylene is from 1:10,000 to 1:10. In embodiments, the ratio of the second oxidized subunit to the non-oxidized subunit in the hydroxylated polyethylene is from 1:8000 to 1:10. In embodiments, the ratio of the second oxidized subunit to the non-oxidized subunit in the hydroxylated polyethylene is from 1:6000 to 1:10. In embodiments, the ratio of the second oxidized subunit to the non-oxidized subunit in the hydroxylated polyethylene is from 1:4000 to 1:10. In embodiments, the ratio of the second oxidized subunit to the non-oxidized subunit in the hydroxylated polyethylene is from 1:2000 to 1:10. In embodiments, the ratio of the second oxidized subunit to the non-oxidized subunit in the hydroxylated polyethylene is from 1:1000 to 1:10. In embodiments, the ratio of the second oxidized subunit to the non-oxidized subunit in the hydroxylated polyethylene is from 1:800 to 1:10. In embodiments, the ratio of the second oxidized subunit to the non-oxidized subunit in the hydroxylated polyethylene is from 1:600 to 1:10. In embodiments, the ratio of the second oxidized subunit to the non-oxidized subunit in the hydroxylated polyethylene is from 1:400 to 1:10. In embodiments, the ratio of the second oxidized subunit to the non-oxidized subunit in the hydroxylated polyethylene is from 1:200 to 1:10. In embodiments, the ratio of the second oxidized subunit to the non-oxidized subunit in the hydroxylated polyethylene is from 1:100 to 1:10. In embodiments, the ratio of the second oxidized subunit to the non-oxidized subunit in the hydroxylated polyethylene is from 1:50 to 1:10.

In embodiments, the ratio of the second oxidized subunit to the non-oxidized subunit in the hydroxylated polyethylene is from about 1:10,000 to about 1:5. In embodiments, the ratio of the second oxidized subunit to the non-oxidized subunit in the hydroxylated polyethylene is from about 1:8000 to about 1:5. In embodiments, the ratio of the second oxidized subunit to the non-oxidized subunit in the hydroxylated polyethylene is from about 1:6000 to about 1:5. In embodiments, the ratio of the second oxidized subunit to the non-oxidized subunit in the hydroxylated polyethylene is from about 1:4000 to about 1:5. In embodiments, the ratio of the second oxidized subunit to the non-oxidized subunit in the hydroxylated polyethylene is from about 1:2000 to about 1:5. In embodiments, the ratio of the second oxidized subunit to the non-oxidized subunit in the hydroxylated polyethylene is from about 1:1000 to about 1:5. In embodiments, the ratio of the second oxidized subunit to the non-oxidized subunit in the hydroxylated polyethylene is from about 1:800 to about 1:5. In embodiments, the ratio of the second oxidized subunit to the non-oxidized subunit in the hydroxylated polyethylene is from about 1:600 to about 1:5. In embodiments, the ratio of the second oxidized subunit to the non-oxidized subunit in the hydroxylated polyethylene is from about 1:400 to about 1:5. In embodiments, the ratio of the second oxidized subunit to the non-oxidized subunit in the hydroxylated polyethylene is from about 1:200 to about 1:5. In embodiments, the ratio of the second oxidized subunit to the non-oxidized subunit in the hydroxylated polyethylene is from about 1:100 to about 1:5. In embodiments, the ratio of the second oxidized subunit to the non-oxidized subunit in the hydroxylated polyethylene is from about 1:50 to about 1:5. In embodiments, the ratio of the second oxidized subunit to the non-oxidized subunit in the hydroxylated polyethylene is from about 1:10,000 to about 1:10. In embodiments, the ratio of the second oxidized subunit to the non-oxidized subunit in the hydroxylated polyethylene is from about 1:8000 to about 1:10. In embodiments, the ratio of the second oxidized subunit to the non-oxidized subunit in the hydroxylated polyethylene is from about 1:6000 to about 1:10. In embodiments, the ratio of the second oxidized subunit to the non-oxidized subunit in the hydroxylated polyethylene is from about 1:4000 to about 1:10. In embodiments, the ratio of the second oxidized subunit to the non-oxidized subunit in the hydroxylated polyethylene is from about 1:2000 to about 1:10. In embodiments, the ratio of the second oxidized subunit to the non-oxidized subunit in the hydroxylated polyethylene is from about 1:1000 to about 1:10. In embodiments, the ratio of the second oxidized subunit to the non-oxidized subunit in the hydroxylated polyethylene is from about 1:800 to about 1:10. In embodiments, the ratio of the second oxidized subunit to the non-oxidized subunit in the hydroxylated polyethylene is from about 1:600 to about 1:10. In embodiments, the ratio of the second oxidized subunit to the non-oxidized subunit in the hydroxylated polyethylene is from about 1:400 to about 1:10. In embodiments, the ratio of the second oxidized subunit to the non-oxidized subunit in the hydroxylated polyethylene is from about 1:200 to about 1:10. In embodiments, the ratio of the second oxidized subunit to the non-oxidized subunit in the hydroxylated polyethylene is from about 1:100 to about 1:10. In embodiments, the ratio of the second oxidized subunit to the non-oxidized subunit in the hydroxylated polyethylene is from about 1:50 to about 1:10.

In embodiments, the hydroxylated polyethylene has a number average molecular weight from 150 Da to 15,000,000 Da. In embodiments, the hydroxylated polyethylene has a number average molecular weight from 150 Da to 10,000,000 Da. In embodiments, the hydroxylated polyethylene has a number average molecular weight from 150 Da to 5,000,000 Da. In embodiments, the hydroxylated polyethylene has a number average molecular weight from 150 Da to 2,000,000 Da. In embodiments, the hydroxylated polyethylene has a number average molecular weight from 150 Da to 1,000,000 Da. In embodiments, the hydroxylated polyethylene has a number average molecular weight from 150 Da to 500,000 Da. In embodiments, the hydroxylated polyethylene has a number average molecular weight from 150 Da to 200,000 Da. In embodiments, the hydroxylated polyethylene has a number average molecular weight from 150 Da to 100,000 Da. In embodiments, the hydroxylated polyethylene has a number average molecular weight from 150 Da to 50,000 Da. In embodiments, the hydroxylated polyethylene has a number average molecular weight from 150 Da to 20,000 Da. In embodiments, the hydroxylated polyethylene has a number average molecular weight from 150 Da to 10,000 Da. In embodiments, the hydroxylated polyethylene has a number average molecular weight from 150 Da to 5000 Da. In embodiments, the hydroxylated polyethylene has a number average molecular weight from 150 Da to 2000 Da. In embodiments, the hydroxylated polyethylene has a number average molecular weight from 150 Da to 1000 Da. In embodiments, the hydroxylated polyethylene has a number average molecular weight from 150 Da to 500 Da. In embodiments, the hydroxylated polyethylene has a number average molecular weight from 300 Da to 20,000,000 Da. In embodiments, the hydroxylated polyethylene has a number average molecular weight from 300 Da to 15,000,000 Da. In embodiments, the hydroxylated polyethylene has a number average molecular weight from 300 Da to 10,000,000 Da. In embodiments, the hydroxylated polyethylene has a number average molecular weight from 300 Da to 5,000,000 Da. In embodiments, the hydroxylated polyethylene has a number average molecular weight from 300 Da to 2,000,000 Da. In embodiments, the hydroxylated polyethylene has a number average molecular weight from 300 Da to 1,000,000 Da. In embodiments, the hydroxylated polyethylene has a number average molecular weight from 300 Da to 500,000 Da. In embodiments, the hydroxylated polyethylene has a number average molecular weight from 300 Da to 200,000 Da. In embodiments, the hydroxylated polyethylene has a number average molecular weight from 300 Da to 100,000 Da. In embodiments, the hydroxylated polyethylene has a number average molecular weight from 300 Da to 50,000 Da. In embodiments, the hydroxylated polyethylene has a number average molecular weight from 300 Da to 20,000 Da. In embodiments, the hydroxylated polyethylene has a number average molecular weight from 300 Da to 10,000 Da. In embodiments, the hydroxylated polyethylene has a number average molecular weight from 300 Da to 5000 Da. In embodiments, the hydroxylated polyethylene has a number average molecular weight from 300 Da to 2000 Da. In embodiments, the hydroxylated polyethylene has a number average molecular weight from 300 Da to 1000 Da. In embodiments, the hydroxylated polyethylene has a number average molecular weight from 300 Da to 500 Da. In embodiments, the hydroxylated polyethylene has a number average molecular weight from 450 Da to 20,000,000 Da. In embodiments, the hydroxylated polyethylene has a number average molecular weight from 450 Da to 15,000,000 Da. In embodiments, the hydroxylated polyethylene has a number average molecular weight from 450 Da to 10,000,000 Da. In embodiments, the hydroxylated polyethylene has a number average molecular weight from 450 Da to 5,000,000 Da. In embodiments, the hydroxylated polyethylene has a number average molecular weight from 450 Da to 2,000,000 Da. In embodiments, the hydroxylated polyethylene has a number average molecular weight from 450 Da to 1,000,000 Da. In embodiments, the hydroxylated polyethylene has a number average molecular weight from 450 Da to 500,000 Da. In embodiments, the hydroxylated polyethylene has a number average molecular weight from 450 Da to 200,000 Da. In embodiments, the hydroxylated polyethylene has a number average molecular weight from 450 Da to 100,000 Da. In embodiments, the hydroxylated polyethylene has a number average molecular weight from 450 Da to 50,000 Da. In embodiments, the hydroxylated polyethylene has a number average molecular weight from 450 Da to 20,000 Da. In embodiments, the hydroxylated polyethylene has a number average molecular weight from 450 Da to 10,000 Da. In embodiments, the hydroxylated polyethylene has a number average molecular weight from 450 Da to 5000 Da. In embodiments, the hydroxylated polyethylene has a number average molecular weight from 450 Da to 2000 Da. In embodiments, the hydroxylated polyethylene has a number average molecular weight from 450 Da to 1000 Da. In embodiments, the hydroxylated polyethylene has a number average molecular weight from 600 Da to 20,000,000 Da. In embodiments, the hydroxylated polyethylene has a number average molecular weight from 600 Da to 15,000,000 Da. In embodiments, the hydroxylated polyethylene has a number average molecular weight from 600 Da to 10,000,000 Da. In embodiments, the hydroxylated polyethylene has a number average molecular weight from 600 Da to 5,000,000 Da. In embodiments, the hydroxylated polyethylene has a number average molecular weight from 600 Da to 2,000,000 Da. In embodiments, the hydroxylated polyethylene has a number average molecular weight from 600 Da to 1,000,000 Da. In embodiments, the hydroxylated polyethylene has a number average molecular weight from 600 Da to 500,000 Da. In embodiments, the hydroxylated polyethylene has a number average molecular weight from 600 Da to 200,000 Da. In embodiments, the hydroxylated polyethylene has a number average molecular weight from 600 Da to 100,000 Da. In embodiments, the hydroxylated polyethylene has a number average molecular weight from 600 Da to 50,000 Da. In embodiments, the hydroxylated polyethylene has a number average molecular weight from 600 Da to 20,000 Da. In embodiments, the hydroxylated polyethylene has a number average molecular weight from 600 Da to 10,000 Da. In embodiments, the hydroxylated polyethylene has a number average molecular weight from 600 Da to 5000 Da. In embodiments, the hydroxylated polyethylene has a number average molecular weight from 600 Da to 2000 Da. In embodiments, the hydroxylated polyethylene has a number average molecular weight from 600 Da to 1000 Da.

In embodiments, the hydroxylated polyethylene has a number average molecular weight from about 150 Da to about 20,000,000 Da. In embodiments, the hydroxylated polyethylene has a number average molecular weight from about 150 Da to about 15,000,000 Da. In embodiments, the hydroxylated polyethylene has a number average molecular weight from about 150 Da to about 10,000,000 Da. In embodiments, the hydroxylated polyethylene has a number average molecular weight from about 150 Da to about 5,000,000 Da. In embodiments, the hydroxylated polyethylene has a number average molecular weight from about 150 Da to about 2,000,000 Da. In embodiments, the hydroxylated polyethylene has a number average molecular weight from about 150 Da to about 1,000,000 Da. In embodiments, the hydroxylated polyethylene has a number average molecular weight from about 150 Da to about 500,000 Da. In embodiments, the hydroxylated polyethylene has a number average molecular weight from about 150 Da to about 200,000 Da. In embodiments, the hydroxylated polyethylene has a number average molecular weight from about 150 Da to about 100,000 Da. In embodiments, the hydroxylated polyethylene has a number average molecular weight from about 150 Da to about 50,000 Da. In embodiments, the hydroxylated polyethylene has a number average molecular weight from about 150 Da to about 20,000 Da. In embodiments, the hydroxylated polyethylene has a number average molecular weight from about 150 Da to about 10,000 Da. In embodiments, the hydroxylated polyethylene has a number average molecular weight from about 150 Da to about 5000 Da. In embodiments, the hydroxylated polyethylene has a number average molecular weight from about 150 Da to about 2000 Da. In embodiments, the hydroxylated polyethylene has a number average molecular weight from about 150 Da to about 1000 Da. In embodiments, the hydroxylated polyethylene has a number average molecular weight from about 150 Da to about 500 Da. In embodiments, the hydroxylated polyethylene has a number average molecular weight from about 300 Da to about 20,000,000 Da. In embodiments, the hydroxylated polyethylene has a number average molecular weight from about 300 Da to about 15,000,000 Da. In embodiments, the hydroxylated polyethylene has a number average molecular weight from about 300 Da to about 10,000,000 Da. In embodiments, the hydroxylated polyethylene has a number average molecular weight from about 300 Da to about 5,000,000 Da. In embodiments, the hydroxylated polyethylene has a number average molecular weight from about 300 Da to about 2,000,000 Da. In embodiments, the hydroxylated polyethylene has a number average molecular weight from about 300 Da to about 1,000,000 Da. In embodiments, the hydroxylated polyethylene has a number average molecular weight from about 300 Da to about 500,000 Da. In embodiments, the hydroxylated polyethylene has a number average molecular weight from about 300 Da to about 200,000 Da. In embodiments, the hydroxylated polyethylene has a number average molecular weight from about 300 Da to about 100,000 Da. In embodiments, the hydroxylated polyethylene has a number average molecular weight from about 300 Da to about 50,000 Da. In embodiments, the hydroxylated polyethylene has a number average molecular weight from about 300 Da to about 20,000 Da. In embodiments, the hydroxylated polyethylene has a number average molecular weight from about 300 Da to about 10,000 Da. In embodiments, the hydroxylated polyethylene has a number average molecular weight from about 300 Da to about 5000 Da. In embodiments, the hydroxylated polyethylene has a number average molecular weight from about 300 Da to about 2000 Da. In embodiments, the hydroxylated polyethylene has a number average molecular weight from about 300 Da to about 1000 Da. In embodiments, the hydroxylated polyethylene has a number average molecular weight from about 300 Da to about 500 Da. In embodiments, the hydroxylated polyethylene has a number average molecular weight from about 450 Da to about 20,000,000 Da. In embodiments, the hydroxylated polyethylene has a number average molecular weight from about 450 Da to about 15,000,000 Da. In embodiments, the hydroxylated polyethylene has a number average molecular weight from about 450 Da to about 10,000,000 Da. In embodiments, the hydroxylated polyethylene has a number average molecular weight from about 450 Da to about 5,000,000 Da. In embodiments, the hydroxylated polyethylene has a number average molecular weight from about 450 Da to about 2,000,000 Da. In embodiments, the hydroxylated polyethylene has a number average molecular weight from about 450 Da to about 1,000,000 Da. In embodiments, the hydroxylated polyethylene has a number average molecular weight from about 450 Da to about 500,000 Da. In embodiments, the hydroxylated polyethylene has a number average molecular weight from about 450 Da to about 200,000 Da. In embodiments, the hydroxylated polyethylene has a number average molecular weight from about 450 Da to about 100,000 Da. In embodiments, the hydroxylated polyethylene has a number average molecular weight from about 450 Da to about 50,000 Da. In embodiments, the hydroxylated polyethylene has a number average molecular weight from about 450 Da to about 20,000 Da. In embodiments, the hydroxylated polyethylene has a number average molecular weight from about 450 Da to about 10,000 Da. In embodiments, the hydroxylated polyethylene has a number average molecular weight from about 450 Da to about 5000 Da. In embodiments, the hydroxylated polyethylene has a number average molecular weight from about 450 Da to about 2000 Da. In embodiments, the hydroxylated polyethylene has a number average molecular weight from about 450 Da to about 1000 Da. In embodiments, the hydroxylated polyethylene has a number average molecular weight from about 600 Da to about 20,000,000 Da. In embodiments, the hydroxylated polyethylene has a number average molecular weight from about 600 Da to about 15,000,000 Da. In embodiments, the hydroxylated polyethylene has a number average molecular weight from about 600 Da to about 10,000,000 Da. In embodiments, the hydroxylated polyethylene has a number average molecular weight from about 600 Da to about 5,000,000 Da. In embodiments, the hydroxylated polyethylene has a number average molecular weight from about 600 Da to about 2,000,000 Da. In embodiments, the hydroxylated polyethylene has a number average molecular weight from about 600 Da to about 1,000,000 Da. In embodiments, the hydroxylated polyethylene has a number average molecular weight from about 600 Da to about 500,000 Da. In embodiments, the hydroxylated polyethylene has a number average molecular weight from about 600 Da to about 200,000 Da. In embodiments, the hydroxylated polyethylene has a number average molecular weight from about 600 Da to about 100,000 Da. In embodiments, the hydroxylated polyethylene has a number average molecular weight from about 600 Da to about 50,000 Da. In embodiments, the hydroxylated polyethylene has a number average molecular weight from about 600 Da to about 20,000 Da. In embodiments, the hydroxylated polyethylene has a number average molecular weight from about 600 Da to about 10,000 Da. In embodiments, the hydroxylated polyethylene has a number average molecular weight from about 600 Da to about 5000 Da. In embodiments, the hydroxylated polyethylene has a number average molecular weight from about 600 Da to about 2000 Da. In embodiments, the hydroxylated polyethylene has a number average molecular weight from about 600 Da to about 1000 Da.

In embodiments, the hydroxylated polyethylene has from 5 to 600,000 number of total subunits. In embodiments, the hydroxylated polyethylene has from 5 to 400,000 number of total subunits. In embodiments, the hydroxylated polyethylene has from 5 to 200,000 number of total subunits. In embodiments, the hydroxylated polyethylene has from 5 to 100,000 number of total subunits. In embodiments, the hydroxylated polyethylene has from 5 to 50,000 number of total subunits. In embodiments, the hydroxylated polyethylene has from 5 to 20,000 number of total subunits. In embodiments, the hydroxylated polyethylene has from 5 to 10,000 number of total subunits. In embodiments, the hydroxylated polyethylene has from 5 to 5000 number of total subunits. In embodiments, the hydroxylated polyethylene has from 5 to 2000 number of total subunits. In embodiments, the hydroxylated polyethylene has from 5 to 1000 number of total subunits. In embodiments, the hydroxylated polyethylene has from 5 to 500 number of total subunits. In embodiments, the hydroxylated polyethylene has from 5 to 200 number of total subunits. In embodiments, the hydroxylated polyethylene has from 5 to 100 number of total subunits. In embodiments, the hydroxylated polyethylene has from 5 to 50 number of total subunits. In embodiments, the hydroxylated polyethylene has from 5 to 20 number of total subunits. In embodiments, the hydroxylated polyethylene has from 10 to 600,000 number of total subunits. In embodiments, the hydroxylated polyethylene has from 10 to 400,000 number of total subunits. In embodiments, the hydroxylated polyethylene has from 10 to 200,000 number of total subunits. In embodiments, the hydroxylated polyethylene has from 10 to 100,000 number of total subunits. In embodiments, the hydroxylated polyethylene has from 10 to 50,000 number of total subunits. In embodiments, the hydroxylated polyethylene has from 10 to 20,000 number of total subunits. In embodiments, the hydroxylated polyethylene has from 10 to 10,000 number of total subunits. In embodiments, the hydroxylated polyethylene has from 10 to 5000 number of total subunits. In embodiments, the hydroxylated polyethylene has from 10 to 2000 number of total subunits. In embodiments, the hydroxylated polyethylene has from 10 to 1000 number of total subunits. In embodiments, the hydroxylated polyethylene has from 10 to 500 number of total subunits. In embodiments, the hydroxylated polyethylene has from 10 to 200 number of total subunits. In embodiments, the hydroxylated polyethylene has from 10 to 100 number of total subunits. In embodiments, the hydroxylated polyethylene has from 10 to 50 number of total subunits. In embodiments, the hydroxylated polyethylene has from 10 to 20 number of total subunits. In embodiments, the hydroxylated polyethylene has from 15 to 600,000 number of total subunits. In embodiments, the hydroxylated polyethylene has from 15 to 400,000 number of total subunits. In embodiments, the hydroxylated polyethylene has from 15 to 200,000 number of total subunits. In embodiments, the hydroxylated polyethylene has from 15 to 100,000 number of total subunits. In embodiments, the hydroxylated polyethylene has from 15 to 50,000 number of total subunits. In embodiments, the hydroxylated polyethylene has from 15 to 20,000 number of total subunits. In embodiments, the hydroxylated polyethylene has from 15 to 10,000 number of total subunits. In embodiments, the hydroxylated polyethylene has from 15 to 5000 number of total subunits. In embodiments, the hydroxylated polyethylene has from 15 to 2000 number of total subunits. In embodiments, the hydroxylated polyethylene has from 15 to 1000 number of total subunits. In embodiments, the hydroxylated polyethylene has from 15 to 500 number of total subunits. In embodiments, the hydroxylated polyethylene has from 15 to 200 number of total subunits. In embodiments, the hydroxylated polyethylene has from 15 to 100 number of total subunits. In embodiments, the hydroxylated polyethylene has from 15 to 50 number of total subunits. In embodiments, the hydroxylated polyethylene has from 15 to 20 number of total subunits. In embodiments, the hydroxylated polyethylene has from 20 to 600,000 number of total subunits. In embodiments, the hydroxylated polyethylene has from 20 to 400,000 number of total subunits. In embodiments, the hydroxylated polyethylene has from 20 to 200,000 number of total subunits. In embodiments, the hydroxylated polyethylene has from 20 to 100,000 number of total subunits. In embodiments, the hydroxylated polyethylene has from 20 to 50,000 number of total subunits. In embodiments, the hydroxylated polyethylene has from 20 to 20,000 number of total subunits. In embodiments, the hydroxylated polyethylene has from 20 to 10,000 number of total subunits. In embodiments, the hydroxylated polyethylene has from 20 to 5000 number of total subunits. In embodiments, the hydroxylated polyethylene has from 20 to 2000 number of total subunits. In embodiments, the hydroxylated polyethylene has from 20 to 1000 number of total subunits. In embodiments, the hydroxylated polyethylene has from 20 to 500 number of total subunits. In embodiments, the hydroxylated polyethylene has from 20 to 200 number of total subunits. In embodiments, the hydroxylated polyethylene has from 20 to 100 number of total subunits. In embodiments, the hydroxylated polyethylene has from 20 to 50 number of total subunits.

In embodiments, the hydroxylated polyethylene has from about 5 to about 600,000 number of total subunits. In embodiments, the hydroxylated polyethylene has from about 5 to about 400,000 number of total subunits. In embodiments, the hydroxylated polyethylene has from about 5 to about 200,000 number of total subunits. In embodiments, the hydroxylated polyethylene has from about 5 to about 100,000 number of total subunits. In embodiments, the hydroxylated polyethylene has from about 5 to about 50,000 number of total subunits. In embodiments, the hydroxylated polyethylene has from about 5 to about 20,000 number of total subunits. In embodiments, the hydroxylated polyethylene has from about 5 to about 10,000 number of total subunits. In embodiments, the hydroxylated polyethylene has from about 5 to about 5000 number of total subunits. In embodiments, the hydroxylated polyethylene has from about 5 to about 2000 number of total subunits. In embodiments, the hydroxylated polyethylene has from about 5 to about 1000 number of total subunits. In embodiments, the hydroxylated polyethylene has from about 5 to about 500 number of total subunits. In embodiments, the hydroxylated polyethylene has from about 5 to about 200 number of total subunits. In embodiments, the hydroxylated polyethylene has from about 5 to about 100 number of total subunits. In embodiments, the hydroxylated polyethylene has from about 5 to about 50 number of total subunits. In embodiments, the hydroxylated polyethylene has from about 5 to about 20 number of total subunits. In embodiments, the hydroxylated polyethylene has from about 10 to about 600,000 number of total subunits. In embodiments, the hydroxylated polyethylene has from about 10 to about 400,000 number of total subunits. In embodiments, the hydroxylated polyethylene has from about 10 to about 200,000 number of total subunits. In embodiments, the hydroxylated polyethylene has from about 10 to about 100,000 number of total subunits. In embodiments, the hydroxylated polyethylene has from about 10 to about 50,000 number of total subunits. In embodiments, the hydroxylated polyethylene has from about 10 to about 20,000 number of total subunits. In embodiments, the hydroxylated polyethylene has from about 10 to about 10,000 number of total subunits. In embodiments, the hydroxylated polyethylene has from about 10 to about 5000 number of total subunits. In embodiments, the hydroxylated polyethylene has from about 10 to about 2000 number of total subunits. In embodiments, the hydroxylated polyethylene has from about 10 to about 1000 number of total subunits. In embodiments, the hydroxylated polyethylene has from about 10 to about 500 number of total subunits. In embodiments, the hydroxylated polyethylene has from about 10 to about 200 number of total subunits. In embodiments, the hydroxylated polyethylene has from about 10 to about 100 number of total subunits. In embodiments, the hydroxylated polyethylene has from about 10 to about 50 number of total subunits. In embodiments, the hydroxylated polyethylene has from about 10 to about 20 number of total subunits. In embodiments, the hydroxylated polyethylene has from about 15 to about 600,000 number of total subunits. In embodiments, the hydroxylated polyethylene has from about 15 to about 400,000 number of total subunits. In embodiments, the hydroxylated polyethylene has from about 15 to about 200,000 number of total subunits. In embodiments, the hydroxylated polyethylene has from about 15 to about 100,000 number of total subunits. In embodiments, the hydroxylated polyethylene has from about 15 to about 50,000 number of total subunits. In embodiments, the hydroxylated polyethylene has from about 15 to about 20,000 number of total subunits. In embodiments, the hydroxylated polyethylene has from about 15 to about 10,000 number of total subunits. In embodiments, the hydroxylated polyethylene has from about 15 to about 5000 number of total subunits. In embodiments, the hydroxylated polyethylene has from about 15 to about 2000 number of total subunits. In embodiments, the hydroxylated polyethylene has from about 15 to about 1000 number of total subunits. In embodiments, the hydroxylated polyethylene has from about 15 to about 500 number of total subunits. In embodiments, the hydroxylated polyethylene has from about 15 to about 200 number of total subunits. In embodiments, the hydroxylated polyethylene has from about 15 to about 100 number of total subunits. In embodiments, the hydroxylated polyethylene has from about 15 to about 50 number of total subunits. In embodiments, the hydroxylated polyethylene has from about 15 to about 20 number of total subunits. In embodiments, the hydroxylated polyethylene has from about 20 to about 600,000 number of total subunits. In embodiments, the hydroxylated polyethylene has from about 20 to about 400,000 number of total subunits. In embodiments, the hydroxylated polyethylene has from about 20 to about 200,000 number of total subunits. In embodiments, the hydroxylated polyethylene has from about 20 to about 100,000 number of total subunits. In embodiments, the hydroxylated polyethylene has from about 20 to about 50,000 number of total subunits. In embodiments, the hydroxylated polyethylene has from about 20 to about 20,000 number of total subunits. In embodiments, the hydroxylated polyethylene has from about 20 to about 10,000 number of total subunits. In embodiments, the hydroxylated polyethylene has from about 20 to about 5000 number of total subunits. In embodiments, the hydroxylated polyethylene has from about 20 to about 2000 number of total subunits. In embodiments, the hydroxylated polyethylene has from about 20 to about 1000 number of total subunits. In embodiments, the hydroxylated polyethylene has from about 20 to about 500 number of total subunits. In embodiments, the hydroxylated polyethylene has from about 20 to about 200 number of total subunits. In embodiments, the hydroxylated polyethylene has from about 20 to about 100 number of total subunits. In embodiments, the hydroxylated polyethylene has from about 20 to about 50 number of total subunits.

In an aspect is provided an oxidized polyethylene, including a first oxidized subunit, a second oxidized subunit, and a non-oxidized subunit. The first oxidized subunit, the second oxidized subunit, and the non-oxidized subunit are as described herein. The first oxidized subunit and the second oxidized subunit are functionalized subunits. The oxidized polyethylene and the hydroxylated polyethylene are as described herein, including in embodiments.

In embodiments, the oxidized polyethylene may further include an alkylene chloride subunit ("chloride subunit") and/or an ester subunit. The chloride subunit and the ester subunit may be functionalized subunits.

In embodiments, the chloride subunit is alkylene (e.g., linear or branched) substituted with one or more chlorides. In embodiments, the chloride subunit is $C_1$-$C_{20}$ alkylene (e.g., linear or branched) substituted with one or more chlorides. In embodiments, the chloride subunit is $C_1$-$C_{10}$ alkylene (e.g., linear or branched) substituted with one or more chlorides. In embodiments, the chloride subunit is $C_1$-$C_8$ alkylene (e.g., linear or branched) substituted with one or more chlorides. In embodiments, the chloride subunit is $C_1$-$C_6$ alkylene (e.g., linear or branched) substituted with one or more chlorides. In embodiments, the chloride subunit is $C_1$-$C_4$ alkylene (e.g., linear or branched) substituted with one or more chlorides. In embodiments, the chloride subunit is $C_1$-$C_3$ alkylene (e.g., linear or branched) substituted with one or more chlorides. In embodiments, the chloride subunit is

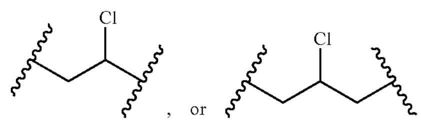

In embodiments, the chloride subunit is

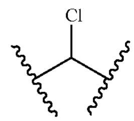

In embodiments, the chloride subunit is

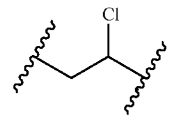

In embodiments, the chloride subunit is

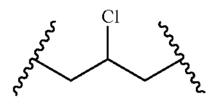

In embodiments, the ester subunit is heteroalkylene (e.g., linear or branched) 7including one or more ester linkages. In embodiments, the ester subunit is 2 to 20 membered heteroalkylene (e.g., linear or branched) including one or more ester linkages. In embodiments, the ester subunit is 2 to 10 membered heteroalkylene (e.g., linear or branched) including one or more ester linkages. In embodiments, the ester subunit is 2 to 8 membered heteroalkylene (e.g., linear or branched) including one or more ester linkages. In embodiments, the ester subunit is 2 to 6 membered heteroalkylene (e.g., linear or branched) including one or more ester linkages. In embodiments, the ester subunit is 2 to 4 membered heteroalkylene (e.g., linear or branched) including one or more ester linkages. In embodiments, the ester subunit is 2 to 3 membered heteroalkylene (e.g., linear or branched) including one or more ester linkages. In embodiments, the ester subunit is

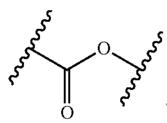

In embodiments, a sum of a chloride subunit and an ester subunit of the oxidized polyethylene is less than about 6% of a sum of the first oxidized subunit and the second oxidized subunit of the oxidized polyethylene. In embodiments, a sum of a chloride subunit and an ester subunit of the oxidized polyethylene is less than about 5% of a sum of the first oxidized subunit and the second oxidized subunit of the oxidized polyethylene. In embodiments, a sum of a chloride subunit and an ester subunit of the oxidized polyethylene is less than about 4% of a sum of the first oxidized subunit and the second oxidized subunit of the oxidized polyethylene. In embodiments, a sum of a chloride subunit and an ester subunit of the oxidized polyethylene is less than about 3% of a sum of the first oxidized subunit and the second oxidized subunit of the oxidized polyethylene. In embodiments, a sum of a chloride subunit and an ester subunit of the oxidized polyethylene is less than about 2% of a sum of the first oxidized subunit and the second oxidized subunit of the oxidized polyethylene. In embodiments, a sum of a chloride subunit and an ester subunit of the oxidized polyethylene is less than about 1% of a sum of the first oxidized subunit and the second oxidized subunit of the oxidized polyethylene.

In embodiments, a sum of a chloride subunit of formula

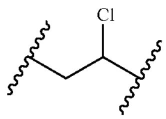

and an ester subunit of formula

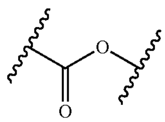

of the oxidized polyethylene is less than about 10% of a sum of the first oxidized subunit and the second oxidized subunit of the oxidized polyethylene. In embodiments, a sum of a chloride subunit of formula

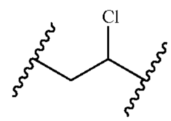

and an ester subunit of formula

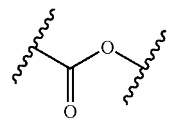

of the oxidized polyethylene is less than about 9% of a sum of the first oxidized subunit and the second oxidized subunit of the oxidized polyethylene. In embodiments, a sum of a chloride subunit of formula

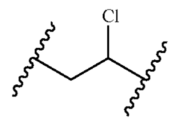

and an ester subunit of formula

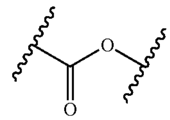

of the oxidized polyethylene is less than about 8% of a sum of the first oxidized subunit and the second oxidized subunit of the oxidized polyethylene. In embodiments, a sum of a chloride subunit of formula

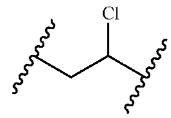

and an ester subunit of formula

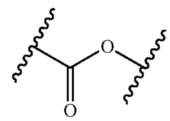

of the oxidized polyethylene is less than about 7% of a sum of the first oxidized subunit and the second oxidized subunit of the oxidized polyethylene. In embodiments, a sum of a chloride subunit of formula

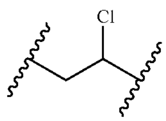

and an ester subunit of formula

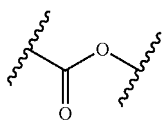

of the oxidized polyethylene is less than about 6% of a sum of the first oxidized subunit and the second oxidized subunit of the oxidized polyethylene. In embodiments, a sum of a chloride subunit of formula

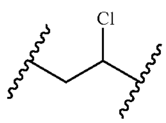

and an ester subunit of formula

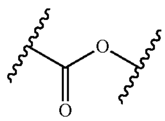

of the oxidized polyethylene is less than about 5% of a sum of the first oxidized subunit and the second oxidized subunit of the oxidized polyethylene. In embodiments, a sum of a chloride subunit of formula

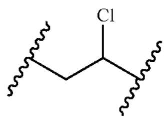

and an ester subunit of formula

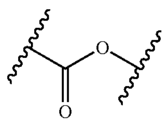

of the oxidized polyethylene is less than about 4% of a sum of the first oxidized subunit and the second oxidized subunit of the oxidized polyethylene. In embodiments, a sum of a chloride subunit of formula

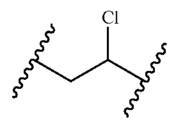

and an ester subunit of formula

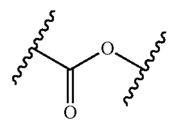

of the oxidized polyethylene is less than about 3% of a sum of the first oxidized subunit and the second oxidized subunit of the oxidized polyethylene. In embodiments, a sum of a chloride subunit of formula

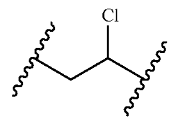

and an ester subunit of formula

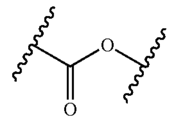

of the oxidized polyethylene is less than about 2% of a sum of the first oxidized subunit and the second oxidized subunit of the oxidized polyethylene. In embodiments, a sum of a chloride subunit of formula

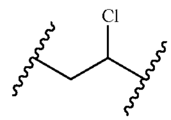

and an ester subunit of formula

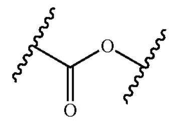

of the oxidized polyethylene is less than about 1% of a sum of the first oxidized subunit and the second oxidized subunit of the oxidized polyethylene.

In an aspect is provided a cross-linked polymer, wherein a first oxidized polyethylene (e.g., as described herein) is covalently bonded to a second oxidized polyethylene (e.g., as described herein) via a covalent linker having the formula:

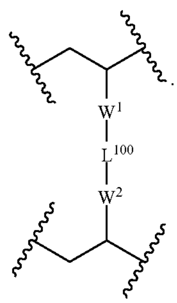

$W^1$ is —O— or —$NR^1$—.

$W^2$ is —O— or —$NR^2$—.

$R^1$ and $R^2$ are independently hydrogen, halogen, —$CX^3_3$, —$CHX^3_2$, —$CH_2X^3$, —$OCX^3_3$, —$OCH_2X^3$, —$OCHX^3_2$, —CN, —$SO_{n3}R^3$, —$SO_{v3}NR^3R^3$, —$NR^3NR^3R^3$, —$ONR^3R^3$, —$NHC(O)NR^3NR^3R^3$, —$NHC(O)NR^3R^3$, —$N(O)_{m3}$, —$NR^3R^3$, —$C(O)R^3$, —$C(O)OR^3$, —$C(O)NR^3R^3$, —$OR^3$, —$SR^3$, —$NR^3SO_2R^3$, —$NR^3C(O)R^3$, —$NR^3C(O)OR^3$, —$NR^3OR^3$, —$SF_5$, —$N_3$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

$R^3$ is independently hydrogen, oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —$NHC(O)NHNH_2$, —$NHC(O)NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered); two $R^3$ substituents bonded to the same nitrogen atom may optionally be joined to form a substituted or unsubstituted heterocycloalkyl (e.g., 3 to 8 membered, 3 to 6 membered, 4 to 6 membered, 4 to 5 membered, or 5 to 6 membered), or substituted or unsubstituted heteroaryl (e.g., 5 to 10 membered, 5 to 9 membered, or 5 to 6 membered).

$L^{100}$ is -$L^{101}$-$L^{102}$-$L^{103}$-.

$L^{101}$ is a bond, —$N(R^{101})$—, —S—, —O—, —C(O)—, —C(O)O—, —OC(O)—, —$N(R^{101})C(O)$—, —$C(O)N(R^{101})$—, —$NR^{101}C(O)NR^{101}$—, —$NR^{101}C(NH)NH$—, —C(S)—, —$Si(R^{101})_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

$L^{102}$ is a bond, —$N(R^{102})$—, —S—, —O—, —C(O)—, —C(O)O—, —OC(O)—, —$N(R^{102})C(O)$—, —$C(O)N(R^{102})$—, —$NR^{102}C(O)NR^{102}$—, —$NR^{102}C(NH)NH$—, —C(S)—, —$Si(R^{102})_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

$L^{103}$ is a bond, —$N(R^{103})$—, —S—, —O—, —C(O)—, —C(O)O—, —OC(O)—, —$N(R^{103})C(O)$—, —$C(O)N(R^{103})$—, —$NR^{103}C(O)NR^{103}$—, —$NR^{103}C(NH)NH$—, —C(S)—, —$Si(R^{103})_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

$R^{101}$, $R^{102}$, and $R^{103}$ are independently hydrogen, halogen, —$CX^{104}_3$, —$CHX^{104}_2$, —$CH_2X^{104}$, —$OCX^{104}_3$, —$OCH_2X^{104}$, —$OCHX^{104}_2$, —CN, —$SO_{n104}R^{104}$, —$SO_{v104}NR^{104}R^{104}$, —$NR^{104}NR^{104}R^{104}$, —$ONR^{104}R^{104}$, —$NHC(O)NR^{104}NR^{104}R^{104}$, —$NHC(O)NR^{104}R^{104}$, —$N(O)_{m104}$, —$NR^{104}R^{104}$, —$C(O)R^{104}$, —$C(O)OR^{104}$, —$C(O)NR^{104}R^{104}$, —$OR^{104}$, —$SR^{104}$, —$NR^{104}SO_2R^{104}$, —$NR^{104}C(O)R^{104}$, —$NR^{104}C(O)OR^{104}$, —$NR^{104}R^{104}$, —$SF_5$, —$N_3$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

$R^{104}$ is independently hydrogen, oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —$NHC(O)NHNH_2$, —$NHC(O)NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered); two $R^{104}$ substituents bonded to the same nitrogen atom may optionally be joined to form a substituted or unsubstituted heterocycloalkyl (e.g., 3 to 8 membered, 3 to 6 membered, 4 to 6 membered, 4 to 5 membered, or 5 to 6 membered), or substituted or unsubstituted heteroaryl (e.g., 5 to 10 membered, 5 to 9 membered, or 5 to 6 membered).

$X^3$ and $X^{104}$ are independently —F, —Cl, —Br, or —I.

The variables n3 and n104 are independently an integer from 0 to 4.

The variables m3, m104, v3, and v104 are each independently 1 or 2.

In embodiments, $W^1$ is —O— or —NH—. In embodiments, $W^1$ is —O—. In embodiments, $W^1$ is —NH—. In embodiments, $W^1$ is independently —$NR^1$—; $R^1$ is as described herein, including in embodiments.

In embodiments, a substituted $R^1$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^1$ is substituted with a plurality of groups selected from substituent groups, size-limited substituent groups, and lower substituent groups; each substituent group, size-limited substituent group, and/or lower substituent group may optionally be different. In embodiments, when $R^1$ is substituted, it is substituted with at least one substituent group. In embodiments, when $R^1$ is substituted, it is substituted with at least one size-limited substituent group. In embodiments, when $R^1$ is substituted, it is substituted with at least one lower substituent group.

In embodiments, $R^1$ is independently hydrogen, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC (O)H, —NHC(O)OH, —NHOH, —$OCCl_3$, —$OCF_3$, —$OCBr_3$, —OC $I_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

In embodiments, $R^1$ is independently hydrogen. In embodiments, $R^1$ is independently unsubstituted $C_1$-$C_4$ alkyl. In embodiments, $R^1$ is independently unsubstituted methyl. In embodiments, $R^1$ is independently unsubstituted ethyl. In embodiments, $R^1$ is independently unsubstituted propyl. In embodiments, $R^1$ is independently unsubstituted n-propyl. In embodiments, $R^1$ is independently unsubstituted isopropyl. In embodiments, $R^1$ is independently unsubstituted butyl. In embodiments, $R^1$ is independently unsubstituted n-butyl. In embodiments, R is independently unsubstituted tert-butyl.

In embodiments, $W^2$ is —O— or —NH—. In embodiments, $W^2$ is —O—. In embodiments, $W^2$ is —NH—. In embodiments, $W^2$ is independently —$NR^2$—; $R^2$ is as described herein, including in embodiments.

In embodiments, a substituted $R^2$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^2$ is substituted with a plurality of groups selected from substituent groups, size-limited substituent groups, and lower substituent groups; each substituent group, size-limited substituent group, and/or lower substituent group may optionally be different. In embodiments, when $R^2$ is substituted, it is substituted with at least one substituent group. In embodiments, when $R^2$ is substituted, it is substituted with at least one size-limited substituent group. In embodiments, when $R^2$ is substituted, it is substituted with at least one lower substituent group.

In embodiments, $R^2$ is independently hydrogen, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC (O)H, —NHC(O)OH, —NHOH, —$OCCl_3$, —$OCF_3$, —$OCBr_3$, —OC $I_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

In embodiments, $R^2$ is independently hydrogen. In embodiments, $R^2$ is independently unsubstituted $C_1$-$C_4$ alkyl. In embodiments, $R^2$ is independently unsubstituted methyl. In embodiments, $R^2$ is independently unsubstituted ethyl. In embodiments, $R^2$ is independently unsubstituted propyl. In embodiments, $R^2$ is independently unsubstituted n-propyl. In embodiments, $R^2$ is independently unsubstituted isopropyl. In embodiments, $R^2$ is independently unsubstituted butyl. In embodiments, $R^2$ is independently unsubstituted n-butyl. In embodiments, $R^2$ is independently unsubstituted tert-butyl.

In embodiments, a substituted $R^3$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^3$ is substituted with a plurality of groups selected from substituent groups, size-limited substituent groups, and lower substituent groups; each substituent group, size-limited substituent group, and/or lower substituent group may optionally be different. In embodiments, when $R^3$ is substituted, it is substituted with at least one substituent group. In embodiments, when $R^3$ is substituted, it is substituted with at least one size-limited substituent group. In embodiments, when $R^3$ is substituted, it is substituted with at least one lower substituent group.

In embodiments, a substituted ring formed when two $R^3$ substituents bonded to the same nitrogen atom are joined (e.g., substituted heterocycloalkyl and/or substituted heteroaryl) is substituted with at least one substituent group, size-limited substituent group, or lower substituent group; wherein if the substituted ring formed when two $R^3$ substituents bonded to the same nitrogen atom are joined is substituted with a plurality of groups selected from substituent groups, size-limited substituent groups, and lower substituent groups; each substituent group, size-limited substituent group, and/or lower substituent group may optionally be different. In embodiments, when the substituted ring formed when two $R^3$ substituents bonded to the same nitrogen atom are joined is substituted, it is substituted with at least one substituent group. In embodiments, when the substituted ring formed when two $R^3$ substituents bonded to the same nitrogen atom are joined is substituted, it is substituted with at least one size-limited substituent group. In embodiments, when the substituted ring formed when two $R^3$ substituents bonded to the same nitrogen atom are joined is substituted, it is substituted with at least one lower substituent group.

In embodiments, a substituted $L^{101}$ (e.g., substituted alkylene, substituted heteroalkylene, substituted cycloalkylene, substituted heterocycloalkylene, substituted arylene, and/or substituted heteroarylene) is substituted with at least one substituent group, size-limited substituent group, or lower substituent group; wherein if the substituted $L^{101}$ is substituted with a plurality of groups selected from substituent groups, size-limited substituent groups, and lower substituent groups; each substituent group, size-limited substituent group, and/or lower substituent group may optionally be different. In embodiments, when $L^{101}$ is substituted, it is substituted with at least one substituent group. In embodiments, when $L^{101}$ is substituted, it is substituted with at least one size-limited substituent group. In embodiments, when $L^{101}$ is substituted, it is substituted with at least one lower substituent group.

In embodiments, $L^{101}$ is a bond, —S—, —O—, —C(O)—, —C(O)O—, —OC(O)—, —C(O)N($R^{101}$)—, —C(S)—, —Si($R^{101}$)$_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{101}$ is a bond, —NH—, —S—, —O—, —C(O)—, —C(O)O—, —OC(O)—, —NHC(O)—, —C(O)NH—, —NHC(O)NH—, —NHC(NH)NH—, —C(S)—, —Si(OH)$_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{101}$ is a bond, —S—, —O—, —C(O)—, —C(O)O—, —OC(O)—, —C(O)NH—, —C(S)—, —Si(OH)$_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{101}$ is —C(O)—, —C(O)NH—, or —Si($R^{101}$)$_2$—; $R^{101}$ is as described herein, including in embodiments. In embodiments, $L^{101}$ is —C(O)—. In embodiments, $L^{101}$ is —C(O)NH—. In embodiments, $L^{101}$ is —Si(OH)$_2$—. In embodiments, $L^{101}$ is —Si(Cl)$_2$—.

In embodiments, $L^{101}$ is —Si($R^{101}$)$_2$—; $R^{101}$ is as described herein, including in embodiments.

In embodiments, a substituted $R^{101}$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^{101}$ is substituted with a plurality of groups selected from substituent groups, size-limited substituent groups, and lower substituent groups; each substituent group, size-limited substituent group, and/or lower substituent group may optionally be different. In embodiments, when $R^{101}$ is substituted, it is substituted with at least one substituent group. In embodiments, when $R^{101}$ is substituted, it is substituted with at least one size-limited substituent group. In embodiments, when $R^{101}$ is substituted, it is substituted with at least one lower substituent group.

In embodiments, $R^{101}$ is independently hydrogen, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —OC $I_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —OSi$(OH)_3$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

In embodiments, $R^{101}$ is independently halogen, —OH, —$NH_2$, —OSi$(OH)_3$, or substituted or unsubstituted heteroalkylene. In embodiments, $R^{101}$ is independently halogen, —OH, —$NH_2$, or substituted or unsubstituted heteroalkylene. In embodiments, $R^{101}$ is independently —Cl or —OH. In embodiments, $R^{101}$ is independently —F. In embodiments, $R^{101}$ is independently —Cl. In embodiments, $R^{101}$ is independently —Br. In embodiments, $R^{101}$ is independently —I. In embodiments, $R^{101}$ is independently —OH. In embodiments, $R^{101}$ is independently —$NH_2$. In embodiments, $R^{101}$ is independently —$OSi(OH)_3$. In embodiments, $R^{101}$ is independently substituted or unsubstituted heteroalkylene. In embodiments, $R^{101}$ is independently unsubstituted heteroalkylene. In embodiments, $R^{101}$ is independently unsubstituted alkoxy. In embodiments, $R^{101}$ is independently —O($C_1$-$C_4$ alkyl). In embodiments, $R^{101}$ is independently unsubstituted methoxy. In embodiments, $R^{101}$ is independently unsubstituted ethoxy. In embodiments, $R^{101}$ is independently unsubstituted propoxy. In embodiments, $R^{101}$ is independently unsubstituted n-propoxy. In embodiments, $R^{101}$ is independently unsubstituted isopropoxy. In embodiments, $R^{101}$ is independently unsubstituted butoxy. In embodiments, $R^{101}$ is independently unsubstituted n-butoxy. In embodiments, $R^{101}$ is independently unsubstituted tert-butoxy.

In embodiments, $L^{101}$ is —$Si(R^{101})_2$—; and $R^{101}$ is independently an oxidized polyethylene, including a subunit having the formula:

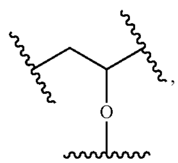 [SMILES: *CC(*)O*]

wherein the oxygen atom is connected to the silicon atom.

In embodiments, a substituted $L^{102}$ (e.g., substituted alkylene, substituted heteroalkylene, substituted cycloalkylene, substituted heterocycloalkylene, substituted arylene, and/or substituted heteroarylene) is substituted with at least one substituent group, size-limited substituent group, or lower substituent group; wherein if the substituted $L^{102}$ is substituted with a plurality of groups selected from substituent groups, size-limited substituent groups, and lower substituent groups; each substituent group, size-limited substituent group, and/or lower substituent group may optionally be different. In embodiments, when $L^{102}$ is substituted, it is substituted with at least one substituent group. In embodiments, when $L^{102}$ is substituted, it is substituted with at least one size-limited substituent group. In embodiments, when $L^{102}$ is substituted, it is substituted with at least one lower substituent group.

In embodiments, $L^{102}$ is a bond, —NH—, —S—, —O—, —C(O)—, —C(O)O—, —OC(O)—, —NHC(O)—, —C(O)NH—, —NHC(O)NH—, —NHC(NH)NH—, —C(S)—, —$Si(OH)_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{102}$ is a substituted or unsubstituted alkylene. In embodiments, $L^{102}$ is a substituted or unsubstituted $C_1$-$C_{20}$ alkylene. In embodiments, $L^{102}$ is a substituted $C_1$-$C_{20}$ alkylene. In embodiments, $L^{102}$ is an unsubstituted $C_1$-$C_{20}$ alkylene. In embodiments, $L^{102}$ is an unsubstituted $C_1$-$C_{12}$ alkylene. In embodiments, $L^{102}$ is an unsubstituted $C_1$-$C_8$alkylene. In embodiments, $L^{102}$ is an unsubstituted $C_1$-$C_6$ alkylene. In embodiments, $L^{102}$ is a bond.

In embodiments, a substituted $R^{102}$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^{102}$ is substituted with a plurality of groups selected from substituent groups, size-limited substituent groups, and lower substituent groups; each substituent group, size-limited substituent group, and/or lower substituent group may optionally be different. In embodiments, when $R^{102}$ is substituted, it is substituted with at least one substituent group. In embodiments, when $R^{102}$ is substituted, it is substituted with at least one size-limited substituent group. In embodiments, when $R^{102}$ is substituted, it is substituted with at least one lower substituent group.

In embodiments, $R^{102}$ is independently hydrogen, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —OC $I_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$OSi(OH)_3$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

In embodiments, a substituted $L^{103}$ (e.g., substituted alkylene, substituted heteroalkylene, substituted cycloalkylene, substituted heterocycloalkylene, substituted arylene, and/or substituted heteroarylene) is substituted with at least one substituent group, size-limited substituent group, or lower substituent group; wherein if the substituted $L^{103}$ is substituted with a plurality of groups selected from substituent groups, size-limited substituent groups, and lower substituent groups; each substituent group, size-limited substituent group, and/or lower substituent group may optionally be different. In embodiments, when $L^{103}$ is substituted, it is substituted with at least one substituent group. In embodiments, when $L^{103}$ is substituted, it is substituted with at least one size-limited substituent group. In embodiments, when $L^{103}$ is substituted, it is substituted with at least one lower substituent group.

In embodiments, $L^{103}$ is a bond, —S—, —O—, —C(O)—, —C(O)O—, —OC(O)—, —$N(R^{103})C(O)$—, —C(S)—, —$Si(R^{103})_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{103}$ is a bond, —NH—, —S—, —O—, —C(O)—, —C(O)O—, —OC(O)—, —NHC(O)—, —C(O)NH—, —NHC(O)NH—, —NHC(NH)NH—, —C(S)—, —$Si(OH)_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{103}$ is a bond, —S—, —O—, —C(O)—, —C(O)O—, —OC(O)—, —NHC(O)—, —C(S)—, —$Si(OH)_2$—, substituted or unsubstituted alkylene (e.g., $C_1$-$C_8$, $C_1$-$C_6$, $C_1$-$C_4$, or $C_1$-$C_2$), substituted or unsubstituted heteroalkylene (e.g., 2 to 8 membered, 2 to 6 membered, 4 to 6 membered, or 2 to 3 membered), substituted or unsubstituted cycloalkylene (e.g., $C_3$-$C_8$, $C_3$-$C_6$, $C_4$-$C_6$, or $C_5$-$C_6$), substituted or unsubstituted heterocycloalkylene (e.g., 3 to 8 membered, 3 to 6 membered, 4 to 6 membered, 4 to 5 membered, or 5 to 6 membered), substituted or unsubstituted arylene (e.g., $C_6$-$C_{10}$ or phenylene), or substituted or unsubstituted heteroarylene (e.g., 5 to 10 membered, 5 to 9 membered, or 5 to 6 membered).

In embodiments, $L^{103}$ is —C(O)—, —NHC(O)—, or —$Si(R^{103})_2$—; $R^{103}$ is as described herein, including in embodiments. In embodiments, $L^{103}$ is —C(O)—. In embodiments, $L^{103}$ is —NHC(O)—. In embodiments, $L^{103}$ is —$Si(OH)_2$—. In embodiments, $L^{103}$ is —$Si(Cl)_2$—. In embodiments, $L^{103}$ is a bond.

In embodiments, $L^{103}$ is —$Si(R^{103})_2$—; $R^{103}$ is as described herein, including in embodiments.

In embodiments, a substituted $R^{103}$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^{103}$ is substituted with a plurality of groups selected from substituent groups, size-limited substituent groups, and lower substituent groups; each substituent group, size-limited substituent group, and/or lower substituent group may optionally be different. In embodiments, when $R^{103}$ is substituted, it is substituted with at least one substituent group. In embodiments, when $R^{103}$ is substituted, it is substituted with at least one size-limited substituent group. In embodiments, when $R^{103}$ is substituted, it is substituted with at least one lower substituent group.

In embodiments, $R^{103}$ is independently hydrogen, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —$NHC(O)NHNH_2$, —$NHC(O)NH_2$, —$NHSO_2H$, —NHC(O)H, —NHC(O)OH, —NHOH, —$OCCl_3$, —$OCF_3$, —$OCBr_3$, —OC $I_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$OSi(OH)_3$, —$N_3$, —$SF_5$, substituted or unsubstituted alkyl (e.g., $C_1$-$C_8$, $C_1$-$C_6$, $C_1$-$C_4$, or $C_1$-$C_2$), substituted or unsubstituted heteroalkyl (e.g., 2 to 8 membered, 2 to 6 membered, 4 to 6 membered, or 2 to 3 membered), substituted or unsubstituted cycloalkyl (e.g., $C_3$-$C_8$, $C_3$-$C_6$, $C_4$-$C_6$, or $C_5$-$C_6$), substituted or unsubstituted heterocycloalkyl (e.g., 3 to 8 membered, 3 to 6 membered, 4 to 6 membered, 4 to 5 membered, or 5 to 6 membered), substituted or unsubstituted aryl (e.g., $C_6$-$C_{10}$ or phenyl), or substituted or unsubstituted heteroaryl (e.g., 5 to 10 membered, 5 to 9 membered, or 5 to 6 membered).

In embodiments, $R^{103}$ is independently halogen, —OH, —$NH_2$, —$OSi(OH)_3$, or substituted or unsubstituted heteroalkylene. In embodiments, $R^{103}$ is independently halogen, —OH, —$NH_2$, or substituted or unsubstituted heteroalkylene. In embodiments, $R^{103}$ is independently —Cl or —OH. In embodiments, $R^{103}$ is independently —F. In embodiments, $R^{103}$ is independently —Cl. In embodiments, $R^{103}$ is independently —Br. In embodiments, $R^{103}$ is independently —I. In embodiments, $R^{103}$ is independently —OH. In embodiments, $R^{103}$ is independently —$NH_2$. In embodiments, $R^{103}$ is independently —$OSi(OH)_3$. In embodiments, $R^{103}$ is independently substituted or unsubstituted heteroalkylene. In embodiments, $R^{103}$ is independently unsubstituted heteroalkylene. In embodiments, $R^{103}$ is independently unsubstituted alkoxy. In embodiments, $R^{103}$ is independently —O($C_1$-$C_4$ alkyl). In embodiments, $R^{103}$ is independently unsubstituted methoxy. In embodiments, $R^{103}$ is independently unsubstituted ethoxy. In embodiments, $R^{103}$ is independently unsubstituted propoxy. In embodiments, $R^{103}$ is independently unsubstituted n-propoxy. In embodiments, $R^{103}$ is independently unsubstituted isopropoxy. In embodiments, $R^{103}$ is independently unsubstituted butoxy. In embodiments, $R^{103}$ is independently unsubstituted n-butoxy. In embodiments, $R^{103}$ is independently unsubstituted tert-butoxy.

In embodiments, $L^{103}$ is —$Si(R^{103})_2$—; and $R^{103}$ is independently an oxidized polyethylene, including a subunit having the formula:

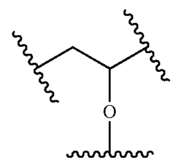

wherein the oxygen atom is connected to the silicon atom.

In embodiments, a substituted $R^{104}$ (e.g., substituted alkyl, substituted heteroalkyl, substituted cycloalkyl, substituted heterocycloalkyl, substituted aryl, and/or substituted heteroaryl) is substituted with at least one substituent group, size-limited substituent group, or lower substituent group; wherein if the substituted $R^{104}$ is substituted with a plurality of groups selected from substituent groups, size-limited substituent groups, and lower substituent groups; each substituent group, size-limited substituent group, and/or lower substituent group may optionally be different. In embodiments, when $R^{104}$ is substituted, it is substituted with at least one substituent group. In embodiments, when $R^{104}$ is substituted, it is substituted with at least one size-limited substituent group. In embodiments, when $R^{104}$ is substituted, it is substituted with at least one lower substituent group.

In embodiments, a substituted ring formed when two $R^{104}$ substituents bonded to the same nitrogen atom are joined (e.g., substituted heterocycloalkyl and/or substituted heteroaryl) is substituted with at least one substituent group, size-limited substituent group, or lower substituent group; wherein if the substituted ring formed when two $R^{104}$ substituents bonded to the same nitrogen atom are joined is substituted with a plurality of groups selected from substituent groups, size-limited substituent groups, and lower substituent groups; each substituent group, size-limited substituent group, and/or lower substituent group may optionally be different. In embodiments, when the substituted ring formed when two $R^{104}$ substituents bonded to the same nitrogen atom are joined is substituted, it is substituted with at least one substituent group. In embodiments, when the substituted ring formed when two $R^{104}$ substituents bonded to the same nitrogen atom are joined is substituted, it is substituted with at least one size-limited substituent group. In embodiments, when the substituted ring formed when two $R^{104}$ substituents bonded to the same nitrogen atom are joined is substituted, it is substituted with at least one lower substituent group.

In embodiments, $L^{101}$ is —C(O)—, —NHC(O)—, —C(O)NH—, or —Si($R^{101}$)$_2$—; $R^{101}$ is halogen, —OH, —$NH_2$, or substituted or unsubstituted heteroalkylene; $L^{102}$ is an unsubstituted alkylene; $L^{103}$ is —C(O)—, —NHC(O)—, —C(O)NH—, or —Si($R^{103}$)$_2$—; and $R^{103}$ is halogen, —OH, —$NH_2$, or substituted or unsubstituted heteroalkylene.

In embodiments, $L^{100}$ is

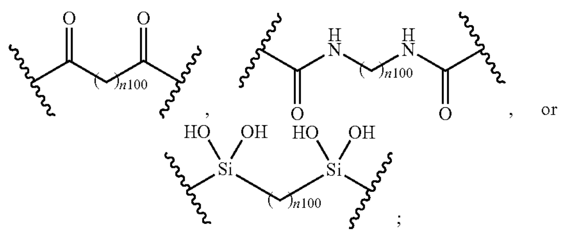

and n100 is an integer from 1 to 20. In embodiments, $L^{100}$ is

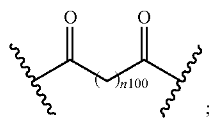

and n100 is an integer from 1 to 20. In embodiments, $L^{100}$ is

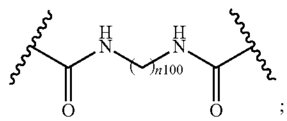

and n100 is an integer from 1 to 20. In embodiments, $L^{100}$ is

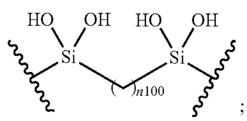

and n100 is an integer from 1 to 20.

In embodiments, $L^{101}$ is —Si($R^{101}$)$_2$—; $R^{101}$ is as described herein, including in embodiments; $L^{102}$ is a bond; and $L^{103}$ is a bond.

In embodiments, n100 is 1. In embodiments, n100 is 2. In embodiments, n100 is 3. In embodiments, n100 is 4. In embodiments, n100 is 5. In embodiments, n100 is 6. In embodiments, n100 is 7. In embodiments, n100 is 8. In embodiments, n100 is 9. In embodiments, n100 is 10. In embodiments, n100 is 11. In embodiments, n100 is 12. In embodiments, n100 is 13. In embodiments, n100 is 14. In embodiments, n100 is 15. In embodiments, n100 is 16. In embodiments, n100 is 17. In embodiments, n100 is 18. In embodiments, n100 is 19. In embodiments, n100 is 20.

In embodiments, when $R^1$ is substituted, $R^1$ is substituted with one or more first substituent groups denoted by $R^{1.1}$ as explained in the definitions section above in the description of "first substituent group(s)". In embodiments, when an $R^{1.1}$ substituent group is substituted, the $R^{1.1}$ substituent group is substituted with one or more second substituent groups denoted by $R^{1.2}$ as explained in the definitions section above in the description of "first substituent group(s)". In embodiments, when an $R^{1.2}$ substituent group is substituted, the $R^{1.2}$ substituent group is substituted with one or more third substituent groups denoted by $R^{1.3}$ as explained in the definitions section above in the description of "first substituent group(s)". In the above embodiments, $R^1$, $R^{1.1}$, $R^{1.2}$, and $R^{1.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^1$, $R^{1.1}$, $R^{1.2}$, and $R^{1.3}$, respectively.

In embodiments, when $R^2$ is substituted, $R^2$ is substituted with one or more first substituent groups denoted by $R^{2.1}$ as explained in the definitions section above in the description of "first substituent group(s)". In embodiments, when an $R^{2.1}$ substituent group is substituted, the $R^{2.1}$ substituent group is substituted with one or more second substituent groups denoted by $R^{2.2}$ as explained in the definitions section above in the description of "first substituent group(s)". In embodiments, when an $R^{2.2}$ substituent group is substituted, the $R^{2.2}$ substituent group is substituted with one or more third substituent groups denoted by $R^{2.3}$ as explained in the definitions section above in the description of "first substituent group(s)". In the above embodiments, $R^2$, $R^{2.1}$, $R^{2.2}$, and $R^{2.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^2$, $R^{2.1}$, $R^{2.2}$, and $R^{2.3}$, respectively.

In embodiments, when $R^3$ is substituted, $R^3$ is substituted with one or more first substituent groups denoted by $R^{3.1}$ as explained in the definitions section above in the description of "first substituent group(s)". In embodiments, when an $R^{3.1}$ substituent group is substituted, the $R^{3.1}$ substituent group is substituted with one or more second substituent groups denoted by $R^{3.2}$ as explained in the definitions section above in the description of "first substituent group(s)". In embodiments, when an $R^{3.2}$ substituent group is substituted, the $R^{3.2}$ substituent group is substituted with one or more third substituent groups denoted by $R^{3.3}$ as explained in the definitions section above in the description of "first substituent group(s)". In the above embodiments, $R^3$, $R^{3.1}$, $R^{3.2}$, and $R^{3.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^3$, $R^{3.1}$, $R^{3.2}$, and $R^{3.3}$, respectively.

In embodiments, when two $R^3$ substituents bonded to the same nitrogen atom are optionally joined to form a moiety that is substituted (e.g., a substituted heterocycloalkyl or substituted heteroaryl), the moiety is substituted with one or more first substituent groups denoted by $R^{3.1}$ as explained in the definitions section above in the description of "first substituent group(s)". In embodiments, when an $R^{3.1}$ substituent group is substituted, the $R^{3.1}$ substituent group is substituted with one or more second substituent groups denoted by $R^{3.2}$ as explained in the definitions section above in the description of "first substituent group(s)". In embodiments, when an $R^{3.2}$ substituent group is substituted, the $R^{3.2}$ substituent group is substituted with one or more third substituent groups denoted by $R^{3.3}$ as explained in the definitions section above in the description of "first substituent group(s)". In the above embodiments, $R^{3.1}$, $R^{3.2}$, and $R^{3.3}$ have values corresponding to the values of $R^{WW.1}$, $R^{WW.2}$, and $R^{WW.3}$, respectively, as explained in the definitions section above in the description of "first substituent group(s)", wherein $R^{WW.1}$, $R^{WW.2}$, and $R^{WW.3}$ correspond to $R^{3.1}$, $R^{3.2}$ and $R^{303}$, respectively.

In embodiments, when $R^{101}$ is substituted, $R^{101}$ is substituted with one or more first substituent groups denoted by $R^{101.1}$ as explained in the definitions section above in the description of "first substituent group(s)". In embodiments, when an $R^{101.1}$ substituent group is substituted, the $R^{101.1}$ substituent group is substituted with one or more second substituent groups denoted by $R^{101.2}$ as explained in the definitions section above in the description of "first substituent group(s)". In embodiments, when an $R^{101.2}$ substituent group is substituted, the $R^{101.2}$ substituent group is substituted with one or more third substituent groups denoted by $R^{101.3}$ as explained in the definitions section above in the description of "first substituent group(s)". In the above embodiments, $R^{101}$, $R^{101.1}$, $R^{101.2}$, and $R^{WW.3}$, have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^{101}$, $R^{101.1}$, $R^{101.2}$, and $R^{101.3}$, respectively.

In embodiments, when $R^{102}$ is substituted, $R^{102}$ is substituted with one or more first substituent groups denoted by $R^{102.1}$ as explained in the definitions section above in the description of "first substituent group(s)". In embodiments, when an $R^{102.1}$ substituent group is substituted, the $R^{102.1}$ substituent group is substituted with one or more second substituent groups denoted by $R^{102.2}$ as explained in the definitions section above in the description of "first substituent group(s)". In embodiments, when an $R^{102.2}$ substituent group is substituted, the $R^{102.2}$ substituent group is substituted with one or more third substituent groups denoted by $R^{102.3}$ as explained in the definitions section above in the description of "first substituent group(s)". In the above embodiments, $R^{102}$, $R^{102.1}$, $R^{102.2}$, and $R^{102.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^{102}$, $R^{102.1}$, $R^{102.2}$, and $R^{102.3}$, respectively.

In embodiments, when $R^{103}$ is substituted, $R^{103}$ is substituted with one or more first substituent groups denoted by $R^{103.1}$ as explained in the definitions section above in the description of "first substituent group(s)". In embodiments, when an $R^{103.1}$ substituent group is substituted, the $R^{103.1}$ substituent group is substituted with one or more second substituent groups denoted by $R^{103.2}$ as explained in the definitions section above in the description of "first substituent group(s)". In embodiments, when an $R^{103.2}$ substituent group is substituted, the $R^{103.2}$ substituent group is substituted with one or more third substituent groups denoted by $R^{103.3}$ as explained in the definitions section above in the description of "first substituent group(s)". In the above embodiments, $R^{103}$, $R^{103.1}$, $R^{103.2}$, and $R^{103.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^{103}$, $R^{103.1}$, $R^{103.2}$, and $R^{103.3}$, respectively.

In embodiments, when $R^{104}$ is substituted, $R^{104}$ is substituted with one or more first substituent groups denoted by $R^{104.1}$ as explained in the definitions section above in the description of "first substituent group(s)". In embodiments, when an $R^{104.1}$ substituent group is substituted, the $R^{104.1}$ substituent group is substituted with one or more second substituent groups denoted by $R^{104.2}$ as explained in the definitions section above in the description of "first substituent group(s)". In embodiments, when an $R^{104.2}$ substituent group is substituted, the $R^{104.2}$ substituent group is substituted with one or more third substituent groups denoted by $R^{104.3}$ as explained in the definitions section above in the description of "first substituent group(s)". In the above embodiments, $R^{104}$, $R^{104.1}$, $R^{104.2}$, and $R^{104.3}$ have values corresponding to the values of $R^{WW}$, $R^{WW.1}$, $R^{WW.2}$, and $R^{WW.3}$, respectively, as explained in the definitions section above in the description of "first substituent group(s)", wherein $R^{WW}$, $R^{WW.1}$, $R^{WW.2}$, and $R^{WW.3}$ correspond to $R^{104}$, $R^{104.1}$, $R^{104.2}$, and $R^{104.3}$, respectively.

In embodiments, when two $R^{104}$ substituents bonded to the same nitrogen atom are optionally joined to form a moiety that is substituted (e.g., a substituted heterocycloalkyl or substituted heteroaryl), the moiety is substituted with one or more first substituent groups denoted by $R^{104.1}$ as explained in the definitions section above in the description of "first substituent group(s)". In embodiments, when an $R^{104.1}$ substituent group is substituted, the $R^{104.1}$ substituent group is substituted with one or more second substituent groups denoted by $R^{104.2}$ as explained in the definitions section above in the description of "first substituent group(s)". In embodiments, when an $R^{104.2}$ substituent group is substituted, the $R^{104.2}$ substituent group is substituted with one or more third substituent groups denoted by $R^{104.3}$ as explained in the definitions section above in the description of "first substituent group(s)". In the above embodiments, $R^{104.1}$, $R^{104.2}$, and $R^{104.3}$ have values corresponding to the values of $R^{WW.1}$, $R^{WW.2}$, and $R^{WW.3}$, respectively, as explained in the definitions section above in the description of "first substituent group(s)", wherein $R^{WW.1}$, $R^{WW.2}$, and $R^{WW.3}$ correspond to $R^{104.1}$, $R^{104.2}$, and $R^{104.3}$, respectively.

In embodiments, when $L^{101}$ is substituted, $L^{101}$ is substituted with one or more first substituent groups denoted by $R^{L101.1}$ as explained in the definitions section above in the description of "first substituent group(s)". In embodiments, when an $R^{L101.1}$ substituent group is substituted, the $R^{L101.1}$ substituent group is substituted with one or more second substituent groups denoted by $R^{L101.2}$ as explained in the definitions section above in the description of "first substituent group(s)". In embodiments, when an $R^{L101.2}$ substituent group is substituted, the $R^{L101.2}$ substituent group is substituted with one or more third substituent groups denoted by $R^{L101.3}$ as explained in the definitions section above in the description of "first substituent group(s)". In the above embodiments, $L^{101}$, $R^{L1O1.1}$, $R^{L101.2}$, and $R^{L101.3}$ have values corresponding to the values of $L^{WW}$, $R^{LWW.1}$, $R^{LWW.2}$, and $R^{LWW.3}$, respectively, as explained in the definitions section above in the description of "first substituent group(s)", wherein $L^{WW}$, $R^{LWW.1}$, $R^{LWW.2}$, and $R^{LWW.3}$ are $L^{101}$, $R^{L101.1}$, $R^{L101.2}$, and $R^{L101.3}$, respectively.

In embodiments, when $L^{102}$ is substituted, $L^{102}$ is substituted with one or more first substituent groups denoted by $R^{L102.1}$ as explained in the definitions section above in the description of "first substituent group(s)". In embodiments, when an $R^{L102.1}$ substituent group is substituted, the $R^{L102.1}$ substituent group is substituted with one or more second substituent groups denoted by $R^{L102.2}$ as explained in the definitions section above in the description of "first substituent group(s)". In embodiments, when an $R^{L102.2}$ substituent group is substituted, the $R^{L102.2}$ substituent group is substituted with one or more third substituent groups denoted by $R^{L102.3}$ as explained in the definitions section above in the description of "first substituent group(s)". In the above embodiments, $L^{102}$, $R^{L102.1}$, $R^{L102.2}$, and $R^{L102.3}$ have values corresponding to the values of $L^{WW}$, $R^{LWW.1}$, $R^{LWW.2}$, and $R^{LWW.3}$, respectively, as explained in the definitions section above in the description of "first substituent group(s)", wherein $L^{WW}$, $R^{LWW.1}$, $R^{LWW.2}$, and $R^{LWW.3}$ are $L^{102}$, $R^{L102.1}$, $R^{L102.2}$, and $R^{L102.3}$, respectively.

In embodiments, when $L^{103}$ is substituted, $L^{103}$ is substituted with one or more first substituent groups denoted by $R^{L103.1}$ as explained in the definitions section above in the description of "first substituent group(s)". In embodiments, when an $R^{L103.1}$ substituent group is substituted, the $R^{L103.1}$ substituent group is substituted with one or more second substituent groups denoted by $R^{L103.2}$ as explained in the definitions section above in the description of "first substituent group(s)". In embodiments, when an $R^{L103.2}$ substituent group is substituted, the $R^{L103.2}$ substituent group is substituted with one or more third substituent groups denoted by $R^{L103.3}$ as explained in the definitions section above in the description of "first substituent group(s)". In the above embodiments, $L^{103}$, $R^{L103.1}$, $R^{L103.2}$, and $R^{L103.3}$ have values corresponding to the values of $L^{WW}$, $R^{LWW.1}$, $R^{LWW.2}$, and $R^{LWW.3}$, respectively, as explained in the definitions section above in the description of "first substituent group(s)", wherein $L^{WW}$, $R^{LWW.1}$, $R^{LWW.2}$, and $R^{LWW.3}$ are $L^{103}$, $R^{L103.1}$, $R^{L103.2}$, and $R^{L103.3}$ respectively.

In embodiments, the compound is a compound described herein (e.g., in an aspect, embodiment, example, table, figure, or claim).

III. Compositions

In an aspect is provided an oxidized polyethylene in a vessel including an oxidized polyethylene and one or more additional compounds selected from the groups consisting of: (i) a metal catalyst; (ii) an oxidizing agent; (iii) a reducing agent; and (iv) a polyethylene; wherein the metal catalyst is not a manganese porphyrin catalyst or an iron porphyrin catalyst.

The oxidized polyethylene and the hydroxylated polyethylene are as described herein, including in embodiments. The polyethylene includes a non-oxidized subunit, wherein the non-oxidized subunit is as described herein.

In embodiments, the polyethylene is a high-density polyethylene, a low-density polyethylene, or a linear low-density polyethylene. In embodiments, the polyethylene is a high-density polyethylene. In embodiments, the polyethylene is a low-density polyethylene. In embodiments, the polyethylene is a linear low-density polyethylene.

In embodiments, the polyethylene has a number average molecular weight from 150 Da to 20,000,000 Da. In embodiments, the polyethylene has a number average molecular weight from 150 Da to 15,000,000 Da. In embodiments, the polyethylene has a number average molecular weight from 150 Da to 10,000,000 Da. In embodiments, the polyethylene has a number average molecular weight from 150 Da to 5,000,000 Da. In embodiments, the polyethylene has a number average molecular weight from 150 Da to 2,000,000 Da. In embodiments, the polyethylene has a number average molecular weight from 150 Da to 1,000,000 Da. In embodiments, the polyethylene has a number average molecular weight from 150 Da to 500,000 Da. In embodiments, the polyethylene has a number average molecular weight from 150 Da to 200,000 Da. In embodiments, the polyethylene has a number average molecular weight from 150 Da to 100,000 Da. In embodiments, the polyethylene has a number average molecular weight from 150 Da to 50,000 Da. In embodiments, the polyethylene has a number average molecular weight from 150 Da to 20,000 Da. In embodiments, the polyethylene has a number average molecular weight from 150 Da to 10,000 Da. In embodiments, the polyethylene has a number average molecular weight from 150 Da to 5000 Da. In embodiments, the polyethylene has a number average molecular weight from 150 Da to 2000 Da. In embodiments, the polyethylene has a number average molecular weight from 150 Da to 1000 Da. In embodiments, the polyethylene has a number average molecular weight from 150 Da to 500 Da. In embodiments, the polyethylene has a number average molecular weight from 300 Da to 20,000,000 Da. In embodiments, the polyethylene has a number average molecular weight from 300 Da to 15,000,000 Da. In embodiments, the polyethylene has a number average molecular weight from 300 Da to 10,000,000 Da. In embodiments, the polyethylene has a number average molecular weight from 300 Da to 5,000,000 Da. In embodiments, the polyethylene has a number average molecular weight from 300 Da to 2,000,000 Da. In embodiments, the polyethylene has a number average molecular weight from 300 Da to 1,000,000 Da. In embodiments, the polyethylene has a number average molecular weight from 300 Da to 500,000 Da. In embodiments, the polyethylene has a number average molecular weight from 300 Da to 200,000 Da. In embodiments, the polyethylene has a number average molecular weight from 300 Da to 100,000 Da. In embodiments, the polyethylene has a number average molecular weight from 300 Da to 50,000 Da. In embodiments, the polyethylene has a number average molecular weight from 300 Da to 20,000 Da. In embodiments, the polyethylene has a number average molecular weight from 300 Da to 10,000 Da. In embodiments, the polyethylene has a number average molecular weight from 300 Da to 5000 Da. In embodiments, the polyethylene has a number average molecular weight from 300 Da to 2000 Da. In embodiments, the polyethylene has a number average molecular weight from 300 Da to 1000 Da. In embodiments, the polyethylene has a number average molecular weight from 300 Da to 500 Da. In embodiments, the polyethylene has a number average molecular weight from 450 Da to 20,000,000 Da. In embodiments, the polyethylene has a number average molecular weight from 450 Da to 15,000,000 Da. In embodiments, the polyethylene has a number average molecular weight from 450 Da to 10,000,000 Da. In embodiments, the polyethylene has a number average molecular weight from 450 Da to 5,000,000 Da. In embodiments, the polyethylene has a number average molecular weight from 450 Da to 2,000,000 Da. In embodiments, the polyethylene has a number average molecular weight from 450 Da to 1,000,000 Da. In embodiments, the polyethylene has a number average molecular weight from 450 Da to 500,000 Da. In embodiments, the polyethylene has a number average molecular weight from 450 Da to 200,000 Da. In embodiments, the polyethylene has a number average molecular weight from 450 Da to 100,000 Da. In embodiments, the polyethylene has a number average molecular weight from 450 Da to 50,000 Da. In embodiments, the polyethylene has a number average molecular weight from 450 Da to 20,000 Da. In embodiments, the polyethylene has a number average molecular weight from 450 Da to 10,000 Da. In embodiments, the polyethylene has a number average molecular weight from 450 Da to 5000 Da. In embodiments, the polyethylene has a number average molecular weight from 450 Da to 2000 Da. In embodiments, the polyethylene has a number average molecular weight from 450 Da to 1000 Da. In embodiments, the polyethylene has a number average molecular weight from 600 Da to 20,000,000 Da. In embodiments, the polyethylene has a number average molecular weight from 600 Da to 15,000,000 Da. In embodiments, the polyethylene has a number average molecular weight from 600 Da to 10,000,000 Da. In embodiments, the polyethylene has a number average molecular weight from 600 Da to 5,000,000 Da. In embodiments, the polyethylene has a number average molecular weight from 600 Da to 2,000,000 Da. In embodiments, the polyethylene has a number average molecular weight from 600 Da to 1,000,000 Da. In embodiments, the polyethylene has a number average molecular weight from 600 Da to 500,000 Da. In embodiments, the polyethylene has a number average molecular weight from 600 Da to 200,000 Da. In embodiments, the polyethylene has a number average molecular weight from 600 Da to 100,000 Da. In embodiments, the polyethylene has a number average molecular weight from 600 Da to 50,000 Da. In embodiments, the polyethylene has a number average molecular weight from 600 Da to 20,000 Da. In embodiments, the polyethylene has a number average molecular weight from 600 Da to 10,000 Da. In embodiments, the polyethylene has a number average molecular weight from 600 Da to 5000 Da. In embodiments, the polyethylene has a number average molecular weight from 600 Da to 2000 Da. In embodiments, the polyethylene has a number average molecular weight from 600 Da to 1000 Da.

In embodiments, the polyethylene has a number average molecular weight from about 150 Da to about 20,000,000 Da. In embodiments, the polyethylene has a number average molecular weight from about 150 Da to about 15,000,000 Da. In embodiments, the polyethylene has a number average molecular weight from about 150 Da to about 10,000,000 Da. In embodiments, the polyethylene has a number average molecular weight from about 150 Da to about 5,000,000 Da. In embodiments, the polyethylene has a number average molecular weight from about 150 Da to about 2,000,000 Da. In embodiments, the polyethylene has a number average molecular weight from about 150 Da to about 1,000,000 Da. In embodiments, the polyethylene has a number average molecular weight from about 150 Da to about 500,000 Da. In embodiments, the polyethylene has a number average molecular weight from about 150 Da to about 200,000 Da. In embodiments, the polyethylene has a number average molecular weight from about 150 Da to about 100,000 Da. In embodiments, the polyethylene has a number average molecular weight from about 150 Da to about 50,000 Da. In embodiments, the polyethylene has a number average molecular weight from about 150 Da to about 20,000 Da. In embodiments, the polyethylene has a number average molecular weight from about 150 Da to about 10,000 Da. In embodiments, the polyethylene has a number average molecular weight from about 150 Da to about 5000 Da. In embodiments, the polyethylene has a number average molecular weight from about 150 Da to about 2000 Da. In embodiments, the polyethylene has a number average molecular weight from about 150 Da to about 1000 Da. In embodiments, the polyethylene has a number average molecular weight from about 150 Da to about 500 Da. In embodiments, the polyethylene has a number average molecular weight from about 300 Da to about 20,000,000 Da. In embodiments, the polyethylene has a number average molecular weight from about 300 Da to about 15,000,000 Da. In embodiments, the polyethylene has a number average molecular weight from about 300 Da to about 10,000,000 Da. In embodiments, the polyethylene has a number average molecular weight from about 300 Da to about 5,000,000 Da. In embodiments, the polyethylene has a number average molecular weight from about 300 Da to about 2,000,000 Da. In embodiments, the polyethylene has a number average molecular weight from about 300 Da to about 1,000,000 Da. In embodiments, the polyethylene has a number average molecular weight from about 300 Da to about 500,000 Da. In embodiments, the polyethylene has a number average molecular weight from about 300 Da to about 200,000 Da. In embodiments, the polyethylene has a number average molecular weight from about 300 Da to about 100,000 Da. In embodiments, the polyethylene has a number average molecular weight from about 300 Da to about 50,000 Da. In embodiments, the polyethylene has a number average molecular weight from about 300 Da to about 20,000 Da. In embodiments, the polyethylene has a number average molecular weight from about 300 Da to about 10,000 Da. In embodiments, the polyethylene has a number average molecular weight from about 300 Da to about 5000 Da. In embodiments, the polyethylene has a number average molecular weight from about 300 Da to about 2000 Da. In embodiments, the polyethylene has a number average molecular weight from about 300 Da to about 1000 Da. In embodiments, the polyethylene has a number average molecular weight from about 300 Da to about 500 Da. In embodiments, the polyethylene has a number average molecular weight from about 450 Da to about 20,000,000 Da. In embodiments, the polyethylene has a number average molecular weight from about 450 Da to about 15,000,000 Da. In embodiments, the polyethylene has a number average molecular weight from about 450 Da to about 10,000,000 Da. In embodiments, the polyethylene has a number average molecular weight from about 450 Da to about 5,000,000 Da. In embodiments, the polyethylene has a number average molecular weight from about 450 Da to about 2,000,000 Da. In embodiments, the polyethylene has a number average molecular weight from about 450 Da to about 1,000,000 Da. In embodiments, the polyethylene has a number average molecular weight from about 450 Da to about 500,000 Da. In embodiments, the polyethylene has a number average molecular weight from about 450 Da to about 200,000 Da. In embodiments, the polyethylene has a number average molecular weight from about 450 Da to about 100,000 Da. In embodiments, the polyethylene has a number average molecular weight from about 450 Da to about 50,000 Da. In embodiments, the polyethylene has a number average molecular weight from about 450 Da to about 20,000 Da. In embodiments, the polyethylene has a number average molecular weight from about 450 Da to about 10,000 Da. In embodiments, the polyethylene has a number average molecular weight from about 450 Da to about 5000 Da. In embodiments, the polyethylene has a number average molecular weight from about 450 Da to about 2000 Da. In embodiments, the polyethylene has a number average molecular weight from about 450 Da to about 1000 Da. In embodiments, the polyethylene has a number average molecular weight from about 600 Da to about 20,000,000 Da. In embodiments, the polyethylene has a number average molecular weight from about 600 Da to about 15,000,000 Da. In embodiments, the polyethylene has a number average molecular weight from about 600 Da to about 10,000,000 Da. In embodiments, the polyethylene has a number average molecular weight from about 600 Da to about 5,000,000 Da. In embodiments, the polyethylene has a number average molecular weight from about 600 Da to about 2,000,000 Da. In embodiments, the polyethylene has a number average molecular weight from about 600 Da to about 1,000,000 Da. In embodiments, the polyethylene has a number average molecular weight from about 600 Da to about 500,000 Da. In embodiments, the polyethylene has a number average molecular weight from about 600 Da to about 200,000 Da. In embodiments, the polyethylene has a number average molecular weight from about 600 Da to about 100,000 Da. In embodiments, the polyethylene has a number average molecular weight from about 600 Da to about 50,000 Da. In embodiments, the polyethylene has a number average molecular weight from about 600 Da to about 20,000 Da. In embodiments, the polyethylene has a number average molecular weight from about 600 Da to about 10,000 Da. In embodiments, the polyethylene has a number average molecular weight from about 600 Da to about 5000 Da. In embodiments, the polyethylene has a number average molecular weight from about 600 Da to about 2000 Da. In embodiments, the polyethylene has a number average molecular weight from about 600 Da to about 1000 Da.

In embodiments, the polyethylene has from 5 to 600,000 number of total subunits. In embodiments, the polyethylene has from 5 to 400,000 number of total subunits. In embodiments, the polyethylene has from 5 to 200,000 number of total subunits. In embodiments, the polyethylene has from 5 to 100,000 number of total subunits. In embodiments, the polyethylene has from 5 to 50,000 number of total subunits. In embodiments, the polyethylene has from 5 to 20,000 number of total subunits. In embodiments, the polyethylene has from 5 to 10,000 number of total subunits. In embodiments, the polyethylene has from 5 to 5000 number of total subunits. In embodiments, the polyethylene has from 5 to 2000 number of total subunits. In embodiments, the polyethylene has from 5 to 1000 number of total subunits. In embodiments, the polyethylene has from 5 to 500 number of total subunits. In embodiments, the polyethylene has from 5 to 200 number of total subunits. In embodiments, the polyethylene has from 5 to 100 number of total subunits. In embodiments, the polyethylene has from 5 to 50 number of total subunits. In embodiments, the polyethylene has from 5 to 20 number of total subunits. In embodiments, the polyethylene has from 10 to 600,000 number of total subunits. In embodiments, the polyethylene has from 10 to 400,000 number of total subunits. In embodiments, the polyethylene has from 10 to 200,000 number of total subunits. In embodiments, the polyethylene has from 10 to 100,000 number of total subunits. In embodiments, the polyethylene has from 10 to 50,000 number of total subunits. In embodiments, the polyethylene has from 10 to 20,000 number of total subunits. In embodiments, the polyethylene has from 10 to 10,000 number of total subunits. In embodiments, the polyethylene has from 10 to 5000 number of total subunits. In embodiments, the polyethylene has from 10 to 2000 number of total subunits. In embodiments, the polyethylene has from 10 to 1000 number of total subunits. In embodiments, the polyethylene has from 10 to 500 number of total subunits. In embodiments, the polyethylene has from 10 to 200 number of total subunits. In embodiments, the polyethylene has from 10 to 100 number of total subunits. In embodiments, the polyethylene has from 10 to 50 number of total subunits. In embodiments, the polyethylene has from 10 to 20 number of total subunits. In embodiments, the polyethylene has from 15 to 600,000 number of total subunits. In embodiments, the polyethylene has from 15 to 400,000 number of total subunits. In embodiments, the polyethylene has from 15 to 200,000 number of total subunits. In embodiments, the polyethylene has from 15 to 100,000 number of total subunits. In embodiments, the polyethylene has from 15 to 50,000 number of total subunits. In embodiments, the polyethylene has from 15 to 20,000 number of total subunits. In embodiments, the polyethylene has from 15 to 10,000 number of total subunits. In embodiments, the polyethylene has from 15 to 5000 number of total subunits. In embodiments, the polyethylene has from 15 to 2000 number of total subunits. In embodiments, the polyethylene has from 15 to 1000 number of total subunits. In embodiments, the polyethylene has from 15 to 500 number of total subunits. In embodiments, the polyethylene has from 15 to 200 number of total subunits. In embodiments, the polyethylene has from 15 to 100 number of total subunits. In embodiments, the polyethylene has from 15 to 50 number of total subunits. In embodiments, the polyethylene has from 15 to 20 number of total subunits. In embodiments, the polyethylene has from 20 to 600,000 number of total subunits. In embodiments, the polyethylene has from 20 to 400,000 number of total subunits. In embodiments, the polyethylene has from 20 to 200,000 number of total subunits. In embodiments, the polyethylene has from 20 to 100,000 number of total subunits. In embodiments, the polyethylene has from 20 to 50,000 number of total subunits. In embodiments, the polyethylene has from 20 to 20,000 number of total subunits. In embodiments, the polyethylene has from 20 to 10,000 number of total subunits. In embodiments, the polyethylene has from 20 to 5000 number of total subunits. In embodiments, the polyethylene has from 20 to 2000 number of total subunits. In embodiments, the polyethylene has from 20 to 1000 number of total subunits. In embodiments, the polyethylene has from 20 to 500 number of total subunits. In embodiments, the polyethylene has from 20 to 200 number of total subunits. In embodiments, the polyethylene has from 20 to 100 number of total subunits. In embodiments, the polyethylene has from 20 to 50 number of total subunits.

In embodiments, the polyethylene has from about 5 to about 600,000 number of total subunits. In embodiments, the polyethylene has from about 5 to about 400,000 number of total subunits. In embodiments, the polyethylene has from about 5 to about 200,000 number of total subunits. In embodiments, the polyethylene has from about 5 to about 100,000 number of total subunits. In embodiments, the polyethylene has from about 5 to about 50,000 number of total subunits. In embodiments, the polyethylene has from about 5 to about 20,000 number of total subunits. In embodiments, the polyethylene has from about 5 to about 10,000 number of total subunits. In embodiments, the polyethylene has from about 5 to about 5000 number of total subunits. In embodiments, the polyethylene has from about 5 to about 2000 number of total subunits. In embodiments, the polyethylene has from about 5 to about 1000 number of total subunits. In embodiments, the polyethylene has from about 5 to about 500 number of total subunits. In embodiments, the polyethylene has from about 5 to about 200 number of total subunits. In embodiments, the polyethylene has from about 5 to about 100 number of total subunits. In embodiments, the polyethylene has from about 5 to about 50 number of total subunits. In embodiments, the polyethylene has from about 5 to about 20 number of total subunits. In embodiments, the polyethylene has from about 10 to about 600,000 number of total subunits. In embodiments, the polyethylene has from about 10 to about 400,000 number of total subunits. In embodiments, the polyethylene has from about 10 to about 200,000 number of total subunits. In embodiments, the polyethylene has from about 10 to about 100,000 number of total subunits. In embodiments, the polyethylene has from about 10 to about 50,000 number of total subunits. In embodiments, the polyethylene has from about 10 to about 20,000 number of total subunits. In embodiments, the polyethylene has from about 10 to about 10,000 number of total subunits. In embodiments, the polyethylene has from about 10 to about 5000 number of total subunits. In embodiments, the polyethylene has from about 10 to about 2000 number of total subunits. In embodiments, the polyethylene has from about 10 to about 1000 number of total subunits. In embodiments, the polyethylene has from about 10 to about 500 number of total subunits. In embodiments, the polyethylene has from about 10 to about 200 number of total subunits. In embodiments, the polyethylene has from about 10 to about 100 number of total subunits. In embodiments, the polyethylene has from about 10 to about 50 number of total subunits. In embodiments, the polyethylene has from about 10 to about 20 number of total subunits. In embodiments, the polyethylene has from about 15 to about 600,000 number of total subunits. In embodiments, the polyethylene has from about 15 to about 400,000 number of total subunits. In embodiments, the polyethylene has from about 15 to about 200,000 number of total subunits. In embodiments, the polyethylene has from about 15 to about 100,000 number of total subunits. In embodiments, the polyethylene has from about 15 to about 50,000 number of total subunits. In embodiments, the polyethylene has from about 15 to about 20,000 number of total subunits. In embodiments, the polyethylene has from about 15 to about 10,000 number of total subunits. In embodiments, the polyethylene has from about 15 to about 5000 number of total subunits. In embodiments, the polyethylene has from about 15 to about 2000 number of total subunits. In embodiments, the polyethylene has from about 15 to about 1000 number of total subunits. In embodiments, the polyethylene has from about 15 to about 500 number of total subunits. In embodiments, the polyethylene has from about 15 to about 200 number of total subunits. In embodiments, the polyethylene has from about 15 to about 100 number of total subunits. In embodiments, the polyethylene has from about 15 to about 50 number of total subunits. In embodiments, the polyethylene has from about 15 to about 20 number of total subunits. In embodiments, the polyethylene has from about 20 to about 600,000 number of total subunits. In embodiments, the polyethylene has from about 20 to about 400,000 number of total subunits. In embodiments, the polyethylene has from about 20 to about 200,000 number of total subunits. In embodiments, the polyethylene has from about 20 to about 100,000 number of total subunits. In embodiments, the polyethylene has from about 20 to about 50,000 number of total subunits. In embodiments, the polyethylene has from about 20 to about 20,000 number of total subunits. In embodiments, the polyethylene has from about 20 to about 10,000 number of total subunits. In embodiments, the polyethylene has from about 20 to about 5000 number of total subunits. In embodiments, the polyethylene has from about 20 to about 2000 number of total subunits. In embodiments, the polyethylene has from about 20 to about 1000 number of total subunits. In embodiments, the polyethylene has from about 20 to about 500 number of total subunits. In embodiments, the polyethylene has from about 20 to about 200 number of total subunits. In embodiments, the polyethylene has from about 20 to about 100 number of total subunits. In embodiments, the polyethylene has from about 20 to about 50 number of total subunits.

In embodiments, the metal catalyst is a ruthenium catalyst, an iron catalyst, or a nickel catalyst. In embodiments, the metal catalyst is a ruthenium catalyst. In embodiments, the metal catalyst is a ruthenium porphyrin catalyst. In embodiments, the metal catalyst is an iron catalyst. In embodiments, the metal catalyst is a nickel catalyst.

In embodiments, the metal catalyst is

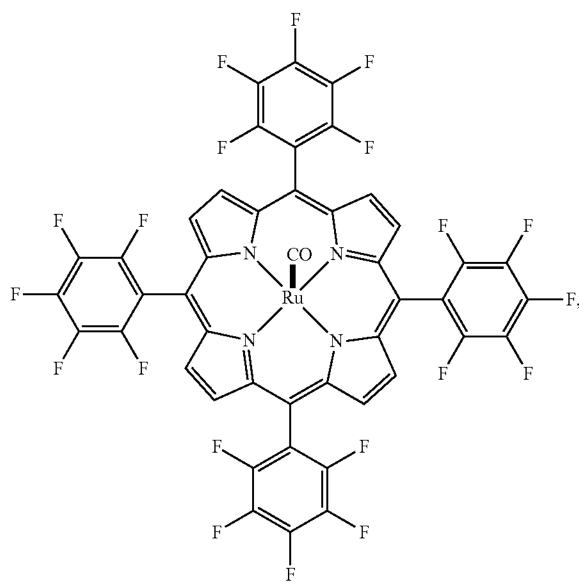

,

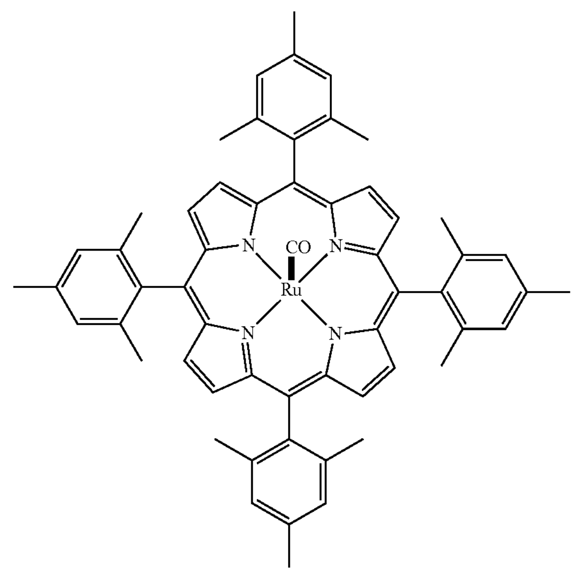

,

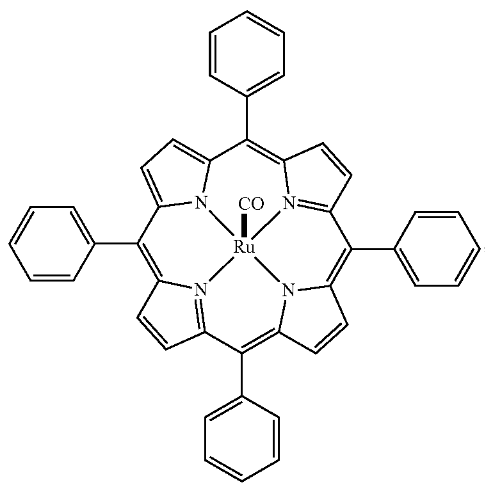
,
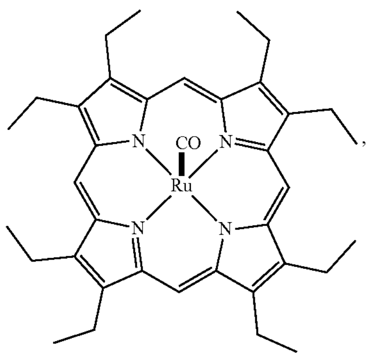
,
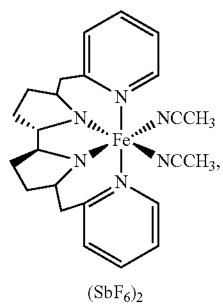
,
$(SbF_6)_2$
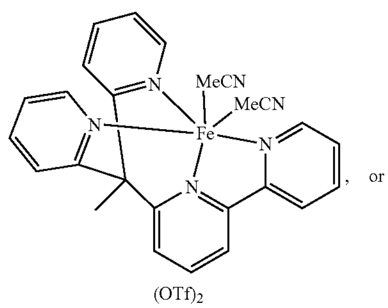
, or
$(OTf)_2$
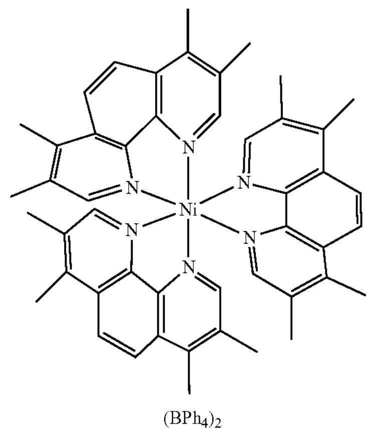
.
$(BPh_4)_2$
In embodiments, the metal catalyst is
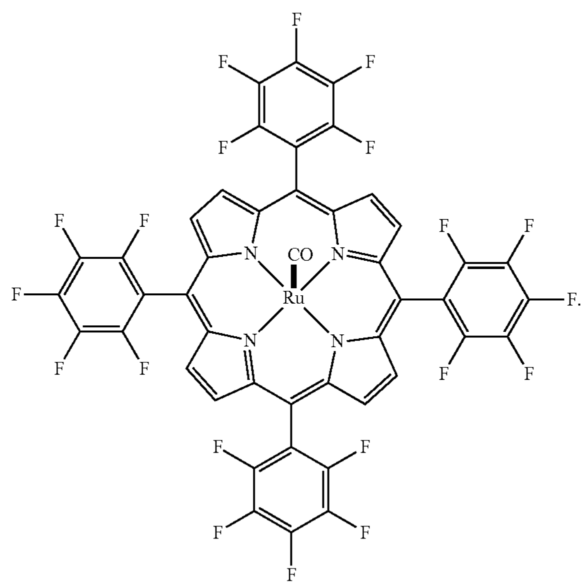
.

In embodiments, the metal catalyst is

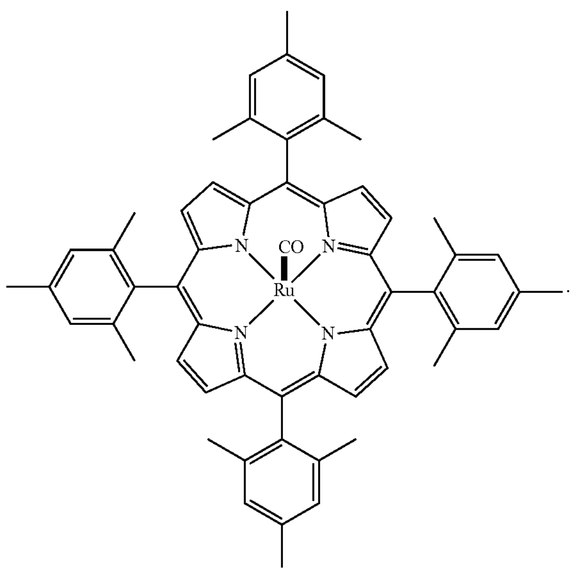

In embodiments, the metal catalyst is

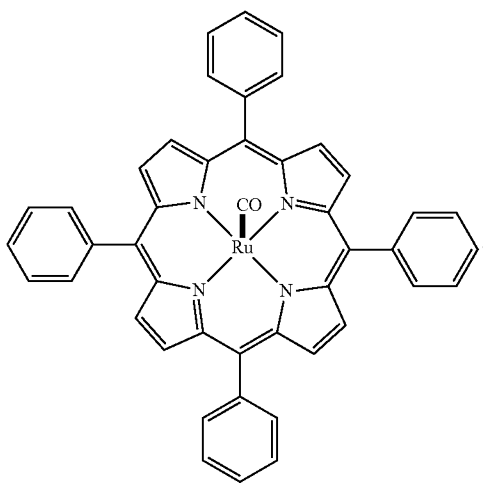

In embodiments, the metal catalyst is

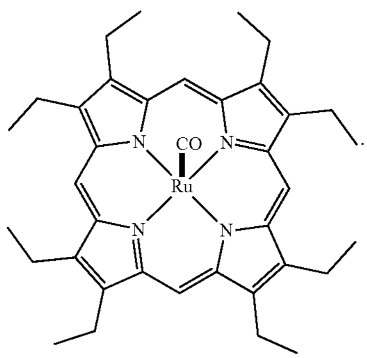

In embodiments, the metal catalyst is

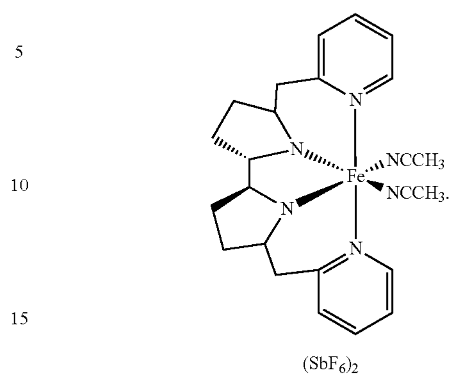

$(SbF_6)_2$

In embodiments, the metal catalyst

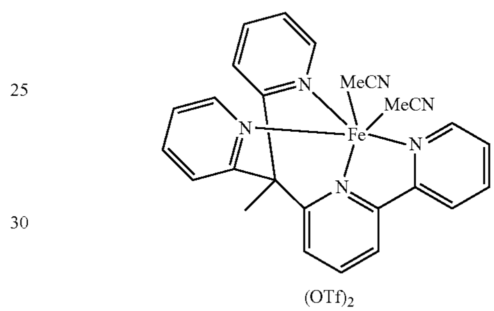

$(OTf)_2$

In embodiments, the metal catalyst is

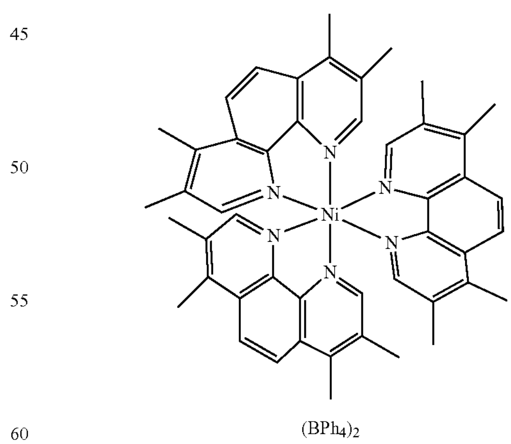

$(BPh_4)_2$

In embodiments, the metal catalyst is not a manganese porphyrin catalyst or an iron porphyrin catalyst. In embodiments, the metal catalyst is not a manganese porphyrin catalyst. In embodiments, the metal catalyst is not an iron porphyrin catalyst. In embodiments, the metal catalyst is not

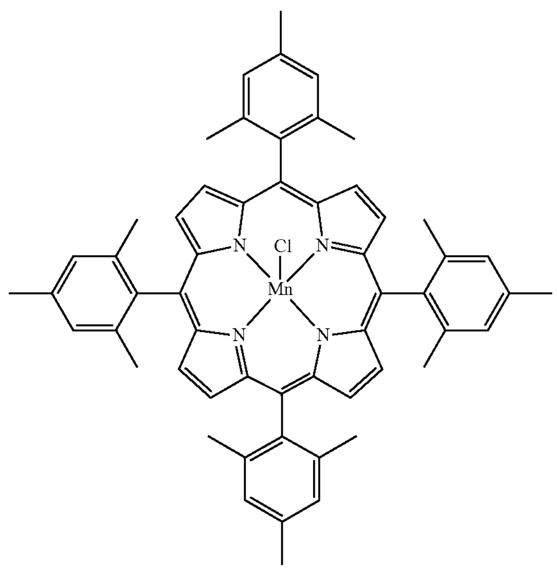

In embodiments, the metal catalyst is not

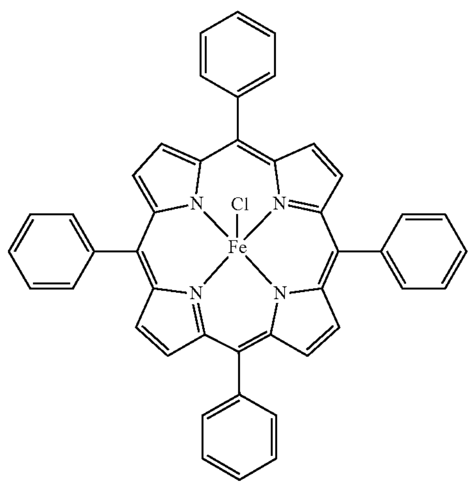

In an aspect is provided an oxidized polyethylene in a vessel including an oxidized polyethylene and one or more additional compounds selected from the groups consisting of: (i) a metal catalyst; (ii) an oxidizing agent; (iii) a reducing agent; and (iv) a polyethylene; wherein the metal catalyst is not a manganese porphyrin catalyst or an iron porphyrin catalyst.

The oxidized polyethylene and the hydroxylated polyethylene are as described herein, including in embodiments. The polyethylene includes a non-oxidized subunit, wherein the non-oxidized subunit is as described herein.

In embodiments, a sum of a chloride subunit of formula

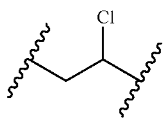

and an ester subunit of formula

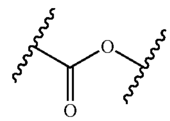

of the oxidized polyethylene is less than about 10% of a sum of the first oxidized subunit and the second oxidized subunit of the oxidized polyethylene. In embodiments, a sum of a chloride subunit of formula

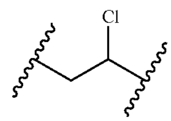

and an ester subunit of formula

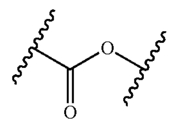

of the oxidized polyethylene is less than about 9% of a sum of the first oxidized subunit and the second oxidized subunit of the oxidized polyethylene. In embodiments, a sum of a chloride subunit of formula

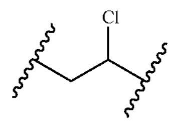

and an ester subunit of formula

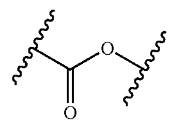

of the oxidized polyethylene is less than about 8% of a sum of the first oxidized subunit and the second oxidized subunit of the oxidized polyethylene. In embodiments, a sum of a chloride subunit of formula

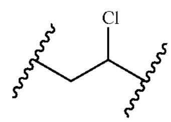

and an ester subunit of formula

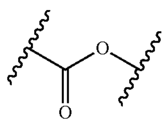

of the oxidized polyethylene is less than about 7% of a sum of the first oxidized subunit and the second oxidized subunit of the oxidized polyethylene. In embodiments, a sum of a chloride subunit of formula

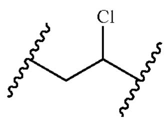

and an ester subunit of formula

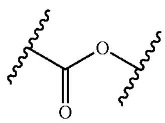

of the oxidized polyethylene is less than about 6% of a sum of the first oxidized subunit and the second oxidized subunit of the oxidized polyethylene. In embodiments, a sum of a chloride subunit of formula

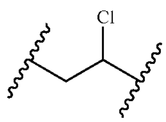

and an ester subunit of formula

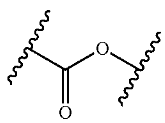

of the oxidized polyethylene is less than about 5% of a sum of the first oxidized subunit and the second oxidized subunit of the oxidized polyethylene. In embodiments, a sum of a chloride subunit of formula

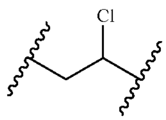

and an ester subunit of formula

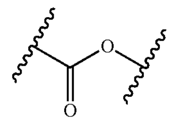

of the oxidized polyethylene is less than about 4% of a sum of the first oxidized subunit and the second oxidized subunit of the oxidized polyethylene. In embodiments, a sum of a chloride subunit of formula

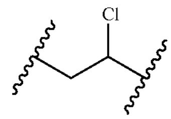

and an ester subunit of formula

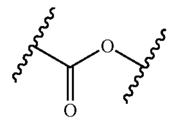

of the oxidized polyethylene is less than about 3% of a sum of the first oxidized subunit and the second oxidized subunit of the oxidized polyethylene. In embodiments, a sum of a chloride subunit of formula

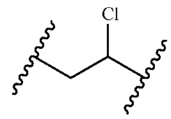

and an ester subunit of formula

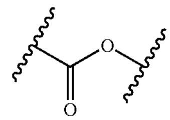

of the oxidized polyethylene is less than about 2% of a sum of the first oxidized subunit and the second oxidized subunit of the oxidized polyethylene. In embodiments, a sum of a chloride subunit of formula

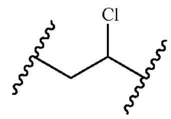

and an ester subunit of formula

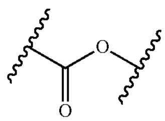

of the oxidized polyethylene is less than about 1% of a sum of the first oxidized subunit and the second oxidized subunit of the oxidized polyethylene.

In embodiments, the metal catalyst is a ruthenium catalyst, or an iron catalyst. In embodiments, the metal catalyst is a ruthenium catalyst. In embodiments, the metal catalyst is an iron catalyst. In embodiments, the metal catalyst is not a nickel catalyst.

In embodiments, the metal catalyst is selected from:

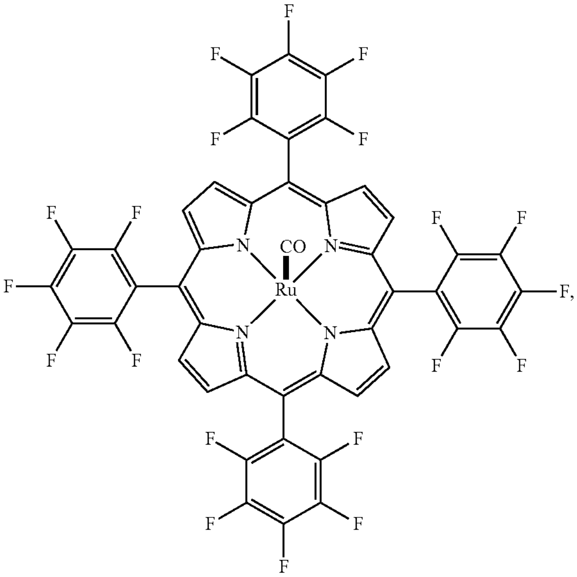

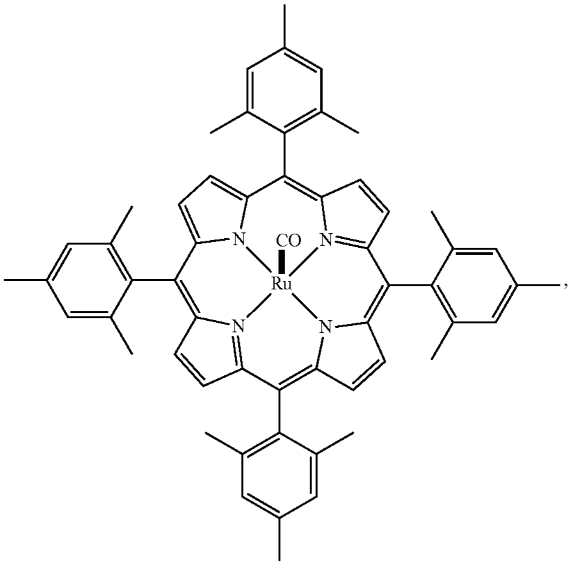

-continued

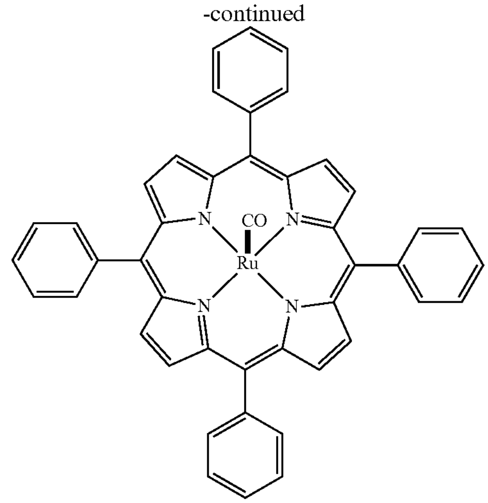

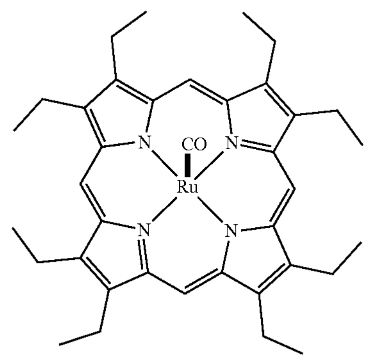

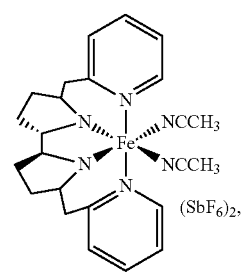

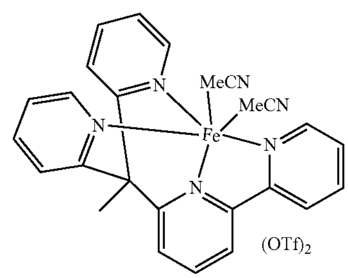

In embodiments, the metal catalyst is
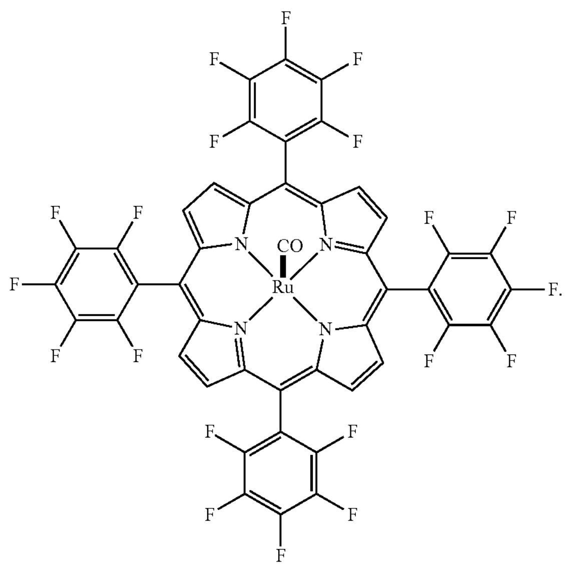
In embodiments, the metal catalyst is
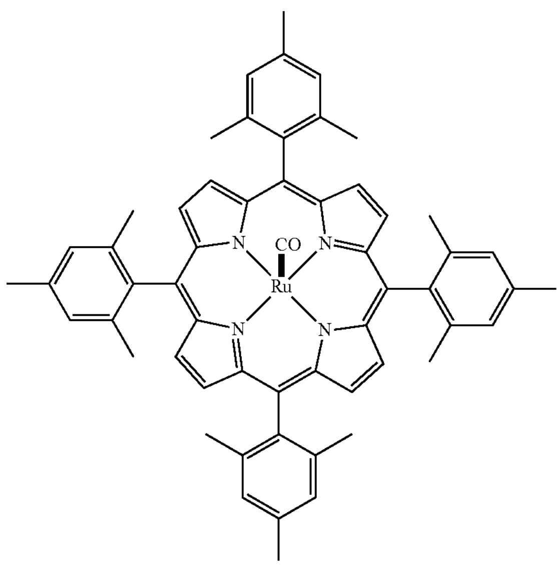
In embodiments, the metal catalyst is
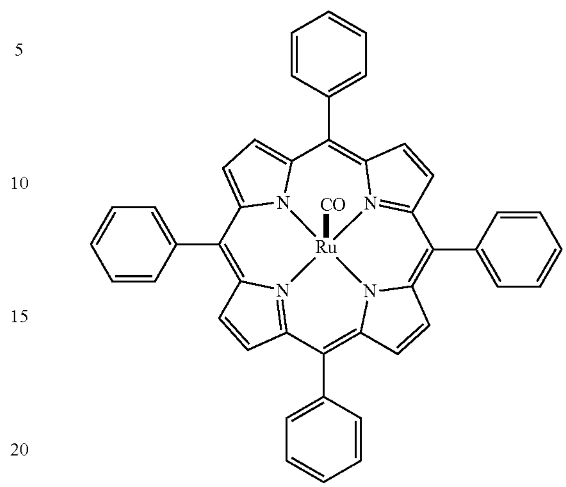
In embodiments, the metal catalyst is
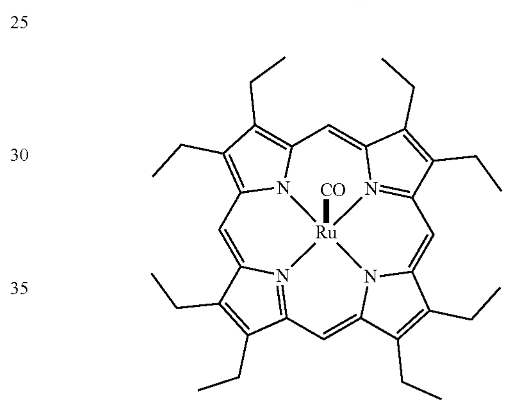
In embodiments, the metal catalyst is
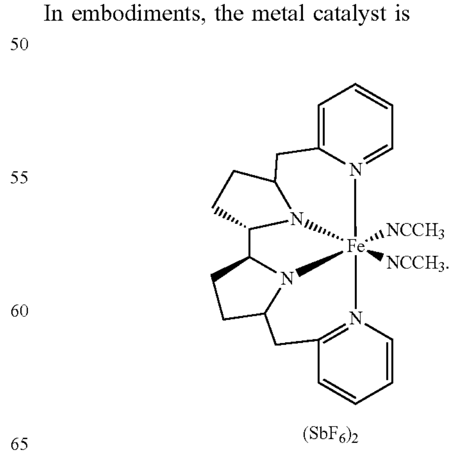

In embodiments, the metal catalyst is

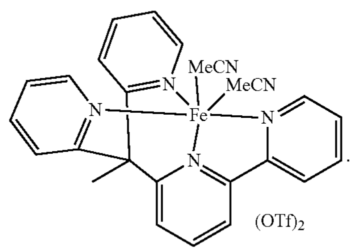

In embodiments, the metal catalyst is not

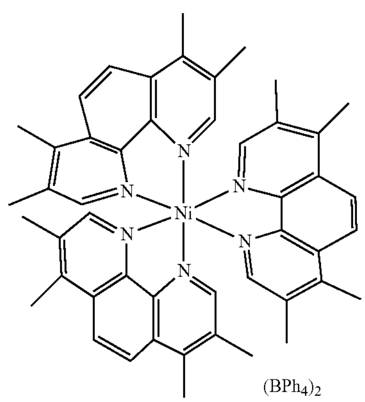

In embodiments, the metal catalyst is not a manganese porphyrin catalyst or an iron porphyrin catalyst. In embodiments, the metal catalyst is not a manganese porphyrin catalyst. In embodiments, the metal catalyst is not an iron porphyrin catalyst.

In embodiments, the metal catalyst is not

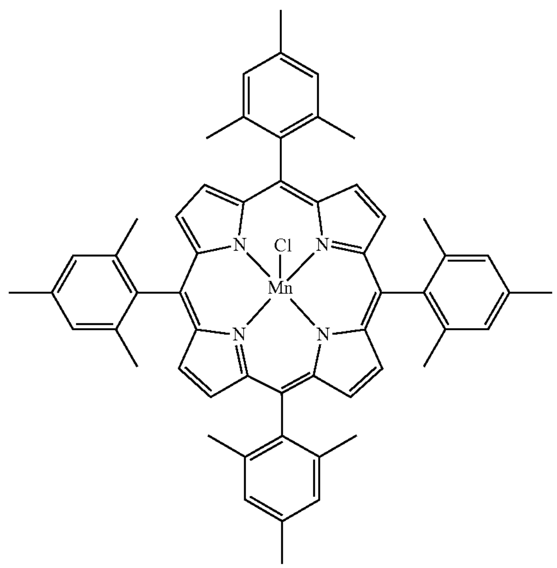

embodiments, the metal catalyst is not

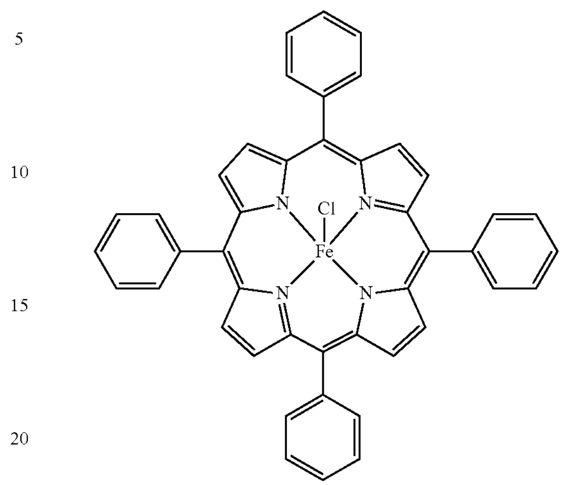

In embodiments, the oxidizing agent is a peroxide or a substituted pyridine N-oxide.

In embodiments, the oxidizing agent is

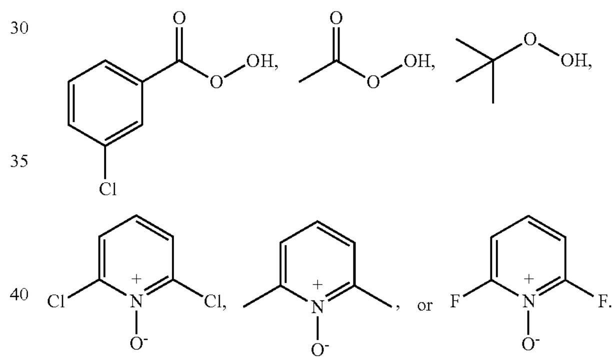

embodiments, the oxidizing agent is

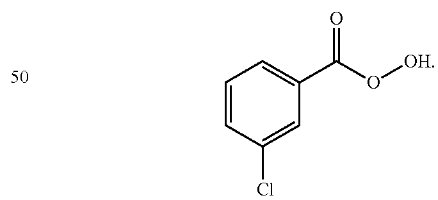

In embodiments, the oxidizing agent is

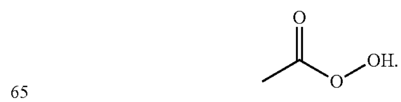

In embodiments, the oxidizing agent is

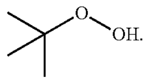

In embodiments, the oxidizing agent is

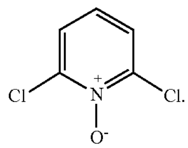

In embodiments, the oxidizing agent is

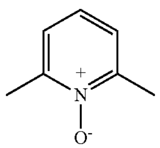

In embodiments, the oxidizing agent is

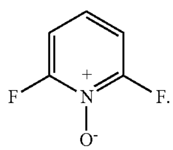

In embodiments, the reducing agent is an aluminum hydride or a boron hydride. In embodiments, the reducing agent is an aluminum hydride. In embodiments, the reducing agent is a boron hydride.

In embodiments, the reducing agent is lithium aluminum hydride, sodium bis(2-methoxyethoxy)aluminum hydride, or lithium triethylborohydride. In embodiments, the reducing agent is lithium aluminum hydride. In embodiments, the reducing agent is sodium bis(2-methoxyethoxy)aluminum hydride. In embodiments, the reducing agent is lithium triethylborohydride.

In an aspect is provided a mixture of polymers including an oxidized polyethylene and a second polymer. The oxidized polyethylene is as described herein, including in embodiments.

In an aspect is provided a cross-linked polymer and a second polymer. The cross-linked polymer is as described herein, including in embodiments.

In embodiments, the second polymer is a high-density polyethylene, a low-density polyethylene, or a linear low-density polyethylene. In embodiments, the second polymer is a high-density polyethylene. In embodiments, the second polymer is a low-density polyethylene. In embodiments, the second polymer is a linear low-density polyethylene.

IV. Methods of Making

In an aspect is provided a method of making an oxidized polyethylene, including mixing a polyethylene, a metal catalyst, and an oxidizing agent. The oxidized polyethylene, polyethylene, metal catalyst, and oxidizing agent are as described herein, including in embodiments. The metal catalyst is not a manganese porphyrin catalyst or an iron porphyrin catalyst.

In embodiments, the method of making an oxidized polyethylene includes mixing a polyethylene, a metal catalyst, and an oxidizing agent. In embodiments, the polyethylene comprises a non-oxidized subunit. In embodiments, the oxidized polyethylene includes a first oxidized subunit, a second oxidized subunit, and a non-oxidized subunit as described herein.

In embodiments, the ratio of the first and second oxidized subunits to the non-oxidized subunit in the oxidized polyethylene is from 1:10,000 to 1:5.

In embodiments, the oxidized polyethylene has a number average molecular weight from 150 Da to 20,000,000 Da.

In embodiments, the metal catalyst is not a manganese porphyrin catalyst or an iron porphyrin catalyst. In embodiments, the metal catalyst is not a manganese porphyrin catalyst. In embodiments, the metal catalyst is not an iron porphyrin catalyst. In embodiments, the metal catalyst is not

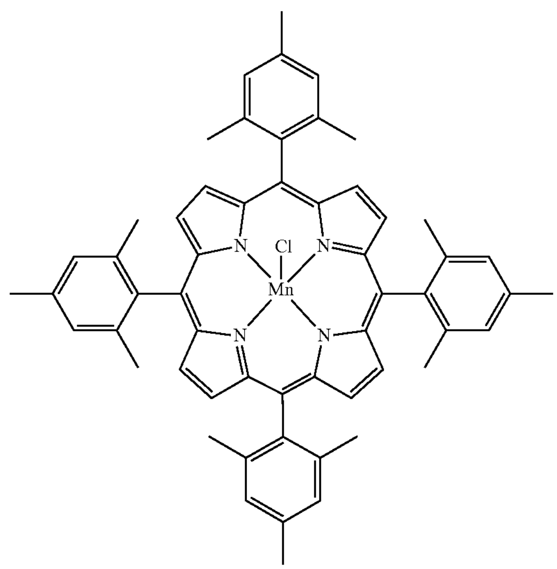

In embodiments, the metal catalyst is not

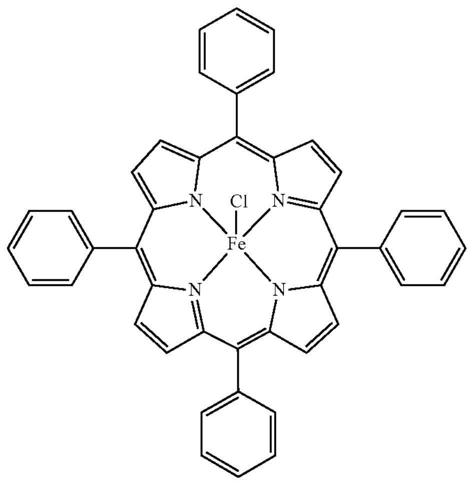

In embodiments, ratio of the first and second oxidized subunits to the non-oxidized subunit in the oxidized polyethylene is from 1:1000 to 1:10.

In embodiments, the ratio of the first oxidized subunit to the second oxidized subunit in the oxidized polyethylene is about 1:1.

In embodiments, the oxidized polyethylene has a number average molecular weight from 300 Da to 2,000,000 Da.

In embodiments, the polyethylene is a high-density polyethylene, a low-density polyethylene, or a linear low-density polyethylene.

In embodiments, the metal catalyst is a ruthenium catalyst, an iron catalyst, or a nickel catalyst. In embodiments, the metal catalyst is a ruthenium catalyst, an iron catalyst, or a nickel catalyst. In embodiments, the metal catalyst is selected from:

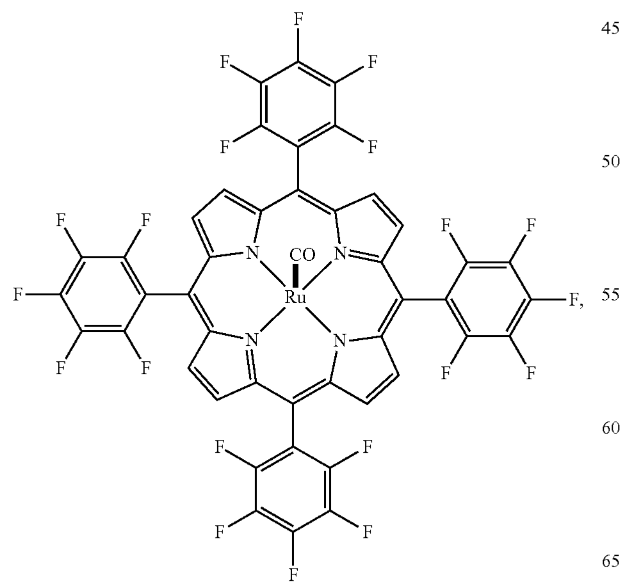

-continued

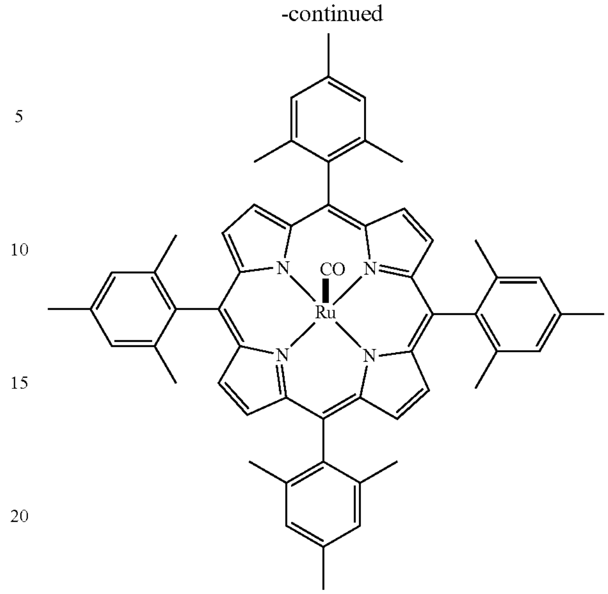

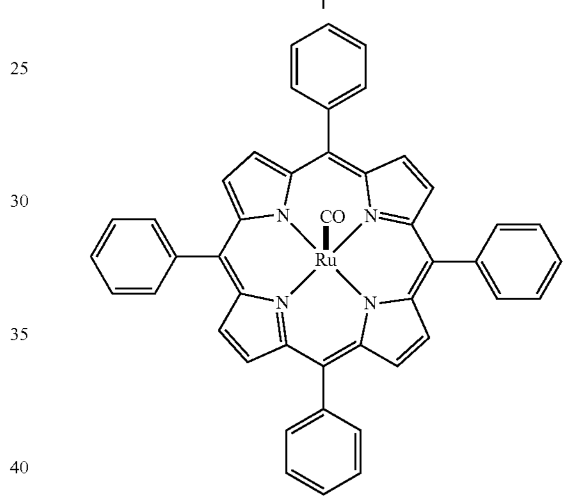

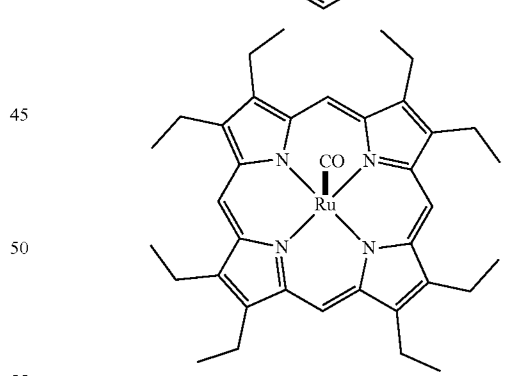

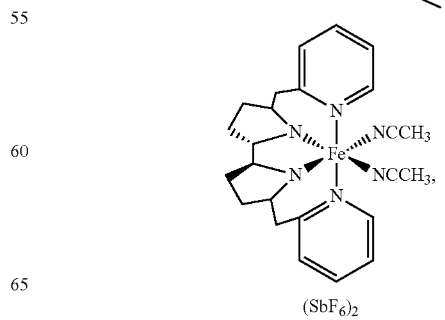

-continued
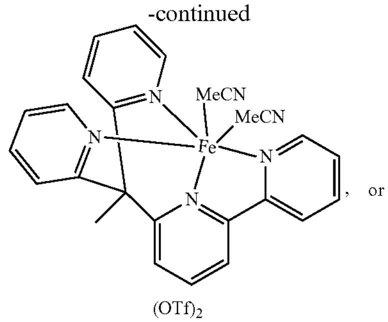
, or
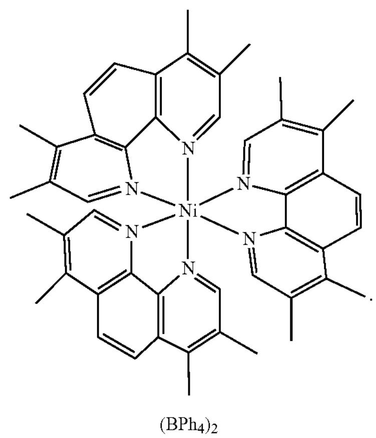
.
In embodiments, the metal catalyst is
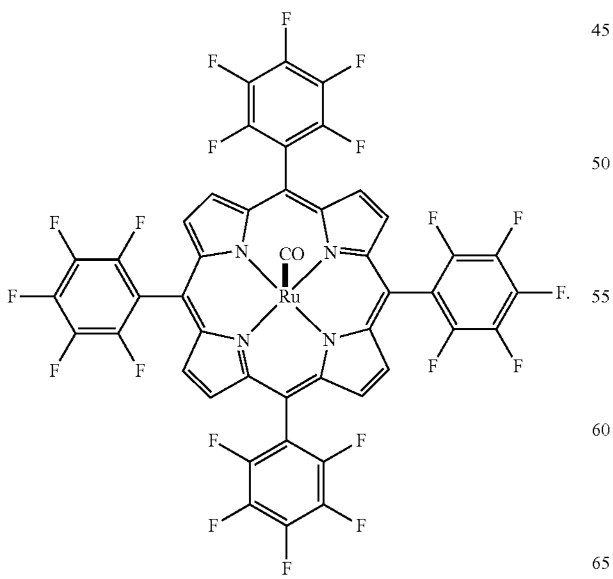
In embodiments, the metal catalyst is
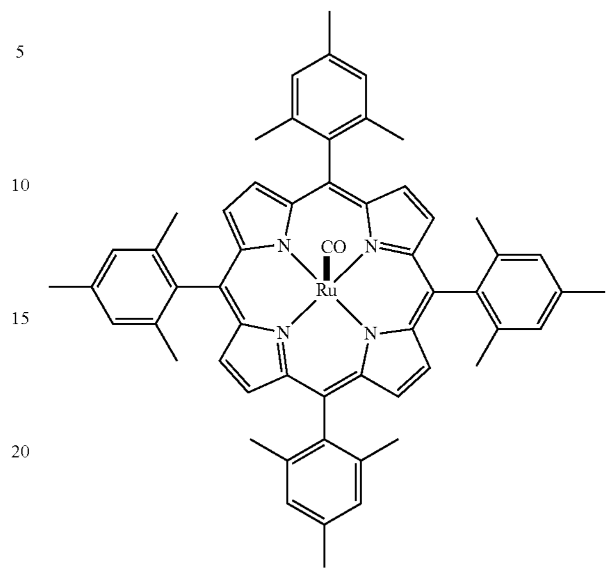
.
In embodiments, the metal catalyst is
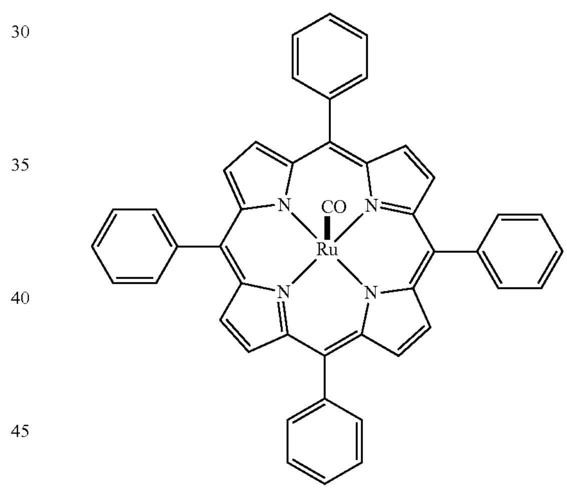
.
In embodiments, the metal catalyst is
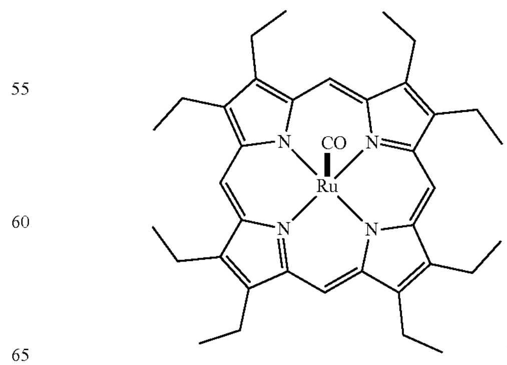
.

In embodiments, the metal catalyst is

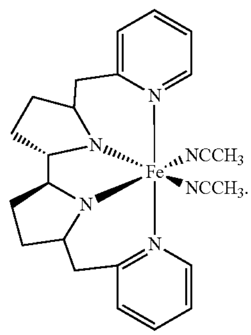

In embodiments, the metal catalyst is

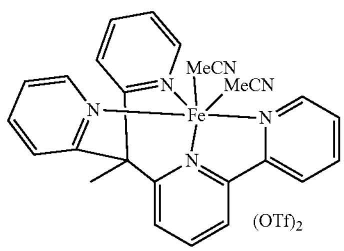

In embodiments, the metal catalyst is

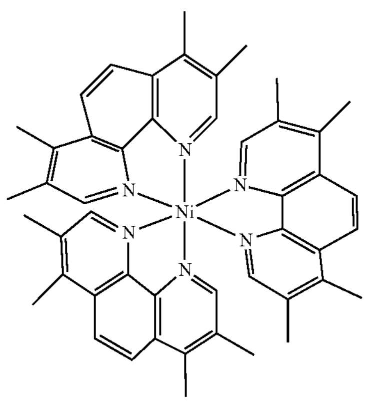

In an aspect is provided a method of making an oxidized polyethylene, including mixing a polyethylene, a metal catalyst, and an oxidizing agent. The oxidized polyethylene, polyethylene, metal catalyst, and oxidizing agent are as described herein, including in embodiments. The metal catalyst is not a manganese porphyrin catalyst or an iron porphyrin catalyst.

In embodiments, the method of making an oxidized polyethylene includes mixing a polyethylene, a metal catalyst, and an oxidizing agent. In embodiments, the polyethylene comprises a non-oxidized subunit. In embodiments, the oxidized polyethylene includes a first oxidized subunit, a second oxidized subunit, and a non-oxidized subunit as described herein.

In embodiments, the ratio of the first and second oxidized subunits to the non-oxidized subunit in the oxidized polyethylene is from 1:10,000 to 1:5.

In embodiments, the oxidized polyethylene has a number average molecular weight from 150 Da to 20,000,000 Da.

In embodiments, the metal catalyst is not a manganese porphyrin catalyst or an iron porphyrin catalyst. In embodiments, the metal catalyst is not a manganese porphyrin catalyst. In embodiments, the metal catalyst is not an iron porphyrin catalyst. In embodiments, the metal catalyst is not

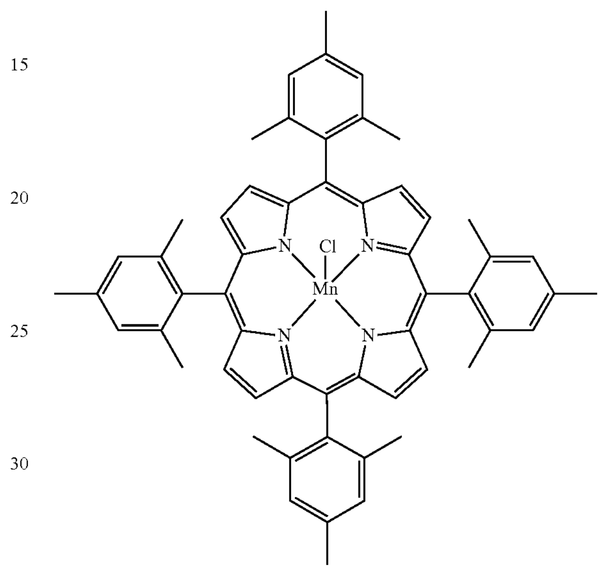

In embodiments, the metal catalyst is not

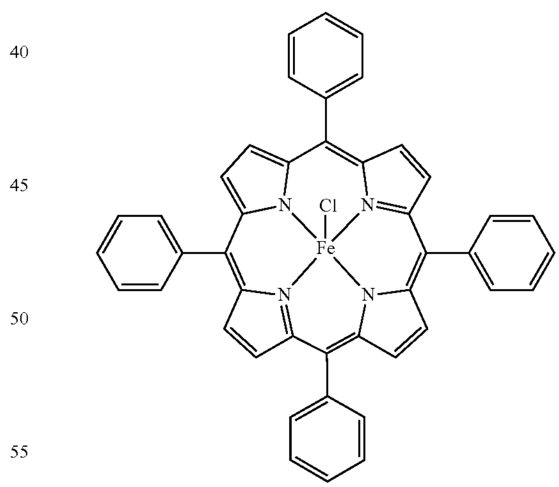

In embodiments, a sum of a chloride subunit of formula

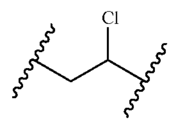

and an ester subunit of formula

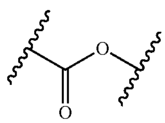

of the oxidized polyethylene is less than about 10% of a sum of the first oxidized subunit and the second oxidized subunit of the oxidized polyethylene. In embodiments, a sum of a chloride subunit of formula

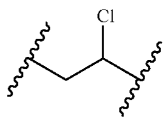

and an ester subunit of formula

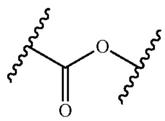

of the oxidized polyethylene is less than about 9% of a sum of the first oxidized subunit and the second oxidized subunit of the oxidized polyethylene. In embodiments, a sum of a chloride subunit of formula

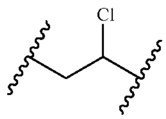

and an ester subunit of formula

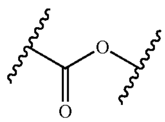

of the oxidized polyethylene is less than about 8% of a sum of the first oxidized subunit and the second oxidized subunit of the oxidized polyethylene. In embodiments, a sum of a chloride subunit of formula

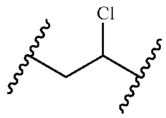

and an ester subunit of formula

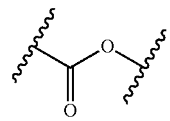

of the oxidized polyethylene is less than about 7% of a sum of the first oxidized subunit and the second oxidized subunit of the oxidized polyethylene. In embodiments, a sum of a chloride subunit of formula

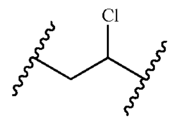

and an ester subunit of formula

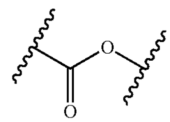

of the oxidized polyethylene is less than about 6% of a sum of the first oxidized subunit and the second oxidized subunit of the oxidized polyethylene. In embodiments, a sum of a chloride subunit of formula

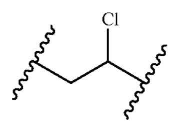

and an ester subunit of formula

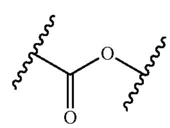

of the oxidized polyethylene is less than about 5% of a sum of the first oxidized subunit and the second oxidized subunit of the oxidized polyethylene. In embodiments, a sum of a chloride subunit of formula

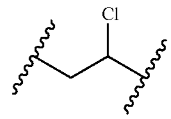

and an ester subunit of formula

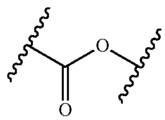

of the oxidized polyethylene is less than about 4% of a sum of the first oxidized subunit and the second oxidized subunit of the oxidized polyethylene. In embodiments, a sum of a chloride subunit of formula

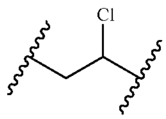

and an ester subunit of formula

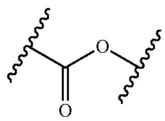

of the oxidized polyethylene is less than about 3% of a sum of the first oxidized subunit and the second oxidized subunit of the oxidized polyethylene. In embodiments, a sum of a chloride subunit of formula

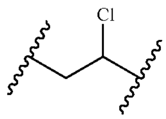

and an ester subunit of formula

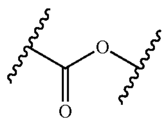

of the oxidized polyethylene is less than about 2% of a sum of the first oxidized subunit and the second oxidized subunit of the oxidized polyethylene. In embodiments, a sum of a chloride subunit of formula

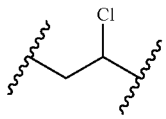

and an ester subunit of formula

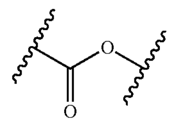

of the oxidized polyethylene is less than about 1% of a sum of the first oxidized subunit and the second oxidized subunit of the oxidized polyethylene.

In embodiments, the ratio of the first and second oxidized subunits to the non-oxidized subunit in the oxidized polyethylene is from 1:1000 to 1:10.

In embodiments, the ratio of the first oxidized subunit to the second oxidized subunit in the oxidized polyethylene is about 1:1.

In embodiments, the oxidized polyethylene has a number average molecular weight from 300 Da to 2,000,000 Da.

In embodiments, the polyethylene is a high-density polyethylene, a low-density polyethylene, or a linear low-density polyethylene.

In embodiments, the metal catalyst is a ruthenium catalyst, or an iron catalyst. In embodiments, the metal catalyst is a ruthenium catalyst. In embodiments, the metal catalyst is an iron catalyst. In embodiments, the metal catalyst is not a nickel catalyst.

In embodiments, the metal catalyst is selected from:

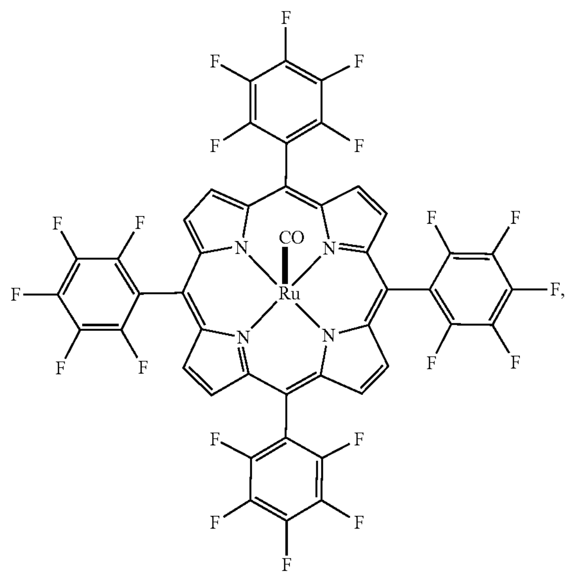

-continued
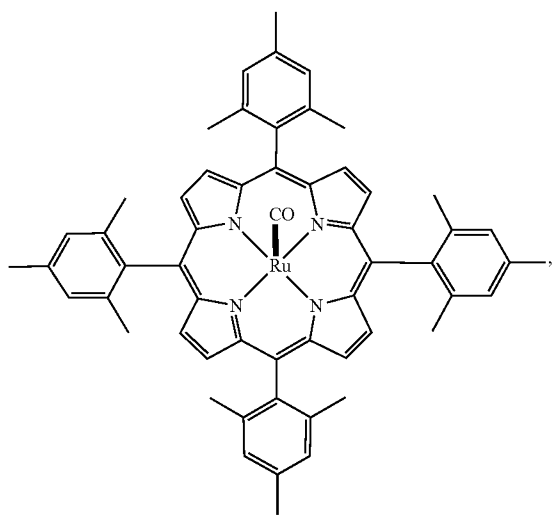
,
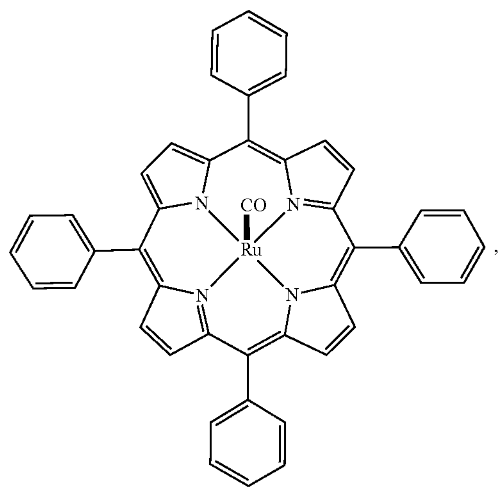
,
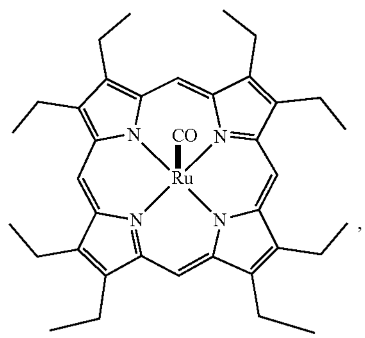
,
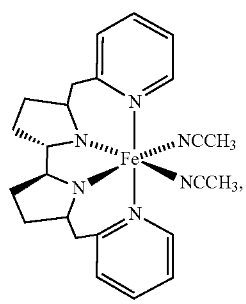
,
(SbF6)2
-continued
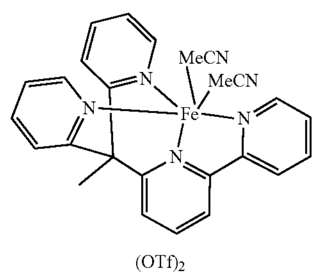
.
(OTf)2
In embodiments, the metal catalyst is,
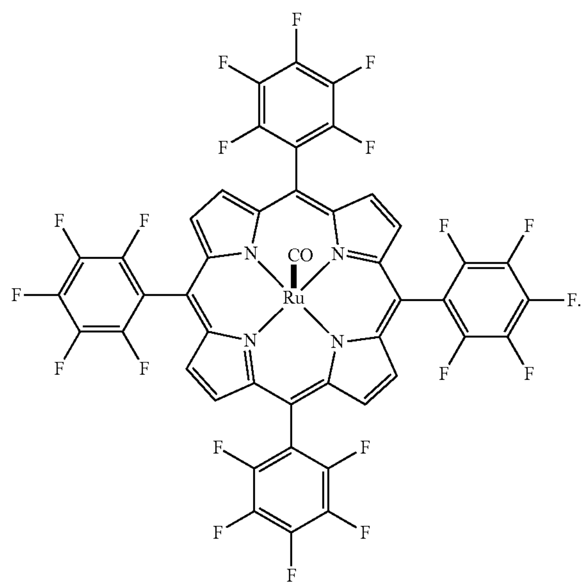
.
In embodiments, the metal catalyst is
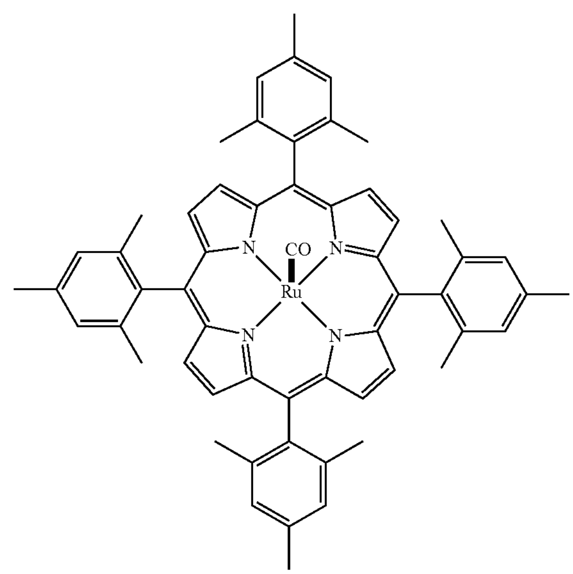
.

In embodiments, the metal catalyst is
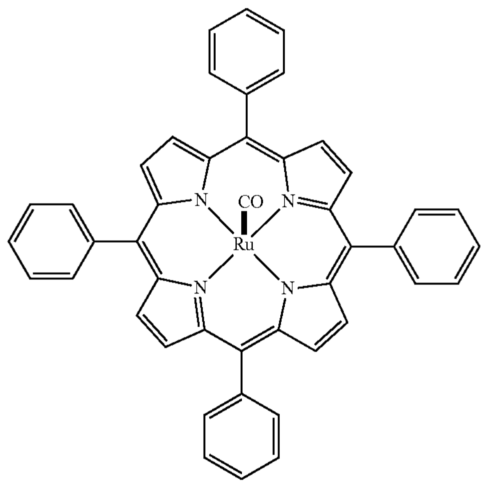
In embodiments, the metal catalyst is
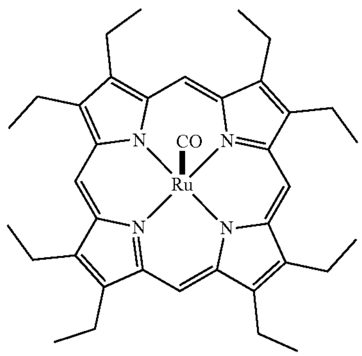
In embodiments, the metal catalyst is
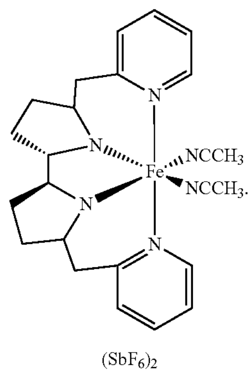
In embodiments, the metal catalyst is
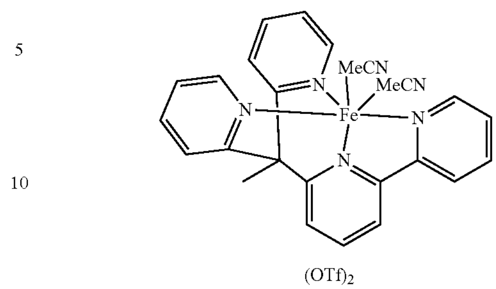
In embodiments, the metal catalyst is not
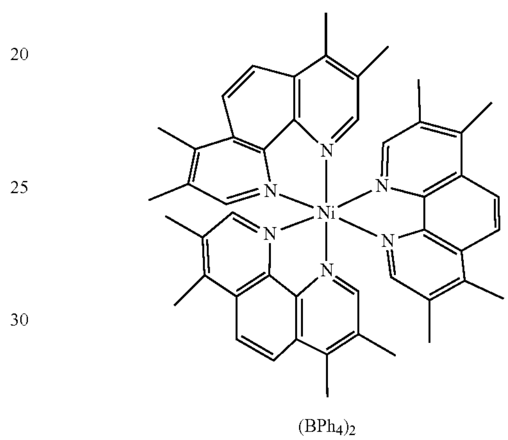
In embodiments, the oxidizing agent is a peroxide or a substituted pyridine N-oxide.
In embodiments, the oxidizing agent is
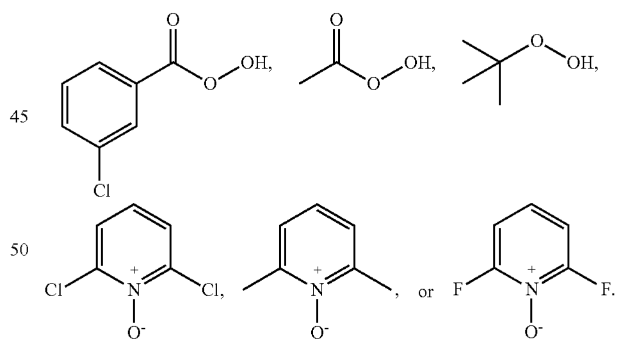
In embodiments, the oxidizing agent is
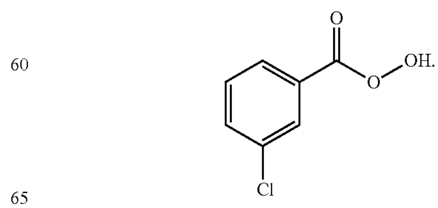

In embodiments, the oxidizing agent is

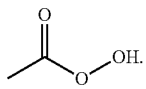

In embodiments, the oxidizing agent is

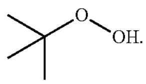

In embodiments, the oxidizing agent is

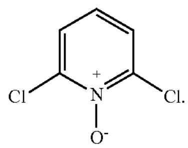

In embodiments, the oxidizing agent is

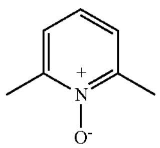

In embodiments, the oxidizing agent is

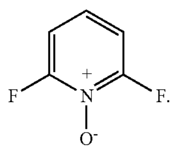

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

V. Embodiments P

Embodiment P1. A method of making an oxidized polyethylene, comprising mixing a polyethylene, a metal catalyst, and an oxidizing agent;

wherein the oxidized polyethylene comprises a first oxidized subunit, a second oxidized subunit, and a non-oxidized subunit;

the polyethylene comprises a non-oxidized subunit;

the first oxidized subunit has the formula:

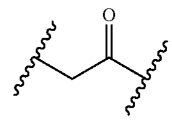

the second oxidized subunit has the formula:

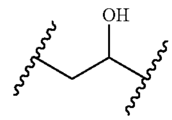

the non-oxidized subunit has the formula:

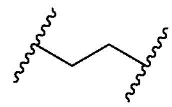

the ratio of the first and second oxidized subunits to the non-oxidized subunit in the oxidized polyethylene is from 1:10,000 to 1:5;

the oxidized polyethylene has a number average molecular weight from 150 Da to 20,000,000 Da; and wherein the metal catalyst is not a manganese porphyrin catalyst or an iron porphyrin catalyst.

Embodiment P2. The method of Embodiment P1, wherein the ratio of the first and second oxidized subunits to the non-oxidized subunit in the oxidized polyethylene is from 1:1000 to 1:10.

Embodiment P3. The method of one of Embodiments P1 to P2, wherein the ratio of the first oxidized subunit to the second oxidized subunit in the oxidized polyethylene is about 1:1.

Embodiment P4. The method of one of Embodiments P1 to P3, wherein the oxidized polyethylene has a number average molecular weight from 300 Da to 2,000,000 Da.

Embodiment P5. The method of one of Embodiments P1 to P4, wherein the polyethylene is a high-density polyethylene, a low-density polyethylene, or a linear low-density polyethylene.

Embodiment P6. The method of one of Embodiments P1 to P5, wherein the metal catalyst is a ruthenium catalyst, an iron catalyst, or a nickel catalyst.

Embodiment P7. The method of one of Embodiments P1 to P5, wherein the metal catalyst is a ruthenium catalyst.

Embodiment P8. The method of one of Embodiments P1 to P5, wherein the metal catalyst is
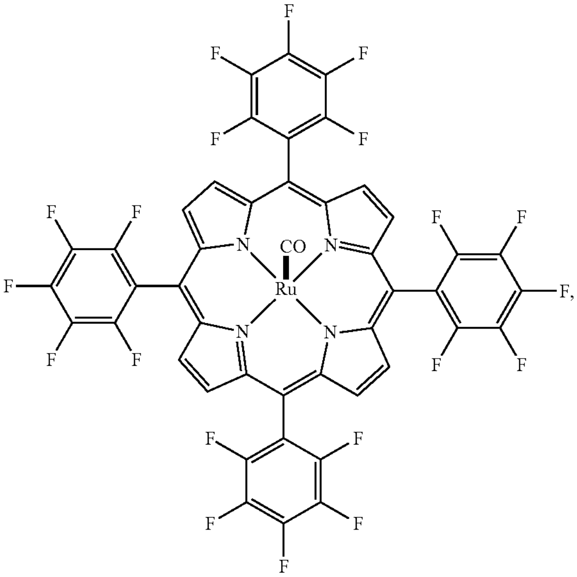
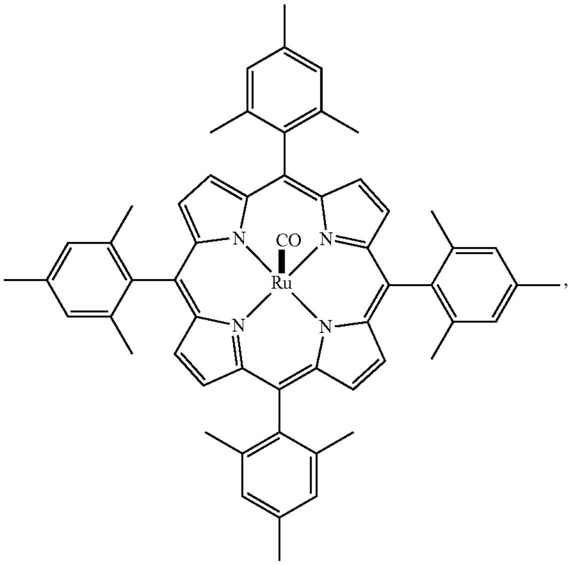
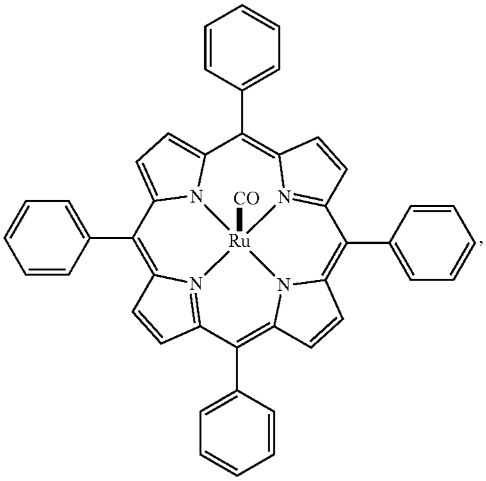
-continued
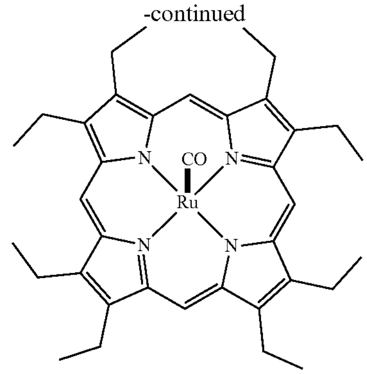
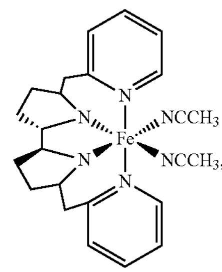
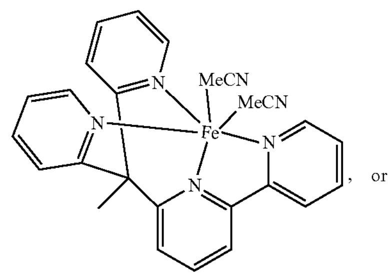
or
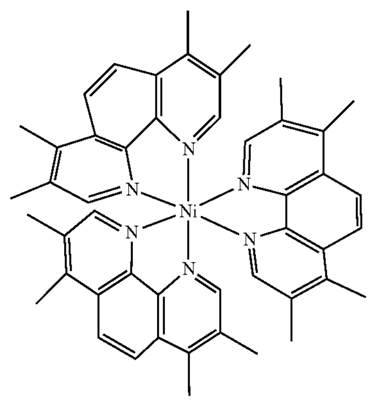

Embodiment P9. The method of one of Embodiments P1 to P5, wherein the metal catalyst is

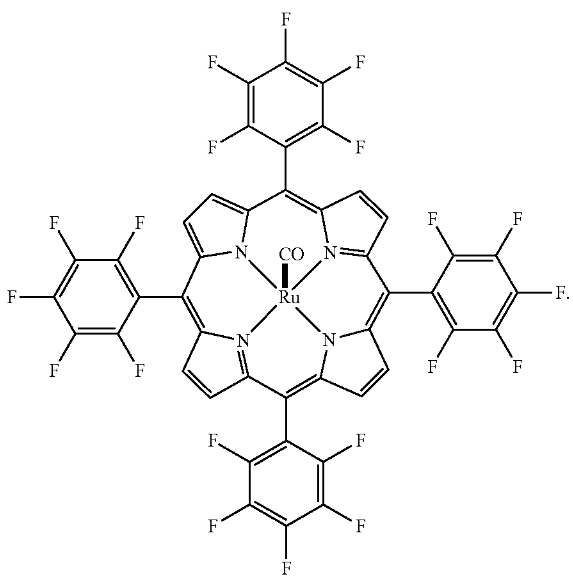

Embodiment P10. The method of one of Embodiments P1 to P9, wherein the oxidizing agent is a peroxide or a substituted pyridine N-oxide.

Embodiment P11. The method of one of Embodiments P1 to P9, wherein the oxidizing agent is a peroxide or a substituted pyridine N-oxide.

Embodiment P12. The method of one of Embodiments P1 to P9, wherein the oxidizing agent is

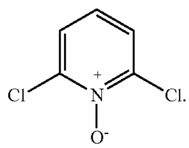

Embodiment P13. An oxidized polyethylene in a vessel comprising an oxidized polyethylene and one or more additional compounds selected from the groups consisting of: (i) a metal catalyst; (ii) an oxidizing agent; (iii) a reducing agent; (iv) a polyethylene; and (v) a hydroxylated polyethylene;

wherein the oxidized polyethylene comprises a first oxidized subunit, a second oxidized subunit, and a non-oxidized subunit;

the polyethylene comprises a non-oxidized subunit;

the hydroxylated polyethylene comprises a second oxidized subunit and a non-oxidized subunit;

the first oxidized subunit has the formula:

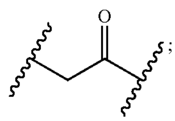 [SMILES: *CC(*)=O]

the second oxidized subunit has the formula:

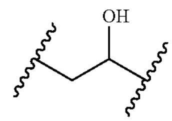

the non-oxidized subunit has the formula:

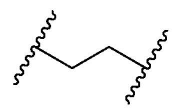

the ratio of the first and second oxidized subunits to the non-oxidized subunit in the oxidized polyethylene is from 1:10,000 to 1:5;

the oxidized polyethylene has a number average molecular weight from 150 Da to 20,000,000 Da;

the hydroxylated polyethylene has a number average molecular weight from 150 Da to 20,000,000 Da; and wherein the metal catalyst is not a manganese porphyrin catalyst or an iron porphyrin catalyst.

Embodiment P14. The oxidized polyethylene in a vessel of Embodiment P13, wherein the ratio of the first and second oxidized subunits to the non-oxidized subunit in the oxidized polyethylene is from 1:1000 to 1:10.

Embodiment P15. The oxidized polyethylene in a vessel of one of Embodiments P13 to P14, wherein the ratio of the first oxidized subunit to the second oxidized subunit in the oxidized polyethylene is about 1:1.

Embodiment P16. The oxidized polyethylene in a vessel of one of Embodiments P13 to P15, wherein the oxidized polyethylene has a number average molecular weight from 300 Da to 2,000,000 Da.

Embodiment P17. The oxidized polyethylene in a vessel of one of Embodiments P13 to P16, wherein the hydroxylated polyethylene has a number average molecular weight from 300 Da to 2,000,000 Da.

Embodiment P18. The oxidized polyethylene in a vessel of one of Embodiments P13 to P17, wherein the polyethylene is a high-density polyethylene, a low-density polyethylene, or a linear low-density polyethylene.

Embodiment P19. The oxidized polyethylene in a vessel of one of Embodiments P13 to P18, wherein the metal catalyst is a ruthenium catalyst, an iron catalyst, or a nickel catalyst.

Embodiment P20. The oxidized polyethylene in a vessel of one of Embodiments P13 to P18, wherein the metal catalyst is -continued
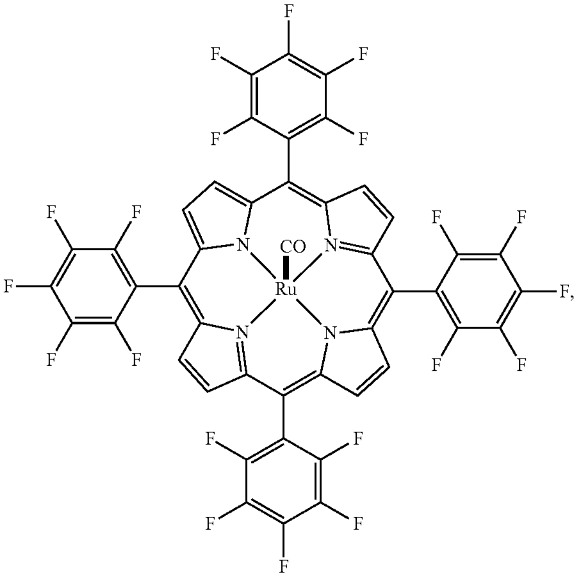
,
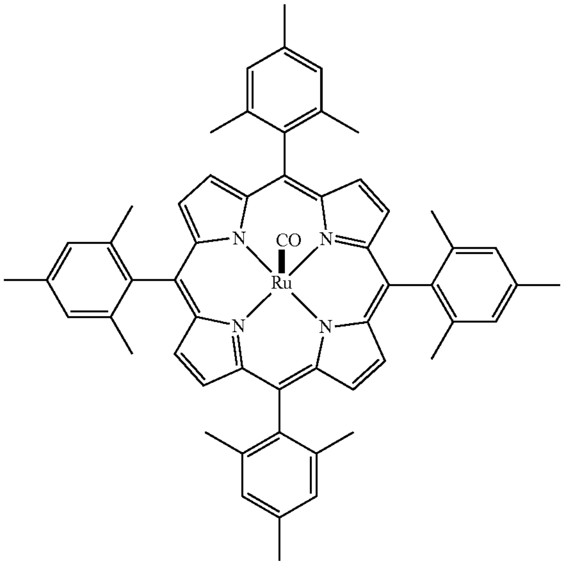
,
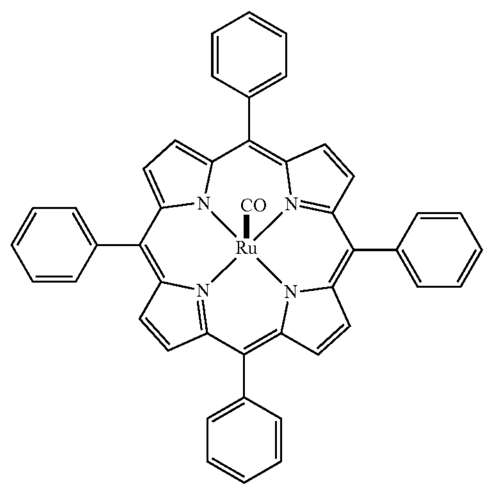
,
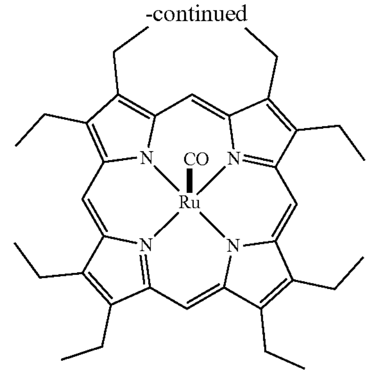
,
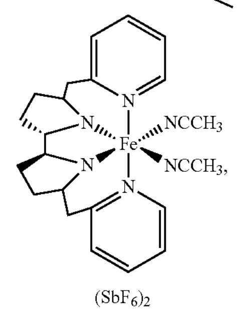
,
(SbF6)2
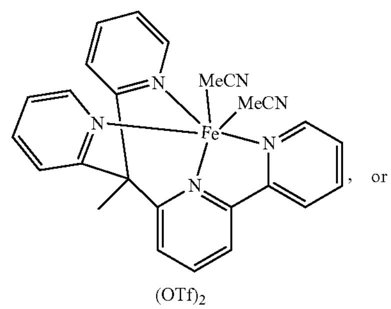
,
(OTf)2
or
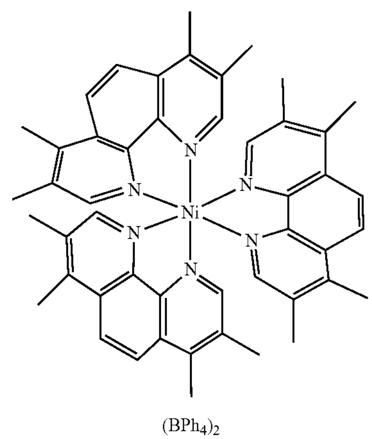
.
(BPh4)2

Embodiment P21. The oxidized polyethylene in a vessel of one of Embodiments P13 to P18, wherein the metal catalyst is

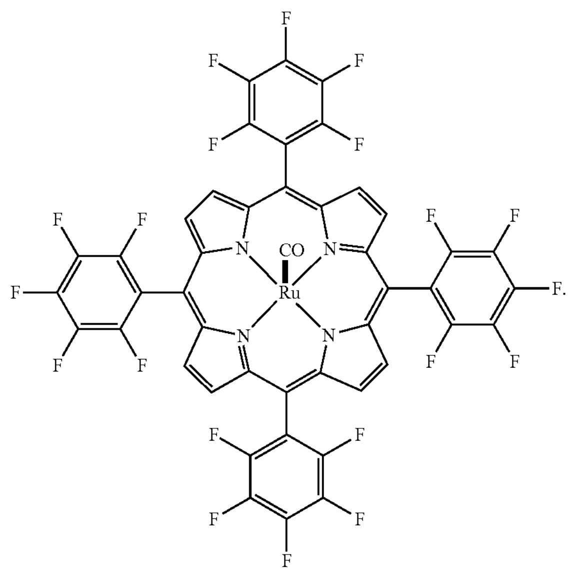

Embodiment P22. The oxidized polyethylene in a vessel of one of Embodiments P13 to P21, wherein the oxidizing agent is a peroxide or a substituted pyridine N-oxide.

Embodiment P23. The oxidized polyethylene in a vessel of one of Embodiments P13 to P21, wherein the oxidizing agent is a peroxide or a substituted pyridine N-oxide.

Embodiment P24. The oxidized polyethylene in a vessel of one of Embodiments P13 to P21, wherein the oxidizing agent is

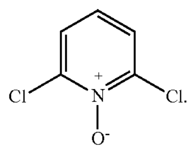

Embodiment P25. The oxidized polyethylene in a vessel of one of Embodiments P13 to P24, wherein the reducing agent is an aluminum hydride or a boron hydride.

Embodiment P26. The oxidized polyethylene in a vessel of one of Embodiments P13 to P24, wherein the reducing agent is lithium aluminum hydride, sodium bis(2-methoxyethoxy)aluminum hydride, or lithium triethylborohydride.

Embodiment P27. An oxidized polyethylene, comprising a first oxidized subunit, a second oxidized subunit, and a non-oxidized subunit;

the first oxidized subunit has the formula:

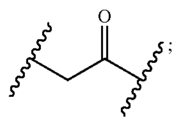 [SMILES: *CC(*)=O]

the second oxidized subunit has the formula:

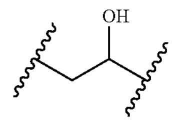

the non-oxidized subunit has the formula:

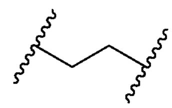

the ratio of the first and second oxidized subunits to the non-oxidized subunit is from 1:10,000 to 1:5; and the oxidized polyethylene has a number average molecular weight from 150 Da to 20,000,000 Da.

Embodiment P28. The oxidized polyethylene of Embodiment P27, wherein the ratio of the first and second oxidized subunits to the non-oxidized subunit is from 1:1000 to 1:10.

Embodiment P29. The oxidized polyethylene of one of Embodiments P27 to P28, wherein the ratio of the first oxidized subunit to the second oxidized subunit is about 1:1.

Embodiment P30. The oxidized polyethylene of one of Embodiments P27 to P29, wherein the oxidized polyethylene has a number average molecular weight from 300 Da to 2,000,000 Da.

Embodiment P31. A mixture of polymers comprising an oxidized polyethylene of one of Embodiments P27 to P30 and a second polymer.

Embodiment P32. The mixture of polymers of Embodiment P31, wherein the second polymer is a high-density polyethylene, a low-density polyethylene, or a linear low-density polyethylene.

Embodiment P33. A cross-linked polymer, wherein a first oxidized polyethylene of one of Embodiments P27 to P30 is covalently bonded to a second oxidized polyethylene of one of Embodiments P27 to P30 via a covalent linker having the formula:

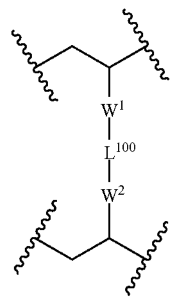

wherein $W^1$ is —O— or —$NR^1$—;

$W^2$ is —O— or —$NR^2$—;

$R^1$ and $R^2$ are independently hydrogen, halogen, —$CX^3_3$, —$CHX^3_2$, —$CH_2X^3$, —$OCX^3_3$, —$OCH_2X^3$, —$OCHX^3_2$, —CN, —$SO_{n3}R^3$, —$SO_{v3}NR^3R^3$, —$NR^3NR^3R^3$, —$ONR^3R^3$, —$NHC(O)NR^3NR^3R^3$, —$NHC(O)NR^3R^3$, —$N(O)_{m3}$, —$NR^3R^3$, —$C(O)R^3$, —$C(O)OR^3$, —$C(O)NR^3R^3$, —$OR^3$, —$SR^3$, —$NR^3SO_2R^3$, $-NR^3C(O)R^3$, $-NR^3C(O)OR^3$, $-NR^{30}R^3$, $-SF_5$, $-N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;

$R^3$ is independently hydrogen, oxo, halogen, $-CCl_3$, $-CBr_3$, $-CF_3$, $-CI_3$, $-CHCl_2$, $-CHBr_2$, $-CHF_2$, $-CHI_2$, $-CH_2Cl$, $-CH_2Br$, $-CH_2F$, $-CH_2I$, $-CN$, $-OH$, $-NH_2$, $-COOH$, $-CONH_2$, $-NO_2$, $-SH$, $-SO_3H$, $-OSO_3H$, $-SO_2NH_2$, $-NHNH_2$, $-ONH_2$, $-NHC(O)NHNH_2$, $-NHC(O)NH_2$, $-NHSO_2H$, $-NHC(O)H$, $-NHC(O)OH$, $-NHOH$, $-OCCl_3$, $-OCF_3$, $-OCBr_3$, $-OCI_3$, $-OCHCl_2$, $-OCHBr_2$, $-OCHI_2$, $-OCHF_2$, $-OCH_2Cl$, $-OCH_2Br$, $-OCH_2I$, $-OCH_2F$, $-N_3$, $-SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^3$ substituents bonded to the same nitrogen atom may optionally be joined to form a substituted or unsubstituted heterocycloalkyl, or substituted or unsubstituted heteroaryl;

$L^{100}$ is $-L^{101}-L^{102}-L^{103}-$;

$L^{101}$ is a bond, $-N(R^{101})-$, $-S-$, $-O-$, $-C(O)-$, $-C(O)O-$, $-OC(O)-$, $-N(R^{101})C(O)-$, $-C(O)N(R^{101})-$, $-NR^{101}C(O)NR^{101}-$, $-NR^{101}C(NH)NH-$, $-C(S)-$, $-Si(R^{101})_2-$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$L^{102}$ is a bond, $-N(R^{102})-$, $-S-$, $-O-$, $-C(O)-$, $-C(O)O-$, $-OC(O)-$, $-N(R^{102})C(O)-$, $-C(O)N(R^{102})-$, $-NR^{102}C(O)NR^{102}-$, $-NR^{102}C(NH)NH-$, $-C(S)-$, $-Si(R^{102})_2-$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$L^{103}$ is a bond, $-N(R^{103})-$, $-S-$, $-O-$, $-C(O)-$, $-C(O)O-$, $-OC(O)-$, $-N(R^{103})C(O)-$, $-C(O)N(R^{103})-$, $-NR^{103}C(O)NR^{103}-$, $-NR^{103}C(NH)NH-$, $-C(S)-$, $-Si(R^{103})_2-$, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$R^{101}$, $R^{102}$, and $R^{103}$ are each independently hydrogen, halogen, $-CX^{104}_3$, $-CHX^{104}_2$, $-CH_2X^{104}$, $-OCX^{104}_3$, $-OCH_2X^{104}$, $-OCHX^{104}_2$, $-CN$, $-SO_{n104}R^{104}$, $-SO_{v104}NR^{104}R^{104}$, $-NR^{104}NR^{104}R^{104}$, $-ONR^{104}R^{104}$, $-NHC(O)NR^{104}NR^{104}R^{104}$, $-NHC(O)NR^{104}R^{104}$, $-N(O)_{m104}$, $-NR^{104}R^{104}$, $-C(O)R^{104}$, $-C(O)OR^{104}$, $-C(O)NR^{104}R^{104}$, $-OR^{104}$, $-SR^{104}$, $-NR^{104}SO_2R^{104}$, $-NR^{104}C(O)R^{104}$, $-NR^{104}C(O)OR^{104}$, $-NR^{104}R^{104}$, $-SF_5$, $-N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;

$R^{104}$ is independently hydrogen, oxo, halogen, $-CCl_3$, $-CBr_3$, $-CF_3$, $-CI_3$, $-CHCl_2$, $-CHBr_2$, $-CHF_2$, $-CHI_2$, $-CH_2Cl$, $-CH_2Br$, $-CH_2F$, $-CH_2I$, $-CN$, $-OH$, $-NH_2$, $-COOH$, $-CONH_2$, $-NO_2$, $-SH$, $-SO_3H$, $-OSO_3H$, $-SO_2NH_2$, $-NHNH_2$, $-ONH_2$, $-NHC(O)NHNH_2$, $-NHC(O)NH_2$, $-NHSO_2H$, $-NHC(O)H$, $-NHC(O)OH$, $-NHOH$, $-OCCl_3$, $-OCF_3$, $-OCBr_3$, $-OCI_3$, $-OCHCl_2$, $-OCHBr_2$, $-OCHI_2$, $-OCHF_2$, $-OCH_2Cl$, $-OCH_2Br$, $-OCH_2I$, $-OCH_2F$, $-N_3$, $-SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^{104}$ substituents bonded to the same nitrogen atom may optionally be joined to form a substituted or unsubstituted heterocycloalkyl, or substituted or unsubstituted heteroaryl;

$X^3$ and $X^{104}$ are independently $-F$, $-Cl$, $-Br$, or $-I$;

n3 and n104 are independently an integer from 0 to 4; and m3, m104, v3, and v104 are independently 1 or 2.

Embodiment P34. The cross-linked polymer of Embodiment P33, wherein $W^1$ is $-O-$ or $-NH-$.

Embodiment P35. The cross-linked polymer of Embodiment P33, wherein $W^1$ is $-O-$.

Embodiment P36. The cross-linked polymer of one of Embodiments P33 to P35, wherein $W^2$ is $-O-$ or $-NH-$.

Embodiment P37. The cross-linked polymer of one of Embodiments P33 to P35, wherein $W^2$ is $-O-$.

Embodiment P38. The cross-linked polymer of one of Embodiments P33 to P37, wherein $L^{101}$ is $-C(O)-$, $-NHC(O)-$, $-C(O)NH-$, or $-Si(R^{101})_2-$;

$L^{102}$ is an unsubstituted alkylene;

$L^{103}$ is $-C(O)-$, $-NHC(O)-$, $-C(O)NH-$, or $-Si(R^{103})_2-$; and $R^{101}$ and $R^{103}$ are independently halogen, $-OH$, $-NH_2$, or substituted or unsubstituted heteroalkylene.

Embodiment P39. The cross-linked polymer of Embodiment P38, wherein $R^{101}$ and $R^{103}$ are each independently $-Cl$ or $-OH$.

Embodiment P40. The cross-linked polymer of one of Embodiments P33 to P37, wherein $L^{100}$ is

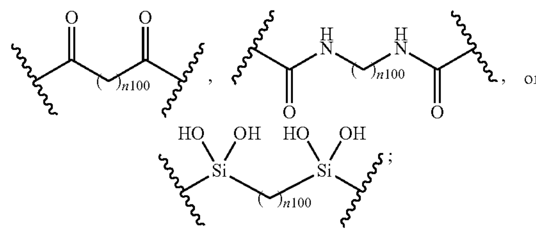

and n100 is an integer from 1 to 20.

Embodiment P41. A mixture of polymers comprising a cross-linked polymer of one of Embodiments P33 to P40 and a second polymer.

Embodiment P42. The mixture of polymers of Embodiment P41, wherein the second polymer is a high-density polyethylene, a low-density polyethylene, or a linear low-density polyethylene.

V. Embodiments

Embodiment 1. A method of making an oxidized polyethylene, comprising mixing a polyethylene, a metal catalyst, and an oxidizing agent;

wherein the oxidized polyethylene comprises a first oxidized subunit, a second oxidized subunit, and a non-oxidized subunit;

the polyethylene comprises a non-oxidized subunit;

the first oxidized subunit has the formula:

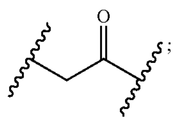 [SMILES: *CC(*)=O]

the second oxidized subunit has the formula:

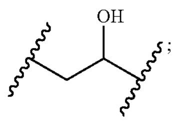 [SMILES: *CC(*)O]

the non-oxidized subunit has the formula:

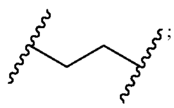 [SMILES: *CC*]

the ratio of the first and second oxidized subunits to the non-oxidized subunit in the oxidized polyethylene is from 1:10,000 to 1:5;

the oxidized polyethylene has a number average molecular weight from 150 Da to 20,000,000 Da; and wherein the metal catalyst is not a manganese porphyrin catalyst or an iron porphyrin catalyst, wherein a sum of a chloride subunit of formula

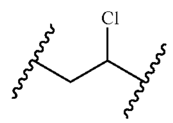

and an ester subunit of formula

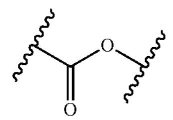

of the oxidized polyethylene is less than about 6% of a sum of the first oxidized subunit and the second oxidized subunit of the oxidized polyethylene.

Embodiment 2. The method of Embodiment 1, wherein the ratio of the first and second oxidized subunits to the non-oxidized subunit in the oxidized polyethylene is from 1:1000 to 1:10.

Embodiment 3. The method of one of Embodiments 1 to 2, wherein the ratio of the first oxidized subunit to the second oxidized subunit in the oxidized polyethylene is about 1:1.

Embodiment 4. The method of one of Embodiments 1 to 3, wherein the oxidized polyethylene has a number average molecular weight from 300 Da to 2,000,000 Da.

Embodiment 5. The method of one of Embodiments 1 to 4, wherein the polyethylene is a high-density polyethylene, a low-density polyethylene, or a linear low-density polyethylene.

Embodiment 6. The method of one of Embodiments 1 to 5, wherein the metal catalyst is a ruthenium catalyst, or an iron catalyst.

Embodiment 7. The method of one of Embodiments 1 to 6, wherein the metal catalyst is a ruthenium catalyst.

Embodiment 8. The method of one of Embodiments 1 to 6, wherein the metal catalyst is

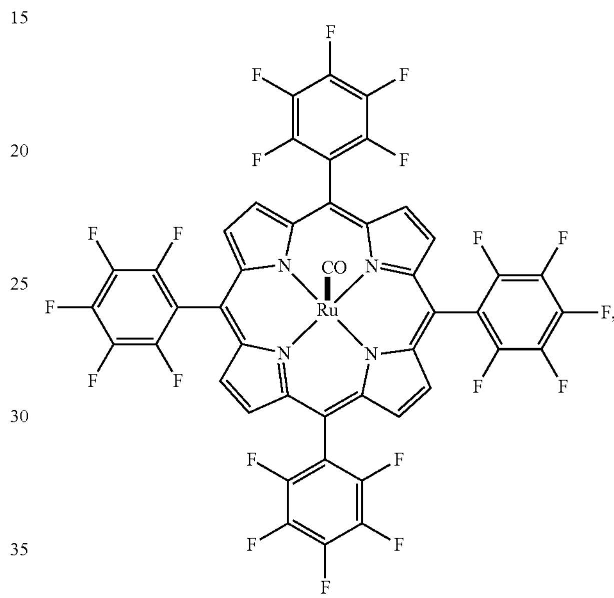

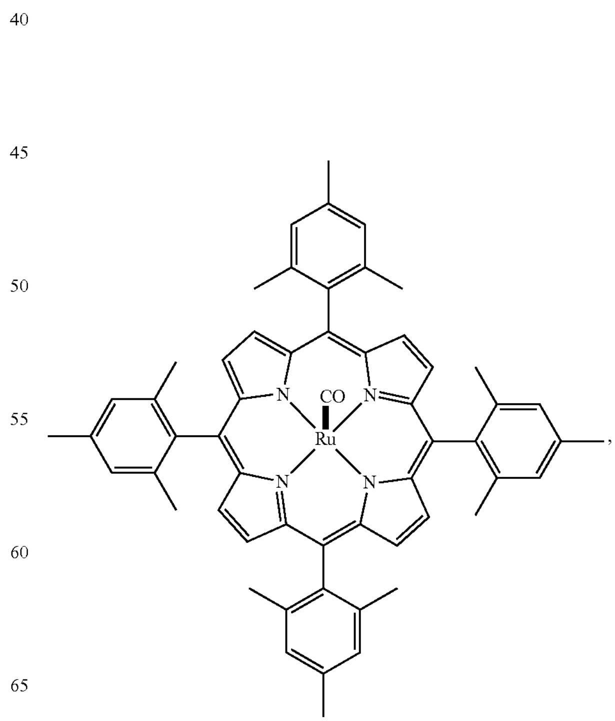

-continued

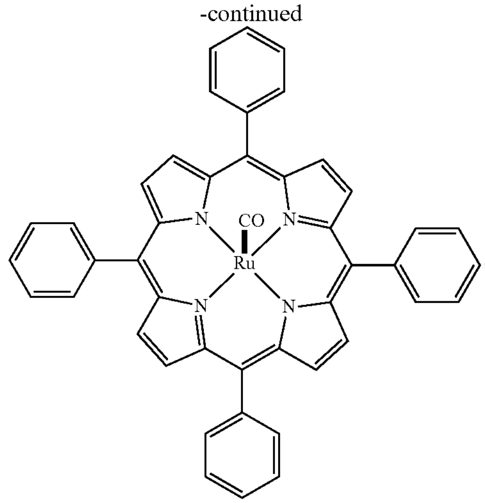

,

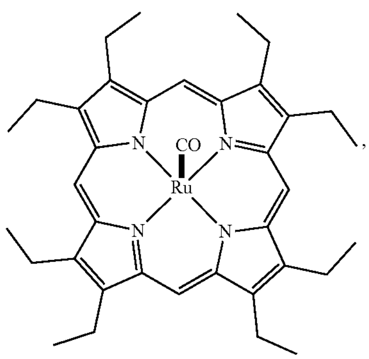

,

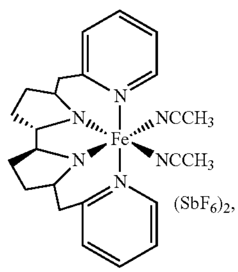

$(SbF_6)_2$,

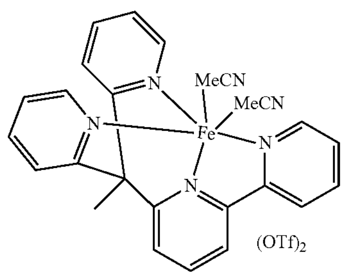

, $(OTf)_2$

Embodiment 9. The method of one of Embodiments 1 to 6, wherein the metal catalyst is

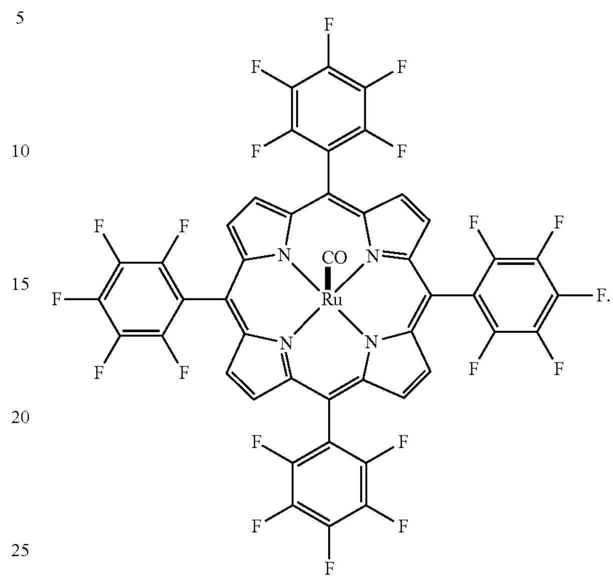

Embodiment 10. The method of one of Embodiments 1 to 9, wherein the oxidizing agent is a peroxide or a substituted pyridine N-oxide.

Embodiment 12. The method of one of Embodiments 1 to 10, wherein the oxidizing agent is

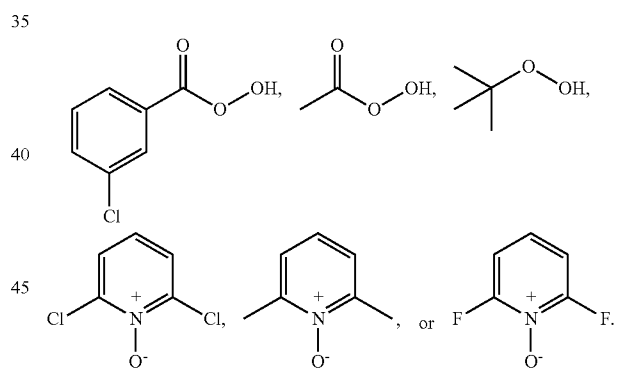

Embodiment 12. The method of one of Embodiments 1 to 10, wherein the oxidizing agent is

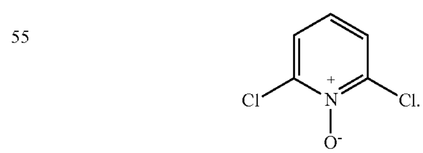

Embodiment 13. An oxidized polyethylene in a vessel comprising an oxidized polyethylene and one or more additional compounds selected from the groups consisting of: (i) a metal catalyst; (ii) an oxidizing agent; (iii) a reducing agent; (iv) a polyethylene; and (v) a hydroxylated polyethylene;

wherein the oxidized polyethylene comprises a first oxidized subunit, a second oxidized subunit, and a non-oxidized subunit;

the polyethylene comprises a non-oxidized subunit;

the hydroxylated polyethylene comprises a second oxidized subunit and a non-oxidized subunit;

the first oxidized subunit has the formula:

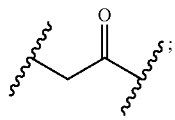 [SMILES: *CC(*)=O]

the second oxidized subunit has the formula:

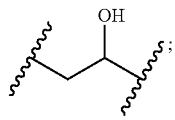 [SMILES: *CC(*)O]

the non-oxidized subunit has the formula:

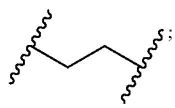 [SMILES: *CC*]

the ratio of the first and second oxidized subunits to the non-oxidized subunit in the oxidized polyethylene is from 1:10,000 to 1:5;

the oxidized polyethylene has a number average molecular weight from 150 Da to 20,000,000 Da;

the hydroxylated polyethylene has a number average molecular weight from 150 Da to 20,000,000 Da;

wherein the metal catalyst is not a manganese porphyrin catalyst or an iron porphyrin catalyst; and wherein a sum of a chloride subunit of formula

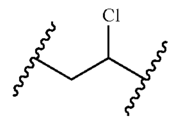

and an ester subunit of formula

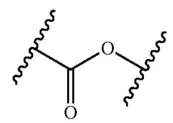

of the oxidized polyethylene is less than about 6% of a sum of the first oxidized subunit and the second oxidized subunit of the oxidized polyethylene.

Embodiment 14. The oxidized polyethylene in a vessel of Embodiment 13, wherein the ratio of the first and second oxidized subunits to the non-oxidized subunit in the oxidized polyethylene is from 1:1000 to 1:10.

Embodiment 15. The oxidized polyethylene in a vessel of one of Embodiments 13 to 14, wherein the ratio of the first oxidized subunit to the second oxidized subunit in the oxidized polyethylene is about 1:1.

Embodiment 16. The oxidized polyethylene in a vessel of one of Embodiments 13 to 15, wherein the oxidized polyethylene has a number average molecular weight from 300 Da to 2,000,000 Da.

Embodiment 17. The oxidized polyethylene in a vessel of one of Embodiments 13 to 16, wherein the hydroxylated polyethylene has a number average molecular weight from 300 Da to 2,000,000 Da.

Embodiment 18. The oxidized polyethylene in a vessel of one of Embodiments 13 to 17, wherein the polyethylene is a high-density polyethylene, a low-density polyethylene, or a linear low-density polyethylene.

Embodiment 19. The oxidized polyethylene in a vessel of one of Embodiments 13 to 18, wherein the metal catalyst is a ruthenium catalyst, or an iron catalyst.

Embodiment 20. The oxidized polyethylene in a vessel of one of Embodiments 13 to 19, wherein the metal catalyst is

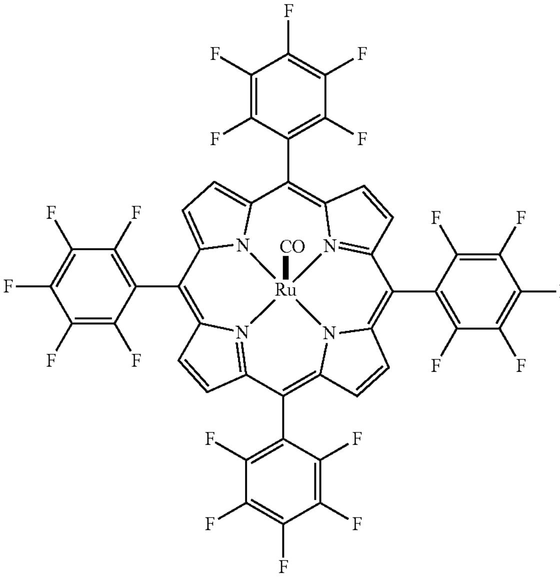

,

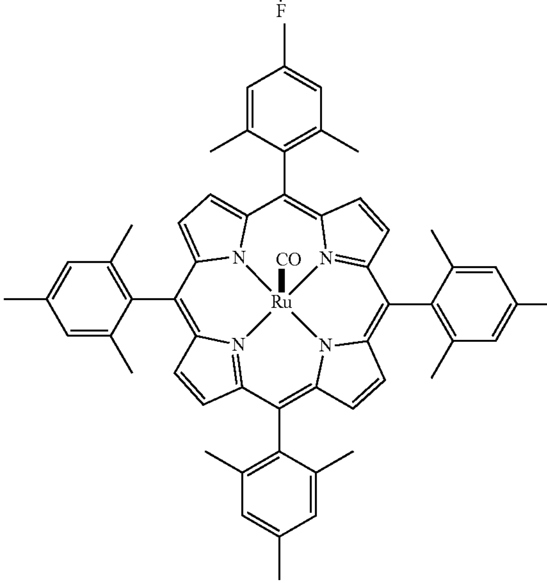

,

-continued

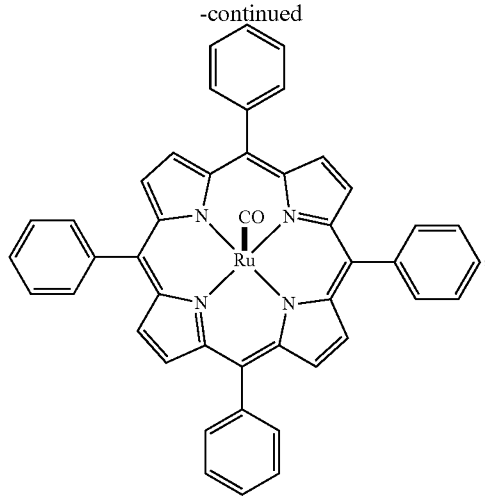

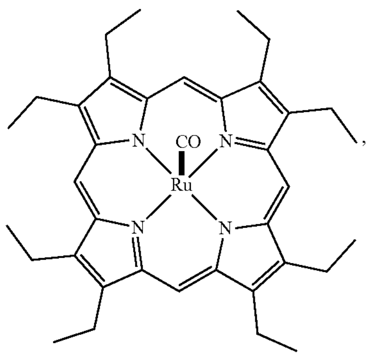

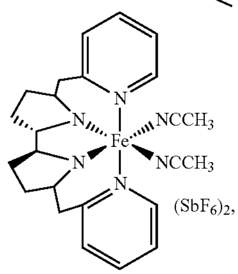

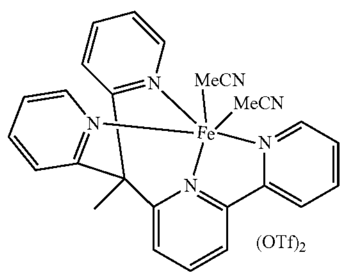

Embodiment 21. The oxidized polyethylene in a vessel of one of Embodiments 13 to 20, wherein the metal catalyst is

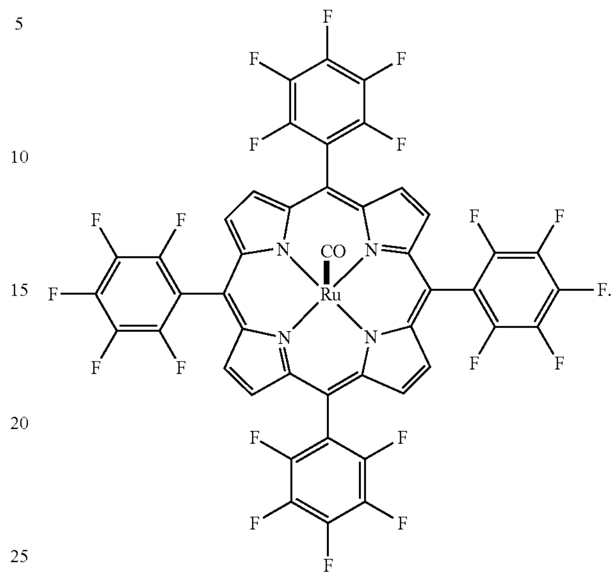

Embodiment 22. The oxidized polyethylene in a vessel of one of Embodiments 13 to 21, wherein the oxidizing agent is a peroxide or a substituted pyridine N-oxide.

Embodiment 23. The oxidized polyethylene in a vessel of one of Embodiments 13 to and 22, wherein the oxidizing agent is

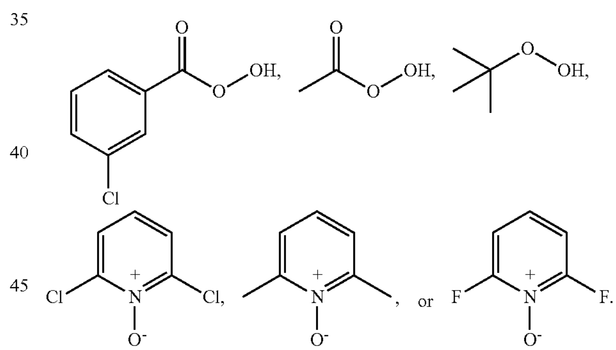

Embodiment 24. The oxidized polyethylene in a vessel of one of Embodiments 13 to 23, wherein the oxidizing agent is

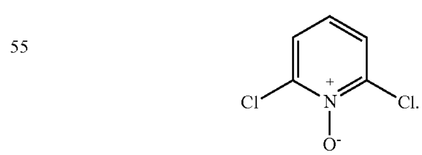

Embodiment 25. The oxidized polyethylene in a vessel of one of Embodiments 13 to 24, wherein the reducing agent is an aluminum hydride or a boron hydride.

Embodiment 26. The oxidized polyethylene in a vessel of one of Embodiments 13 to 25, wherein the reducing agent is lithium aluminum hydride, sodium bis(2-methoxyethoxy) aluminum hydride, or lithium triethylborohydride.

Embodiment 27. An oxidized polyethylene, comprising a first oxidized subunit, a second oxidized subunit, and a non-oxidized subunit;

the first oxidized subunit has the formula:

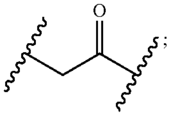 [SMILES: *CC(*)=O]

the second oxidized subunit has the formula:

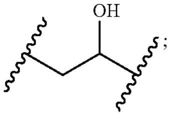 [SMILES: *CC(*)O]

the non-oxidized subunit has the formula:

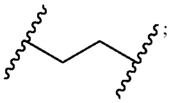 [SMILES: *CC*]

the ratio of the first and second oxidized subunits to the non-oxidized subunit is from 1:10,000 to 1:5; and the oxidized polyethylene has a number average molecular weight from 150 Da to 20,000,000 Da.

Embodiment 28. The oxidized polyethylene of Embodiment 27, wherein the ratio of the first and second oxidized subunits to the non-oxidized subunit is from 1:1000 to 1:10.

Embodiment 29. The oxidized polyethylene of one of Embodiments 27 to 28, wherein the ratio of the first oxidized subunit to the second oxidized subunit is about 1:1.

Embodiment 30. The oxidized polyethylene of one of Embodiments 27 to 29, wherein the oxidized polyethylene has a number average molecular weight from 300 Da to 2,000,000 Da.

Embodiment 31. A mixture of polymers comprising an oxidized polyethylene of one of Embodiments 27 to 30 and a second polymer.

Embodiment 32. The mixture of polymers of Embodiment 31, wherein the second polymer is a high-density polyethylene, a low-density polyethylene, or a linear low-density polyethylene.

Embodiment 33. A cross-linked polymer, wherein a first oxidized polyethylene of one of Embodiments 27 to 30 is covalently bonded to a second oxidized polyethylene of one of Embodiments 32 to 35 via a covalent linker having the formula:

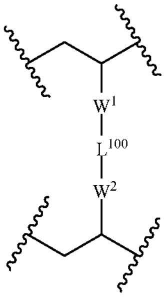

wherein $W^1$ is —O— or —$NR^1$—;

$W^2$ is —O— or —$NR^2$—;

$R^1$ and $R^2$ are independently hydrogen, halogen, —$CX^3_3$, —$CHX^3_2$, —$CH_2X^3$, —$OCX^3_3$, —$OCH_2X^3$, —$OCHX^3_2$, —CN, —$SO_{n3}R^3$, —$SO_{v3}NR^3R^3$, —$NR^3NR^3R^3$, —$ONR^3R^3$, —$NHC(O)NR^3NR^3R^3$, —$NHC(O)NR^3R^3$, —$N(O)_{m3}$, —$NR^3R^3$, —$C(O)R^3$, —$C(O)OR^3$, —$C(O)NR^3R^3$, —$OR^3$, —$SR^3$, —$NR^3SO_2R^3$, —$NR^3C(O)R^3$, —$NR^3C(O)OR^3$, —$NR^3OR^3$, —$SF_5$, —$N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;

$R^3$ is independently hydrogen, oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —$NHC(O)NHNH_2$, —$NHC(O)NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^3$ substituents bonded to the same nitrogen atom may optionally be joined to form a substituted or unsubstituted heterocycloalkyl, or substituted or unsubstituted heteroaryl;

$L^{100}$ is -$L^{101}$-$L^{102}$-$L^{103}$-;

$L^{101}$ is a bond, —$N(R^{101})$—, —S—, —O—, —C(O)—, —C(O)O—, —OC(O)—, —$N(R^{101})C(O)$—, —$C(O)N(R^{101})$—, —$NR^{101}C(O)NR^{101}$—, —$NR^{101}C(NH)NH$—, —C(S)—, —$Si(R^{101})_2$—, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$L^{102}$ is a bond, —$N(R^{102})$—, —S—, —O—, —C(O)—, —C(O)O—, —OC(O)—, —$N(R^{102})C(O)$—, —$C(O)N(R^{102})$—, —$NR^{102}C(O)NR^{102}$—, —$NR^{102}C(NH)NH$—, —C(S)—, —$Si(R^{102})_2$—, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$L^{103}$ is a bond, —$N(R^{103})$—, —S—, —O—, —C(O)—, —C(O)O—, —OC(O)—, —$N(R^{103})C(O)$—, —$C(O)N(R^{103})$—, —$NR^{103}C(O)NR^{103}$—, —$NR^{103}C(NH)$ NH—, —C(S)—, —$Si(R^{103})_2$—, substituted or unsubstituted alkylene, substituted or unsubstituted heteroalkylene, substituted or unsubstituted cycloalkylene, substituted or unsubstituted heterocycloalkylene, substituted or unsubstituted arylene, or substituted or unsubstituted heteroarylene;

$R^{101}$, $R^{102}$, and $R^{103}$ are each independently hydrogen, halogen, —$CX^{104}_3$, —$CHX^{104}_2$, —$CH_2X^{104}$, —$OCX^{104}_3$, —$OCH_2X^{104}$, —$OCHX^{104}_2$, —CN, —$SO_{n104}R^{104}$, —$SO_{v104}NR^{104}R^{104}$, —$NR^{104}NR^{104}R^{104}$, —$ONR^{104}R^{104}$, —NHC(O)$NR^{104}NR^{104}R^{104}$, —NHC(O)$NR^{104}R^{104}$, —$N(O)_{m104}$, —$NR^{104}R^{104}$, —C(O)$R^{104}$, —C(O)$OR^{104}$, —C(O)$NR^{104}R^{104}$, —$OR^{104}$, —$SR^{104}$, —$NR^{104}SO_2R^{104}$, —$NR^{104}C(O)R^{104}$, —$NR^{104}C(O)OR^{104}$, —$NR^{104}OR^{104}$, —$SF_5$, —$N_3$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl;

$R^{104}$ is independently hydrogen, oxo, halogen, —$CCl_3$, —$CBr_3$, —$CF_3$, —$CI_3$, —$CHCl_2$, —$CHBr_2$, —$CHF_2$, —$CHI_2$, —$CH_2Cl$, —$CH_2Br$, —$CH_2F$, —$CH_2I$, —CN, —OH, —$NH_2$, —COOH, —$CONH_2$, —$NO_2$, —SH, —$SO_3H$, —$OSO_3H$, —$SO_2NH_2$, —$NHNH_2$, —$ONH_2$, —NHC(O)$NHNH_2$, —NHC(O)$NH_2$, —$NHSO_2H$, —NHC(O)H, —NHC(O)OH, —NHOH, —$OCCl_3$, —$OCF_3$, —$OCBr_3$, —$OCI_3$, —$OCHCl_2$, —$OCHBr_2$, —$OCHI_2$, —$OCHF_2$, —$OCH_2Cl$, —$OCH_2Br$, —$OCH_2I$, —$OCH_2F$, —$N_3$, —$SF_5$, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl; two $R^{104}$ substituents bonded to the same nitrogen atom may optionally be joined to form a substituted or unsubstituted heterocycloalkyl, or substituted or unsubstituted heteroaryl;

$X^3$ and $X^{104}$ are independently —F, —Cl, —Br, or —I;

n3 and n104 are independently an integer from 0 to 4; and m3, m104, v3, and v104 are independently 1 or 2.

Embodiment 34. The cross-linked polymer of Embodiment 33, wherein $W^1$ is —O— or —NH—.

Embodiment 35. The cross-linked polymer of Embodiment 33, wherein $W^1$ is —O—.

Embodiment 36. The cross-linked polymer of one of Embodiments 33 to 35, wherein $W^2$ is —O— or —NH—.

Embodiment 37. The cross-linked polymer of one of Embodiments 33 to 35, wherein $W^2$ is —O—.

Embodiment 38 The cross-linked polymer of one of Embodiments 33 to 37, wherein $L^{101}$ is —C(O)—, —NHC(O)—, —C(O)NH—, or —Si$(R^{101})_2$—;

$L^{102}$ is an unsubstituted alkylene;

$L^{103}$ is —C(O)—, —NHC(O)—, —C(O)NH—, or —Si$(R^{103})_2$—; and $R^{101}$ and $R^{103}$ are independently halogen, —OH, —$NH_2$, or substituted or unsubstituted heteroalkylene.

Embodiment 39 The cross-linked polymer of Embodiment 38, wherein $R^{101}$ and $R^{103}$ are each independently —Cl or —OH.

Embodiment 40. The cross-linked polymer of one of Embodiments 33 to 37, wherein $L^{100}$ is

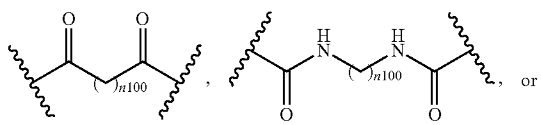

, , or

-continued

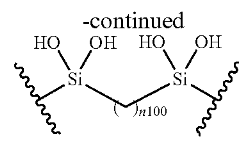

;

and n100 is an integer from 1 to 20.

Embodiment 41. A mixture of polymers comprising a cross-linked polymer of one of Embodiments 33 to 40 and a second polymer.

Embodiment 42. The mixture of polymers of Embodiment 41, wherein the second polymer is a high-density polyethylene, a low-density polyethylene, or a linear low-density polyethylene.

EXAMPLES

Example 1: Ruthenium-Catalyzed Selective Oxidation of Polyethylenes

About 8% of world oil production is consumed for the manufacture of more than 300 million tons of synthetic plastics annually. Polyolefins constitute half of these materials by weight.[1] The immense commercial scale of polyolefins arises from their low cost, high thermal stability, and excellent mechanical properties. However, the lack of functionality in polyolefins results in their poor compatibility with other types of materials, thereby hindering use as adhesives, coatings, and polymer composites, and limiting their value for end-of-life recycling.[2]

Figure 1B:
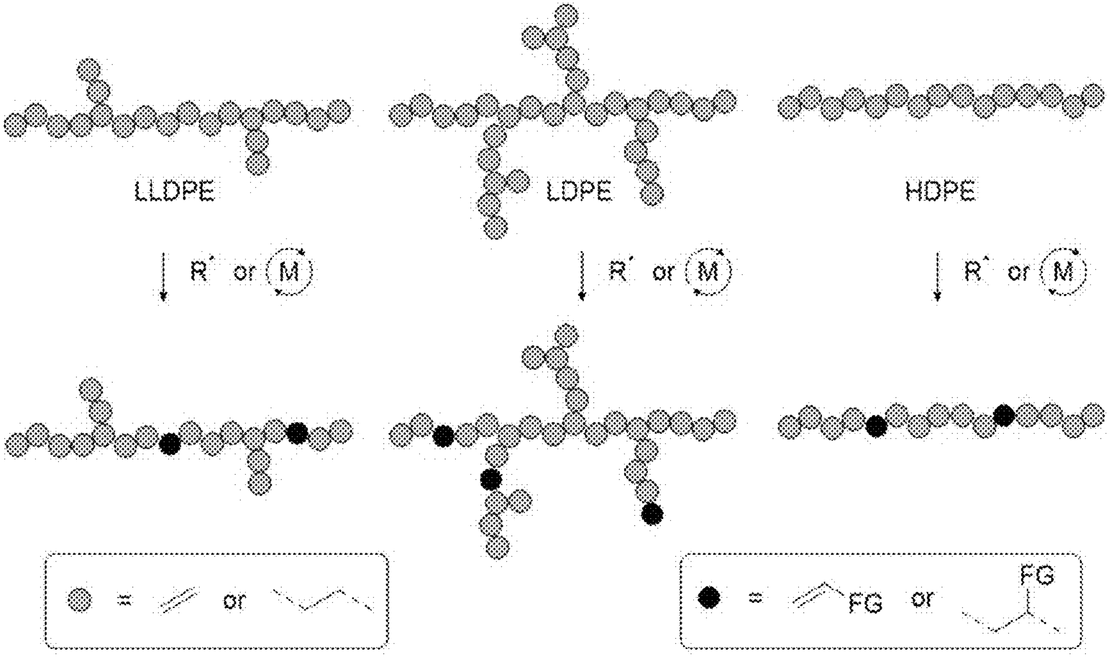

To address these limitations, several strategies have been explored to incorporate polar functionality into polyolefins (FIGS. 1A-1B). Radical copolymerization of ethylene with polar alkenes or carbon monoxide is industrially practiced, but this approach requires harsh reaction conditions and offers little control over the degree of alkyl branching and the distribution of functional groups.[3] To address this limitation, transition metal-catalyzed copolymerization of ethylene with polar vinyl comonomers has been studied.[4] While the catalyst structure can influence the polymer microstructure, the activity of these catalysts for copolymerization is much lower than those of Ziegler-Natta catalysts for homopolymerization. This lower activity, combined with frequent chain transfer and catalyst deactivation, hinders practical applications and narrows the range of structures of functional polyolefins accessible by coordination-insertion copolymerization.[5]

The combination of metathesis polymerization and hydrogenation has been used to synthesize strictly linear functional polyethylenes.[6] These polymers are suitable models for functionalized high-density polyethylenes and have allowed systematic investigations of their material properties.[7] However, this approach involves multistep syntheses of monomers and has not modeled branched polyethylenes containing polar functional groups.

As an alternative to copolymerization, the post-polymerization functionalization of polyolefins has been investigated to access modified polyolefins from readily available polymer materials (FIG. 1B).[8] Functionalization by free radicals mediated by plasma, radiation, and thermolysis of peroxides has been practiced for decades, but these processes often result in side reactions (e.g., over-oxidation, chain cleavage, and crosslinking) that often lead to loss of mass, coloration, and deteriorated material properties.[9] Exceptions are the regioselective xanthylation and trithiocarbonylation of polyolefins with amidyl radicals reported recently,[10] but these processes require expensive reagents, and the thermal stability of the resulting materials ($T_d$=250° C.) are significantly lower than that of the original materials ($T_d$ >400° C.).

Catalytic methods for the functionalization of polyolefins have potential advantages over those that rely on free radicals. However, methods that can install polar, oxygen-containing functional groups (e.g., hydroxyl, carbonyl, and ester) are challenging to achieve. In 2002, Hillmyer and Hartwig reported the combination of C—H borylation and oxidation to introduce hydroxyl groups into polyethylethylene, LLDPE, and polypropylenes.[11] Although the functionalization of primary C—H bonds in polyolefins by these processes is unique, these reactions required high loading of a rhodium catalyst (5 mol %), only a minor portion of the boron reagent added was incorporated into the polymer, and the reactions did not occur on LDPE and HDPE. Hillmyer and Perez subsequently reported oxidation and insertion of carbenes into secondary and tertiary C—H bonds in amorphous polyolefins catalyzed by complexes of base metals with low turnover numbers (<20).[12] Very recently, our laboratory reported the oxidation of polyethylenes catalyzed by nickel, but chlorination and over-oxidation to form esters competed with hydroxylation.[13] Thus, no process has been reported for the oxidation of polyethylenes to incorporate alcohol and ketone units with high chemoselectivity and turnovers. We report herein, inter alia, ruthenium-catalyzed oxidations of polyethylenes to form derivatives containing solely ketone and hydroxyl groups with turnover numbers about one order of magnitude higher than any previous process for oxidation of polyethylenes. The thermal stability of the resulting polymers is high, and the polarity is measurably increased over the unmodified polyethylenes.

We recently discovered that the polyfluorinated ruthenium-porphyrin catalyst 1, first reported by Groves for the oxidation of small molecules,[14] catalyzes the functionalization of an amorphous polyolefin with high regioselectivity and chemoselectivity under mild conditions. Recognizing that this complex is thermally stable (1 was synthesized in boiling o-dichlorobenzene (m.p. 180° C.) over 12 hours with 73% yield), we envisioned that it could be suitable for the oxidation of commercially important, semicrystalline polyethylenes. The melting points of these polymers are high (>110° C.), and unlike amorphous polyolefin models in most previous studies on the functionalization of polyolefins,[11a,12] the polymers are poorly soluble in any solvent at moderate temperature.

We first tested the oxidation of LDPE 3 catalyzed by 1 in solvents with high boiling points (Table 1). No incorporation of hydroxyl or carbonyl groups was observed from reactions performed in o-dichlorobenzene (ODCB, entry 1). However, by replacing neat ODCB with a 1:1 mixture of this solvent and dichloromethane (DCM), which has been proposed to stimulate the activation of catalyst 1,[14b] we observed that the oxidation occurred with complete consumption of N-oxide 2 at 120° C. and low loading of catalyst (0.05 mol %, entry 2).

TABLE 1

Catalytic oxidation of LDPE.

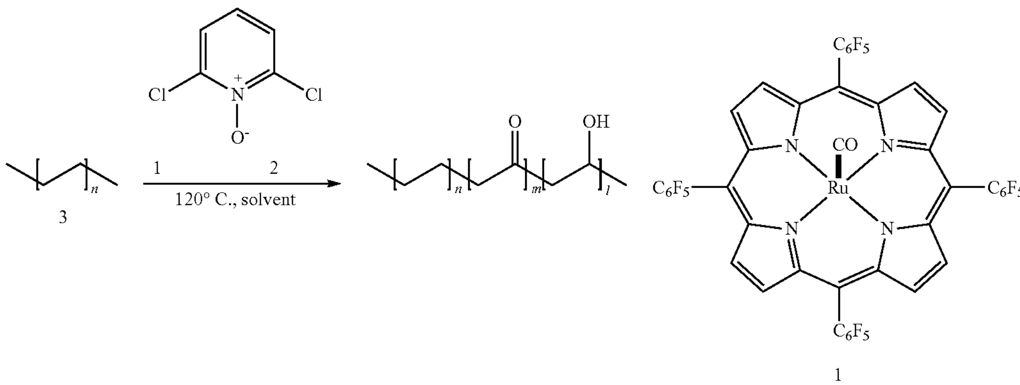

3

1

| Entry[a] | [1]/[2] (mol %) | Solvent | Conversion of 2 (%) | Yield of oxidation[e] (%) | l/n (mol %) | m/n (mol %) | FG[f] (mol %) | $T_m$[g] (° C.) | $T_d$[g] (° C.) |
|---|---|---|---|---|---|---|---|---|---|
| 1 | 0.05 | ODCB | — | — | 0 | 0 | 0 | — | — |
| 2 | 0.05 | ODCB/DCM | 100 | 61 | 1.5 | 2.3 | 3.8 | 100.8 | 419.9 |
| 3 | 0.05 | DCE | 100 | 59 | 1.7 | 2.1 | 3.8 | 100.9 | 414.9 |
| 4[b] | 0.01 | DCE | 41 | 23 | 0.7 | 0.8 | 1.5 | 103.7 | 419.9 |
| 5[c] | 0.02 | DCE | 81 | 48 | 1.2 | 1.8 | 3.0 | 103.4 | 400.1 |
| 6[c, d] | 0.02 | DCE | 83 | 53 | 1.3 | 2.0 | 3.3 | 102.8 | 406.8 |

[a]LDPE 3 was dissolved in solvent (1M) at 120° C. and then cooled to room temperature. 2 (0.1 equiv to PE repeating unit) and 1 as a stock solution (2.2 mg, 2 μmol in 2 mL of DCM) were sequentially added and stirred. The final mixture was heated at 120° C. for 0.5 h. Conversion of 2 to the corresponding pyridine was measured from crude NMR spectra, and incorporation of hydroxyl and carbonyl groups were measured from NMR spectra of purified polyethylenes.

[b]18 h.

[c]2 h.

[d]In DCE (2M).

[e]Yield of oxidation = 10 × (l/n + 2 m/n).

[f]Level of functionalization (FG) = l/n + m/n.

[g]Thermal properties of functionalized polyethylenes were measured by differential scanning calorimetry (DSC) and thermogravimetric analysis (TGA).

The oxidized LDPE was characterized by nuclear magnetic resonance (NMR) spectroscopy in $C_2D_2Cl_4$ at 100° C. Incorporation of hydroxyl (1.5 per 100 repeating unit, —CH—OH— 3.6 ppm) and carbonyl groups (2.3 per 100 repeating unit, —$CH_2$—C(O)—$CH_2$— 2.4 ppm) was observed. The catalyst turnover number was over 1,200, as calculated from the yield of oxidation. In contrast to our previous nickel-catalyzed oxidation of polyethylenes,[13] no chlorination or over-oxidation was observed.

Figure 2:
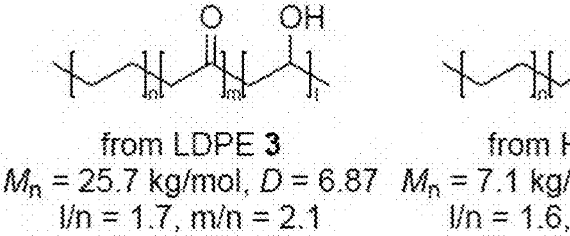
FIG. 2. Oxidized polyethylenes derived from LDPE 3, HDPE 4, and LLDPE 5.
Figure 2:
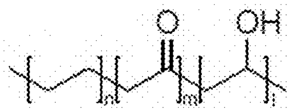
Figure 2:
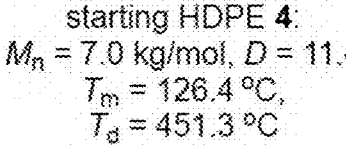
Figure 2:
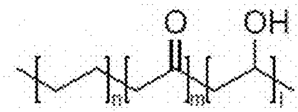

The oxidation also occurred in dichloroethane (DCE, entry 3), which avoids the use of a low-boiling-point solvent (DCM), with full conversion of N-oxide 2 and a level of functionalization that was similar to that in entry 2. A further decrease in the catalyst loading to 0.01 mol % (entry 4) resulted in a higher turnover number (2,300) than that of the reaction in entry 2, but reduced the conversion of 2 and the yield of oxidation, even when the reaction time was increased from 0.5 h to 18 h. Finally, we found that the reaction with a catalyst loading of 0.02 mol % and a concentration of polyethylene repeating unit of 2 M occurred with a level of functionalization (3.3 mol %) similar to that from higher loadings of catalyst and a high turnover number of 2,650 (entries 5 and 6). Gel permeation chromatography analysis indicated that the oxidation changed the molecular weight parameters modestly (FIG. 2). This result indicates that little chain-scission or crosslinking occurred under the conditions of this oxidation.

Figure 10:
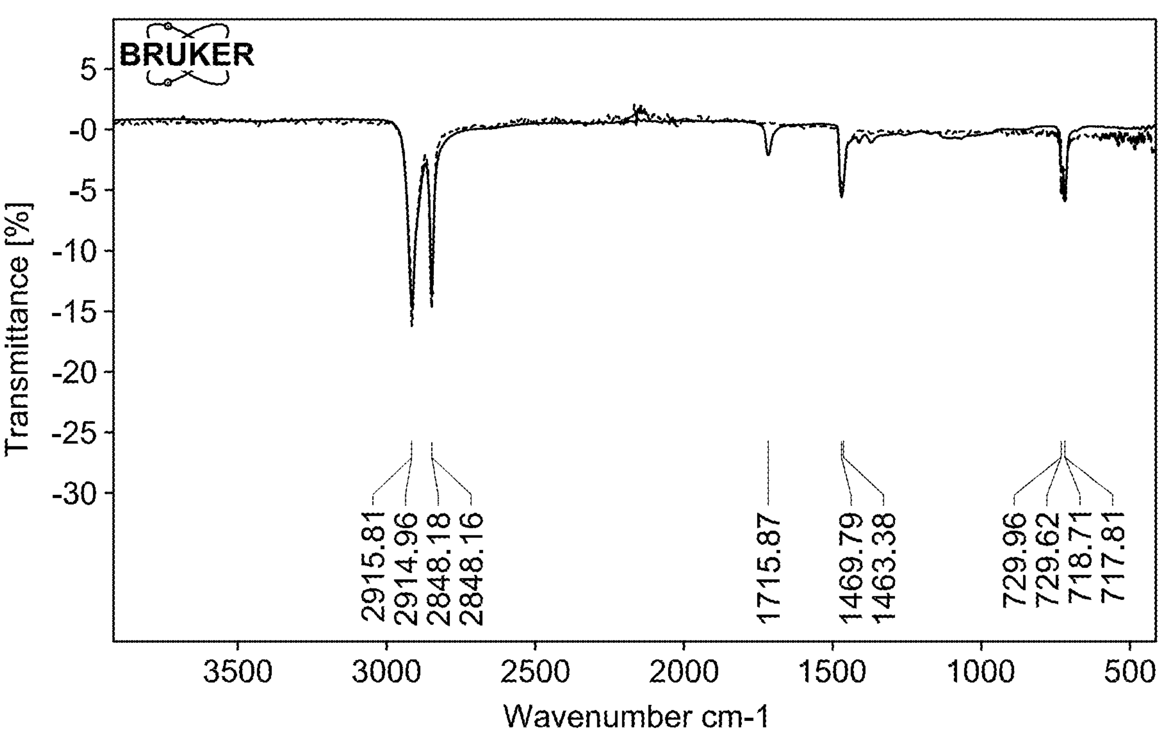
FIG. 10. ATR-FT-IR spectrum of oxidized HDPE (darker) and unmodified HDPE (lighter).
Figure 11:
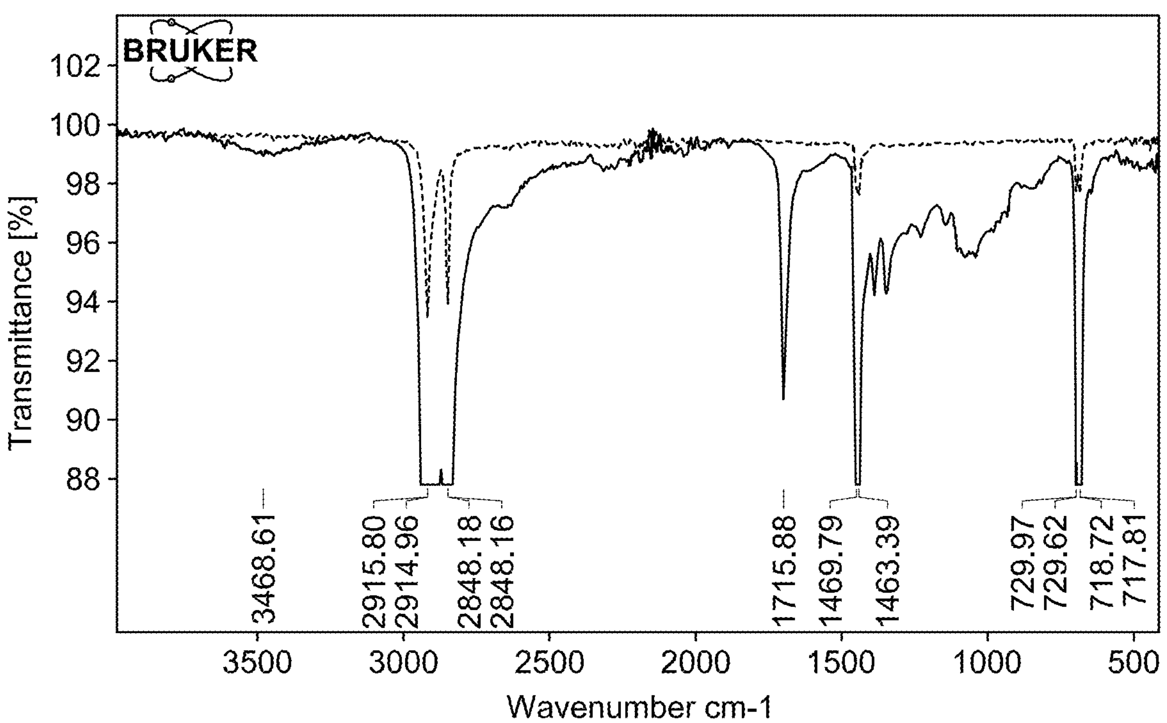
FIG. 11. Zoomed-in FT-IR spectrum of oxidized HDPE (darker) and unmodified HDPE (lighter).
Figure 12:
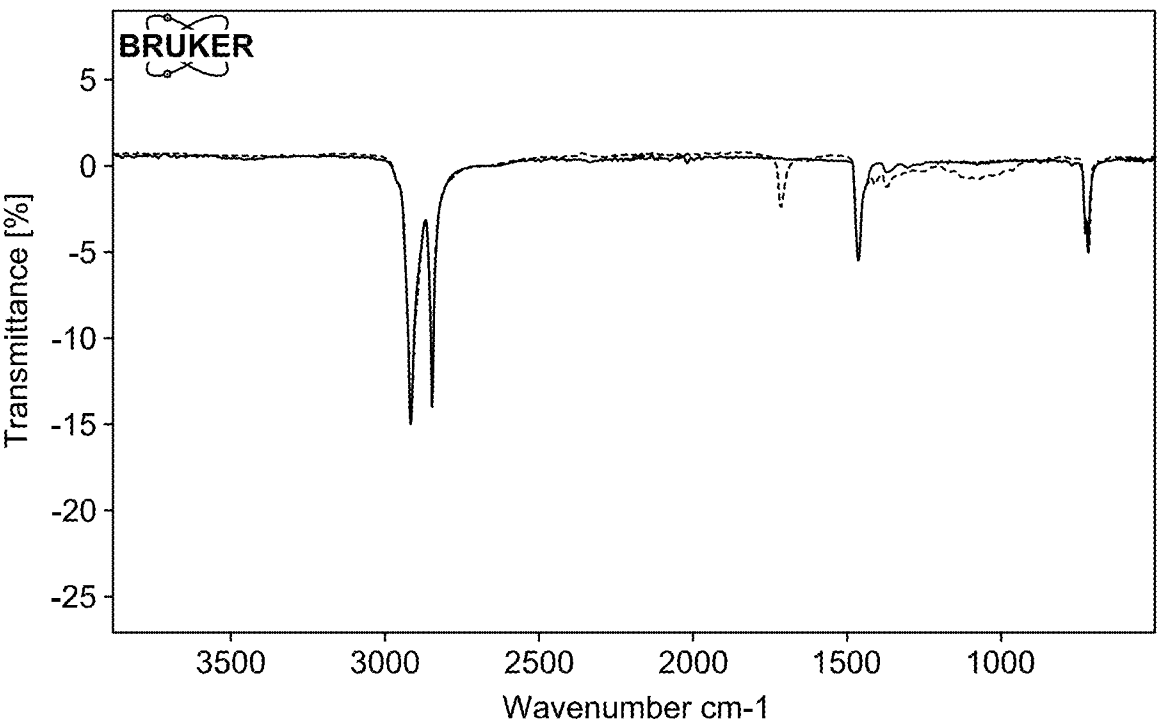
FIG. 12. ATR-FT-IR spectrum of oxidized LLDPE (lighter) and unmodified LLDPE (darker).
Figure 13:
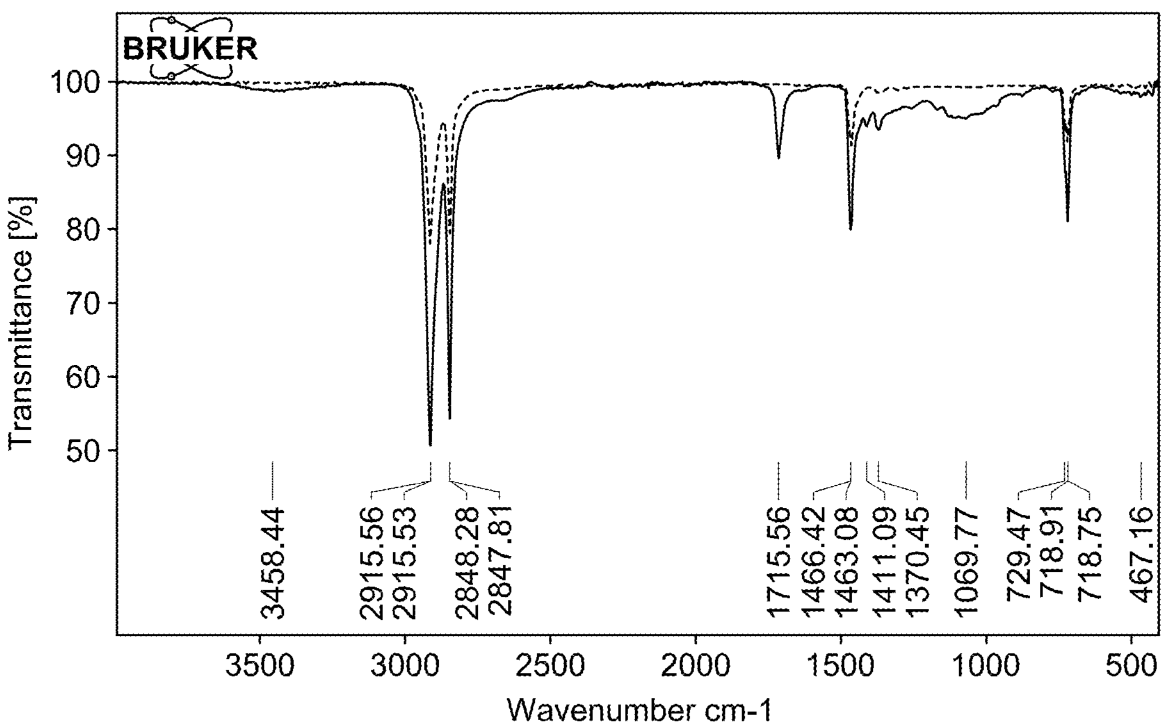
FIG. 13. Zoomed-in FT-IR spectrum of oxidized LLDPE (darker) and unmodified LLDPE (lighter).
Figure 14A:
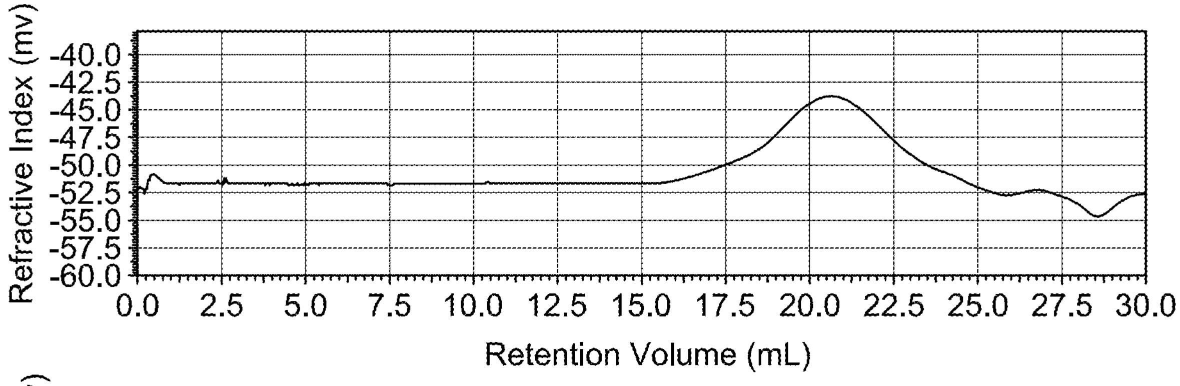
FIGS. 14A-14B. GPC traces of commercial LDPE (FIG. 14A) and oxidized LDPE (FIG. 14B).
Figure 14A:
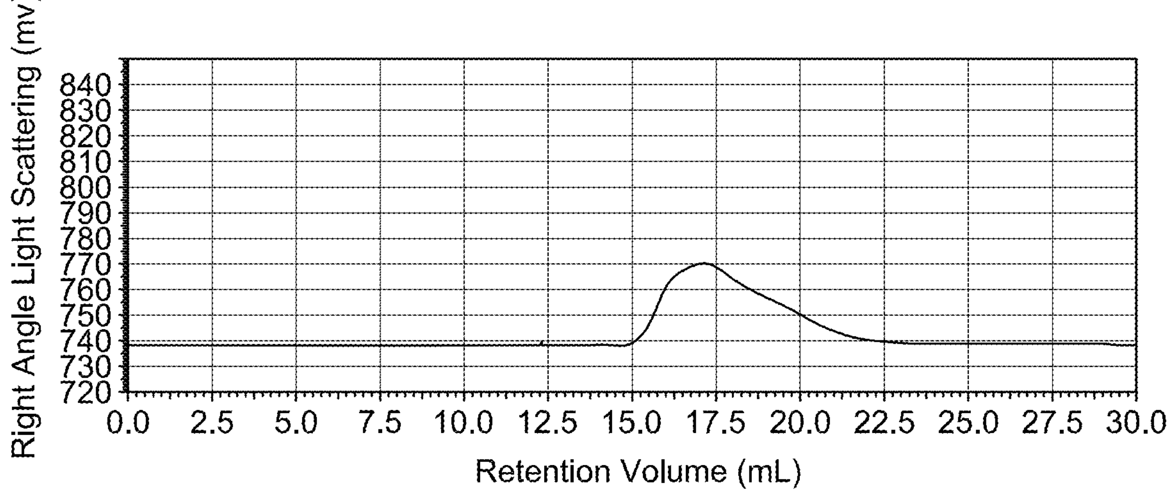
Figure 14A:
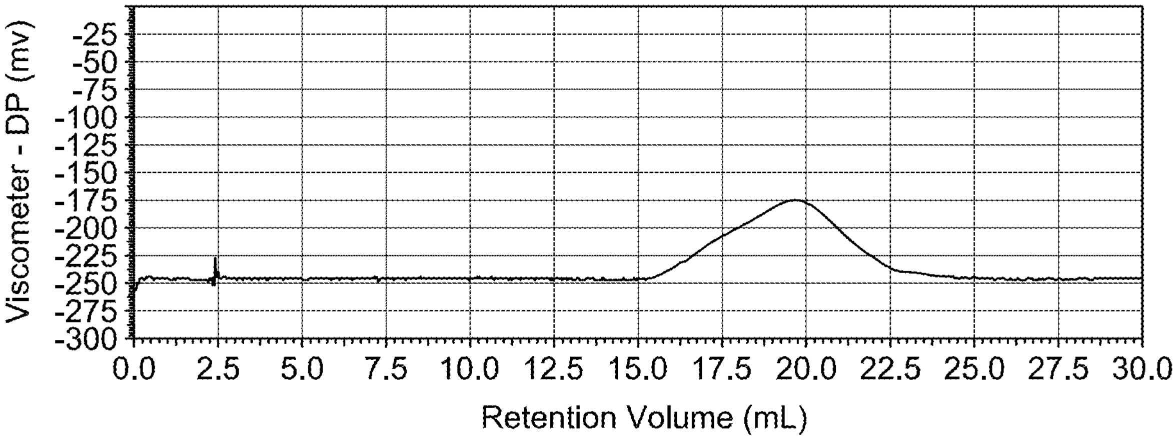
Figure 14B:
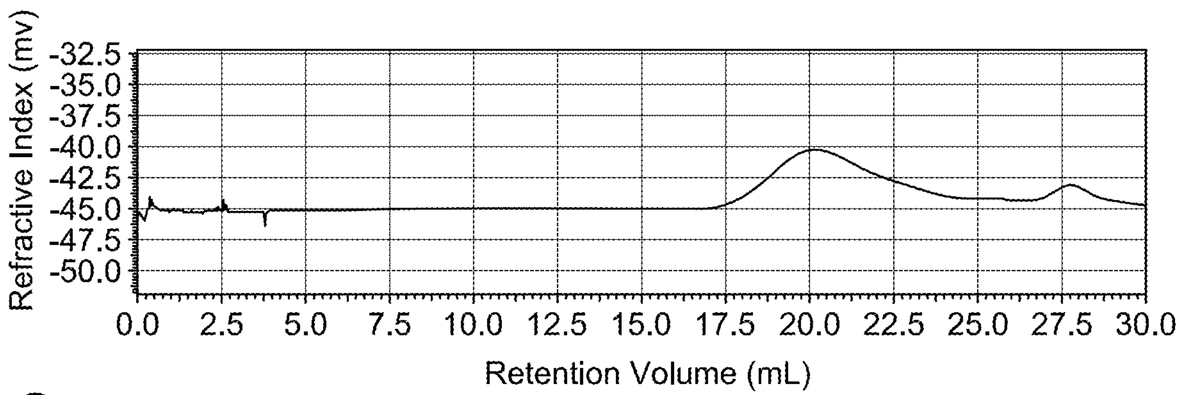
Figure 14B:
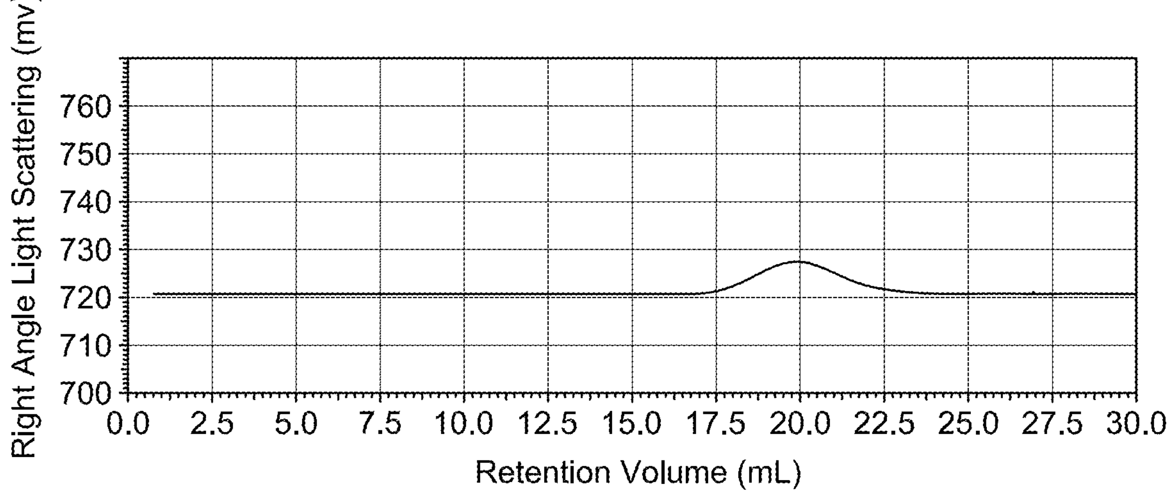
Figure 14B:
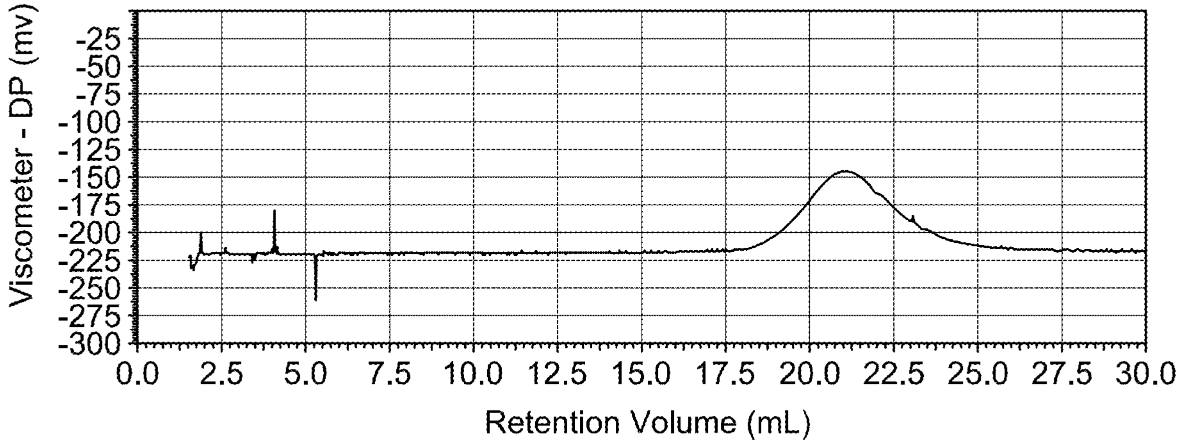
Figure 15A:
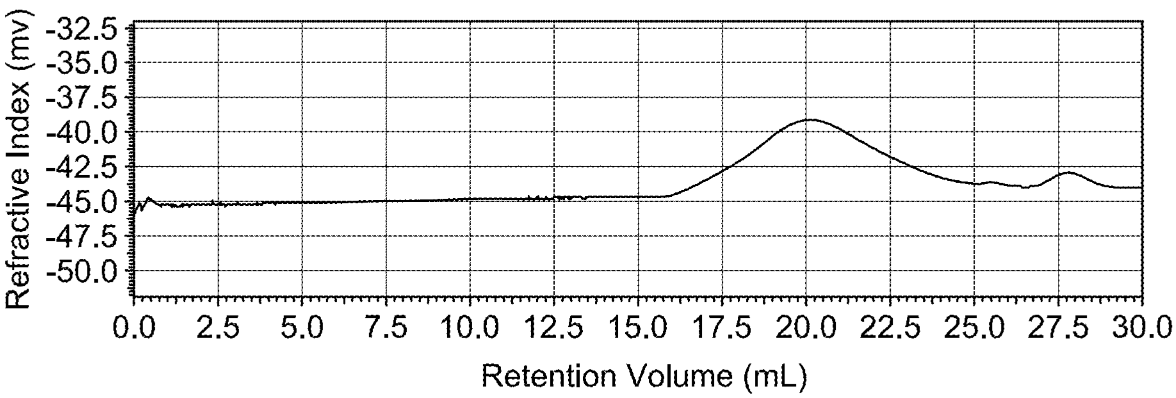
FIGS. 15A-15B. GPC traces of commercial HDPE (FIG. 15A) and oxidized HDPE (FIG. 15B).
Figure 15A:
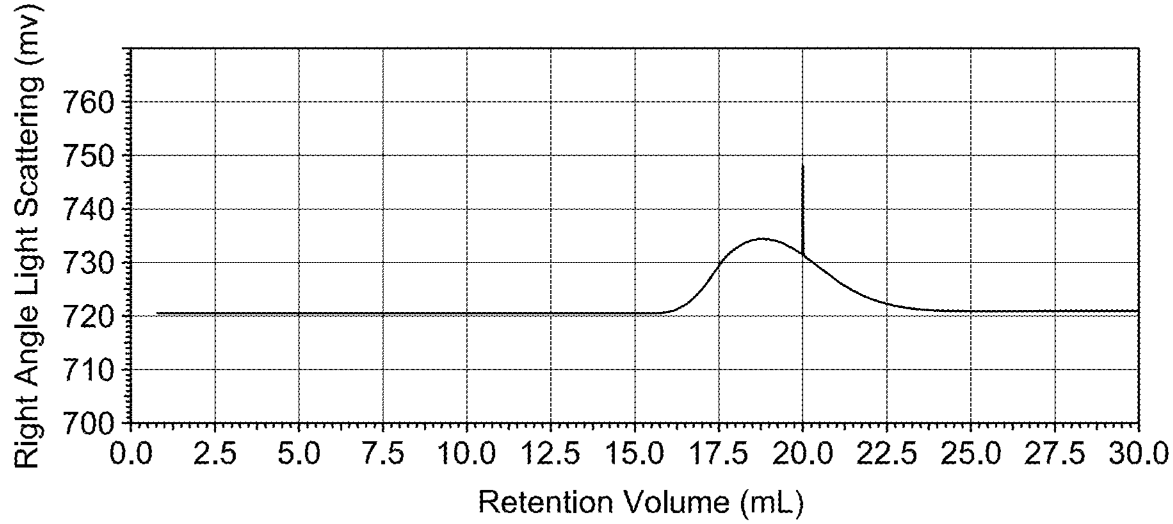
Figure 15A:
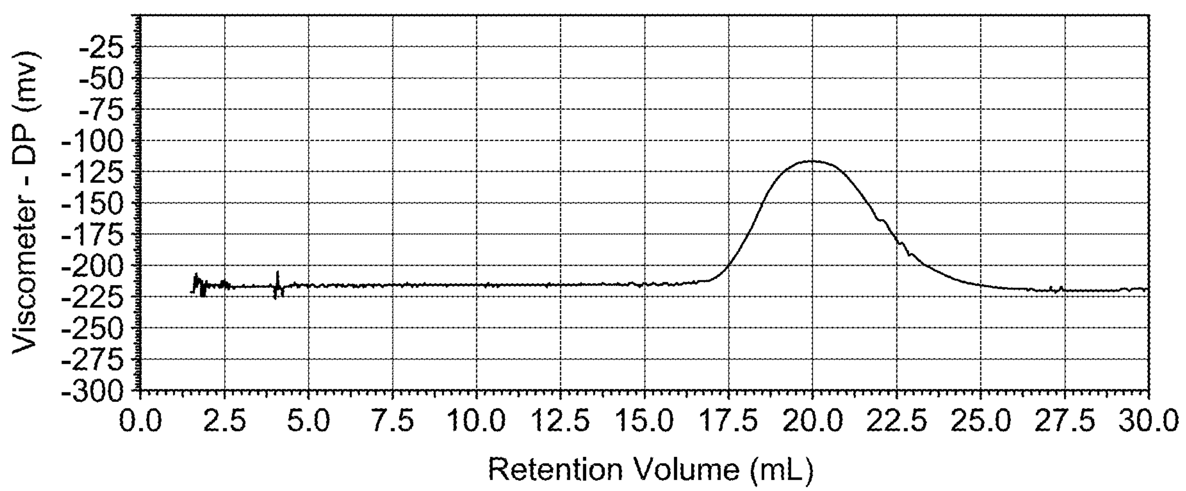
Figure 15B:
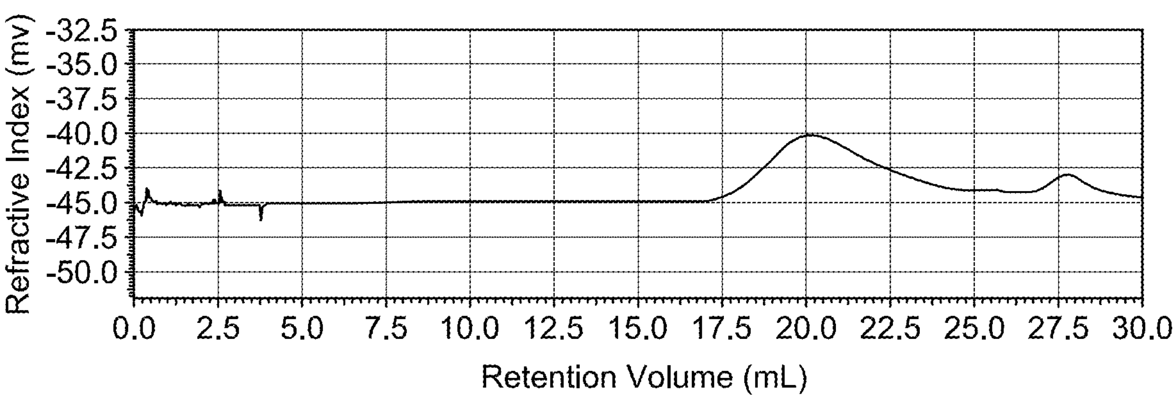
Figure 15B:
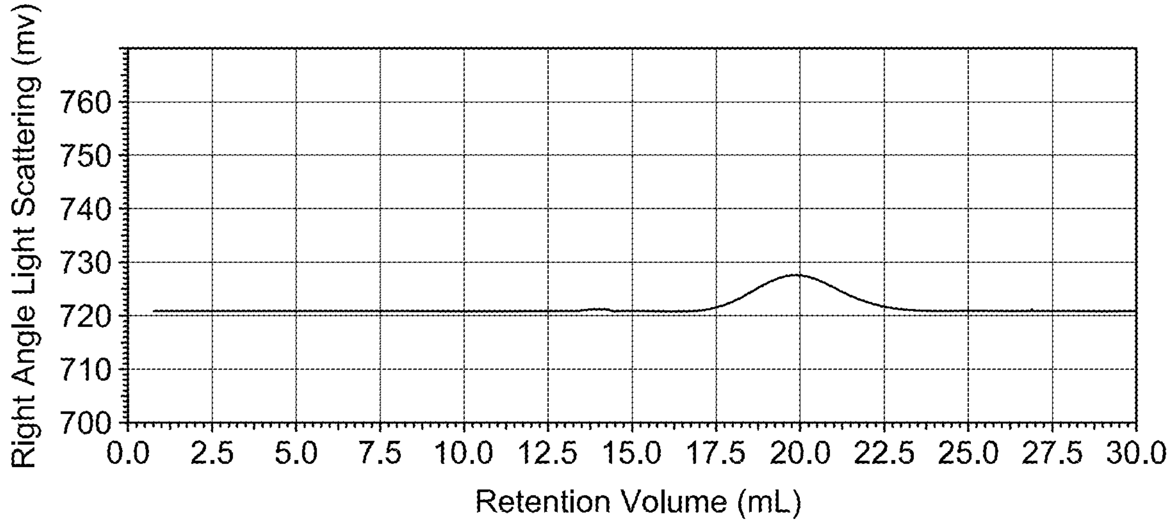
Figure 15B:
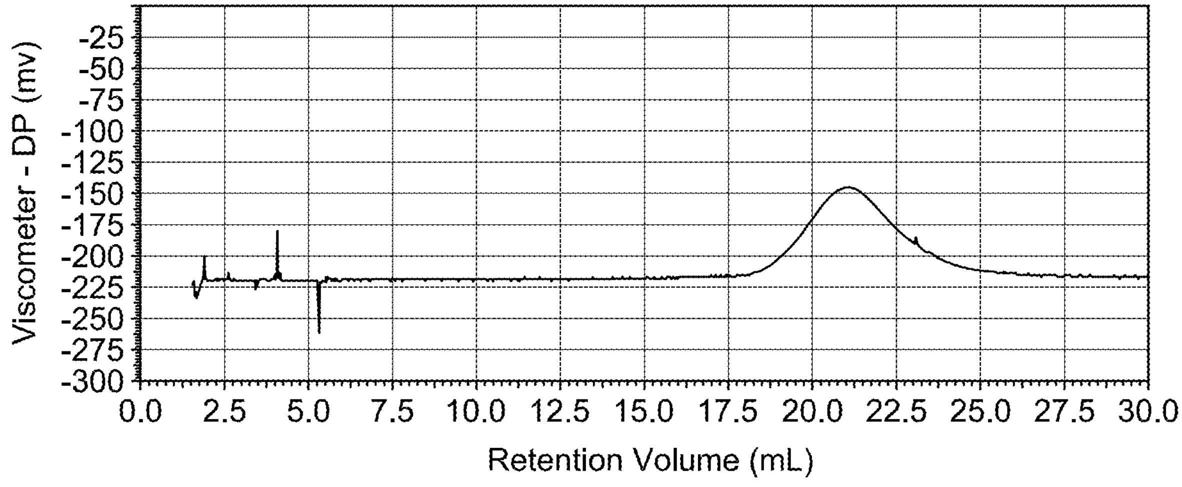
Figure 16A:
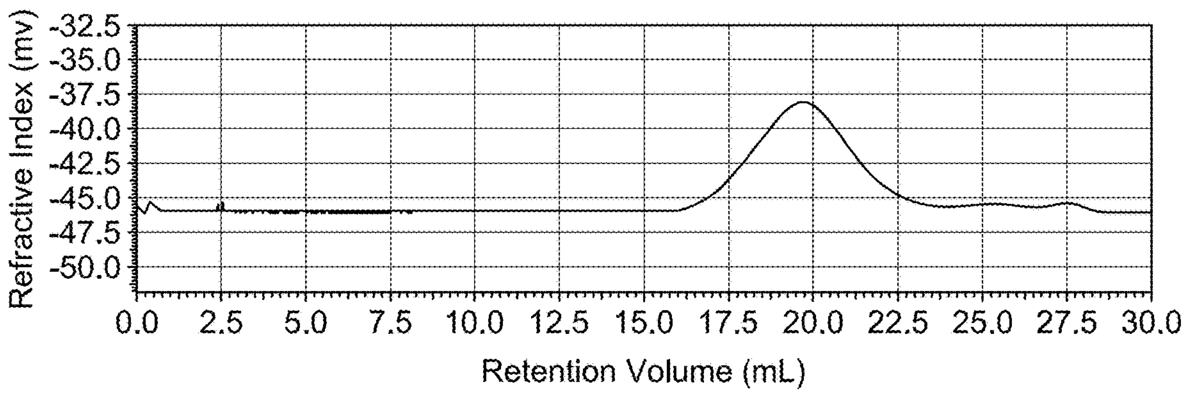
FIGS. 16A-16B. GPC traces of commercial LLDPE (FIG. 16A) and oxidized LLDPE (FIG. 16B).
Figure 16A:
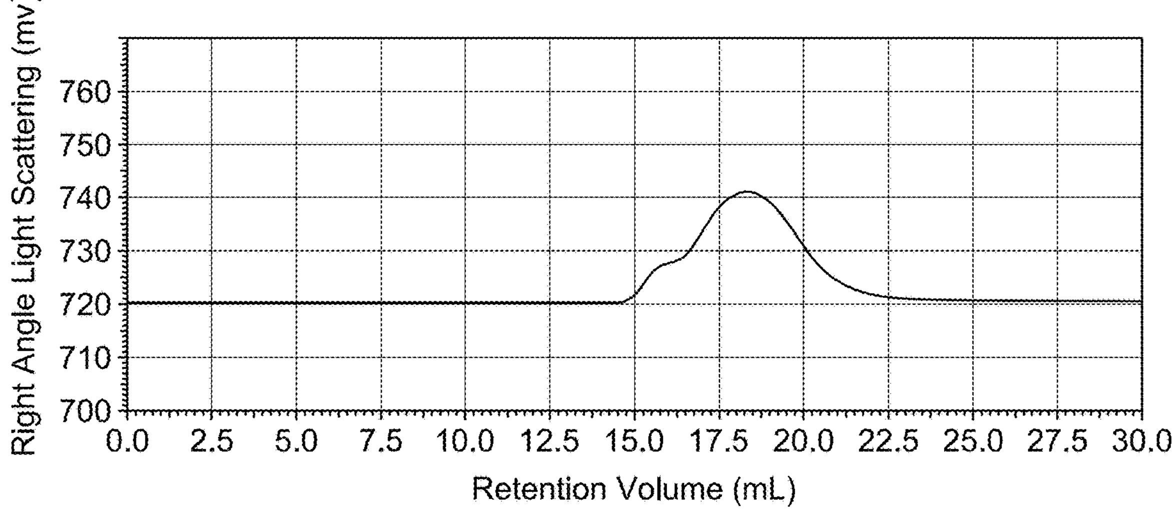
Figure 16A:
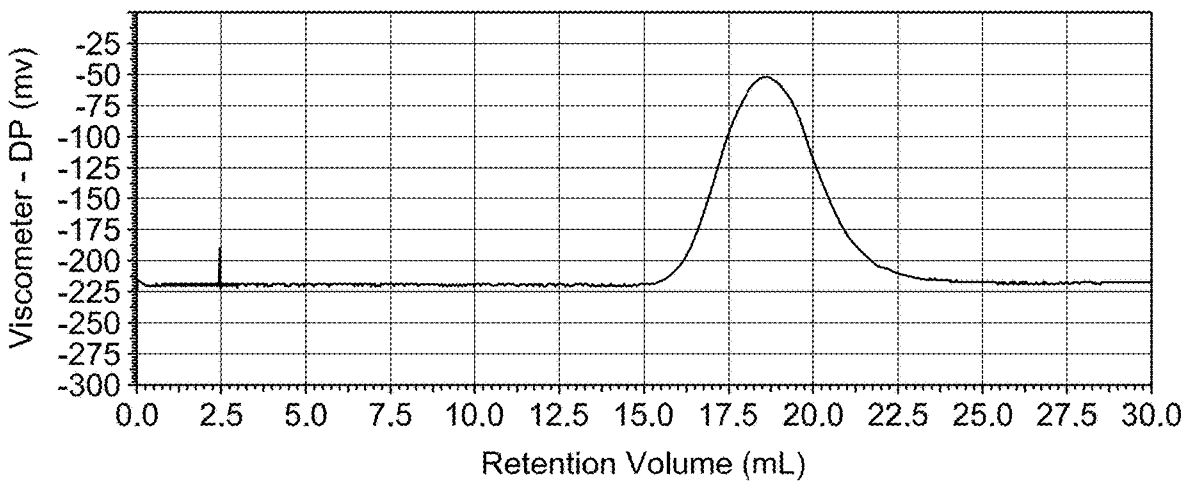
Figure 16B:
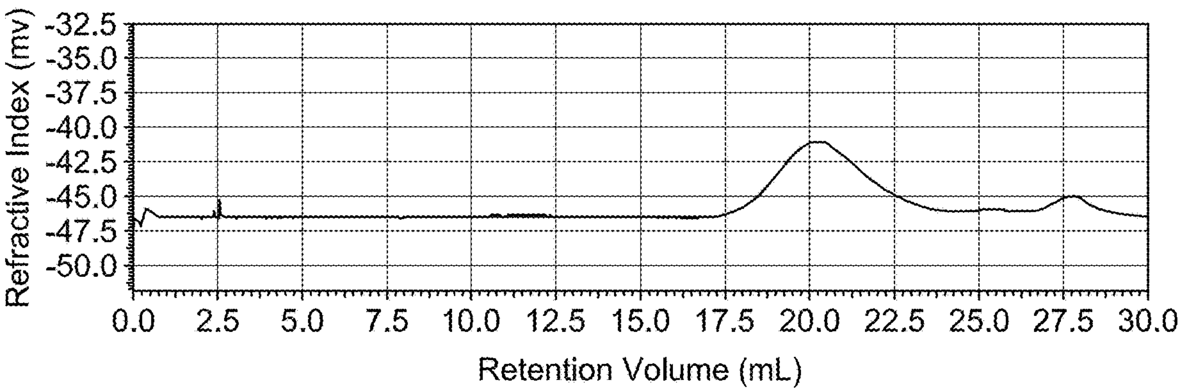
Figure 16B:
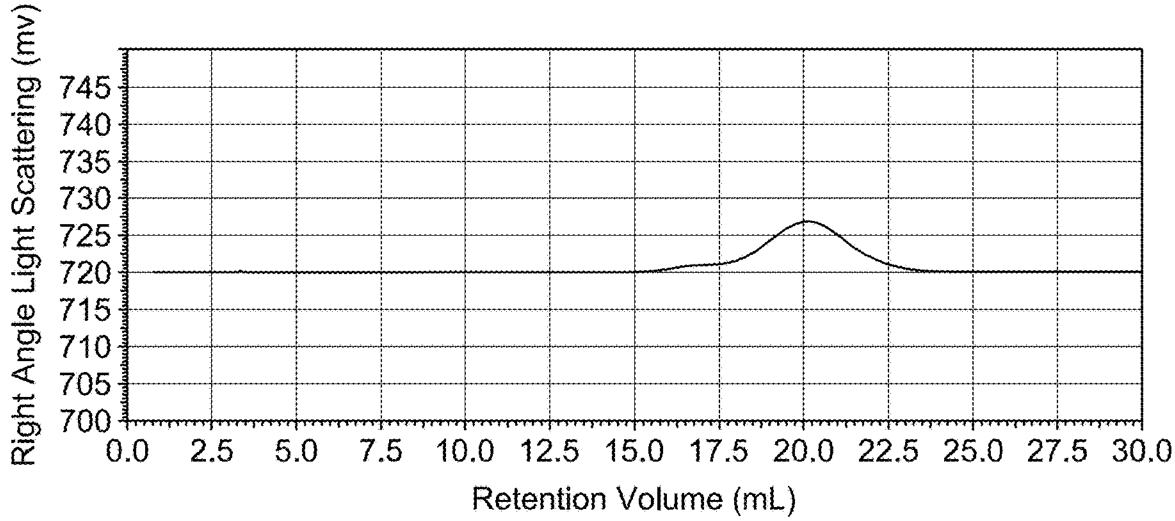
Figure 16B:
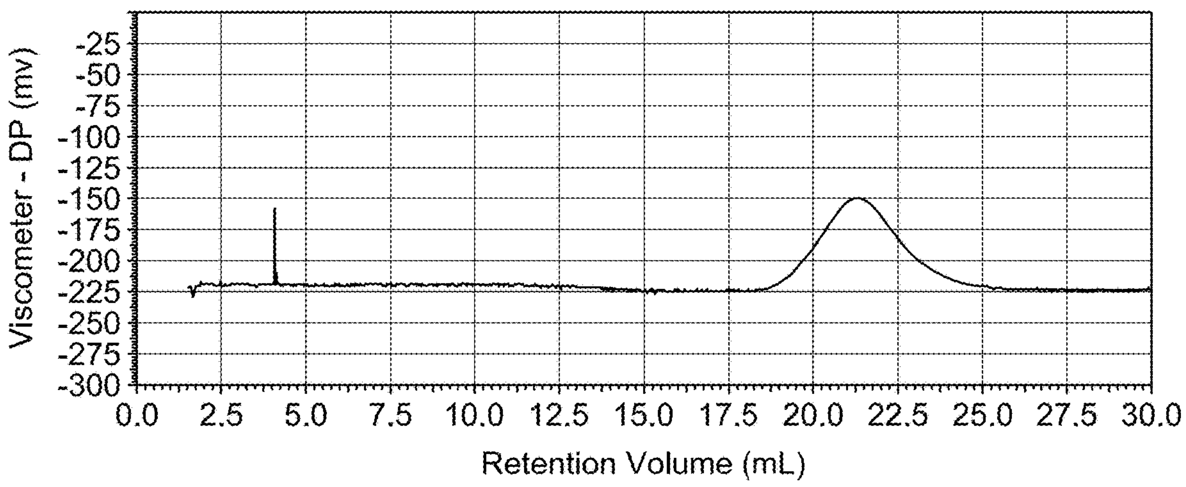

To elucidate the local chemical environment of carbonyl groups in the polymers, we characterized the oxidized LDPE by attenuated total reflection infrared spectroscopy. The carbonyl unit was unambiguously identified by the observed vibration at 1716 $cm^{-1}$ (FIG. 10), which is characteristic of isolated carbonyl groups separated by long methylene segments.[15] The absence of shoulders or multiple maxima indicated that there are no alternating ethylene-carbonyl dyads or blocks that are common in copolymers of ethylene and carbon monoxide.[15]

The decomposition onset temperatures ($T_d$) of these functionalized polyethylenes were evaluated using TGA (Table 1). In each case, $T_d$ was slightly lower than that of the precursor 3 but remained above 400° C. This high stability contrasts that of polyethylene-carbon monoxide copolymers containing alternating ethylene-carbonyl units ($T_d$<250° C.).[15] Thus, the distribution of functionality in polymer chains and resulting thermal properties of the oxidized polyethylenes generated by the current method differ from those formed by copolymerization methods.

Polyethylenes (HDPE 4 and LLDPE 5) with microstructures other than that of LDPE also underwent this ruthenium-catalyzed oxidation under conditions similar to those for 3 (entry 3, Table 1). Full conversion of N-oxide 2 was observed, and the levels of functionalization (3.9 and 4 mol %) of 4 and 5 were similar to that of oxidized 3 (FIG. 2). The molecular weight parameters of oxidized 4 and 5 were comparable to those of the same polymers prior to functionalization. Thus, this oxidation method modifies polyethylenes with varied microstructures, molecular weights, and thermal properties (FIG. 2), and such modifications can enable the use of polyolefins for applications requiring specific grades of functionalized polyethylenes. So far, atactic or isotactic polypropylenes have not undergone oxidation with these ruthenium catalysts to install functional groups, despite the presence of weaker tertiary C—H bonds. The origin of this phenomenon is unclear and will be the subject of future research.

Because the current method allows rapid access to a variety of oxidized polyethylenes, our catalysis provides opportunities to conduct systematic investigations of the properties of polyolefins containing randomly incorporated functional groups. Catalytic oxidation of LDPE 3 with varied ratios of N-oxide 2 to monomer units gave eight functionalized polyethylenes with degrees of functionalization from 0.7 to 3.8 mol %, (Tables 1 and 2). The plot of peak melting temperatures of these polymers against the degree of functionalization was linear ($T_m$=−2.55 $x_{FG}$+111, $R^2$=0.97, FIG. 3). This linear relationship is reminiscent of those observed by Wagener and Mecking for polyethylene-co-vinyl alcohol and polyketones with carbonyl units spaced by long methylene segments.[7b, 7d]

The relationship between peak melting temperatures and degree of functionalization can be fit to the simplified Sanchez-Eby model,[16]

$$T_m = T_m^0\left(1 - \frac{2\sigma}{\Delta H_u^0 L} - \frac{\varepsilon}{\Delta H_u^0} x_{FG}\right)$$

in which $T_m$ is the melting temperature of the functionalized polyethylene, $$T_m^0$$

is the equilibrium melting temperature of the homopolymer, $$\Delta H_u^0$$

is the enthalpy of fusion, σ is the surface energy, L is the lamellae thickness, ε is the enthalpy penalty for incorporating structural defects into the lamellar crystal, and $x_{FG}$ is the level of functionalization. The correlation is consistent with the size of hydroxyl and carbonyl groups being sufficiently small to be included in crystalline domains of polyethylenes. It is known that larger groups, such acetoxy, alkoxycarbonyl, and hydroxycarbonyl groups, are excluded to amorphous domains.[7b] We note that the slope of the linear correlation between melting temperature and level of functionalization for the oxyfunctionalized, branched polyethylenes derived from LDPE 3 is comparable to those of highly linear polyethylene-co-vinyl alcohols synthesized by ROMP and olefin hydrogenation and polyketones synthesized by ADMET and olefin hydrogenation (FIG. 3).[7b, 7d] This similarity is consistent with similar enthalpy penalties for incorporating hydroxyl and carbonyl groups into crystalline domains of linear and branched polyethylenes.

To assess the surface polarity of the oxidized polyethylenes, we prepared polymer films from HDPE 4 and a blend of 4 with oxidized 3 (FG=3.3 mol %, 9 wt %) and measured the static water contact angle. This angle for the blended film (93°) was about 4° smaller than that of the HDPE film (97°). This reduction indicates that the oxidation increases the surface polarity and will increase the interfacial interactions with polar media. This contact angle of the blend film is significantly larger than that of polyethylene treated with oxygen plasma (12-24°) or chromic acid in sulfuric acid (ca. 60°),[17] yet comparable to that of alternating ethylene-carbon monoxide copolymer (90°).[18]

In summary, we have reported the selective catalytic oxidation of polyethylenes with thousands of turnovers to incorporate hydroxyl and carbonyl groups without significant side reactions, such as chlorination, over-oxidation, and chain scission. This method enables direct access to a collection of oxidized polyethylenes with varied and precisely controlled levels of functionalization and microstructures, which allows quantitative analysis of the thermal properties of these new materials. The oxidation also increases the surface polarity of polyethylenes and incorporates two types of reactive functionality into polyethylenes. Such functionalization paves the way for further, orthogonal synthetic elaboration or crosslinking at two groups on any polyethylene.

REFERENCES FOR EXAMPLE 1

1. (a) Hopewell, J.; Dvorak, R.; Kosior, E., *Philosophical Transactions of the Royal Society B: Biological Sciences* 2009, 364 (1526), 2115-2126; (b) World Economic Forum, Ellen MacArthur Foundation and McKinsey & Company (2016); (c) Geyer, R.; Jambeck, J. R.; Law, K. L., *Science Advances* 2017, 3 (7), e1700782. 2. (a) Chung, T. C., *Functionalization of Polyolefins. Elsevier Science:* 2002; (b) Imbemon, L.; Norvez, S., *Eur. Polym. J.* 2016, 82, 347-376; (c) Röttger, M.; Domenech, T.; van der Weegen, R.; Breuillac, A.; Nicolaÿ, R.; Leibler, L., *Science* 2017, 356 (6333), 62; (d) Eagan, J. M.; Xu, J.; Di Girolamo, R.; Thurber, C. M.; Macosko, C. W.; LaPointe, A. M.; Bates, F. S.; Coates, G. W., *Science* 2017, 355 (6327), 814. 3. Klingsberg, A.; Baldwin, T.; Editors, *Encyclopedia of Polymer Science and Engineering, Vol. 13: Poly(phenylene Ether) to Radical Polymerization. 2nd Ed.* John Wiley & Sons: 1988; p 867 pp. 4. (a) Boffa, L. S.; Novak, B. M., *Chem. Rev.* 2000, 100 (4), 1479-1494; (b) Nakamura, A.; Ito, S.; Nozaki, K., *Chem. Rev.* 2009, 109 (11), 5215-5244. 5. (a) Johnson, L. K.; Mecking, S.; Brookhart, M., *J Am. Chem. Soc.* 1996, 118 (1), 267-268; (b) Kochi, T.; Noda, S.; Yoshimura, K.; Nozaki, K., *J Am. Chem. Soc.* 2007, 129 (29), 8948-8949; (c) Luo, S.; Jordan, R. F., *J Am. Chem. Soc.* 2006, 128 (37), 12072-12073; (d) Ito, S.; Munakata, K.; Nakamura, A.; Nozaki, K., *J. Am. Chem. Soc.* 2009, 131 (41), 14606-14607; (e) Carrow, B. P.; Nozaki, K., *J. Am. Chem. Soc.* 2012, 134 (21), 8802-8805; (f) Zhang, W.; Waddell, P. M.; Tiedemann, M. A.; Padilla, C. E.; Mei, J.; Chen, L.; Carrow, B. P., *J. Am. Chem. Soc.* 2018, 140 (28), 8841-8850. 6. (a) Hillmyer, M. A.; Laredo, W. R.; Grubbs, R. H., *Macromolecules* 1995, 28 (18), 6311-6316; (b) Watson, M. D.; Wagener, K. B., *Macromolecules* 2000, 33 (9), 3196-3201; (c) Watson, M. D.; Wagener, K. B., *Macromolecules* 2000, 33 (24), 8963-8970. 7. (a) Sworen, J. C.; Smith, J. A.; Wagener, K. B.; Baugh, L. S.; Rucker, S. P., *J. Am. Chem. Soc.* 2003, 125 (8), 2228-2240; (b) Lehman, S. E.; Wagener, K. B.; Baugh, L. S.; Rucker, S. P.; Schulz, D. N.; Varma-Nair, M.; Berluche, E., *Macromolecules* 2007, 40 (8), 2643-2656; (c) Boz, E.; Nemeth, A. J.; Wagener, K. B.; Jeon, K.; Smith, R.; Nazirov, F.; Bockstaller, M. R.; Alamo, R. G., *Macromolecules* 2008, 41 (5), 1647-1653; (d) Ortmann, P.; Wimmer, F. P.; Mecking, S., *ACS Macro Letters* 2015, 4 (7), 704-707. 8. (a) Boaen, N. K.; Hillmyer, M. A., *Chem. Soc. Rev.* 2005, 34 (3), 267-275; (b) Franssen, N. M. G.; Reek, J. N. H.; de Bruin, B., *Chem. Soc. Rev.* 2013, 42 (13), 5809-5832; (c) Williamson, J. B.; Lewis, S. E.; Johnson III, R. R.; Manning, I. M.; Leibfarth, F., *Angew. Chem., Int. Ed.* 2018, 0 (ja). 9. (a) Jagur-Grodzinski, J., *Prog. Polym. Sci.* 1992, 17 (3), 361-415; (b) Singh, R. P., *Prog. Polym. Sci.* 1992, 17 (2), 251-281; (c) Desai, S. M.; Singh, R. P., Surface Modification of Polyethylene. In *Long Term Properties of Polyolefins*, Albertsson, A.-C., Ed. Springer Berlin Heidelberg: Berlin, Heidelberg, 2004; pp 231-294; (d) Moad, G., *Prog. Polym. Sci.* 1999, 24 (1), 81-142; (e) Passaglia, E.; Coiai, S.; Augier, S., *Prog. Polym. Sci.* 2009, 34 (9), 911-947. 10. (a) Williamson, J. B.; Czaplyski, W. L.; Alexanian, E. J.; Leibfarth, F. A., *Angew. Chem., Int. Ed.* 2018, 57 (21), 6261-6265; (b) Williamson, J. B.; Na, C. G.; Johnson, R. R.; Daniel, W. F. M.; Alexanian, E. J.; Leibfarth, F. A., *J Am. Chem. Soc.* 2019, 141 (32), 12815-12823. 11. (a) Kondo, Y.; Garcia-Cuadrado, D.; Hartwig, J. F.; Boaen, N. K.; Wagner, N. L.; Hillmyer, M. A., *J Am. Chem. Soc.* 2002, 124 (7), 1164-1165; (b) Bae, C.; Hartwig, J. F.; Boaen Harris, N. K.; Long, R. O.; Anderson, K. S.; Hillmyer, M. A., *J Am. Chem. Soc.* 2005, 127 (2), 767-776; (c) Bae, C.; Hartwig, J. F.; Chung, H.; Harris, N. K.; Switek, K. A.; Hillmyer, M. A., *Angew. Chem., Int. Ed.* 2005, 44 (39), 6410-6413. 12. (a) Boaen, N. K.; Hillmyer, M. A., *Macromolecules* 2003, 36 (19), 7027-7034; (b) Diaz-Requejo, M. M.; Wehrmann, P.; Leatherman, M. D.; Trofimenko, S.; Mecking, S.; Brookhart, M.; Pérez, P. J., *Macromolecules* 2005, 38 (12), 4966-4969. 13. Bunescu, A.; Lee, S.; Li, Q.; Hartwig, J. F., *ACS Central Science* 2017, 3 (8), 895-903. 14. (a) Groves, J. T.; Bonchio, M.; Carofiglio, T.; Shalyaev, K., *J Am. Chem. Soc.* 1996, 118 (37), 8961-8962; (b) Wang, C.; Shalyaev, K. V.; Bonchio, M.; Carofiglio, T.; Groves, J. T., *Inorg. Chem.* 2006, 45 (12), 4769-4782. 15.5 Soomro, S. S.; Cozzula, D.; Leitner, W.; Vogt, H.; Müller, T. E., *Polym. Chem.* 2014, 5 (12), 3831-3837. 16. (a) Sanchez, I. C.; Eby, R. K., *Macromolecules* 1975, 8 (5), 638-641; (b) Crist, B., *Polymer* 2003, 44 (16), 4563-4572. 17. (a) Morra, M.; Occhiello, E.; Gila, L.; Garbassi, F., *The Journal of Adhesion* 1990, 33 (1-2), 77-88; (b) Holmes-Farley, S. R.; Reamey, R. H.; McCarthy, T. J.; Deutch, J.; Whitesides, G. M., *Langmuir* 1985, 1 (6), 725-740. 18. Garbassi, F.; Sommazzi, A.; Meda, L.; Mestroni, G.; Sciutto, A., *Polymer* 1998, 39 (6), 1503-1506.

Example 2: Materials and Methods

General remarks. All reactions were conducted under air unless otherwise noted. Solvents were purchased from Aldrich or Fisher and used as received. All chemical reagents were used as received from Aldrich, Alfa Aesar, Strem, and Acros unless otherwise noted. Fourier-transform infrared (FT-IR) spectra were obtained on a Bruker Vertex 80 spectrometer in the attenuated total reflection or transmission mode. $^1H$, $^{13}C\{^1H\}$, nuclear magnetic resonance spectra (NMR) were obtained on a Bruker 600 MHz spectrometer, and values reported in ppm (δ) referenced against the resonance of residual solvent ($^1H$ NMR: $CDCl_3$, 7.26 ppm; $C_2D_2Cl_4$, 6.00 ppm; $^{13}C\{^1H\}$NMR: $CDCl_3$, 77.16 ppm; $C_2D_2Cl_4$, 73.78 ppm). Spin-spin coupling are described as singlet (s), doublet (d), triplet (t), quartet (q), quintet (quint), broad (br) or multiplet (m), with coupling constants (J) in Hz. Gel-permeation chromatography was performed at 150° C. in 1,2-dichlorobenzene at 1.0 mL/min on a Viscotek HTGPC Modular 350A equipped with three SEC columns (Viscotek CLM6210 columns) and viscosity, refractive index, and right-angle light-scattering detectors. Differential scanning calorimetry (DSC) was performed on a TA Q200 instrument, and thermogravimetric analysis (TGA) was performed on a TA Q5000 instrument under air. Contact angles were measured using a VCA Optima Goniometer (AST Products, Inc).

Representative protocol (entry 3, Table 1). LDPE 3 (56 mg, 2.0 mmol) was dissolved in DCE (2 mL) at 120° C. and then cooled to room temperature. N-oxide 2 (33 mg, 0.20 mmol) and 0.05 mol %, 0.1 mL of a 1 mM stock solution, prepared from 2.2 mg (2.0 μmol) of catalyst 1 in 2 mL of DCM, were added, and the mixture was stirred. The reaction was heated at 120° C. for 0.5 h. After cooling the reaction to room temperature, an aliquot of the crude mixture was removed and diluted with $CDCl_3$ and analyzed by $^1H$ NMR spectroscopy. The remaining reaction mixture was poured into MeOH (10 mL) while stirring. The precipitated polymer was filtered, air dried, and collected in a vial (20 mL). The polymer was dried further in a vacuum oven at 70° C. for 12 h. A portion of the purified polymer (ca. 10 mg) was dissolved in $C_2D_2Cl_4$ (0.4 mL) in an NMR tube at 140° C., and high-temperature NMR spectra of the sample were collected at 100° C.

Oxidized LDPE: $^1H$ NMR (600 MHz, $C_2D_2Cl_4$) δ 3.63 (br, CHOH), 2.40 (t, J=7.4 Hz, $CH_2C(O)CH_2$), 1.61 (br), 1.45 (br), 1.34 (br), 0.98-0.88 (m). $^{13}C$ NMR (151 MHz, $C_2D_2Cl_4$) δ 71.8 (CHOH), 42.5 ($CH_2C(O)CH_2$), 37.5, 33.9, 31.7, 29.9, 29.4, 29.1, 28.9, 26.7, 25.4, 23.8, 22.9, 22.4, 13.7.

Determination of degrees of functionalization by $^1H$ NMR spectra. The integration of peaks between 1.7 and 0.7 ppm were set to total 4 protons (per monomer unit). The integration of the methine proton next to hydroxyl group that appears at 3.6 ppm was used to determine the level of functionalization for hydroxyl group (1 proton per alcohol unit). The integration of the methylene protons next to carbonyl group that appear at 2.4 ppm was used to determine the level of functionalization for carbonyl group (4 protons per ketone unit).

Synthesis of oxyfunctionalized polyethylenes.

Protocol for the oxidation of HDPE and LLDPE (FIG. 2). HDPE 4 or LLDPE 5 (0.28 g, 10 mmol) was dissolved in DCE (10 mL) at 120° C. and then cooled to room temperature. N-oxide 2 (0.16 g, 1.0 mmol) and 0.05 mol %, 0.5 mL of a 1 mM stock solution, prepared from 2.2 mg (2.0 µmol) of catalyst 1 in 2 mL of DCM, were added, and the mixture was stirred. The reaction was heated at 120° C. for 0.5 h. After cooling the reaction to room temperature, an aliquot of the crude mixture was removed and diluted with $CDCl_3$ and analyzed by $^1H$ NMR spectroscopy. The remainder of the reaction mixture was poured into MeOH (50 mL) while stirring. The precipitated polymer was filtered, air dried, and collected in a vial (20 mL). The polymer was dried further in the vacuum oven at 70° C. for 12 h. A portion of the purified polymer (ca. 10 mg) was dissolved in $C_2D_2Cl_4$ (0.4 mL) in an NMR tube at 140° C., and high-temperature NMR spectra of the sample were collected at 100° C.

Oxidized HDPE: $^1H$ NMR (600 MHz, $C_2D_2Cl_4$) δ 3.63 (br, CHOH), 2.40 (t, J=7.4 Hz, $CH_2C(O)CH_2$), 1.64-1.60 (m), 1.47 (br), 1.34 (br), 0.98-0.93 (m). $^{13}C$ NMR (151 MHz, $C_2D_2Cl_4$) δ 71.8 (CHOH), 42.5 ($CH_2C(O)CH_2$), 37.4, 29.4, 29.2, 29.1, 26.7, 25.4, 23.8.

Oxidized LLDPE: $^1H$ NMR (600 MHz, $C_2D_2Cl_4$) δ 3.62 (br, CHOH), 2.40 (t, J=7.4 Hz, $CH_2C(O)CH_2$), 1.61 (br), 1.46 (br), 1.34 (br), 0.94-0.89 (m). $^{13}C$ NMR (151 MHz, $C_2D_2Cl_4$) δ 71.8 (CHOH), 42.5 ($CH_2C(O)CH_2$), 39.0, 38.9, 37.4, 33.4, 29.9, 29.5, 29.4, 29.2, 29.1, 26.7, 26.1, 25.4, 23.8, 10.8.

Representative protocol for the oxidation of LDPE 3 with varied stoichiometry of 2 (entry 1, Table 2). LDPE 3 (0.28 g, 10 mmol) was dissolved in DCE (10 mL) at 120° C. and then cooled to room temperature. N-Oxide 2 (0.016 g, 0.10 mmol) and 0.5 mol %, 0.5 mL of a 1 mM stock solution, prepared from 2.2 mg (2.0 µmol) of catalyst 1 in 2 mL of DCM, were added, and the mixture was stirred. The reaction was heated at 120° C. for 0.5 h. After cooling the reaction to room temperature, an aliquot of the crude mixture was removed and diluted with $CDCl_3$ and analyzed by $^1H$ NMR spectroscopy. The remainder of the reaction mixture was poured into MeOH (50 mL) while stirring. The precipitated polymer was filtered, air dried, and collected in a vial (20 mL). The polymer was dried further in the vacuum oven at 70° C. for 12 h. A portion of the purified polymer (ca. 10 mg) was dissolved in $C_2D_2Cl_4$ (0.4 mL) in an NMR tube at 140° C., and high-temperature NMR spectra of the sample were collected at 100° C.

TABLE 2

Figure 3:
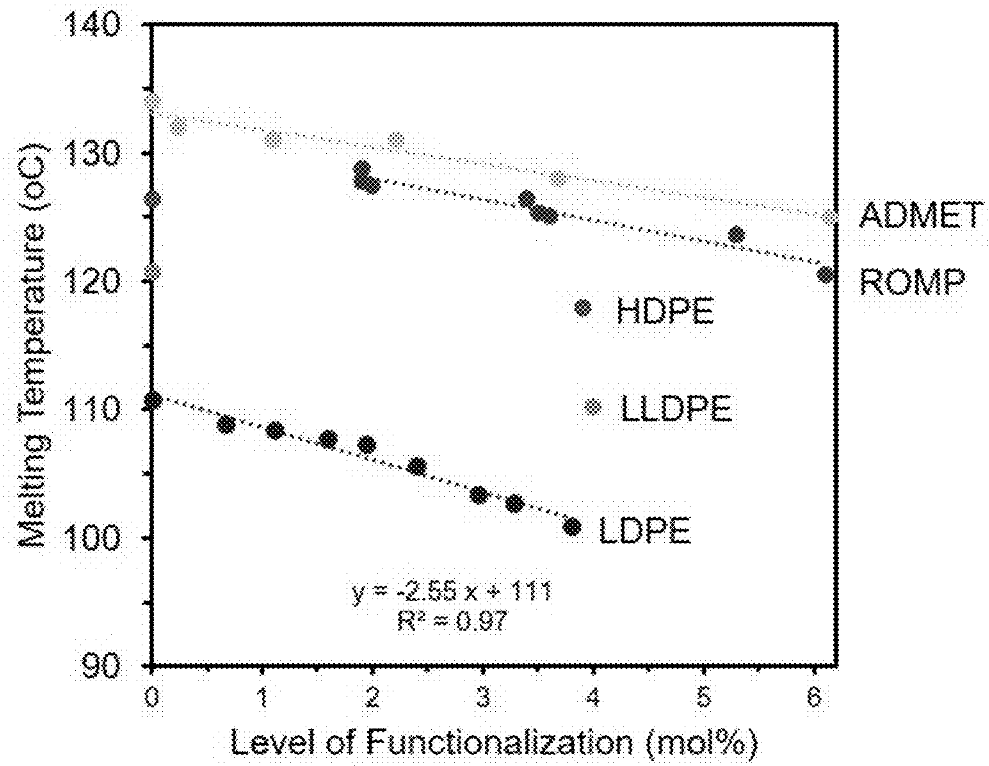
FIG. 3. Peak melting temperatures of oxidized polyethylenes with varied degrees of functionalization synthesized from LDPE 3, HDPE 4, and LLDPE 5, polyethylene-co-vinyl alcohol by ROMP, and polyketone by ADMET.

Oxidation of low-density polyethylene 3 with varied stoichiometry of 2 (FIG. 3).

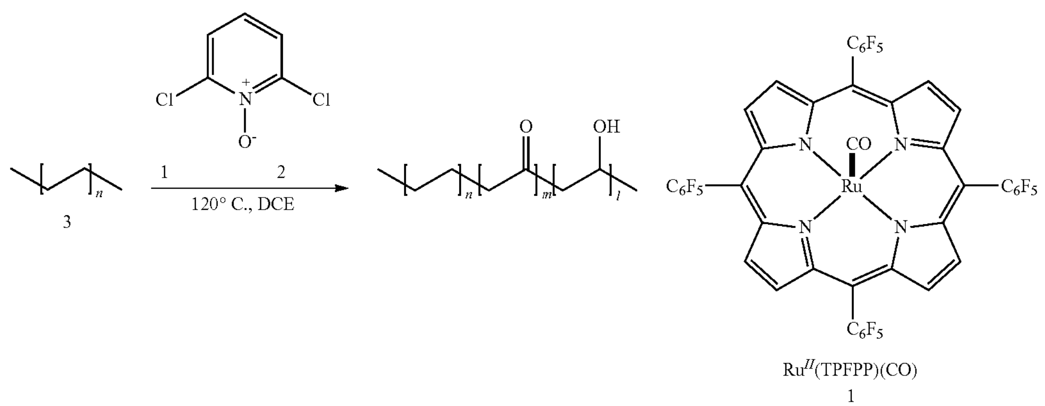

3

$Ru^{II}$(TPFPP)(CO)
1

| Entry | [2]/[3] | Conversion of 2 (%) | Yield of oxidation[b] (%) | l/n (mol %) | m/n (mol %) | FG[c] (mol %) | $T_m{}^d$ (° C.) | $T_d{}^d$ (° C.) |
|---|---|---|---|---|---|---|---|---|
| 1 | 0.01 | 100% | 100 | 0.4 | 0.3 | 0.7 | 108.8 | 426.4 |
| 2 | 0.02 | 100% | 80 | 0.6 | 0.5 | 1.1 | 108.5 | 437.5 |
| 3 | 0.03 | 100% | 80 | 0.8 | 0.8 | 1.6 | 107.8 | 433.6 |

TABLE 2-continued

Oxidation of low-density polyethylene 3 with varied stoichiometry of 2 (FIG. 3).

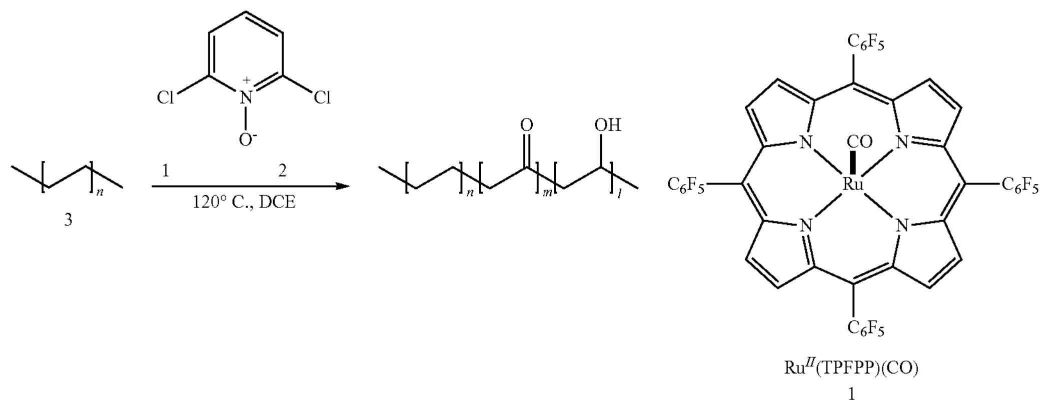

3

$Ru^{II}$(TPFPP)(CO)

1

| Entry | [2]/[3] | Conversion of 2 (%) | Yield of oxidation[b] (%) | l/n (mol %) | m/n (mol %) | FG[c] (mol %) | $T_m$[d] (° C.) | $T_d$[d] (° C.) |
|---|---|---|---|---|---|---|---|---|
| 4 | 0.04 | 100% | 75 | 0.8 | 1.1 | 1.9 | 107.3 | 435.3 |
| 5 | 0.06 | 100% | 62 | 1.1 | 1.3 | 2.4 | 105.6 | 419.6 |

[a]Low-density polyethylene 3 (280 mg, 10 mmol) was dissolved in DCE (10 mL) in a 20 mL vial at 120° C. and then cooled. 2 and 1 (0.5 μmol, 0.5 mL) as a stock solution (2.2 mg, 2 μmol) in DCM (2 mL) were added, and the mixture was heated to the 120° C. for 0.5 h.

[b]Yield of oxidation = (l/n + 2 m/n)/([2]/[3]).

[c]Level of functionalization (FG) = l/n + m/n.

[d]Thermal properties of functionalized polyethylenes were measured by differential scanning calorimetry (DSC) and thermogravimetric analysis (TGA).

TABLE 3

Melting temperatures and degrees of functionalization of polyethylene-co-vinyl alcohol prepared by ROMP and hydrogenation and of polyketone prepared by ADMET and hydrogenation from the literature (FIG. 3).[1]

| | Polyketone | | Polyethylene-co-vinyl alcohol | |
|---|---|---|---|---|
| Entry | FG (mol %) | $T_m$ (° C.) | FG (mol %) | $T_m$ (° C.) |
| 1 | 0.0 | 134 | 1.9 | 128.8 |
| 2 | 0.2 | 132 | 1.9 | 127.8 |
| 3 | 1.1 | 131 | 2.0 | 127.4 |
| 4 | 2.2 | 131 | 3.4 | 126.5 |
| 5 | 3.7 | 128 | 3.5 | 125.3 |
| 6 | 6.1 | 125 | 3.6 | 125.1 |
| 7 | — | — | 5.3 | 123.7 |
| 8 | — | — | 6.1 | 120.5 |

Figure 4A:
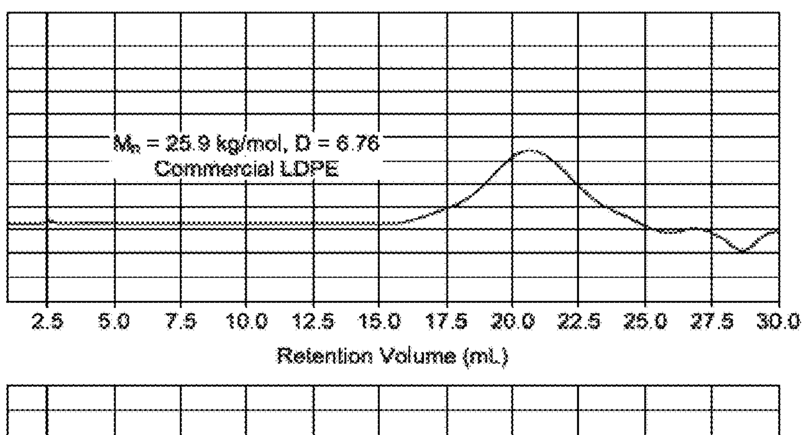
FIGS. 4A-4C. Overlays of GPC traces of functionalized and unmodified LDPE (FIG. 4A), HDPE (FIG. 4B), and LLDPE (FIG. 4C).
Figure 4A:
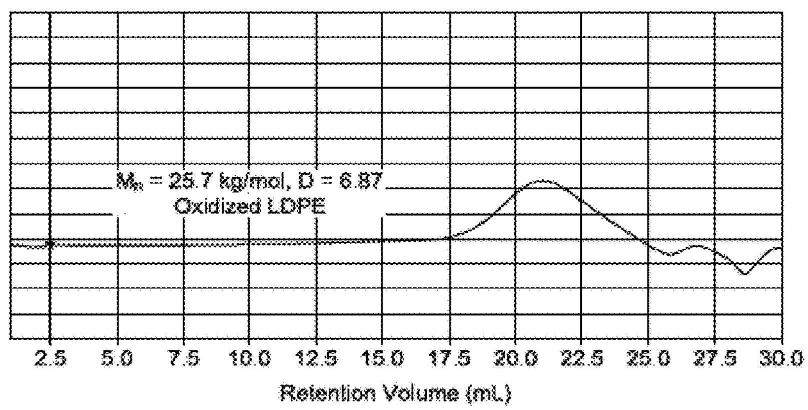
Figure 4B:
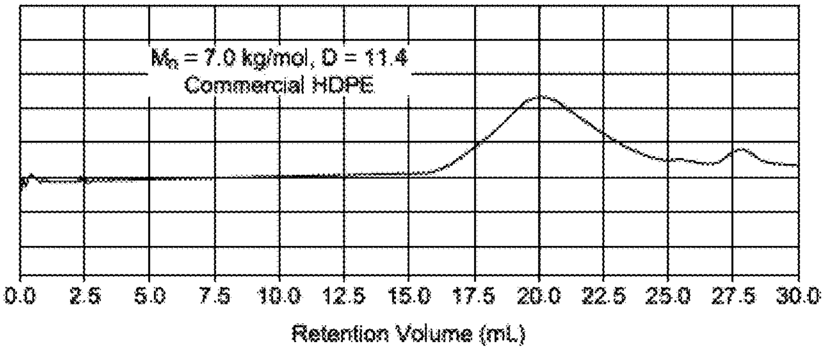
Figure 4B:
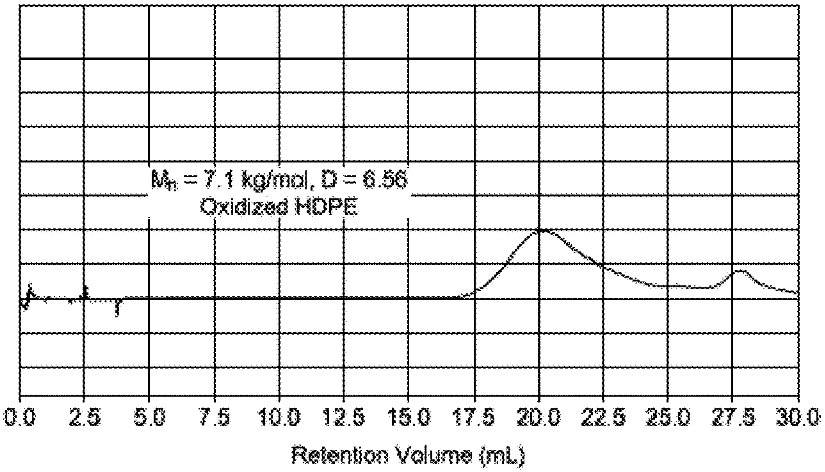
Figure 4C:
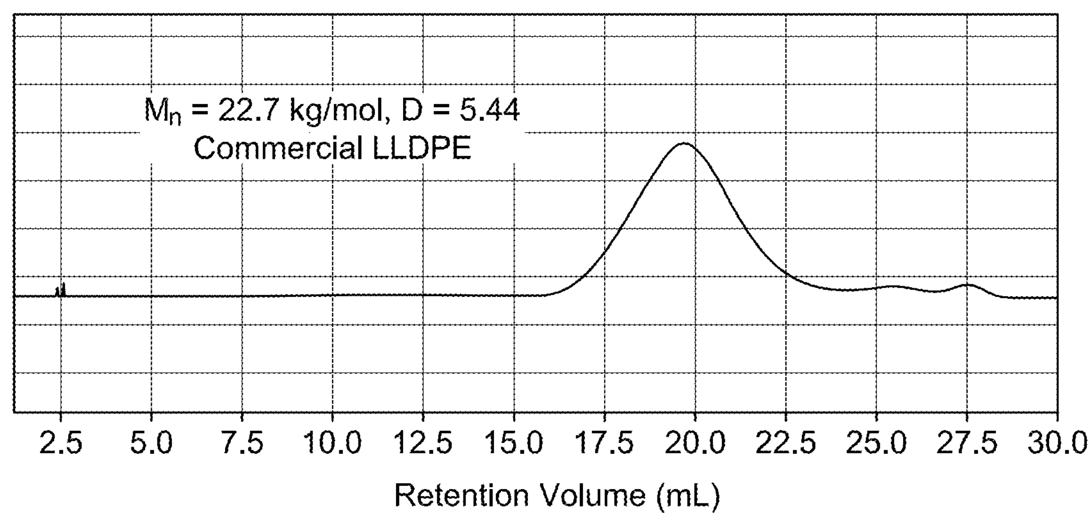
Figure 4C:
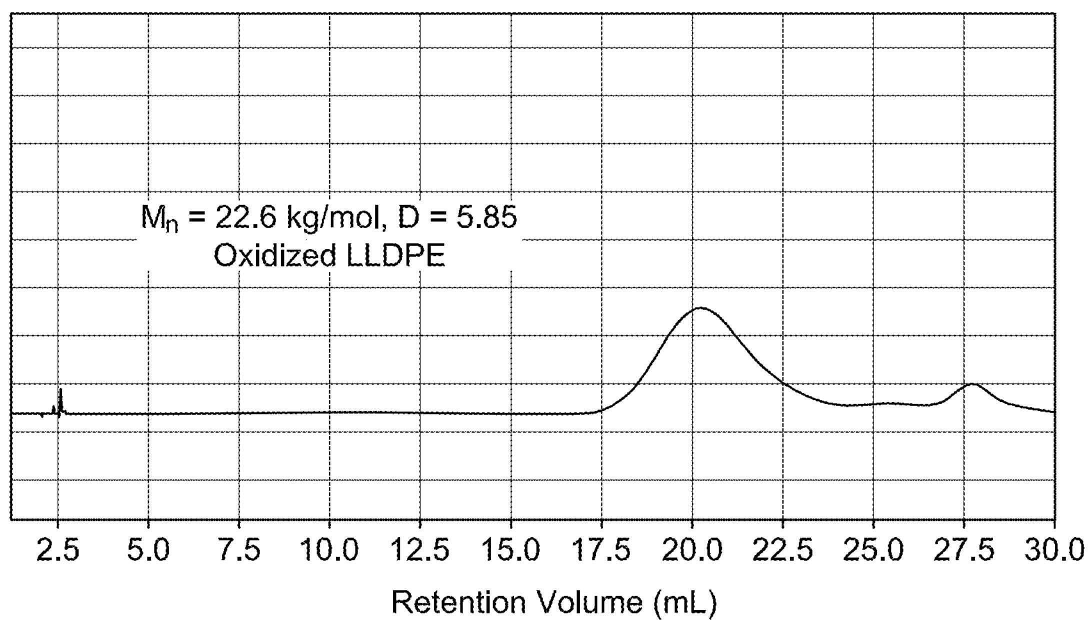

Gel permeation chromatography. Each sample was dissolved in ODCB (ca. 3 mg/mL) at 140° C., and each solution (0.2 mL) was injected for GPC analysis (FIGS. 4A-4C).

Thermogravimetric analysis. Each sample (ca. 5 mg) was heated from 40° C. to 600° C. at a rate of 10° C./min. Decomposition onset temperatures ($T_d$) were measured at 5% mass loss (FIGS. 5A-5C).

Figure 6B:
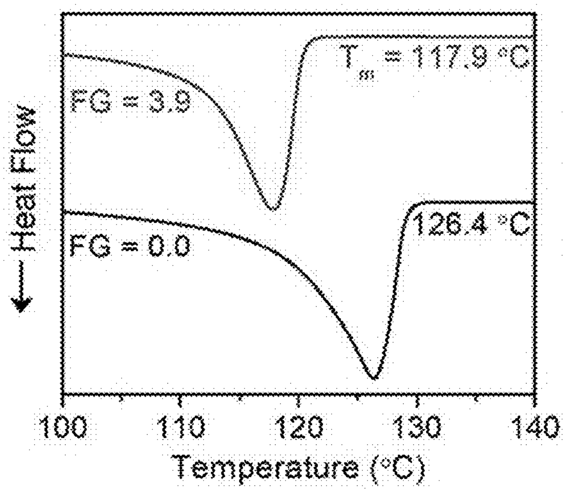
Figure 6C:
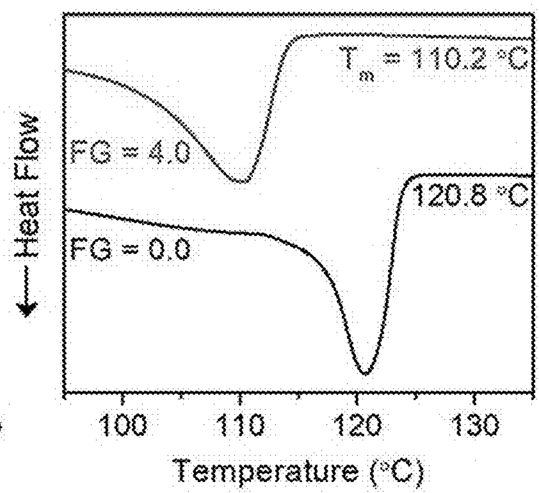
Figure 7A:
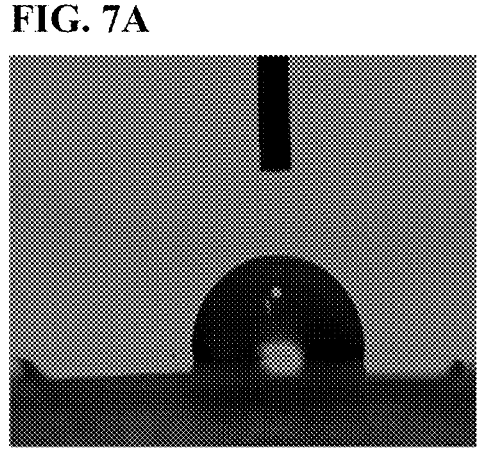
FIGS. 7A-7B. Selected pictures of water droplets on films made from HDPE (FIG. 7A) and the polymer blend (FIG. 7B).
Figure 7B:
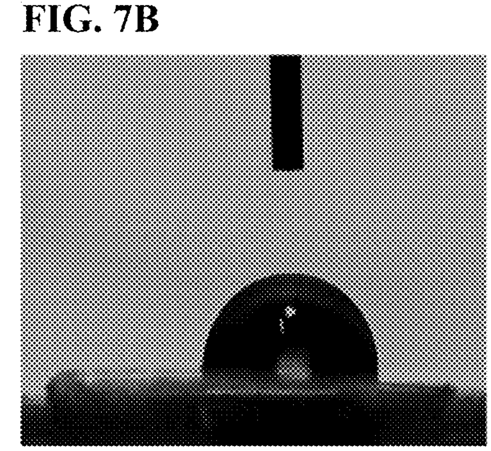
Figure 8:
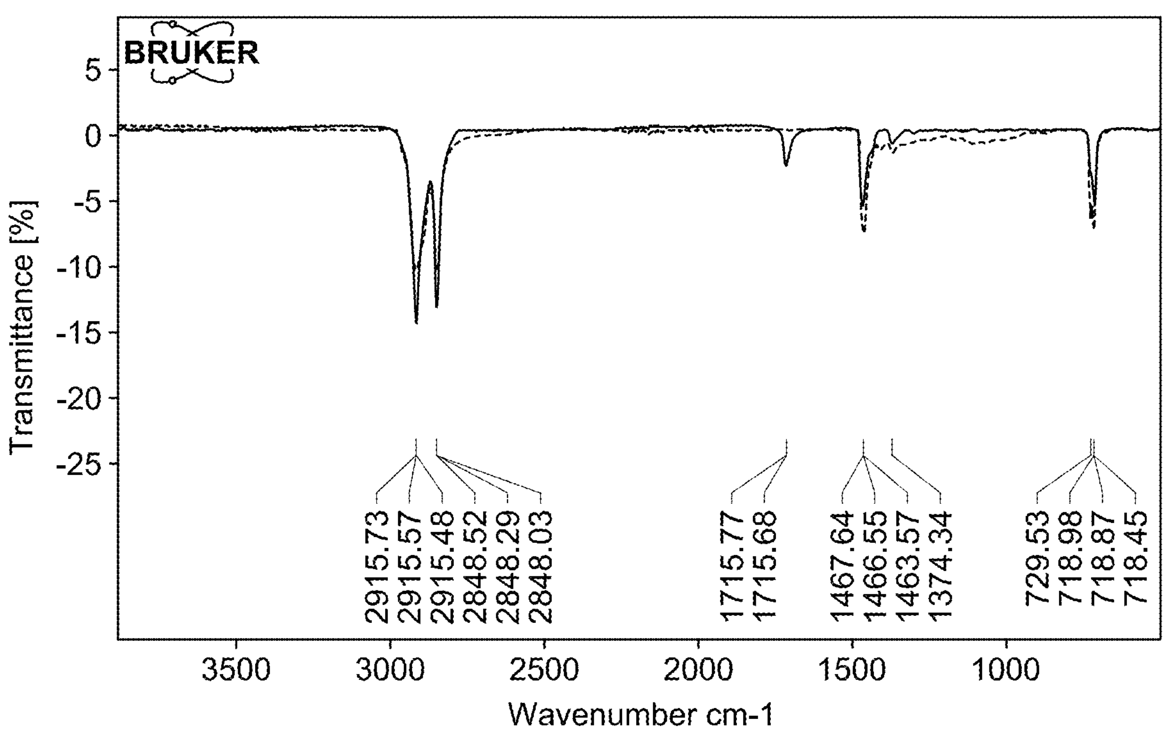
FIG. 8. ATR-FT-IR spectrum of oxidized LDPE (DCE; ODCB/DCM) and unmodified LDPE.

Differential scanning calorimetry. Each sample (ca. 5 mg) was placed in a hermitic aluminum pan, sealed, and scanned at a rate of 10° C./min from 40° C. to 200° C. Peak melting temperatures ($T_m$) were recorded at the second scan (FIGS. 6A-6C).

Figure 9:
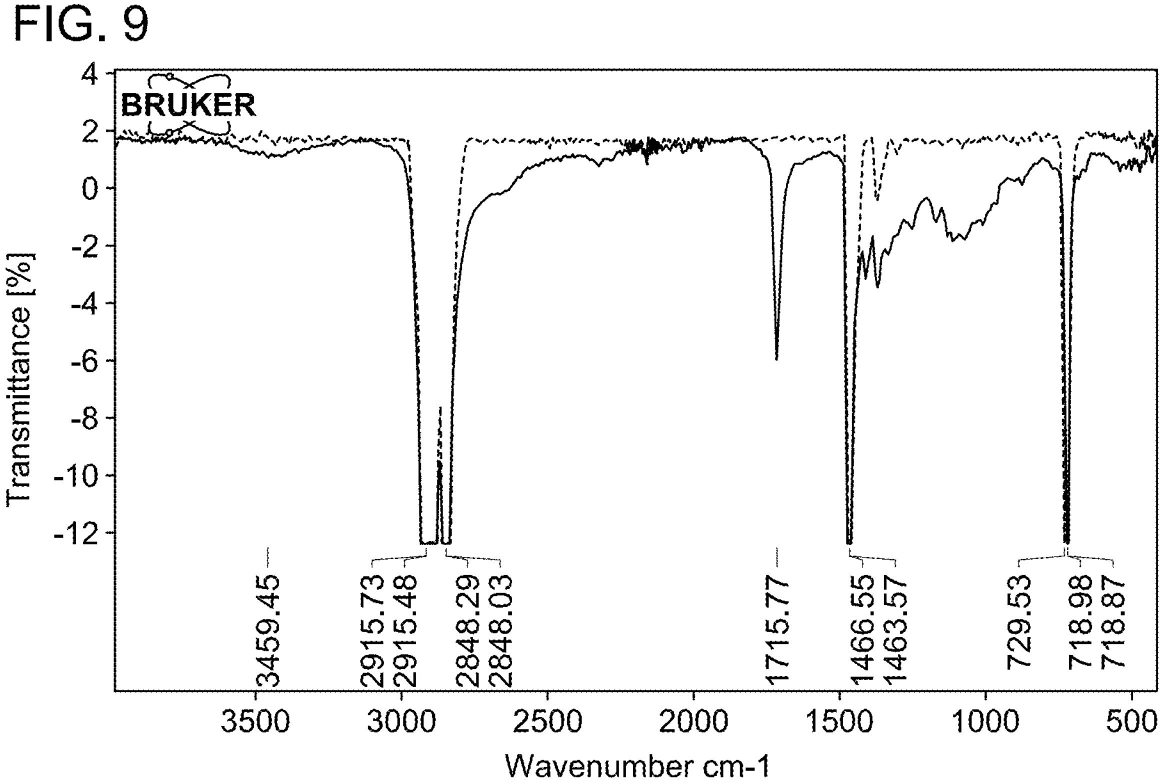
FIG. 9. Zoomed-in FT-IR spectrum of oxidized LDPE (darker, bottom) and unmodified LDPE (lighter, top).

Contact angle measurements. Polymer films from HDPE (50 mg) and a blend of HDPE (50 mg) and oxidized LDPE (5 mg, FG=3.3 mol %, 9 wt %) were prepared by drop casting in ODCB (2 mL). Static water contact angles were measured with deionized water (Milli-Q, 2 μL) in 10 repetitive tests using the Sessile Drop Technique (FIG. 9 and Table 4), and the average of these values of contact angles was calculated. HDPE film, 97±4°; blend film, 93±4°.

TABLE 4

Static contact angles for films from HDPE and polymer blend.

| Trial | contact angle of HDPE film (°) | contact angle of blend film (°) |
|---|---|---|
| 1 | 100 | 95 |
| 2 | 95 | 93 |
| 3 | 92 | 91 |
| 4 | 92 | 87 |
| 5 | 96 | 92 |
| 6 | 104 | 91 |
| 7 | 99 | 87 |
| 8 | 100 | 96 |
| 9 | 92 | 92 |
| 10 | 99 | 102 |

Figure 17:
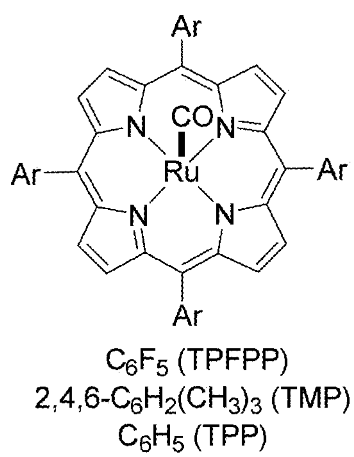
FIG. 17. Selected transition metal complexes for the catalytic oxidation of C—H bonds.
Figure 17:
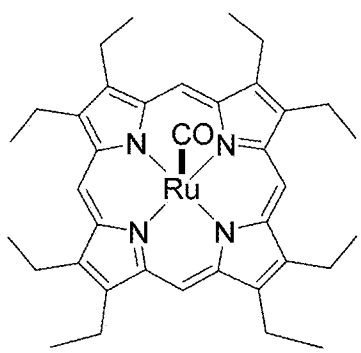
Figure 17:
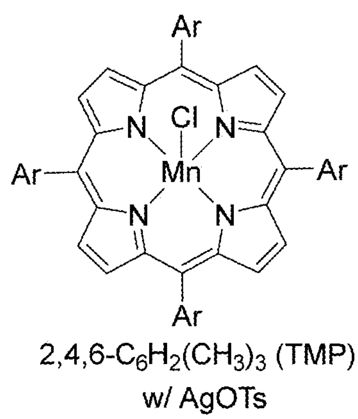
Figure 17:
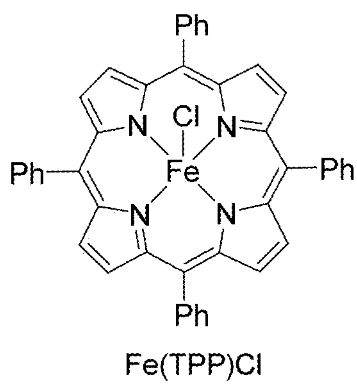
Figure 17:
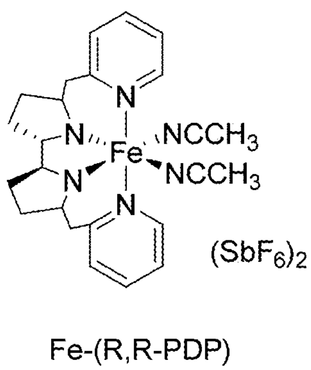
Figure 17:
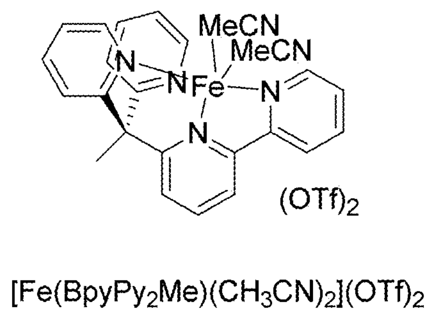

Evaluation of transition metal catalysts (FIG. 17) for the oxidation of LDPE.

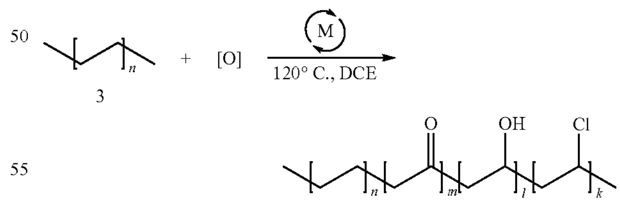

3

Representative protocol for the catalytic oxidation with iron-oxo catalysts. LDPE 3 (28 mg, 1.0 mmol) was dissolved in DCE (1 mL) at 120° C. and then cooled to room temperature. The reaction mixture was added a cosolvent MeCN (0.2 mL), Fe(R, R-PDP) (5.0 mol %, 4.7 mg, 5.0 μmol), and $^{m}$CPBA (23 mg, 0.10 mmol). The reaction was heated at 120° C. for 0.5 h. After cooling the reaction to room temperature, the mixture was poured into MeOH (5 mL) while stirring. The precipitated polymer was filtered, air dried, and collected in a vial (4 mL). The polymer was dried further in a vacuum oven at 70° C. for 12 h. The purified polymer (ca. 10 mg) was dissolved in $C_2D_2Cl_4$ (0.4 mL) in an NMR tube at 140° C., and high-temperature NMR spectra of the sample were collected at 100° C.

Representative protocol for the catalytic oxidation with the Mn-porphyrin complex. A catalyst stock solution was prepared by dissolving Mn(TMP)Cl (3.3 mg, 4.0 μmol) and AgOTs (2.2 mg, 8.0 μmol) in DCM (1 mL).[2] LDPE 3 (28 mg, 1.0 mmol) was dissolved in DCE (1 mL) at 120° C. and then cooled to room temperature. The catalyst stock solution (2 mol %, 0.5 mL) and $^{m}$CPBA (23 mg, 0.10 mmol) were added, and the mixture was stirred. The reaction was heated at 120° C. for 0.5 h. After cooling the reaction to room temperature, the mixture was poured into MeOH (5 mL) while stirring. The precipitated polymer was filtered, air dried, and collected in a vial (4 mL). The polymer was dried further in a vacuum oven at 70° C. for 12 h. The purified polymer (ca. 10 mg) was dissolved in $C_2D_2Cl_4$ (0.4 mL) in an NMR tube at 140° C., and high-temperature NMR spectra of the sample were collected at 100° C.

Representative protocol for the catalytic oxidation with the Ru-porphyrin complexes. A catalyst stock solution was prepared by dissolving Ru(TPFPP)(CO) (22 mg, 20 μmol) in DCM (20 mL). LDPE 3 (28 mg, 1.0 mmol) was dissolved in DCE (1 mL) at 120° C. and then cooled to room temperature. N-oxide 2 (16 mg, 0.10 mmol) and 0.05 mol %, 0.05 mL of a 1 mM stock solution were added, and the mixture was stirred. The reaction was heated at 120° C. for 0.5 h. After cooling the reaction to room temperature, the mixture was poured into MeOH (5 mL) while stirring. The precipitated polymer was filtered, air dried, and collected in a vial (4 mL). The polymer was dried further in a vacuum oven at 70° C. for 12 h. The purified polymer (ca. 10 mg) was dissolved in $C_2D_2Cl_4$ (0.4 mL) in an NMR tube at 140° C., and high-temperature NMR spectra of the sample were collected at 100° C.

TABLE 5

Catalytic oxidation of LDPE.[a]

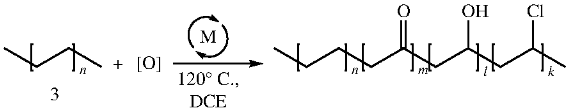

3

| Catalyst | l/n (mol %) | m/n (mol %) | k/n (mol %) |
|---|---|---|---|
| Fe(R, R-PDP) | 0 | 0 | 0 |
| $Fe(BpyPy_2Me)(CH_3CN)_2](OTf)_2$ | 0.2 | 0.2 | 0.8 |
| Fe(TPP)Cl | 0.1 | 0.1 | 0.4 |
| $Ni(Me_4Phen)_3](BPh_4)_2$[3, b] | 3.0 | 0.4 | 0.6 |
| Mn(TMP)Cl | 0.1 | 0 | 0 |
| Ru(TPFPP)(CO) | 1.7 | 2.1 | 0 |
| Ru(OEP)(CO) | 0.1 | 0.1 | 0 |
| Ru(TPP)(CO) | 0.1 | 0.1 | 0.1 |
| Ru(TMP)(CO) | 0.1 | 0.2 | 0.1 |

[a] [O]/[3] = 10 mol %.
[b] [O]/[3] = 14.5 mol %.

Analysis of the relationship between peak melting temperatures of oxidized LDPE and degree of functionalization.

The relationship between peak melting temperatures of oxidized LDPE and degree of functionalization can be fit to the simplified Sanchez-Eby model.[4]

$$T_m = T_m^0\left(1 - \frac{2\sigma}{\Delta H_u^0 L} - \frac{\varepsilon}{\Delta H_u^0} x_{FG}\right)$$

in which $T_m$ is the melting temperature of the functionalized polyethylene, $$T_m^0$$

is the equilibrium melting temperature of the homopolymer, $$\Delta H_u^0$$

is the enthalpy of fusion, σ is the surface energy, L is the lamellae thickness, ε is the enthalpy penalty for incorporating structural defects into the lamellar crystal, and $x_{FG}$ is the level of functionalization.

REFERENCES FOR EXAMPLE 2

1. (a) Lehman, S. E.; Wagener, K. B.; Baugh, L. S.; Rucker, S. P.; Schulz, D. N.; Varma-Nair, M.; Berluche, E., *Macromolecules* 2007, 40 (8), 2643-2656; (b) Ortmann, P.; Wimmer, F. P.; Mecking, S., *ACS Macro Letters* 2015, 4 (7), 704-707. 2. Liu, W.; Huang, X.; Placzek, M. S.; Krska, S. W.; McQuade, P.; Hooker, J. M.; Groves, J. T., *Chem. Sci.* 2018, 9 (5), 1168-1172. 3. Bunescu, A.; Lee, S.; Li, Q.; Hartwig, J. F., *ACS Central Science* 2017, 3 (8), 895-903. 4. (a) Sanchez, I. C.; Eby, R. K., *Macromolecules* 1975, 8 (5), 638-641; (b) Crist, B., *Polymer* 2003, 44 (16), 4563-4572.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of making an oxidized polyethylene, comprising mixing a polyethylene, a metal catalyst, and an oxidizing agent;

wherein:

the oxidized polyethylene comprises a first oxidized subunit, a second oxidized subunit, and a non-oxidized subunit;

the polyethylene comprises a non-oxidized subunit;

the first oxidized subunit has the formula:

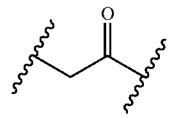

the second oxidized subunit has the formula:

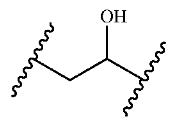

the non-oxidized subunit has the formula:

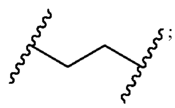 [SMILES: *CC*]

the ratio of the first and second oxidized subunits to the non-oxidized subunit in the oxidized polyethylene is from 1:10,000 to 1:5;

the oxidized polyethylene has a number average molecular weight from 600 Da to 20,000,000 Da;

wherein the metal catalyst is a ruthenium catalyst or an iron catalyst; and wherein a sum of a chloride subunit of formula

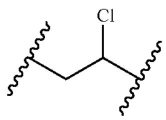

and an ester subunit of formula

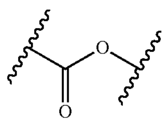

of the oxidized polyethylene is less than 6% of a sum of the first oxidized subunit and the second oxidized subunit of the oxidized polyethylene.

2. The method of claim 1, wherein the polyethylene is a high-density polyethylene, a low-density polyethylene, or a linear low-density polyethylene.

3. The method of claim 1, wherein the metal catalyst is a ruthenium catalyst.

4. The method of claim 1, wherein the metal catalyst is

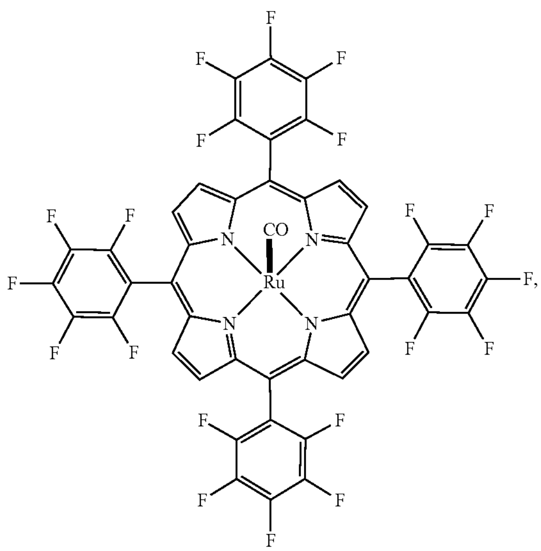

-continued

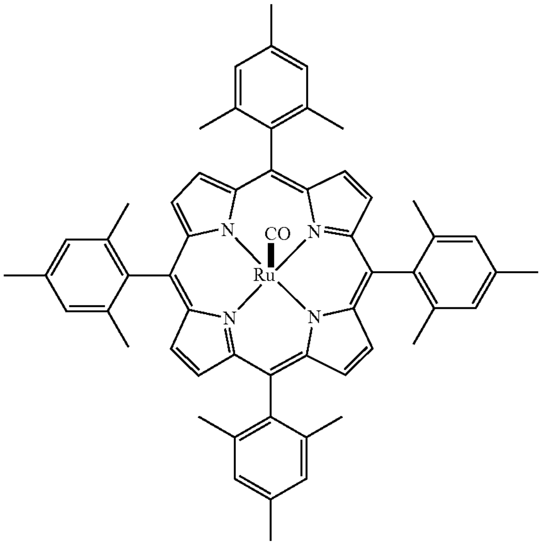

,

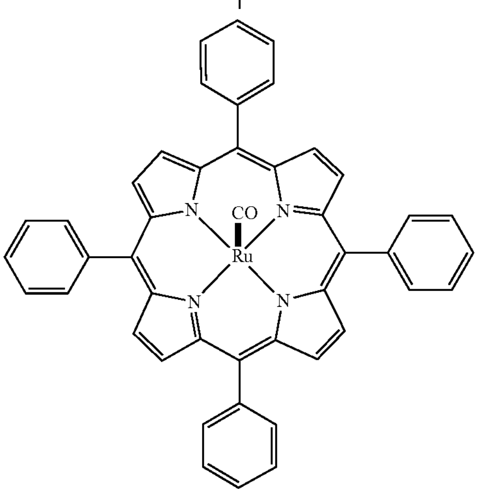

,

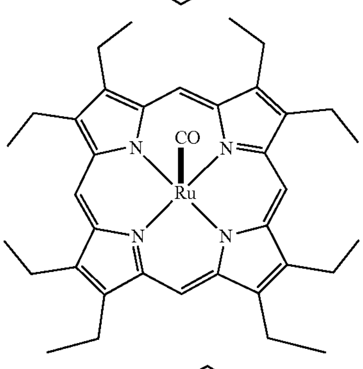

,

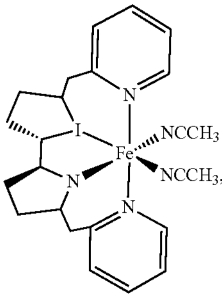

$(SbF_6)_2$

-continued
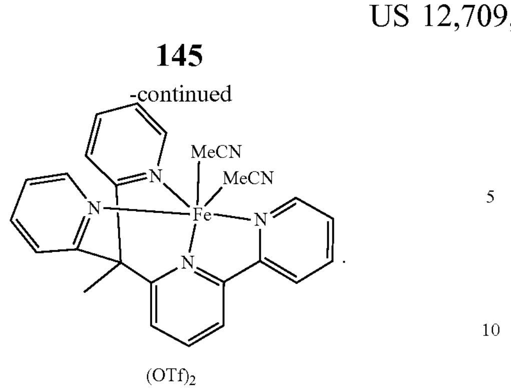
$(OTf)_2$
5. The method of claim 1, wherein the oxidizing agent is a peroxide or a substituted pyridine N-oxide.
* * * * *